(12) United States Patent
Ueno et al.

(10) Patent No.: US 8,291,231 B2
(45) Date of Patent: Oct. 16, 2012

(54) COMMON KEY SETTING METHOD, RELAY APPARATUS, AND PROGRAM

(75) Inventors: Nachi Ueno, Tokyo (JP); Shingo Orihara, Tokyo (JP); Kei Karasawa, Tokyo (JP); Yukio Tsuruoka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 350 days.

(21) Appl. No.: 12/741,758

(22) PCT Filed: Nov. 6, 2008

(86) PCT No.: PCT/JP2008/070212
§ 371 (c)(1),
(2), (4) Date: May 6, 2010

(87) PCT Pub. No.: WO2009/060899
PCT Pub. Date: May 14, 2009

(65) Prior Publication Data
US 2010/0250951 A1  Sep. 30, 2010

(30) Foreign Application Priority Data
Nov. 7, 2007 (JP) ................................ 2007-289906
Jul. 24, 2008 (JP) ................................ 2008-190536

(51) Int. Cl.
*H04L 9/32* (2006.01)
(52) U.S. Cl. ......... 713/176; 713/170; 713/168; 380/277
(58) Field of Classification Search .................. None
See application file for complete search history.

(56) References Cited

U.S. PATENT DOCUMENTS

| 7,093,128 | B2 * | 8/2006 | Asano et al. | 713/171 |
| 7,143,436 | B2 * | 11/2006 | Yamaguchi et al. | 726/6 |
| 7,275,158 | B2 * | 9/2007 | Akama | 713/171 |
| 7,584,351 | B2 * | 9/2009 | Kakii | 713/157 |

(Continued)

FOREIGN PATENT DOCUMENTS
JP    10 84338    3/1998
(Continued)

OTHER PUBLICATIONS

Dierks, T. et al., "The TLS Protocol Version 1.0", Network Working Group, retrieved on Oct. 24, 2007, URL: http://www.ietf.org/rfc/rfc2246.txt, pp. 1-79, (Jan. 1999).

(Continued)

*Primary Examiner* — Fikremariam A Yalew
(74) *Attorney, Agent, or Firm* — Oblon, Spivak, McClelland, Maier & Neustadt, L.L.P.

(57) ABSTRACT

A secret key of a second apparatus is stored in a relay apparatus. A first apparatus specifies secret information used to identify a common key, generates encrypted secret information by encrypting the secret information by using a public key of the second apparatus, and transmits the encrypted secret information to the relay apparatus. Then, the relay apparatus decrypts the encrypted secret information by using the secret key of the second apparatus to extract the secret information. The relay apparatus transmits the encrypted secret information to the second apparatus. The second apparatus decrypts the encrypted secret information by using the secret key of the second apparatus to extract the secret information. Finished messages corresponding to communication log information and the secret information are exchanged between the first apparatus and the relay apparatus and between the second apparatus and the relay apparatus.

15 Claims, 69 Drawing Sheets

U.S. PATENT DOCUMENTS

| | | | |
|---|---|---|---|
| 7,647,501 B2 * | 1/2010 | Imai | 713/175 |
| 7,681,033 B2 * | 3/2010 | Miura et al. | 713/155 |
| 2002/0035685 A1 | 3/2002 | Ono et al. | |
| 2003/0061518 A1 * | 3/2003 | Yamaguchi et al. | 713/201 |
| 2004/0107344 A1 * | 6/2004 | Minemura et al. | 713/171 |
| 2007/0055877 A1 * | 3/2007 | Persson et al. | 713/171 |
| 2009/0103733 A1 * | 4/2009 | Falk et al. | 380/277 |
| 2010/0174911 A1 * | 7/2010 | Isshiki | 713/182 |
| 2010/0325435 A1 * | 12/2010 | Park et al. | 713/171 |

FOREIGN PATENT DOCUMENTS

| | | |
|---|---|---|
| JP | 2001 237824 | 8/2001 |
| JP | 2002 82907 | 3/2002 |
| JP | 2007 36389 | 2/2007 |

OTHER PUBLICATIONS

"SSL & TLS", [online] May 2, 2007, retrieved on Oct. 26, 2007, URL: http://www21.ocn.ne.ip/~k-west/SSLandTLS/index-e.html, 12 pages, (with computer generated translation).

Maruyama, Ryuichiro "Advantages of introducing SSL-VPN, a new wave in remote access (part 1)", ITmedia Inc., retrieved on Oct. 24, 2007, URL: http://www.atmarkit.co.jp/fsecurity/special/42ssl_vpn/ssl_vpn01.html, pp. 1-5, (Sep. 13, 2003), (with English translation).

Ueno, Nachi et al., "TLSConnector: A Proposal for Improving Performance of SSL-VPN Gateways", Poster Session of 17th USENIX Security Symposium (USENIX Security' 08), pp. 1-5, (Jul. 28-Aug. 1, 2008).

17th USENIX Security Symposium, retrieved from internet on Apr. 22, 2010, URL: http://www.usenix.org/events/sec08/poster.html.

* cited by examiner

PRIOR ART

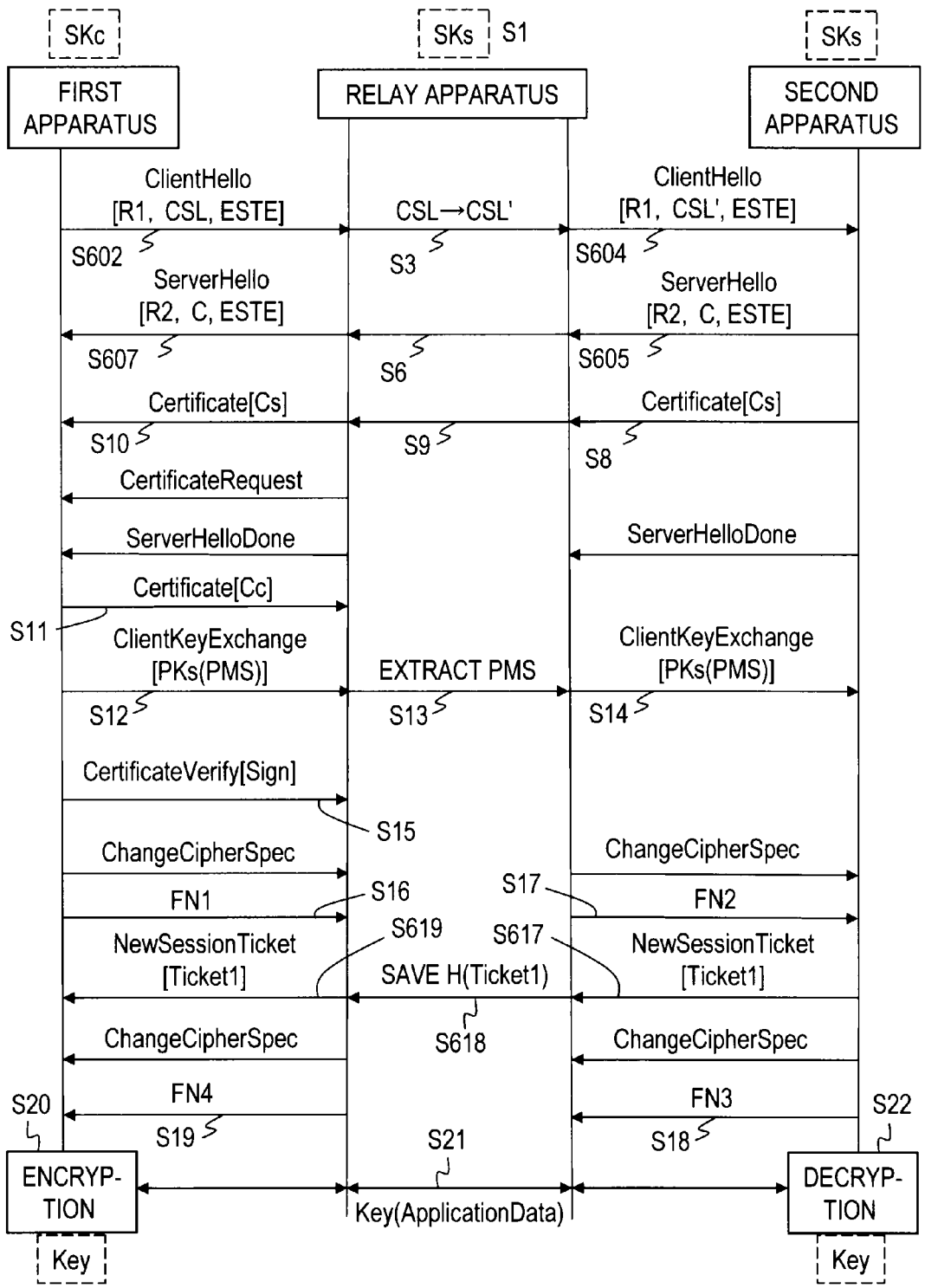

COMMON KEY SETTING METHOD, RELAY APPARATUS, AND PROGRAM

TECHNICAL FIELD

The present invention relates to a technology for setting a common key in a first apparatus and a second apparatus through a relay apparatus, wherein the first and second apparatuses perform processing according to a protocol including authentication between two apparatuses, sharing of a common key between the two apparatuses by using a cryptography technology, and processing for checking the validity of a common key setting process by using secret information for identifying the common key and communication log information between the two apparatuses.

BACKGROUND ART

Protocols for ensuring the security of a communication channel between a client apparatus and a server apparatus by authentication and cryptography include Transport Layer Security (TLS) and Secure Sockets Layer (SSL) (refer to non-patent literature 1 and 2, for example). These protocols include authentication between two apparatuses, the client apparatus and the server apparatus (processing 1), sharing of a common key between the two apparatuses by using a cryptography technology (processing 2), and processing to check the validity of a common key setting process by using secret information for identifying the common key and communication log information between the two apparatuses (processing 3). Authentication is performed as a safeguard against man-in-the-middle attacks, in which an attacker's apparatus impersonates the server apparatus to steal the common key from the client apparatus. There are two authentication modes: In one mode, authentication of the server apparatus alone is performed; in the other mode, authentication of both the server apparatus and the client apparatus is performed.

An outline of the protocols is given below. A protocol overview of TLS will be given here, but the same basic procedure applies to SSL and other extended protocols (TLS, SSL, and their extended protocols will be referred to as "TLS or the like" below). Items needed to explain the invention will be mainly described, and descriptions of other items that are not needed to explain the invention will be omitted.

[Mode in which Authentication of Server Apparatus Alone is Performed]

FIG. 1 is a sequence diagram illustrating an outline of a conventional mode in which authentication of the server apparatus alone is performed. When TLS is used, a method based on RSA, a method based on Diffie-Hellman (DH), or the like can be selected as a key exchange scheme. Just the RSA-based method will be described below.

In preprocessing of this procedure, a secret key SKs of a second apparatus (server apparatus) is stored in a memory of the second apparatus. When a first apparatus (client apparatus) starts communicating with the second apparatus, the first apparatus generates a random number R1 and sends information (ClientHello message) that includes the random number R1 (ClientHello.random) and a cryptosystem list (cipher suite list) CSL to the second apparatus. In response to the information, the second apparatus generates a random number R2 and sends information (ServerHello message) that includes the random number R2 (ServerHello.random) and a cryptosystem (cipher suite) C selected from the cryptosystem list CSL to the first apparatus.

The second apparatus next sends information (Certificate message) that includes a public key certificate Cs to the first apparatus. The second apparatus also sends a ServerHelloDone message to the first apparatus, but a description of this process will be omitted here.

The first apparatus generates a random number and uses the generated random number as secret information (premaster secret) PMS. This information is used to identify the common key Key. The first apparatus generates encrypted text PKs(PMS) by encrypting the secret information PMS with the public key PKs of the second apparatus and sends information (ClientKeyExchange message) that includes the encrypted text PKs(PMS) to the second apparatus (challenge at the first apparatus in processing 1 and processing 2). The second apparatus can obtain the secret information PMS by decrypting the encrypted text PKs(PMS) by using its own secret key SKs and calculates a master secret key MS from the secret information PMS and the random numbers R1 and R2. The second apparatus calculates the common key Key from the master secret key MS and the random numbers R1 and R2.

The first apparatus then sends a notification (ChangeCipherSpec) of the start of encryption to the second apparatus (unless otherwise expressed explicitly, the description will be omitted), generates a finished message FN1 corresponding to the secret information PMS and communication log information HS1 between the second apparatus and the first apparatus, and sends the finished message FN1 to the second apparatus. When TLS is used, the finished message FN1 is a message authentication code (MAC) generated to authenticate the communication log information HS1 between the second apparatus and the first apparatus by using the master secret key MS. When TLS is used, the finished message FN1 is generally encrypted by a common key encryption processor 12i by using the common key Key, is sent to the second apparatus, and is decrypted as necessary. This process is omitted in FIG. 1 (and also in FIGS. 2 to 4 to be described later).

The second apparatus verifies the finished message FN1 by using the master secret key MS and the communication log information HS1 between the second apparatus and the first apparatus (processing 3). If the verification has finished successfully, the second apparatus sends a notification (ChangeCipherSpec) of the start of encryption to the first apparatus (unless otherwise expressed explicitly, the description will be omitted), generates a finished message FN2 corresponding to the secret information PMS and communication log information HS2 between the second apparatus and the first apparatus, and sends the message to the first apparatus (response from the second apparatus in processing 1 and processing 3). When TLS is used, the finished message FN2 is the message authentication code generated to authenticate the communication log information HS2 between the second apparatus and the first apparatus and the finished message FN1, by using the master secret key MS. When TLS is used, the finished message FN2 is generally encrypted by using the common key Key and sent to the first apparatus.

The first apparatus verifies the finished message FN2, using the master secret key MS, the communication log information HS2 between the second apparatus and the first apparatus, and the finished message FN1 (verification of response from the second apparatus in processing 1 and processing 3). If the verification has finished successfully, the first apparatus sends the encrypted text data (Key(Application DATA)) obtained by encrypting a message by using the common key Key to the second apparatus to perform common key cryptosystem communication.

[Mode in which Authentication of Both Server Apparatus and Client Apparatus is Performed]

FIG. 2 is a sequence diagram illustrating an outline of a conventional mode in which authentication of both the server apparatus and the client apparatus is performed.

As shown in FIG. 2, this mode differs from the mode in which authentication of the server apparatus alone is performed in the following points: the secret key SKc is stored in the first apparatus so that the second apparatus (server apparatus) authenticates the first apparatus (client apparatus); the first apparatus sends information (Certificate message) that includes the public key certificate Cc to the second apparatus and also sends signature information Sign (CertificateVerify message) generated with the secret key SKc of the first apparatus to the second apparatus (response from the first apparatus in processing 1). Now, the second apparatus can perform authentication of the first apparatus (verification of response from the first apparatus in processing 1).

[Communication Technology through Relay Apparatus]

SSL-VPN, SSL-accelerator, and other technologies are used to perform communication through a relay apparatus between the client apparatus and the server apparatus performing the processing as described above in accordance with TLS or the like (refer to non-patent literature 3, for example). With these technologies, the client apparatus and the relay apparatus share a common key by performing the processing described above using TLS or the like, and the server apparatus and the relay apparatus share a common key by performing the processing as described above using TLS or the like.

FIG. 3 is a sequence diagram illustrating an example of related art for performing communication through the relay apparatus between the client apparatus and the server apparatus, the apparatuses performing processing in accordance with TLS or the like.

In the example illustrated in FIG. 3, the first apparatus (client apparatus) and the second apparatus (server apparatus) perform authentication of both the server apparatus and the client apparatus and common key sharing, via the relay apparatus (TLS-authenticated GW). In this example, the first apparatus stores its secret key SKc, the relay apparatus stores its secret key SKg, and the second apparatus stores its secret key SKs. The first apparatus and the relay apparatus perform the above described processing in the mode in which authentication of both the server apparatus and the client apparatus is performed (the public key certificate Cs of the second apparatus is replaced with the public key certificate Cg of the relay apparatus; the public key PKs is replaced with the public key PKg; and the second apparatus is replaced with the relay apparatus) to share a common key Key1. In addition, the second apparatus and the relay apparatus separately perform the above described processing in the mode in which authentication of both the server apparatus and the client apparatus is performed to share a common key Key2.

FIG. 4 is a sequence diagram illustrating another example of communication through the relay apparatus, between the client apparatus and the server apparatus performing processing in accordance with TLS or the like.

In the example illustrated in FIG. 4, the first apparatus stores its secret key SKc, the relay apparatus stores its secret key SKg, and the second apparatus stores its secret key SKs. The first apparatus and the relay apparatus perform the above described processing in the mode in which authentication of both the server apparatus and the client apparatus is performed (the public key certificate Cs of the second apparatus is replaced with the public key certificate Cg of the relay apparatus; the public key PKs is replaced with the public key PKg; and the second apparatus is replaced with the relay apparatus) to share a common key Key1. In addition, the second apparatus and the relay apparatus separately perform the above described processing in the mode in which authentication of the server apparatus alone is performed to share a common key Key2.

Non-patent literature 1: T. Dierks, C. Akken, "The TLS Protocol Version 1.0," [online] January 1999, Network Working Group, retrieved on Oct. 24, 2007, URL: http://www.ietf.org/rfc/rfc2246.txt Non-patent literature 2: "SSL & TLS," [online] May 2, 2007, retrieved on Oct. 26, 2007, URL: http://www21.ocn.ne.jp/~ k-west/SSLandTLS/Non-patent Non-patent literature 3: Ryuichiro Maruyama, "Advantages of introducing SSL-VPN, a new wave in remote access (part 1)," [online] Sep. 13, 2003, ITmedia Inc., retrieved on Oct. 24, 2007, URL: http://www.atmarkit.co.jp/fsecurity/special/42ssl_vpn/ssl_vpn01.html

DISCLOSURE OF THE INVENTION

Problems to be Solved by the Invention

With the technologies illustrated in FIG. 3 and FIG. 4, the processing performed between the first apparatus and the relay apparatus in accordance with the protocol is separate from the processing performed between the second apparatus and the relay apparatus in accordance with the protocol. Accordingly, the common key Key1 shared between the first apparatus and the relay apparatus and the common key Key2 shared between the second apparatus and the relay apparatus are separate keys. If common key cryptosystem communication is performed between the first apparatus and the second apparatus by using the specified common keys, the relay apparatus must execute decryption by using one specified common key and encryption by using the other specified common key. This increases the amount of encryption and decryption in the relay apparatus and lowers the rate of cryptosystem communication. To perform common key cryptosystem communication from the first apparatus to the second apparatus, for example, the first apparatus must generate encrypted data by using the common key Key1 and send the data to the relay apparatus; the relay apparatus must decrypt the encrypted data by using the common key Key1 to extract plaintext, encrypt the plaintext by using the common key Key2, and send the generated encrypted data to the second apparatus.

When the first apparatus and the second apparatus set a common key through the relay apparatus, a method of performing processing differing from the protocol that includes processing 1 to 3 described above and sharing the common key can be used. However, if the first apparatus and the second apparatus must execute processing differing from the protocol when the first apparatus and the second apparatus set the common key through the relay apparatus, all the processing settings of the first apparatus and the second apparatus must be changed. This will require a great amount of money and labor.

In view of the problems described above, it is an object of the present invention to provide a technology that allows a first apparatus and a second apparatus, the first and second apparatuses performing processing according to a protocol including authentication between two apparatuses, sharing of a common key between the two apparatuses by using a cryptography technology, and processing for checking the validity of a common key setting process by using secret information for identifying the common key and communication log information between the two apparatuses, to share an identical common key through a relay apparatus and to perform high-speed cryptosystem communication, without performing processing not conforming to the protocol.

Means to Solve the Problems

In the present invention, a first apparatus and a second apparatus performing processing according to a protocol including authentication between two apparatuses, sharing of a common key between the two apparatuses by using a cryptography technology, and processing for checking the validity of a common key setting process by using secret information for identifying the common key and communication log information between the two apparatuses set a common key through a relay apparatus.

In one aspect of the present invention, a secret key of the second apparatus is first stored into a memory of the relay apparatus. Then, a secret information setting unit of the first apparatus specifies secret information for identifying the common key. A public key encryption processor of the first apparatus generates encrypted secret information by encrypting the secret information by using a public key of the second apparatus corresponding to the secret key of the second apparatus, and a transmitter of the first apparatus transmits the encrypted secret information to the relay apparatus. A decryption processor of the relay apparatus decrypts the encrypted secret information by using the secret key of the second apparatus read from the memory of the relay apparatus to extract the secret information. A transmitter of the relay apparatus transmits the encrypted secret information to the second apparatus. A decryption processor of the second apparatus decrypts the encrypted secret information by using the secret key of the second apparatus to extract the secret information. A finished message generator of the first apparatus generates a first finished message corresponding to the secret information and communication log information between the first apparatus and the relay apparatus, and the transmitter of the first apparatus transmits the first finished message to the relay apparatus. A finished message generator of the relay apparatus generates a second finished message corresponding to the secret information and communication log information between the second apparatus and the relay apparatus, and the transmitter of the relay apparatus transmits the second finished message to the second apparatus. A finished message generator of the second apparatus generates a third finished message corresponding to the secret information and communication log information between the second apparatus and the relay apparatus, and a transmitter of the second apparatus transmits the third finished message to the relay apparatus. The finished message generator of the relay apparatus generates a fourth finished message corresponding to the secret information and communication log information between the first apparatus and the relay apparatus, and the transmitter of the relay apparatus transmits the fourth finished message to the first apparatus.

When the relay apparatus forwards the encrypted secret information sent from the first apparatus, to the second apparatus, the first apparatus and the second apparatus can share the identical common key. Since the relay apparatus stores the secret key of the second apparatus, the relay apparatus can decrypt the encrypted secret information sent from the first apparatus to obtain the secret information corresponding to the common key. Therefore, the relay apparatus can generate the second finished message and the fourth finished message corresponding to the identical common key. In other words, in the above described aspect, the first apparatus and the second apparatus are allowed to share the identical common key while the relay apparatus does not need to decrypt the encrypted secret information sent from the first apparatus, for re-encryption. In addition, the relay apparatus can send the second finished message and the fourth finished message corresponding to the identical common key to the second apparatus and the first apparatus, respectively. Since these processes conform to the above described protocol when viewed from the first apparatus and the second apparatus, there is no need for the first apparatus and the second apparatus to execute any processes not conforming to the above described protocol.

In a second aspect of the present invention, a secret information setting unit of the first apparatus specifies secret information for identifying the common key. A public key encryption processor of the first apparatus generates first encrypted secret information by encrypting the secret information by using a public key of the relay apparatus corresponding to a secret key of the relay apparatus, and a transmitter of the first apparatus transmits the first encrypted secret information to the relay apparatus. Then, a decryption processor of the relay apparatus decrypts the first encrypted secret information by using the secret key of the relay apparatus read from the memory of the relay apparatus to extract the secret information. A public key encryption processor of the relay apparatus generates second encrypted secret information by encrypting the secret information by using a public key of the second apparatus, and a transmitter of the relay apparatus transmits the second encrypted secret information to the second apparatus. A decryption processor of the second apparatus decrypts the second encrypted secret information by using a secret key of the second apparatus corresponding to the public key of the second apparatus to extract the secret information. A finished message generator of the first apparatus generates a first finished message corresponding to the secret information and communication log information between the first apparatus and the relay apparatus, and the transmitter of the first apparatus transmits the first finished message to the relay apparatus. A finished message generator of the relay apparatus generates a second finished message corresponding to the secret information and communication log information between the second apparatus and the relay apparatus, and the transmitter of the relay apparatus transmits the second finished message to the second apparatus. A finished message generator of the second apparatus generates a third finished message corresponding to the secret information and communication log information between the second apparatus and the relay apparatus, and a transmitter of the second apparatus transmits the third finished message to the relay apparatus. The finished message generator of the relay apparatus generates a fourth finished message corresponding to the secret information and communication log information between the first apparatus and the relay apparatus, and the transmitter of the relay apparatus transmits the fourth finished message to the first apparatus.

In the above case, the relay apparatus needs to decrypt the first encrypted secret information sent from the first apparatus and encrypts the secret information again for the second apparatus. The first apparatus and the second apparatus are allowed to share the identical common key. In addition, the relay apparatus can send the second finished message and the fourth finished message corresponding to the identical common key to the second apparatus and the first apparatus, respectively. Since these processes conform to the above described protocol when viewed from the first apparatus and the second apparatus, there is no need for the first apparatus and the second apparatus to execute any processes not conforming to the above described protocol.

In the present invention, "apparatus A transmits information C to apparatus B" means that "apparatus A transmits information C to apparatus B without encrypting information C" and "apparatus A encrypts information C such that apparatus B can decrypt the encrypted information C and transmits the encrypted information C". Each finished message may be encrypted by using the common key determined by using the secret information. Whether or not each finished message is encrypted by using the common key determined by using the secret information does not change the technical values of the present invention.

Effects of the Invention

According to the present invention, a first apparatus and a second apparatus performing processing according to a protocol including authentication between two apparatuses, sharing of a common key between the two apparatuses by using a cryptography technology, and processing for checking the validity of a common key setting process by using secret information for identifying the common key and communication log information between the two apparatuses, are allowed to share an identical common key through a relay apparatus and to perform high-speed cryptosystem communication, without performing processing not conforming to the protocol.

BRIEF DESCRIPTION OF THE DRAWINGS

FIG. 3 is a sequence diagram illustrating an example of related art for performing communication through a relay apparatus between the client apparatus and the server apparatus, the apparatuses performing processing in accordance with TLS or the like;

FIG. 4 is a sequence diagram illustrating another example of communication through the relay apparatus, between the client apparatus and the server apparatus performing processing in accordance with TLS or the like;

FIG. 42 is a sequence diagram illustrating the overall initial connection processing in the thirteenth embodiment;

Figure 1:
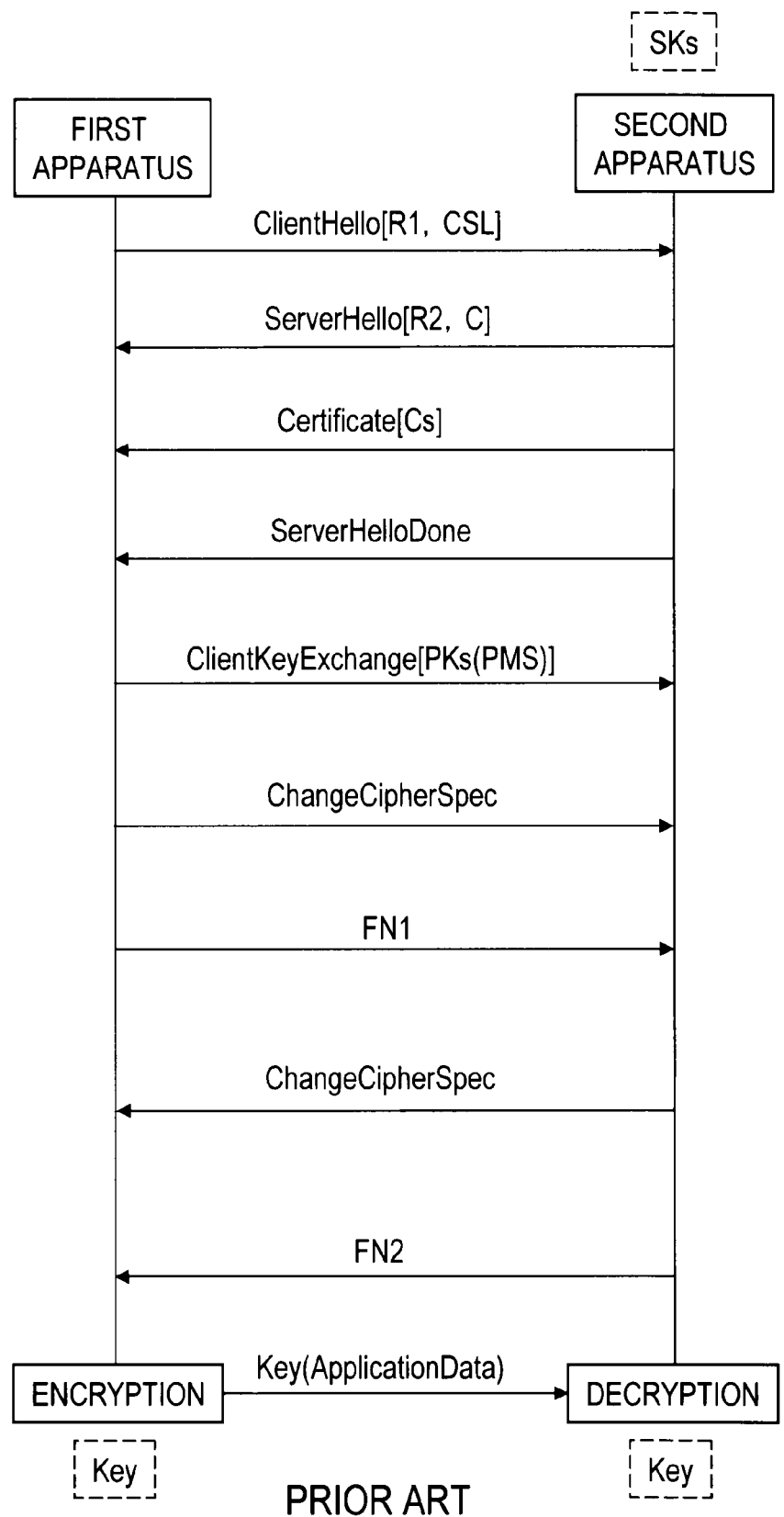
FIG. 1 is a sequence diagram illustrating an outline of a conventional mode in which authentication of a server apparatus alone is performed.
Figure 2:
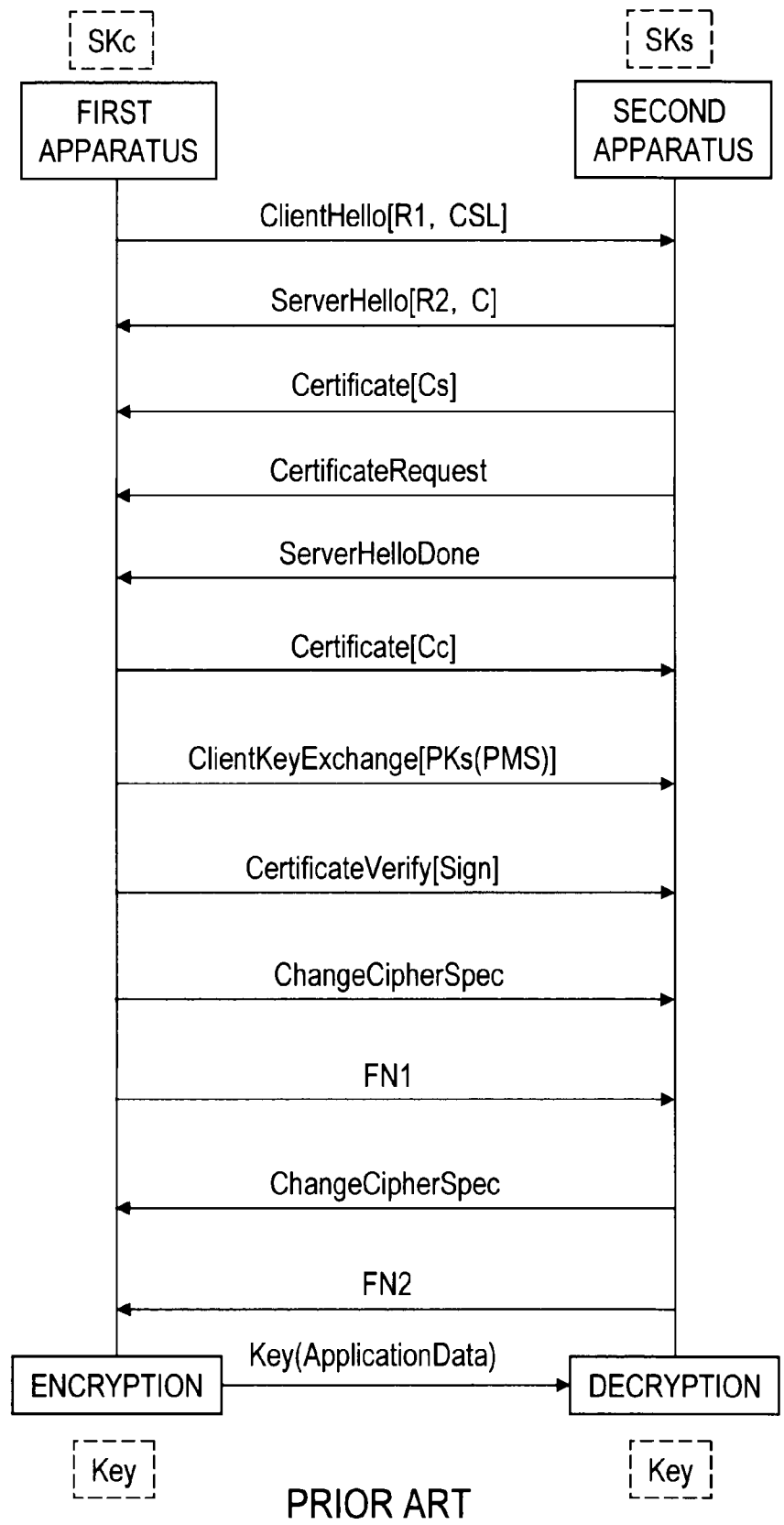
FIG. 2 is a sequence diagram illustrating an outline of a conventional mode in which authentication of both the server apparatus and a client apparatus is performed.
Figure 3:
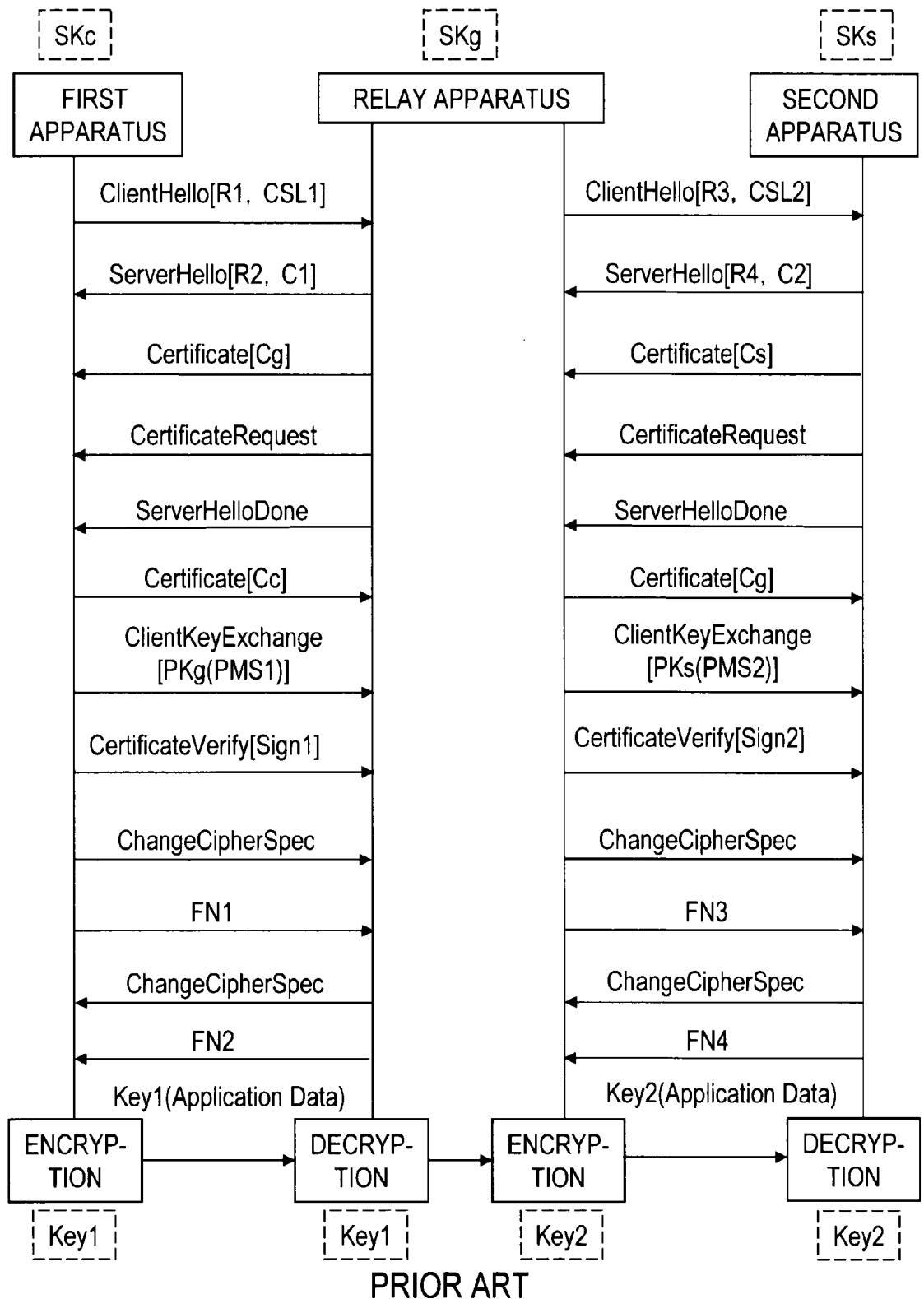
Figure 4:
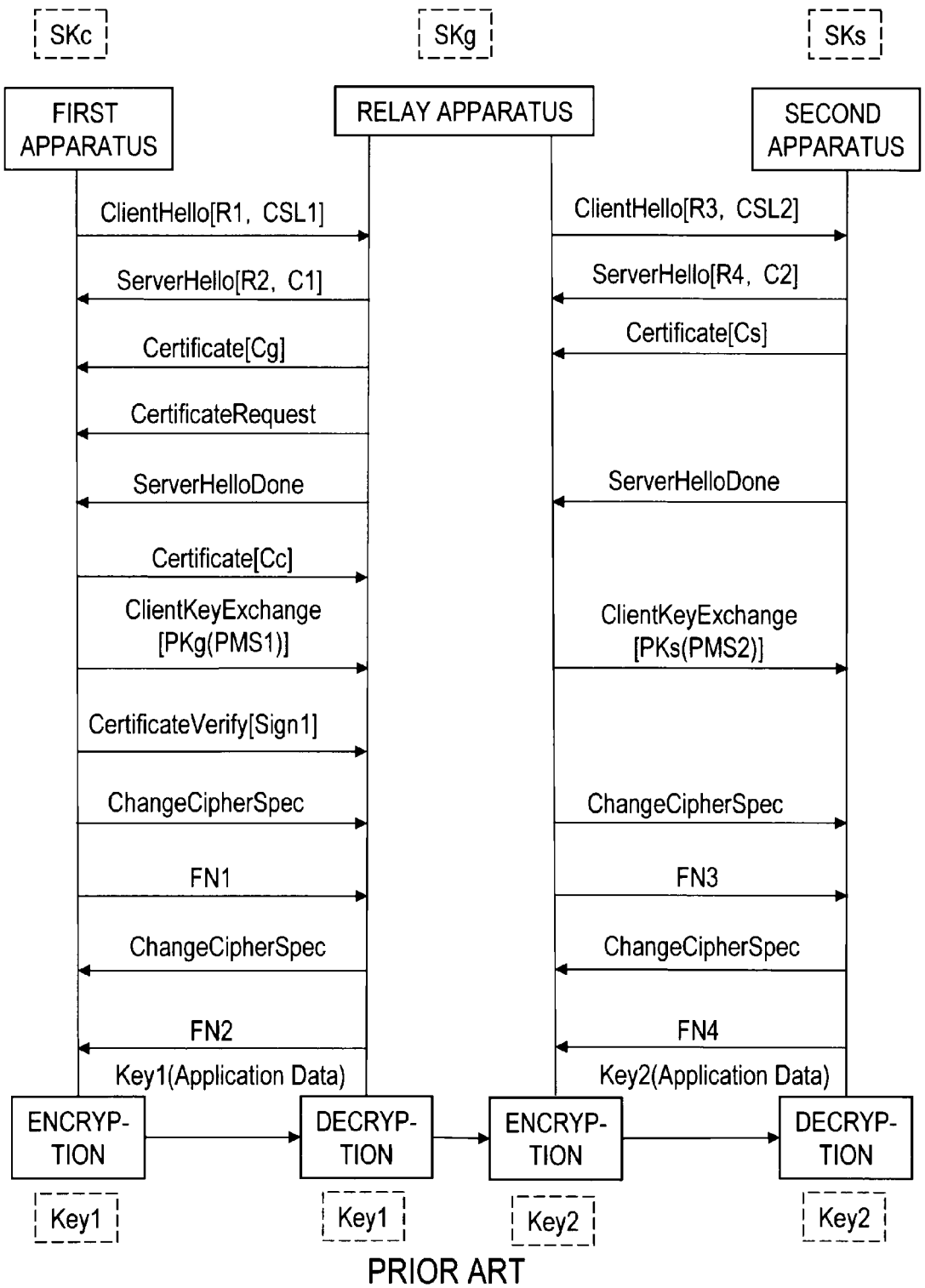

DESCRIPTION OF REFERENCE NUMERALS 1, 100, 200, 300, 400, 1001, 1100, 1200, 1300: Common key cryptosystem communication systems

BEST MODES FOR CARRYING OUT THE INVENTION

Now, embodiments of the present invention will be described below with reference to the drawings.

First Embodiment

A first embodiment of the present invention will now be described.

<Structure>

[Overall Structure]

Figure 5:
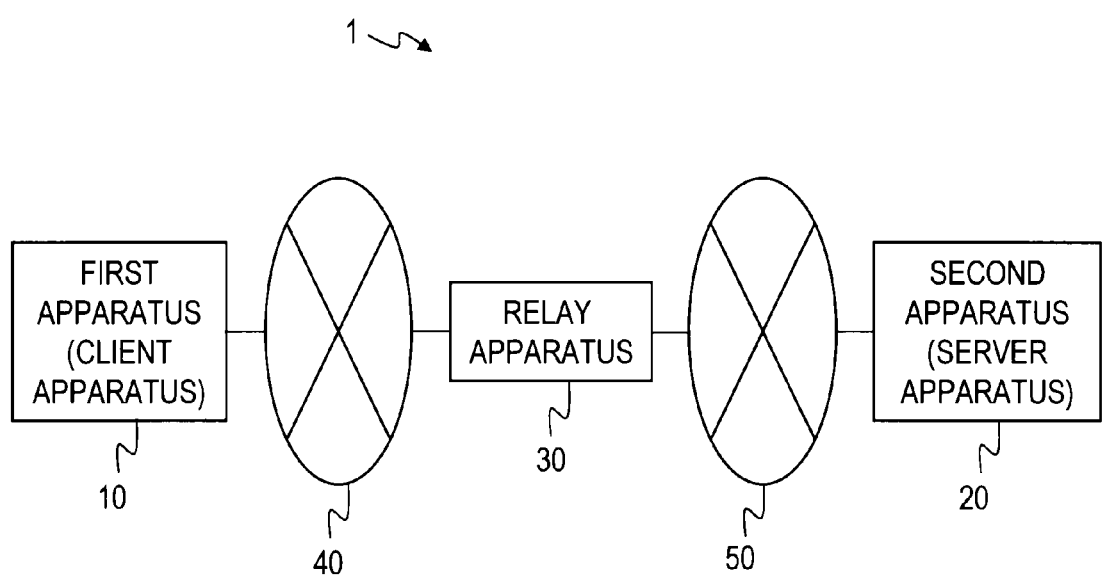
FIG. 5 is a block diagram illustrating the overall structure of a common key cryptosystem communication system according to a first embodiment.

FIG. 5 is a block diagram illustrating the overall structure of a common key cryptosystem communication system 1 of a first embodiment.

As illustrated in FIG. 5, the common key cryptosystem communication system 1 in this embodiment includes a first apparatus 10 (a client apparatus, for example), a second apparatus 20 (a server apparatus, for example), and a relay apparatus 30 (a gateway apparatus, for example). The first apparatus 10 and the relay apparatus 30 are connected by a network 40 such as the Internet or a local area network (LAN) to allow communication between them, and the second apparatus 20 and the relay apparatus 30 are connected by a network 50 such as the Internet or a LAN to allow communication between them.

The first apparatus 10 and the second apparatus 20 are apparatuses that perform processing in accordance with a protocol (such as SSL, TLS or the like), including authentication between two apparatuses, common key sharing between the two apparatuses, using a cryptography technology, and processing for checking the validity of a common key setting process by using secret information for identifying a common key and communication log information between the two apparatuses. The relay apparatus 30 is an apparatus for performing new unique processing in this embodiment. In FIG. 5, to simplify the description, one first apparatus 10 and one second apparatus 20 are connected to the relay apparatus 30 to allow communication between them. However, two or more first apparatuses 10 and second apparatuses 20 may be connected to the relay apparatus 30 to allow communication between them. The structure may include a plurality of relay apparatuses 30.

[First Apparatus]

The first apparatus 10 in this embodiment is implemented by a well-known computer that includes a central processing unit (CPU), a random-access memory (RAM), a read-only memory (ROM), a communication device, and the like when a predetermined program is read into the computer and executed by the CPU.

Figure 6:
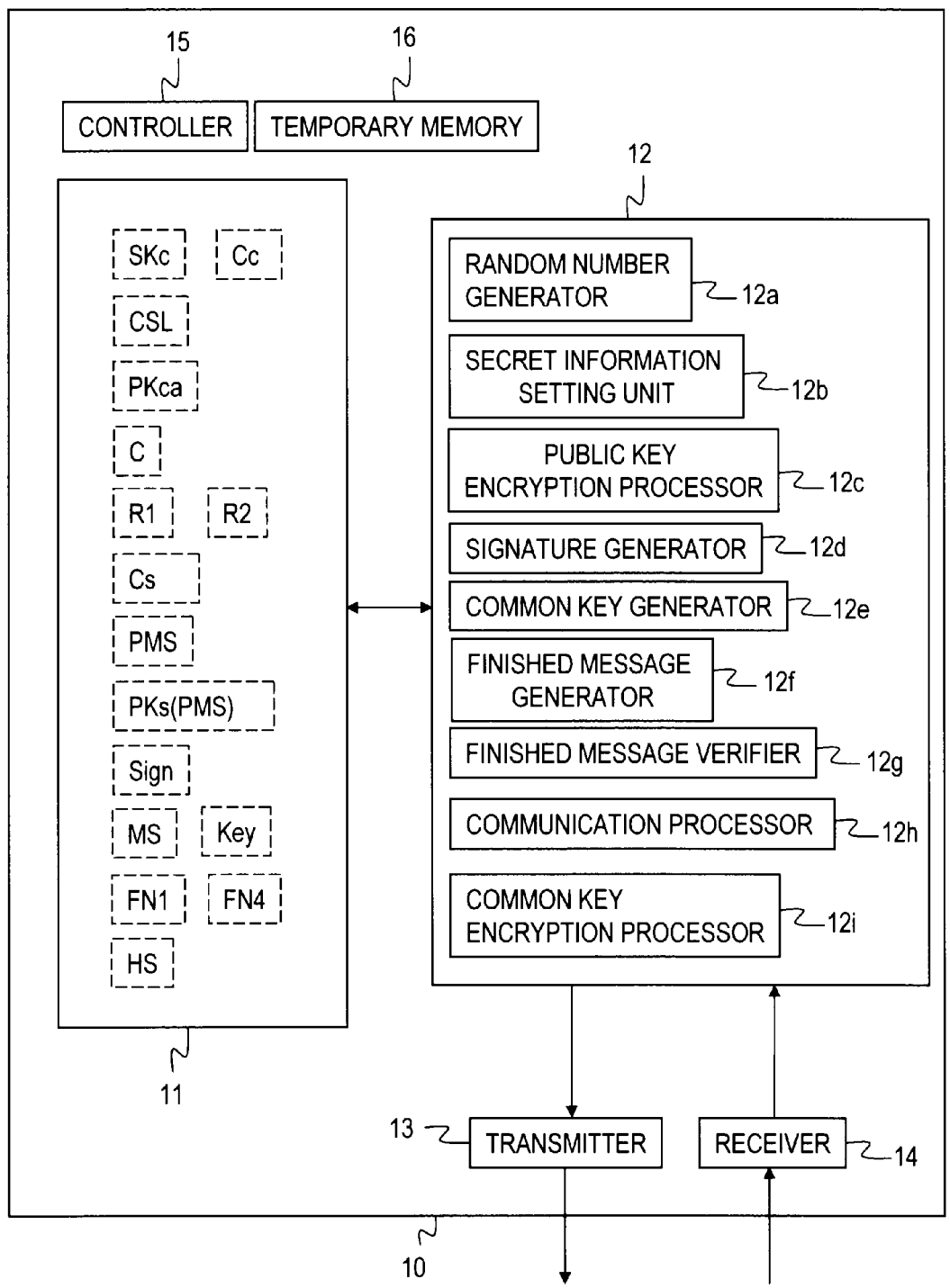
FIG. 6 is a block diagram illustrating the functional structure of a first apparatus in the first embodiment.

FIG. 6 is a block diagram illustrating the functional structure of the first apparatus 10 in the first embodiment.

As shown in FIG. 6, the first apparatus 10 in this embodiment includes a memory 11, a calculator 12, a transmitter 13, a receiver 14, a controller 15, and a temporary memory 16. The calculator 12 includes a random number generator 12a, a secret information setting unit 12b, a public key encryption processor 12c, a signature generator 12d, a common key generator 12e, a finished message generator 12f, a finished message verifier 12g, a communication processor 12h, and a common key encryption processor 12i.

The calculator 12 and the controller 15 in this embodiment are processors implemented when predetermined programs are read into the CPU and executed by the CPU. The memory 11 and the temporary memory 16 are well-known storage devices such as RAMs, registers, cache memories, and hard disk drives, or storage areas formed by combining at least some of these. The transmitter 13 and the receiver 14 are communication devices such as LAN cards or modems controlled by the CPU when predetermined programs are read into it. Examples of hardware implementing the first apparatus include a personal computer, a mobile phone, and a personal digital assistant (PDA).

The first apparatus 10 executes processing under the control of the controller 15. Unless otherwise specified explicitly, each data item generated in each calculation process is stored in the temporary memory 16 and is read out for a different calculation.

[Second Apparatus]

The second apparatus 20 in this embodiment is implemented by a well-known computer that includes a CPU, a RAM, a ROM, a communication device, and the like when a predetermined program is read into the computer and executed by the CPU.

Figure 7:
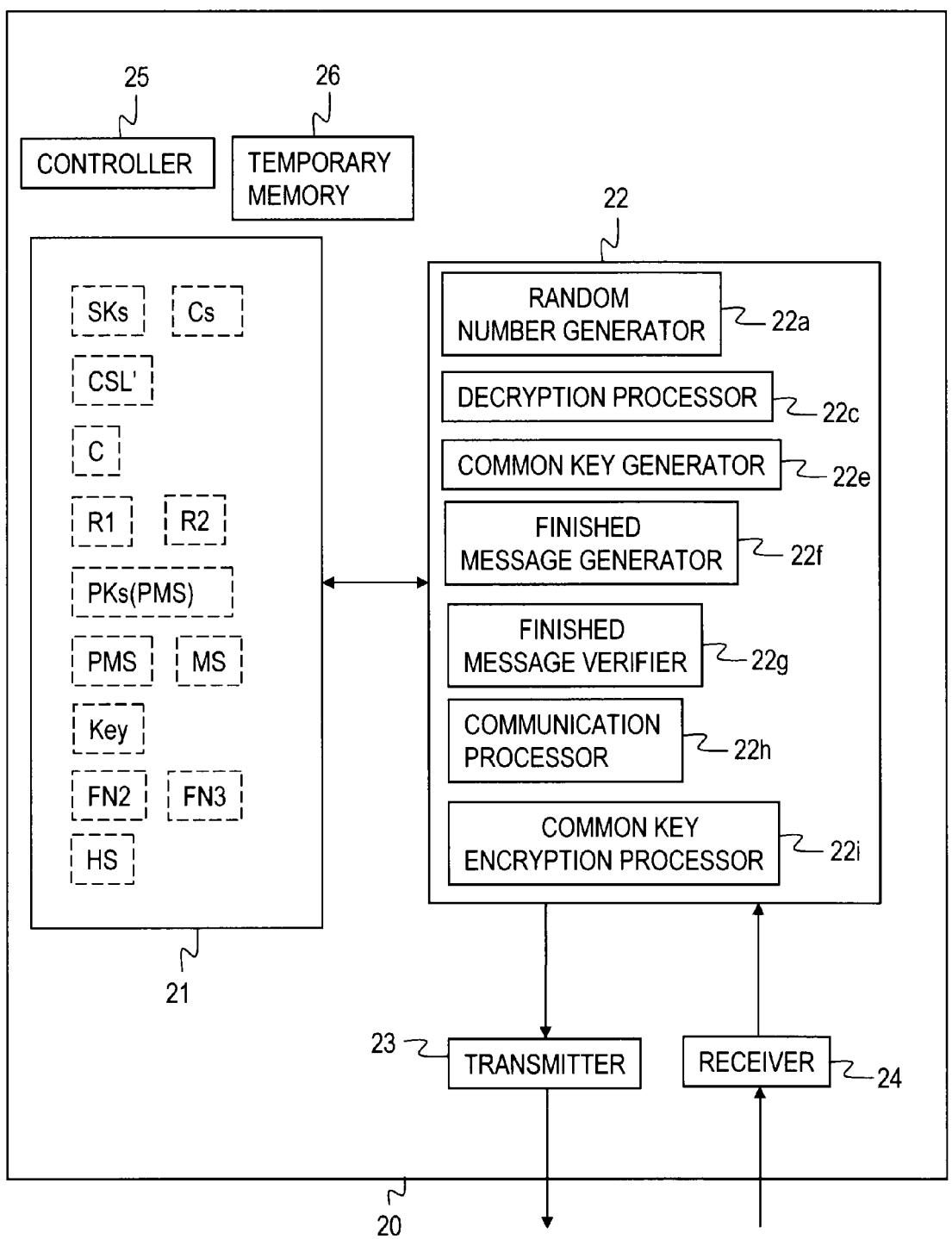
FIG. 7 is a block diagram illustrating the functional structure of a second apparatus in the first embodiment.

FIG. 7 is a block diagram illustrating the functional structure of the second apparatus 20 in the first embodiment.

As shown in FIG. 7, the second apparatus 20 in this embodiment includes a memory 21, a calculator 22, a transmitter 23, a receiver 24, a controller 25, and a temporary memory 26. The calculator 22 includes a random number generator 22a, a decryption processor 22c, a common key generator 22e, a finished message generator 22f, a finished message verifier 22g, a communication processor 22h, and a common key encryption processor 22i.

The calculator 22 and the controller 25 in this embodiment are processors implemented when predetermined programs are read into the CPU and executed by the CPU. The memory 21 and the temporary memory 26 are well-known storage devices such as RAMs, registers, cache memories, and hard disk drives, or storage areas formed by combining at least some of these. The transmitter 23 and the receiver 24 are communication devices such as LAN cards or modems controlled by the CPU when predetermined programs are read into it. Examples of hardware implementing the second apparatus include a server machine and a personal computer.

The second apparatus 20 executes processing under the control of the controller 25. Unless otherwise specified explicitly, each data item generated in each calculation process is stored in the temporary memory 26 and is read out for a different calculation.

[Relay Apparatus]

The relay apparatus 30 in this embodiment is implemented by a well-known computer that includes a CPU, a RAM, a ROM, a communication device, and the like when a predetermined program is read into the computer and executed by the CPU.

Figure 8:
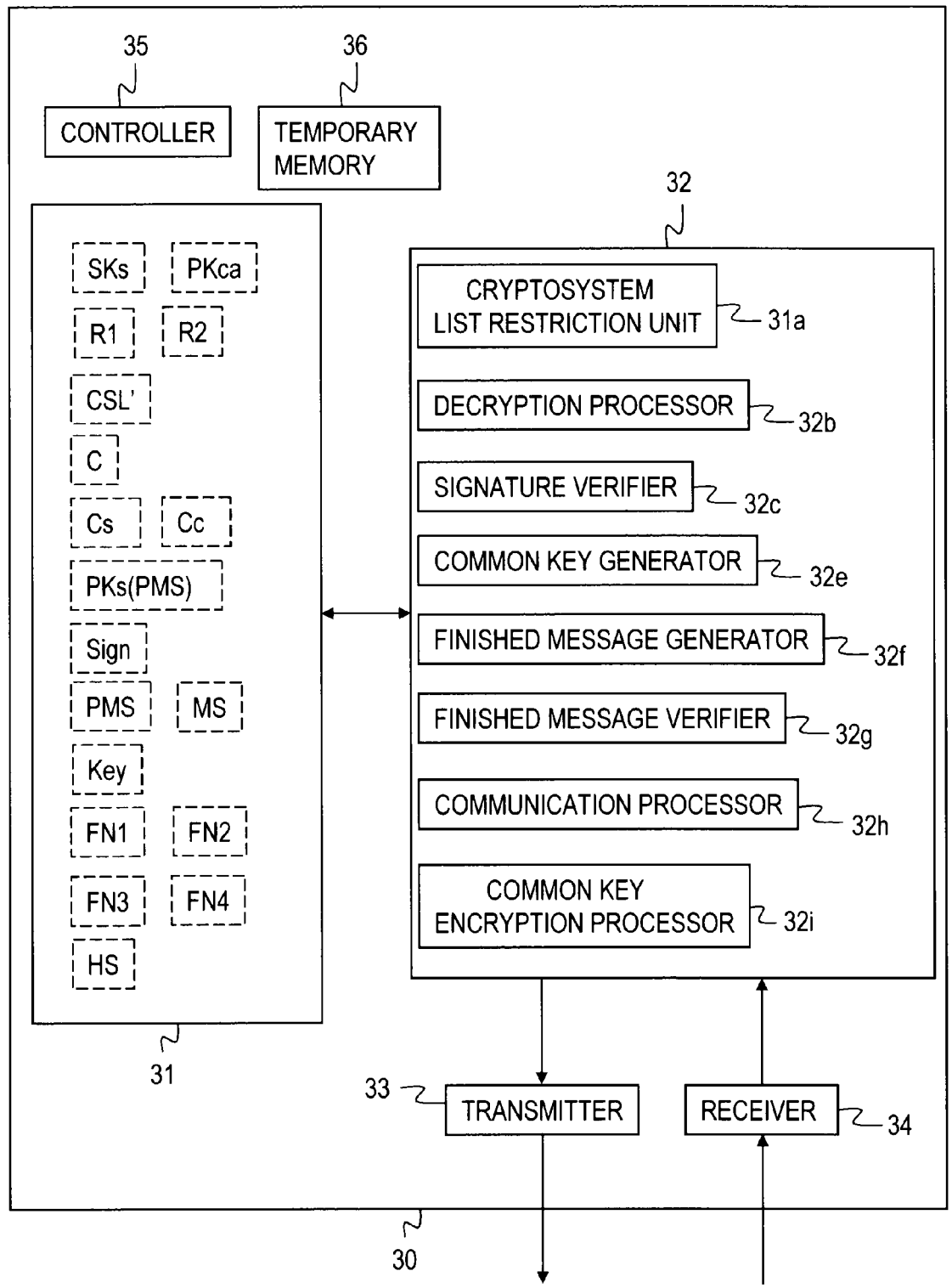
FIG. 8 is a block diagram illustrating the functional structure of a relay apparatus in the first embodiment.

FIG. 8 is a block diagram illustrating the functional structure of the relay apparatus 30 in the first embodiment.

As shown in FIG. 8, the relay apparatus 30 in this embodiment includes a memory 31, a calculator 32, a transmitter 33, a receiver 34, a controller 35, and a temporary memory 36. The calculator 32 includes a cryptosystem list restriction unit 31a, a decryption processor 32b, a signature verifier 32c, a common key generator 32e, a finished message generator 32f, a finished message verifier 32g, a communication processor 32h, and a common key encryption processor 32i.

The calculator 32 and the controller 35 in this embodiment are processors implemented when predetermined programs are read into the CPU and executed by the CPU. The memory 31 and the temporary memory 36 are well-known storage devices such as RAMs, registers, cache memories, and hard disk drives or storage areas formed by combining at least some of these. The transmitter 33 and the receiver 34 are communication devices such as LAN cards and modems controlled by the CPU when predetermined programs are read into it. Examples of hardware implementing the relay apparatus include a gateway machine, a server machine, and a personal computer.

The relay apparatus 30 executes processing under the control of the controller 35. Unless otherwise specified explicitly, each data item generated in each calculation process is stored in the temporary memory 36 and is read out for a different calculation.

<Processing>

The processing in this embodiment will be described next.

[Prerequisites]

The following are assumed: A pair of keys (public key, secret key) of a public key cryptosystem (such as RSA) has been generated for both the first apparatus 10 and the second apparatus 20. Each key pair may be generated for each of a plurality of cryptosystems. A secret key SKc of the first apparatus 10 has been stored in the memory 11 of the first apparatus 10, and a secret key SKs of the second apparatus 20 has been stored in the memory 21 of the second apparatus 20. A certification authority (CA) has issued a public key certificate for each public key; a public key certificate Cc for a public key PKc of the first apparatus 10 has been stored in the memory 11 of the first apparatus 10; and a public key certificate Cs for a public key PKs of the second apparatus 20 has been stored in the memory 21 of the second apparatus 20. The public key certificate Cc includes information such as the public key PKc of the first apparatus 10 and an electronic signature generated by using the secret key of the certification authority for data that includes the public key PKc. The public key certificate Cs includes information such as the public key PKs of the second apparatus 20 and an electronic signature generated by using the secret key of the certification authority for data that includes the public key PKs. Examples of standards for public key certificates include X.509. A cryptosystem list CSL listing cryptosystems for sharing secret information between two apparatuses is stored in the memory 11 of the first apparatus 10. The list corresponds to a cipher suite in TLS or the like and includes RSA cryptosystems and Diffie-Hellman (DH) cryptosystems, for example.

[Overall Processing]

Figure 9:
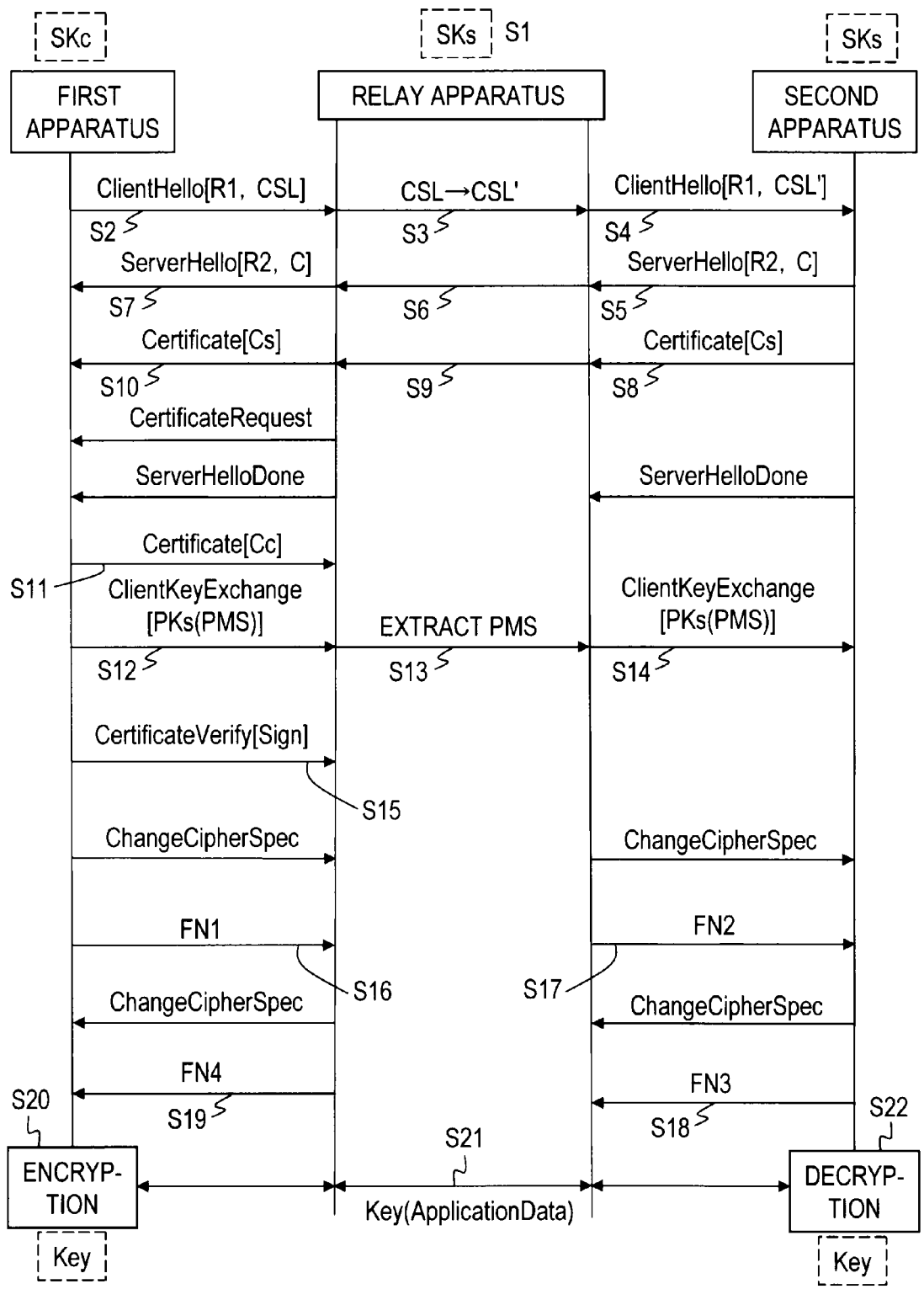
FIG. 9 is a sequence diagram illustrating the overall processing in the first embodiment.

FIG. 9 is a sequence diagram illustrating the overall processing in the first embodiment. A description will be made with reference to the diagram.

The secret key SKs of the second apparatus 20 (FIG. 7) is stored in the memory 31 of the relay apparatus 30 (secret key sharing process, step S1). If one key pair has been generated for each of a plurality of cryptosystems, the secret key SKs corresponding to each cryptosystem is stored in the memory 31. The second apparatus 20 can give its secret key SKs to the relay apparatus 30 in various ways: For example, the administrator of the second apparatus 20 may send by post a recording medium such as a memory card storing the secret key SKs to the administrator of the relay apparatus 30; or the second apparatus 20 may deliver the secret key SKs to the relay apparatus 30 safely by performing key sharing utilizing an authentication technology and a cryptography technology.

The random number generator 12a of the first apparatus 10 (FIG. 6) generates a random number R1 (first random number) (first random number generating process) and stores it in the memory 11. The communication processor 12h reads the random number R1 (first random number) and the cryptosystem list CSL from the memory 11, generates information (ClientHello message) that includes the read items, and sends the information to the transmitter 13. The transmitter 13 sends the ClientHello message, including the random number R1 and the cryptosystem list CSL, to the relay apparatus 30 through the network 40 (first random number sending process, step S2).

The ClientHello message is received by the receiver 34 of the relay apparatus 30 (FIG. 8) and sent to the communication processor 32h. The communication processor 32h stores the random number R1 (first random number) included in the ClientHello message in the memory 31 and sends the cryptosystem list CSL to the cryptosystem list restriction unit 31a. From the cryptosystems included in the cryptosystem list CSL, the cryptosystem list restriction unit 31a selects only the public key cryptosystems by which one of two apparatuses encrypts the secret information and sends the encrypted text to the other apparatus, and the other apparatus decrypts the encrypted text to share the secret information. The cryptosystem list restriction unit 31a generates a new cryptosystem list CSL' containing just the selected cryptosystems. When TLS or the like is used, the cryptosystem list restriction unit 31a selects just RSA cryptosystems from the cryptosystems included in CSL, generates a new cryptosystem list CSL' containing the RSA cryptosystems, and stores the list in the memory 31 (step S3).

The communication processor 32h reads the random number R1 and the new cryptosystem list CSL' from the memory 31, generates information (ClientHello message) that includes the read items, and sends the information to the transmitter 33. The transmitter 33 sends the ClientHello message, including the random number R1 and the new cryptosystem list CSL', to the second apparatus 20 through the network 50 (second random number sending process, step S4).

The ClientHello message, including the random number R1 and the new cryptosystem list CSL', is received by the receiver 24 of the second apparatus 20 (FIG. 7) and sent to the communication processor 22h. The communication processor 22h stores the random number R1 and the new cryptosystem list CSL' included in the ClientHello message in the memory 21. Then, the random number generator 22a of the second apparatus 20 generates a random number R2 (second random number) (second random number generating process) and stores it in the memory 21. The communication processor 22h selects one cryptosystem C for which the secret key SKs is stored in the memory 21, from the cryptosystem list CSL' stored in the memory 21, and stores the selected cryptosystem C in the memory 21. The communication processor 22h reads the selected cryptosystem C and the random number R2 from the memory 21, generates information (ServerHello message) that includes the read items, and sends the information to the transmitter 23. When TLS or the like is used, the ServerHello message also includes a session identifier SID, a compression algorithm (compression method), and the like. The cryptosystem C corresponds to the cipher suite in TLS or the like, and the cryptosystem C in this embodiment is an RSA cryptosystem. The transmitter 23 sends the ServerHello message, including the random number R2 and the cryptosystem C, to the relay apparatus 30 through the network 50 (third random number sending process, step S5).

The ServerHello message is received by the receiver 34 of the relay apparatus 30 (FIG. 8) and sent to the communication processor 32h. The communication processor 32h stores the random number R2 (second random number) and the cryptosystem C included in the ServerHello message in the memory 31 (step S6) and sends the ServerHello message to the transmitter 33. The transmitter 33 sends the ServerHello message, including the random number R2 and the cryptosystem C, to the first apparatus 10 through the network 40 (fourth random number sending process, step S7). The ServerHello message is received by the receiver 14 of the first apparatus 10 (FIG. 6) and sent to the communication processor 12h. The communication processor 12h stores the random number R2 (second random number) and the cryptosystem C included in the ServerHello message in the memory 11.

The communication processor 22h of the second apparatus 20 (FIG. 7) reads the public key certificate Cs of the public key PKs for the cryptosystem C stored in the memory 21 and sends information (Certificate message) that includes the read public key certificate Cs to the transmitter 23. The transmitter 23 sends the public key certificate Cs of the second apparatus 20 to the relay apparatus 30 through the network 50 (first public key certificate sending process, step S8). The public key certificate Cs of the second apparatus 20 is received by the receiver 34 of the relay apparatus 30 (FIG. 8) and sent to the communication processor 32h. The communication processor 32h stores the public key certificate Cs of the second apparatus 20 in the memory 31 and sends it to the transmitter 33. The transmitter 33 sends the public key certificate Cs of the second apparatus 20 to the first apparatus 10 through the network 40 (public key certificate sending process, step S9). The sent public key certificate Cs of the second apparatus 20 is received by the receiver 14 of the first apparatus 10 (FIG. 6) and sent to the communication processor 12h. The communication processor 12h stores the public key certificate Cs of the second apparatus 20 in the memory 11 (step S10). When TLS or the like is used, a CertificateRequest message is then sent from the relay apparatus 30 to the first apparatus 10, and a ServerHelloDone message is sent from the second apparatus 20 to the first apparatus 10 through the relay apparatus 30.

The communication processor 12h of the first apparatus 10 reads the public key certificate Cc of the public key PKc corresponding to the cryptosystem C stored in the memory 11 and sends information (Certificate message) that includes the read public key certificate Cc to the transmitter 13. The transmitter 13 sends the public key certificate Cc of the first apparatus 10 to the relay apparatus 30 through the network 40 (second public key certificate sending process, step S11). The public key certificate Cc of the first apparatus 10 is received by the receiver 34 of the relay apparatus 30 (FIG. 8) and sent to the communication processor 32h. The communication processor 32h stores the public key certificate Cc of the first apparatus 10 in the memory 31.

The secret information setting unit 12b of the first apparatus 10 (FIG. 6) specifies secret information (premaster secret) PMS for identifying the common key Key and stores the secret information PMS in the memory 11. The secret information PMS is set, for example, to a random number generated by the secret information setting unit 12b. The communication processor 12h of the first apparatus 10 reads the public key certificate Cs of the second apparatus 20 from the memory 11 and obtains a public key PKca of the CA which has issued the pubic key certificate Cs of the second apparatus 20 from a certification authority apparatus, not shown, connected to the network 40. The obtained public key PKca of the CA is stored in the memory 11. The communication processor 12h reads the public key certificate Cs of the second apparatus 20 and the public key PKca of the CA from the memory 11 and verifies the public key certificate Cs of the second apparatus 20 by using the public key PKca of the CA. If the verification is finished successfully, the public key encryption processor 12c reads from the memory 11 the secret information PMS, the public key PKs of the second apparatus 20 included in the public key certificate Cs, and the cryptosystem C, generates encrypted text PKs(PMS) (encrypted secret information, EncryptedPreMasterSecret message) by encrypting the secret information PMS by using the public key PKs in accordance with the cryptosystem indicated as the cryptosystem C, and stores the encrypted text PKs(PMS) in the memory 11 (secret information encrypting process). Information (ClientKeyExchange message) that includes the generated encrypted text PKs(PMS) is sent to the transmitter 13. The transmitter 13 sends the ClientKeyExchange message, including the encrypted text PKs(PMS) (encrypted secret information), to the relay apparatus 30 through the network 40 (encrypted secret information sending process, step S12).

The ClientKeyExchange message is received by the receiver 34 of the relay apparatus 30 (FIG. 8) and sent to the communication processor 32h. The communication processor 32h stores the encrypted text PKs(PMS) (encrypted secret information) included in the ClientKeyExchange message in the memory 31. The decryption processor 32b then reads the cryptosystem C from the memory 31 and reads the secret key SKs of the second apparatus 20, where the read secret key SKs corresponds to the read cryptosystem C. The decryption processor 32b reads the encrypted text PKs(PMS) from the memory 31 and decrypts it with the secret key SKs to extract the secret information PMS (first secret information decrypting process, step S13). The extracted secret information PMS is stored in the memory 31. The communication processor 32h reads the encrypted text PKs(PMS) from the memory 31 and sends a ClientKeyExchange message that includes the encrypted text PKs(PMS) to the transmitter 33. The transmitter 33 sends the ClientKeyExchange message, including the encrypted text PKs(PMS), to the second apparatus 20 through the network 50 (encrypted secret information forwarding process).

The sent ClientKeyExchange message is received by the receiver 23 of the second apparatus 20 and sent to the communication processor 22h. The communication processor 22h stores the encrypted text PKs(PMS) included in the ClientKeyExchange message in the memory 21. The decryption processor 22c of the second apparatus 20 reads the cryptosystem C from the memory 21 and reads the secret key SKs of the second apparatus 20, where the read secret key SKs corresponds to the read cryptosystem C. The decryption processor 22c reads the encrypted text PKs(PMS) from the memory 21 and decrypts it with the secret key SKs to extract the secret information PMS (second secret information decrypting process, step 14). The extracted secret information PMS is stored in the memory 21.

Now, the secret information PMS is shared by the first apparatus 10, the second apparatus 20, and the relay apparatus 30. The first apparatus 10, the second apparatus 20, and the relay apparatus 30 separately generate a master secret key MS and a common key Key by using the secret information PMS and share the keys.

The common key generator 12e of the first apparatus 10 (FIG. 6) reads the secret information PMS from the memory 11, generates a master secret key MS and a common key Key by using the secret information PMS, and stores the items in the memory 11. The master secret key MS is information determined by the random number R1 (first random number), the random number R2 (second random number), and the secret information PMS, for example. When TLS or the like is used, the common key generator 12e reads the secret information PMS, the random number R1 (first random number), and the random number R2 (second random number) from the memory 11 and specifies the function value obtained by inputting the secret information PMS, a character string, and the value of the connect bits of the random number R1 (first random number) and the random number R2 (second random number) to a predetermined pseudo-random function PRF, as the master secret key MS. When TLS or the like is used, the common key generator 12e reads the master secret key MS, the random number R1 (first random number), and the random number R2 (second random number) from the memory 11, obtains the function value by inputting the master secret key MS, a character string, and the value of the connect bits of the random number R1 (first random number) and the random number R2 (second random number) to the predetermined pseudo-random function PRF, specifies the bit string located at predetermined positions of the function value as the common key Key, and stores the string in the memory 11.

The common key generator 32e of the relay apparatus 30 also reads the secret information PMS and the like from the memory 31, generates the master secret key MS and the common key Key by performing the same calculation as that performed in the first apparatus 10, and stores the generated items in the memory 31. The common key generator 22e of the second apparatus 20 also reads the secret information PMS and the like from the memory 21, generates the master secret key MS and the common key Key by performing the same calculation as that performed by the first apparatus 10, and stores the generated items in the memory 21. The master secret keys MS generated by the apparatuses are associated with a session identifier SID and stored in the corresponding memories 11, 21, and 31.

The signature generator 12d of the first apparatus 10 (FIG. 6) reads the cryptosystem C from the memory 11 and reads the secret key SKc of the first apparatus, where the read secret key SKc corresponds to the read cryptosystem C. The signature generator 12d generates signature information Sign by using the secret key SKc and stores it in the memory 11 (signature information generating process). When TLS or the like is used, all the handshake messages (communication log information) that have been sent or received by the first apparatus 10 since the ClientHello message (step S2) until then, except the CertificateVerify message to be sent in step S15, are targets to be signed, and encrypted text obtained by encrypting, with the secret key SKc, the hash value of the targets to be signed becomes the signature information Sign. The communication processor 12h reads the signature information Sign from the memory 11 and sends information (CertificateVerify message) that includes the signature information Sign to the transmitter 13. The transmitter 13 sends the CertificateVerify message through the network 40 to the relay apparatus 30 (signature information sending process, step S15).

The CertificateVerify message is received by the receiver 34 of the relay apparatus 30 (FIG. 8) and sent to the communication processor 32h. The communication processor 32h stores the signature information Sign included in the CertificateVerify message in the memory 31. The signature verifier 32c reads the public key certificate Cc of the first apparatus 10 from the memory 31 and obtains the public key PKca of the CA which has issued the public key certificate Cc of the first apparatus 10 from the certification authority apparatus, not shown, connected to the network 40. The obtained public key PKca of the CA is stored in the memory 31. The communication processor 32h reads the public key certificate Cc of the first apparatus 10 and the public key PKca of the CA from the memory 31 and verifies the public key certificate Cc of the first apparatus 10 by using the public key PKca of the CA. If the verification is finished successfully, the signature verifier 32c reads the signature information Sign and the public key PKc of the first apparatus 10 included in the public key certificate Cc of the first apparatus 10, from the memory 31.

The signature verifier 32c verifies the signature information Sign by using the public key PKc of the first apparatus 10 (signature information verifying process). In this process, instead of the second apparatus 20, the relay apparatus 30 verifies the first apparatus 10. When TLS or the like is used, the signature verifier 32c decrypts the signature information Sign by using the public key PKc and verifies whether the decrypted result agrees with the hash value of all the handshake messages (communication log information) that have been exchanged between the relay apparatus 30 and the first apparatus 10 from the ClientHello message (step S2) up to that point, except the CertificateVerify message sent in step S15.

Then, a ChangeCipherSpec message is sent from the first apparatus 10 to the second apparatus 20 via the relay apparatus 30. The finished message generator 12f reads the master secret key MS and communication log information HS1 between the first apparatus 10 and the relay apparatus 30 from the memory 11, generates a first finished message FN1 corresponding to the master secret key MS and the communication log information HS1 (corresponding to the secret information PMS and the communication log information HS1), and stores the generated message in the memory 11 (first finished message generating process). An example of the communication log information HS1 between the first apparatus 10 and the relay apparatus 30 is all or part of the handshake messages issued until then, except the first finished message FN1. When TLS or the like is used, the communication log information HS1 between the first apparatus 10 and the relay apparatus 30 is all the handshake messages that have been exchanged between the first apparatus 10 and the relay apparatus 30 until then, except the ChangeCipherSpec message and includes the random number R1 (first random number) and the random number R2 (second random number). When TLS or the like is used, the first finished message FN1 is a message authentication code generated for the communication log information HS1 by using the master secret key MS, and more specifically, the function value obtained by entering the master secret key MS, a character string (finished label), and the value of the connect bits of the MD5 hash value by of the communication log information HS1 and the SHA-1 hash value of the communication log information HS1 into the predetermined pseudo-random function PRF. If the protocol is not limited to TLS, the first finished message FN1 may be obtained by encrypting information corresponding to the communication log information HS1 and the master secret key MS by using the master secret key MS.

The generated first finished message FN1 is sent to the transmitter 13, and is then sent through the network 40 to the relay apparatus 30 (first finished message sending process, step S16). When TLS or the like is used, the finished message FN1 is usually encrypted by the common key encryption processor 12i by using the common key Key, is sent to the relay apparatus 30, and is decrypted as needed (the same applies to the finished messages FN2 to FN4).

The first finished message FN1 is received by the receiver 34 of the relay apparatus 30 (FIG. 8) and stored in the memory 31. If the encrypted first finished message FN1 is sent from the first apparatus 10, the encrypted first finished message FN1 is decrypted by the common key encryption processor 32i by using the common key Key and stored in the memory 31.

The finished message verifier 32g reads the first finished message FN1, the master secret key MS, and the communication log information HS1 between the first apparatus 10 and the relay apparatus 30 from the memory 31, and verifies whether the first finished message FN1 corresponds to the secret information PMS. For example, the finished message verifier 32g uses the master secret key MS and the communication log information HS1 to generate a first finished message FN1 by performing the same calculation as performed by the first apparatus 10, and verifies whether this first finished message FN1 agrees with the first finished message FN1 sent from the first apparatus 10. When TLS or the like is used, the finished message verifier 32g generates the function value by entering the master secret key MS, a character string (finished label), and the value of the connect bits of the MD5 hash value of the communication log information HS1 and the SHA-1 hash value of the communication log information HS1 into the predetermined pseudo-random function PRF and verifies whether the function value agrees with the first finished message FN1 sent from the first apparatus 10.

If the verification is finished successfully, the finished message generator 32f of the relay apparatus 30 (FIG. 8) reads the master secret key MS and communication log information HS2 between the second apparatus 20 and the relay apparatus 30 from the memory 31, generates a second finished message FN2 corresponding to the master secret key MS and the communication log information HS2 (corresponding to the secret information PMS and the communication log information HS2), and stores the generated message in the memory 31 (second finished message generating process). An example of the communication log information HS2 between the second apparatus 20 and the relay apparatus 30 is all or part of the handshake messages until then, except the second finished message FN2. When TLS or the like is used, the communication log information HS2 between the second apparatus 20 and the relay apparatus 30 is all the handshake messages that have been exchanged between the relay apparatus 30 and the second apparatus 20 until then, except the ChangeCipherSpec message, and includes the random number R1 (first random number) and the random number R2 (second random number). When TLS or the like is used, the second finished message FN2 is a message authentication code generated for the communication log information HS2 by using the master secret key MS, and more specifically, the function value obtained by entering the master secret key MS, a character string (finished label), and the value of the connect bits of the MD5 hash value of the communication log information HS2 and the SHA-1 hash value of the communication log information HS2 into the predetermined pseudo-random function PRF. If the protocol is not limited to TLS, the following modification can be made, for example: Information obtained by encrypting, by using the master key MS, information corresponding to the master secret key MS and the communication log information HS2 may be used as the second finished message FN2.

The generated second finished message FN2 is sent to the transmitter 33, and is then sent through the network 50 to the second apparatus 20 (second finished message sending process, step S17). When TLS or the like is used, the finished message FN2 is usually encrypted by using the common key Key and sent to the second apparatus 20.

The second finished message FN2 is received by the receiver 24 of the second apparatus 20 (FIG. 7) and stored in the memory 21. If the encrypted second finished message FN2 is sent from the relay apparatus 30, the encrypted second finished message FN2 is decrypted by using the common key Key and stored in the memory 21.

The finished message verifier 22g then reads from the memory 21 the second finished message FN2, the master secret key MS, and the communication log information HS2 between the second apparatus 20 and the relay apparatus 30, and verifies whether the second finished message FN2 corresponds to the secret information PMS. For example, the finished message verifier 22g generates second finished message FN2 by using the master secret key MS and the communication log information HS2 in the same calculation as performed by the relay apparatus 30 and verifies whether this second finished message FN2 agrees with the second finished message FN2 sent from the relay apparatus 30. When TLS or the like is used, the finished message verifier 22g generates the function value obtained by entering the master secret key MS, a character string (finished label), and the value of the connect bits of the MD5 hash value of the communication log information HS2 and the SHA-1 hash value of the communication log information HS2 into the predetermined pseudo-random function PRF and verifies whether the function value agrees with the second finished message FN2 sent from the relay apparatus 30.

If the verification is finished successfully, the second apparatus 20 sends a ChangeCipherSpec message through the relay apparatus 30 to the first apparatus 10. Then, the finished message generator 22f of the second apparatus 20 (FIG. 7) reads the master secret key MS and communication log information HS3 between the second apparatus 20 and the relay apparatus 30, from the memory 21, generates a third finished message FN3 corresponding to the master secret key MS and the communication log information HS3 (corresponding to the secret information PMS and the communication log information HS3), and stores the third finished message FN3 in the memory 21 (third finished message generating process). An example of the communication log information HS3 between the second apparatus 20 and the relay apparatus 30 is all or part of the handshake messages until then, except the third finished message FN3. When TLS or the like is used, the communication log information HS3 between the second apparatus 20 and the relay apparatus 30 includes all the handshake messages exchanged between the second apparatus 20 and the relay apparatus 30, except the ChangeCipherSpec message, and includes also the random number R1 (first random number) and the random number R2 (second random number). When TLS or the like is used, the third finished message FN3 is a message authentication code generated for the communication log information HS3 by using the master secret key MS, and more specifically, is the function value obtained by inputting the master secret key MS, a character string (finished label), and the value of the connect bits of the MD5 hash value of the communication log information HS3 and the SHA-1 hash value of the communication log information HS3 into the predetermined pseudo-random function PRF. If the protocol is not limited to TLS, the following modification can be made, for example: Information obtained by encrypting, by using the master secret key MS, information corresponding to the master secret key MS and the communication log information HS3 may be used as the third finished message FN3.

The generated third finished message FN3 is sent to the transmitter 33, and is then sent through the network 50 to the relay apparatus 30 (third finished message sending process, step S18). When TLS or the like is used, the third finished message FN3 is usually encrypted by using the common key Key and sent to the relay apparatus 30.

The third finished message FN3 is received by the receiver 34 of the relay apparatus 30 (FIG. 8) and stored in the memory 31. If the encrypted third finished message FN3 is sent from the second apparatus 20, the encrypted third finished message FN3 is decrypted by using the common key Key and stored in the memory 31.

The finished message verifier 32g reads from the memory 31 the third finished message FN3, the master secret key MS, and the communication log information HS3 between the second apparatus 20 and the relay apparatus 30, and verifies whether the third finished message FN3 corresponds to the secret information PMS. For example, the finished message verifier 32g generates a third finished message FN3 by using the master secret key MS and the communication log information HS3 in the same calculation as performed by the second apparatus 20, and verifies whether this third finished message FN3 agrees with the third finished message FN3 sent from the second apparatus 20. When TLS or the like is used, the finished message verifier 32g generates the function value obtained by inputting the master secret key MS, a character string (finished label), and the value of the connect bits of the MD5 hash value of the communication log information HS3 and the SHA-1 hash value of the communication log information HS3 into the predetermined pseudo-random function PRF, and verifies whether the function value agrees with the third finished message FN3 sent from the second apparatus 20.

If the verification is finished successfully, the finished message generator 32f of the relay apparatus 30 (FIG. 8) reads from the memory 31 the master secret key MS and communication log information HS4 between the first apparatus 10 and the relay apparatus 30, generates a fourth finished message FN4 corresponding to the master secret key MS and the communication log information HS4 (corresponding to the secret information PMS and the communication log information HS4), and stores the fourth finished message FN4 in the memory 31 (fourth finished message generating process). An example of the communication log information HS4 between the first apparatus 10 and the relay apparatus 30 includes all or part of the handshake messages until then, except the fourth finished message FN4. When TLS or the like is used, the communication log information HS4 between the first apparatus 10 and the relay apparatus 30 includes all the handshake messages exchanged between the relay apparatus 30 and the first apparatus 10 except the ChangeCipherSpec message, and also includes the random number R1 (first random number) and the random number R2 (second random number). When TLS or the like is used, the fourth finished message FN4 is a message authentication code generated for the communication log information HS4 by using the master secret key MS, and more specifically, is the function value obtained by entering the master secret key MS, a character string (finished label), and the value of the connect bits of the MD5 hash value of the communication log information HS4 and the SHA-1 hash value of the communication log information HS4 into the predetermined pseudo-random function PRF. If the protocol is not limited to TLS, the following modification can be made, for example: Information obtained by encrypting, by using the master secret key MS, information corresponding to the master secret key MS and the communication log information HS4 may be used as the fourth finished message FN4.

The generated fourth finished message FN4 is sent to the transmitter 33, and is then sent through the network 40 to the first apparatus 10 (fourth finished message sending process, step S19). When TLS or the like is used, the fourth finished message FN4 is usually encrypted by using the common key Key and sent to the first apparatus 10.

The fourth finished message FN4 is received by the receiver 14 of the first apparatus 10 (FIG. 6) and stored in the memory 11. If the encrypted fourth finished message FN4 is sent from the relay apparatus 30, the encrypted fourth finished message FN4 is decrypted by using the common key Key and stored in the memory 11.

The finished message verifier 12g reads from the memory 11 the fourth finished message FN4, the master secret key MS, and the communication log information HS4 between the first apparatus 10 and the relay apparatus 30, and verifies whether the fourth finished message FN4 corresponds to the master secret key MS (finished message verifying process). For example, the finished message verifier 12g generates a fourth finished message FN4 by using the master secret key MS and the communication log information HS4 in the same calculation as performed by the relay apparatus 30 and verifies whether this fourth finished message FN4 agrees with the fourth finished message FN4 sent from the relay apparatus 30. When TLS or the like is used, the finished message verifier 12g generates the function value by entering the master secret key MS, a character string (finished label), and the value of the connect bits of the MD5 hash value of the communication log information HS4 and the SHA-1 hash value of the communication log information HS4 into the predetermined pseudo-random function PRF, and verifies whether the function value agrees with the fourth finished message FN4 sent from the relay apparatus 30.

If the verification has finished successfully, common key cryptosystem communication using the common key Key becomes possible between the first apparatus 10 and the second apparatus 20. For example, the common key encryption processor 12i of the first apparatus 10 encrypts a message (ApplicationData) by using the common key Key (step S20), and the transmitter 13 sends the generated encrypted text data (Key(ApplicationData)) through the relay apparatus 30 to the second apparatus 20 (step S21). Then, the common key encryption processor 22i of the second apparatus 20 decrypts the encrypted text data by using the common key Key (step S22) to restore the message.

[Processing in Relay Apparatus]

Figure 10:
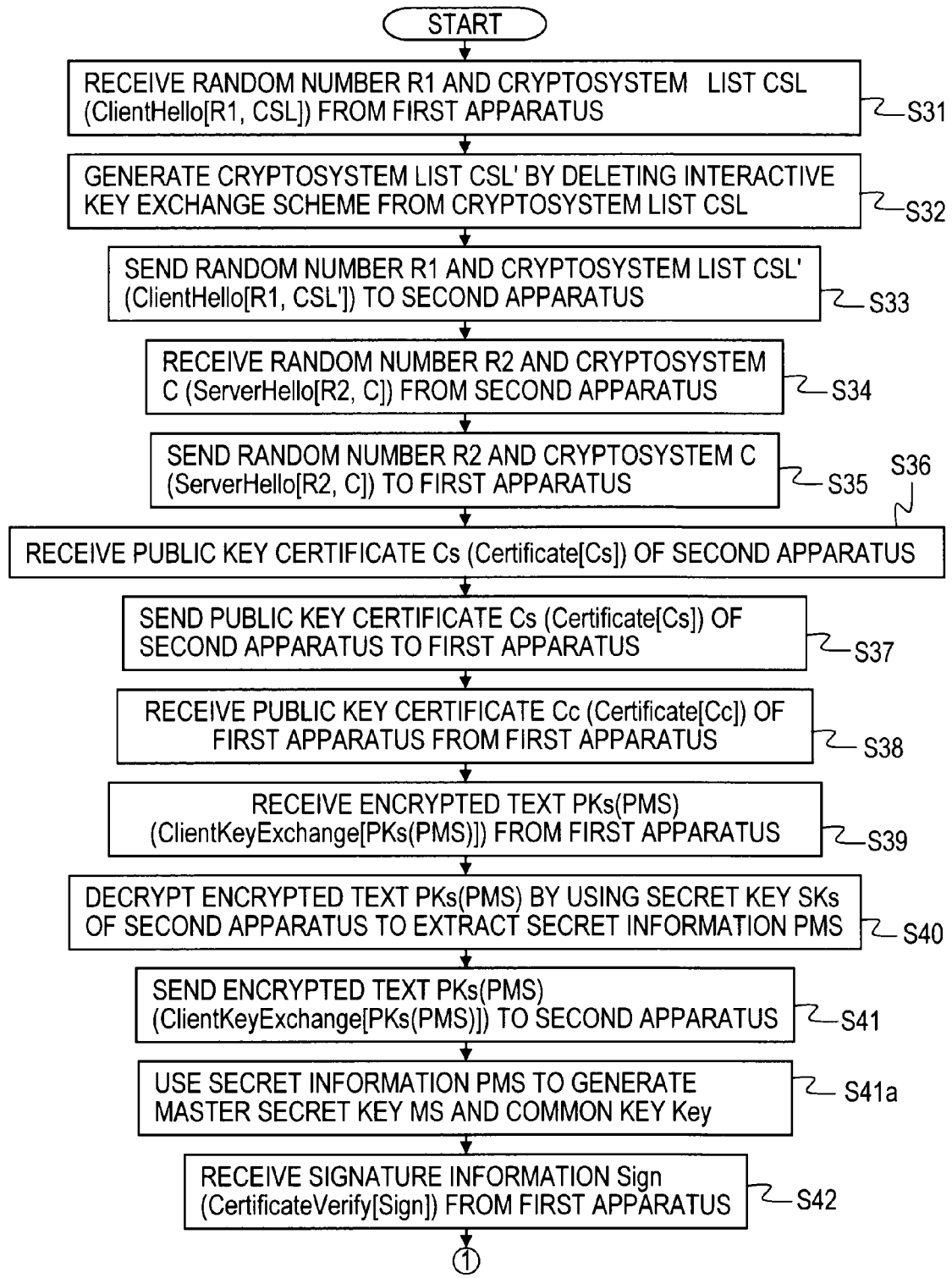
FIG. 10 is a flowchart illustrating processing in the relay apparatus in the first embodiment.
Figure 11:
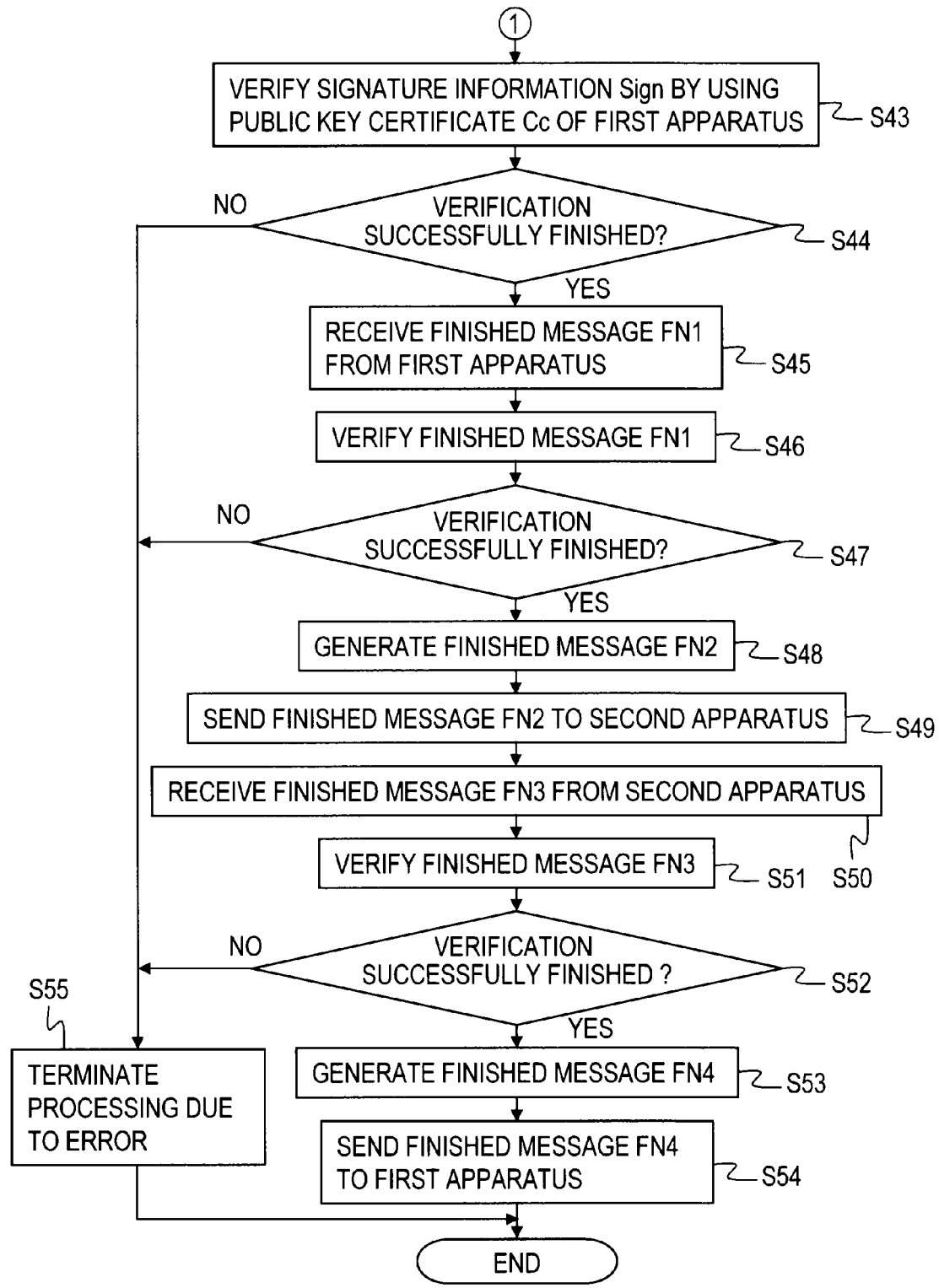
FIG. 11 is a flowchart illustrating the processing in the relay apparatus in the first embodiment.

FIGS. 10 and 11 are flowcharts illustrating the processing in the relay apparatus 30 of the first embodiment.

The processing in the relay apparatus 30 will be described next with reference to the flowcharts. It is assumed that the secret key SKs of the second apparatus 20 is stored in the memory 31 of the relay apparatus 30 prior to the processing.

The receiver 34 of the relay apparatus 30 receives the information (ClientHello message) that includes the random number R1 (first random number and the cryptosystem list CSL, sent from the first apparatus 10, and the information is sent to the communication processor 32h (step S31). The communication processor 32h stores the random number R1 (first random number) included in the ClientHello message in the memory 31 and sends the cryptosystem list CSL to the cryptosystem list restriction unit 31a. The cryptosystem list restriction unit 31a generates a new cryptosystem list CSL' by excluding an interactive key exchange scheme (DH method and the like) from the cryptosystems included in the cryptosystem list CSL and stores the new list in the memory 31 (step S32). The communication processor 32h reads from the memory 31 the random number R1 and the new cryptosystem list CSL', generates information (ClientHello message) that includes them, and sends it to the transmitter 33. The transmitter 33 sends the ClientHello message, including the random number R1 and the new cryptosystem list CSL', through the network 50 to the second apparatus 20 (second random number sending process, step S33).

The receiver 34 of the relay apparatus 30 receives the information (ServerHello message) that includes the cryptosystem C and the random number R2, sent from the second apparatus 20, and sends the information to the communication processor 32h (step S34). The communication processor 32h stores the random number R2 (second random number) and the cryptosystem C included in the ServerHello message in the memory 31 and sends the ServerHello message to the transmitter 33. The transmitter 33 sends the ServerHello message, including the random number R2 and the cryptosystem C, through the network 40 to the first apparatus 10 (fourth random number sending process, step S35).

Then, the receiver 34 of the relay apparatus 30 receives the public key certificate Cs of the second apparatus 20, sent from the second apparatus 20, and sends it to the communication processor 32h (step S36). The transmitter 33 sends the public key certificate Cs of the second apparatus 20 through the network 40 to the first apparatus 10 (public key certificate sending process, step S37).

The receiver 34 of the relay apparatus 30 receives the information (Certificate message) that includes the public key certificate Cc of the first apparatus 10, sent from the first apparatus 10, and sends it to the communication processor 32h (step S38). The communication processor 32h stores the public key certificate Cc of the first apparatus 10 in the memory 31.

The receiver 34 of the relay apparatus 30 receives the information (ClientKeyExchange message) that includes the encrypted text PKs(PMS) and sends the information to the communication processor 32h (step S39). The communication processor 32h stores the encrypted text PKs(PMS) (encrypted secret information) included in the ClientKeyExchange message in the memory 31. The decryption processor 32b decrypts the encrypted text PKs(PMS) by using the secret key SKs, as described earlier, to extract the secret information PMS (first secret information decrypting process, step S40). The extracted secret information PMS is stored in the memory 31. The communication processor 32h sends the ClientKeyExchange message, including the encrypted text PKs(PMS), to the transmitter 33, and the transmitter 33 sends the ClientKeyExchange message through the network 50 to the second apparatus 20 (encrypted secret information forwarding process, step S41). The common key generator 32e reads the secret information PMS from the memory 31, generates the master secret key MS and the common key Key as described earlier, and stores them in the memory 31 (step S41a).

The receiver 34 of the relay apparatus 30 receives the CertificateVerify message that includes the signature information Sign, sent from the first apparatus 10, and sends it to the communication processor 32h (step S42). The communication processor 32h stores the signature information Sign included in the CertificateVerify message in the memory 31. The signature verifier 32c verifies the signature information Sign by using the public key certificate Cc of the first apparatus 10, as described earlier (signature information verifying process, step S43). If the verification fails (step S44), the processing is terminated due to the error (step S55).

If the verification is finished successfully, the receiver 34 receives the first finished message FN1 sent from the first apparatus 10 (step S45). The first finished message FN1 is stored in the memory 31. Then, the finished message verifier 32g reads from the memory 31 the first finished message FN1, the master secret key MS, the communication log information HS1 between the first apparatus 10 and the relay apparatus 30, and the secret information PMS, and verifies the first finished message FN1 as described earlier by using the master secret key MS (step S46). If the verification fails (step S47), the processing is terminated due to the error (step S55).

If the verification is finished successfully, the finished message generator 32f reads from the memory 31 the master secret key MS and the communication log information HS2 between the second apparatus 20 and the relay apparatus 30, generates a second finished message FN2 corresponding to the master secret key MS and the communication log information HS2, and stores it in the memory 31 (second finished message generating process, step S48). The generated second finished message FN2 is sent to the transmitter 33, and is then sent via the network 50 to the second apparatus 20 (second finished message sending process, step S49).

The receiver 34 of the relay apparatus 30 receives the third finished message FN3 (step S50). The third finished message FN3 is stored in the memory 31. The finished message verifier 32g then reads from the memory 31 the third finished message FN3, the master secret key MS, and the communication log information HS3 between the second apparatus 20 and the relay apparatus 30, and verifies the third finished message FN3 as described earlier (step S51). If the verification fails (step S52), the processing is terminated due to the error (step S55).

If the verification is finished successfully, the finished message generator 32f reads from the memory 31 the master secret key MS and the communication log information HS4 between the first apparatus 10 and the relay apparatus 30, generates a fourth finished message FN4 corresponding to the master secret key MS and the communication log information HS4, and stores it in the memory 31 (fourth finished message generating process, step S53). The generated fourth finished message FN4 is sent to the transmitter 33, and is then sent through the network 40 to the first apparatus 10 (fourth finished message sending process, step S54).

<Features of Present Embodiment>

Since the second apparatus 20 and the relay apparatus 30 in this embodiment share the identical secret key SKs, the first apparatus 10 and the second apparatus 20 share the secret information PMS. The relay apparatus 30 does not need to decrypt the encrypted information PMS to obtain the secret information PMS, and does not need to encrypt the secret information PMS again with the public key of the second apparatus 20. The relay apparatus 30 just has to forward the encrypted text PKs(PMS) (ClientKeyExchange message) sent from the first apparatus 10, to the second apparatus 20 (step S13). Accordingly, the first apparatus 10 and the second apparatus 20 can share the secret information PMS, and can also share the master secret key MS and the common key Key both of which can be identified by using the secret information PMS. Therefore, the relay apparatus 30 can relay cryptosystem communication between the first apparatus 10 and the second apparatus 20 in accordance with the protocol (TLS, for example) just by forwarding to the second apparatus 20 the text encrypted in the first apparatus 10 by using the common key Key.

Since the first apparatus 10 and the second apparatus 20 have the same secret information PMS, they can separately generate a finished message corresponding to the same secret information PMS (steps S16 and S18) and can send the finished message to the relay apparatus 30. Since the memory 31 of the relay apparatus 30 in this embodiment stores the secret key SKs of the second apparatus 20, the relay apparatus 30 can extract the secret information PMS by decrypting the encrypted text PKs(PMS) (ClientKeyExchange message) sent from the first apparatus 10 (step S13). Therefore, the relay apparatus 30 can also send finished messages corresponding to the same master secret key MS identified by using the secret information PMS to the first apparatus 10 and the second apparatus 20 (steps S17 and S19).

Finished messages corresponding to the same master secret key MS can be generated in both parties of communications between the first apparatus 10 and the relay apparatus 30 and between the second apparatus 20 and the relay apparatus 30, respectively. Accordingly, the common key Key that can be shared between the first apparatus 10 and the second apparatus 20 is a common key that passes the verification under the protocol. Consequently, the first apparatus 10 and the second apparatus 20 performing processing in accordance with the protocol can share the same common key through the relay apparatus 30, without changing their specifications.

In this embodiment, especially, the random number R1 (first random number) used in a session between the first apparatus 10 and the relay apparatus 30 can also be used in a session between the second apparatus 20 and the relay apparatus 30 (ClientHello message). Moreover, the random number R2 (second random number) used in a session between the second apparatus 20 and the relay apparatus 30 can also be used in a session between the first apparatus 10 and the relay apparatus 30 (ServerHello message). Therefore, even when the master secret key MS is determined by the random number R1 (first random number), the random number R2 (second random number), and the secret information PMS and when the finished message depends on the random number R1 (first random number) and the random number R2 (second random number), as with TLS or the like, the same master secret key MS and common key Key can be specified both between the first apparatus 10 and the relay apparatus 30 and between the second apparatus 20 and the relay apparatus 30. Moreover, a finished message corresponding to the same master secret key MS can be generated in both parties. As a result, the first apparatus 10 and the second apparatus 20 that perform processing in accordance with TLS or the like can share the same common key Key through the relay apparatus 30, without changing their specifications.

The transmitter 23 of the second apparatus 20 in this embodiment sends the public key certificate Cs of the second apparatus 20 to the relay apparatus 30 (step S8) prior to the secret information encrypting process (step S12), the receiver 34 of the relay apparatus 30 receives the public key certificate Cs of the second apparatus 20, and the transmitter 33 of the relay apparatus 30 sends the public key certificate Cs of the second apparatus 20 to the first apparatus 10 (step S9) prior to the secret information encrypting process (step S12). Accordingly, the first apparatus 10 can obtain the public key PKs with the certificate of the second apparatus. The public key encryption processor 12c of the first apparatus 10 generates encrypted secret information PKs(PMS) by encrypting the secret information PMS by using the public key PKs of the second apparatus 20 corresponding to the secret key SKs of the second apparatus 20 and sends it to the second apparatus 20 through the relay apparatus 30 (steps S12 to S14). This corresponds to the transmission of a challenge from the first apparatus 10 for authentication of the second apparatus 20 and the relay apparatus 30. The first apparatus 10 receives the fourth finished message FN4 from the relay apparatus 30. This corresponds to the reception of a response to the challenge. The first apparatus 10 verifies whether the fourth finished message FN4 corresponds to the secret information MS (step S19). This corresponds to the verification of the response. Therefore, only the second apparatus 20 and the relay apparatus 30 having the secret key SKs are allowed to obtain the secret information PMS by decryption, based on the assumption that the certification authority having issued the public key certificate Cs of the second apparatus 20 is proper. Therefore, the first apparatus 10 can recognize that the party which the first apparatus 10 shares the secret information PMS, the master secret key MS, and the common key Key with is at least one of the second apparatus 20 and the relay apparatus 30 (server authentication enabled).

The transmitter 13 of the first apparatus 10 in this embodiment sends the public key certificate Cc of the first apparatus 10 to the relay apparatus 30 (step S11). The relay apparatus 30 can then obtain the public key PKc with the certificate of the first apparatus 10. The signature generator 12d of the first apparatus 10 generates signature information Sign by using the secret key SKc of the first apparatus 10 corresponding to the public key PKc of the first apparatus 10, and the transmitter 13 sends the signature information Sign to the relay apparatus 30. The signature verifier 32c of the relay apparatus 30 verifies the signature information Sign by using the public key PKc of the first apparatus 10. This corresponds to the authentication of the first apparatus 10 by the relay apparatus 30, instead of by the second apparatus 20, on the assumption that the certification authority that has issued the public key certificate Cc of the first apparatus 10 is proper (client authentication enabled). In that case, just the first apparatus 10 that has been authenticated by the relay apparatus 30 can be connected to the second apparatus 20, so the second apparatus 20 can be protected from an attack made by an unauthorized apparatus.

In this embodiment, the relay apparatus 30 obtains the common key Key shared by the first apparatus 10 and the second apparatus 20. Accordingly, the relay apparatus 30 can decrypt encrypted text generated by using the common key Key, exchanged between the first apparatus 10 and the second apparatus 20, if necessary. Accordingly, the relay apparatus 30 can block an attack code sent to the second apparatus 20 and can prevent leakage of information to the second apparatus 20.

Second Embodiment

A second embodiment of the present invention will now be described.

This embodiment is a modification of the first embodiment. In the first embodiment, the first apparatus authenticates the second apparatus (server authentication), and in place of the second apparatus, the relay apparatus authenticates the first apparatus (client authentication). In this embodiment, the first apparatus authenticates the second apparatus (server authentication), and client authentication is not performed. Differences from the first embodiment will be described mainly, and a description of items in common with the first embodiment will be omitted.

[Overall Structure]

Figure 12:
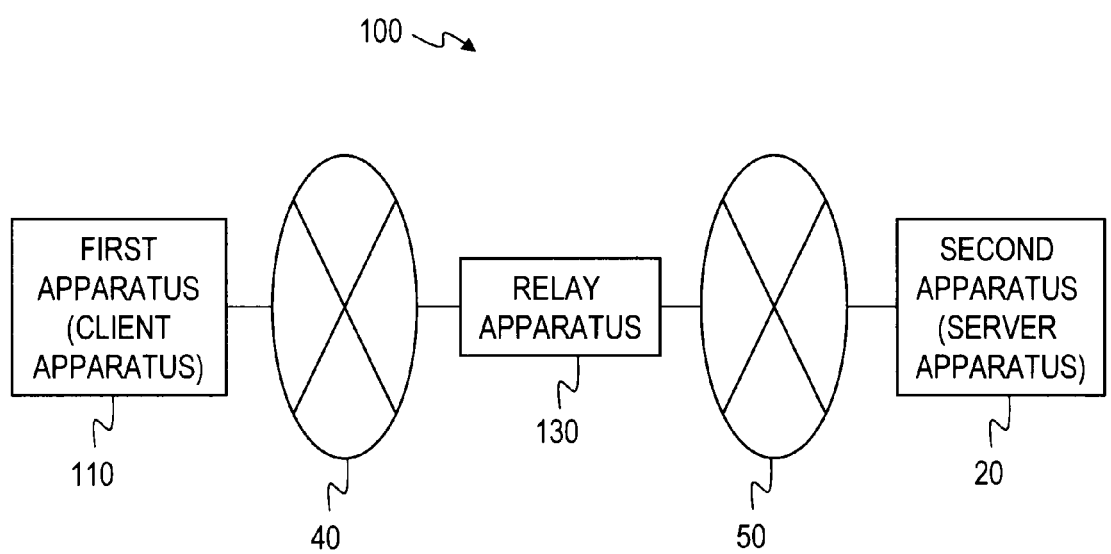
FIG. 12 is a block diagram illustrating the overall structure of a common key cryptosystem communication system according to a second embodiment.

FIG. 12 is a block diagram illustrating the overall structure of a common key cryptosystem communication system 100 in the second embodiment. In FIG. 12, elements identical to those in the first embodiment are indicated by the same reference characters as in FIG. 5, and a description of those elements will be omitted.

As shown in FIG. 12, the common key cryptosystem communication system 100 of this embodiment includes a first apparatus 110 (a client apparatus, for example), a second apparatus 20 (a server apparatus, for example), and a relay apparatus 130 (a gateway apparatus, for example). The first apparatus 110 and the relay apparatus 130 are connected through a network 40 to allow communication between them, and the second apparatus 20 and the relay apparatus 130 are connected through a network 50 to allow communication between them.

The first apparatus 110 and the second apparatus 20 are apparatuses that perform processing in accordance with a protocol (such as SSL, TLS or the like), including authentication between two apparatuses, sharing of a common key between the two apparatuses by using a cryptography technology, and processing for checking the validity of a common key setting process by using secret information for identifying the common key and communication log information between the two apparatuses. The relay apparatus 130 is an apparatus for performing new unique processing in this embodiment. In FIG. 12, to simplify the description, one first apparatus 110 and one second apparatus 20 are connected to the relay apparatus 130 to allow communication between them. However, two or more first apparatuses 110 and second apparatuses 20 may be connected to the relay apparatus 130 to allow communication between them. The structure may also include a plurality of relay apparatuses 130.

[First Apparatus]

The first apparatus 110 in this embodiment is implemented by a well-known computer that includes a CPU, a RAM, a ROM, a communication device, and the like when a predetermined program is read into the computer and executed by the CPU.

Figure 13:
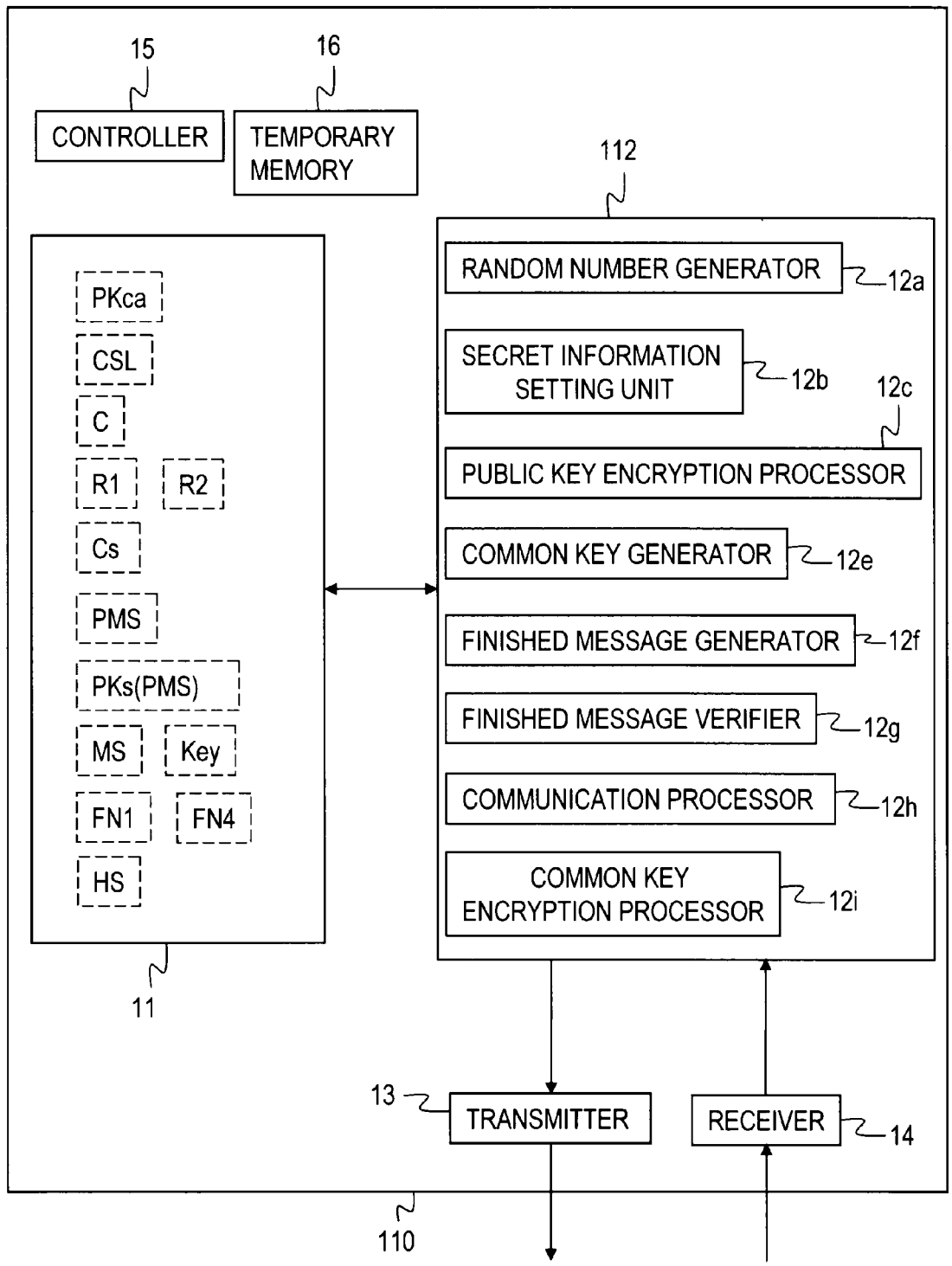
FIG. 13 is a block diagram illustrating the functional structure of a first apparatus in the second embodiment.

FIG. 13 is a block diagram illustrating the functional structure of the first apparatus 110 in the second embodiment.

As shown in FIG. 13, the first apparatus 110 in this embodiment includes a memory 11, a calculator 112, a transmitter 13, a receiver 14, a controller 15, and a temporary memory 16. The calculator 112 includes a random number generator 12a, a secret information setting unit 12b, a public key encryption processor 12c, a common key generator 12e, a finished message generator 12f, a finished message verifier 12g, a communication processor 12h, and a common key encryption processor 12i. The first apparatus 110 executes processing under the control of the controller 15. Unless otherwise specified explicitly, each data item generated in each calculation process is stored in the temporary memory 16 and is read out for a different calculation. The calculator 112 in this embodiment is a processor implemented when predetermined programs are read into the CPU and executed by the CPU.

[Second Apparatus]

The second apparatus is the same as in the first embodiment.

[Relay Apparatus]

The relay apparatus 130 in this embodiment is implemented by a well-known computer that includes a CPU, a RAM, a ROM, a communication device, and the like when a predetermined program is read into the computer and executed by the CPU.

Figure 14:
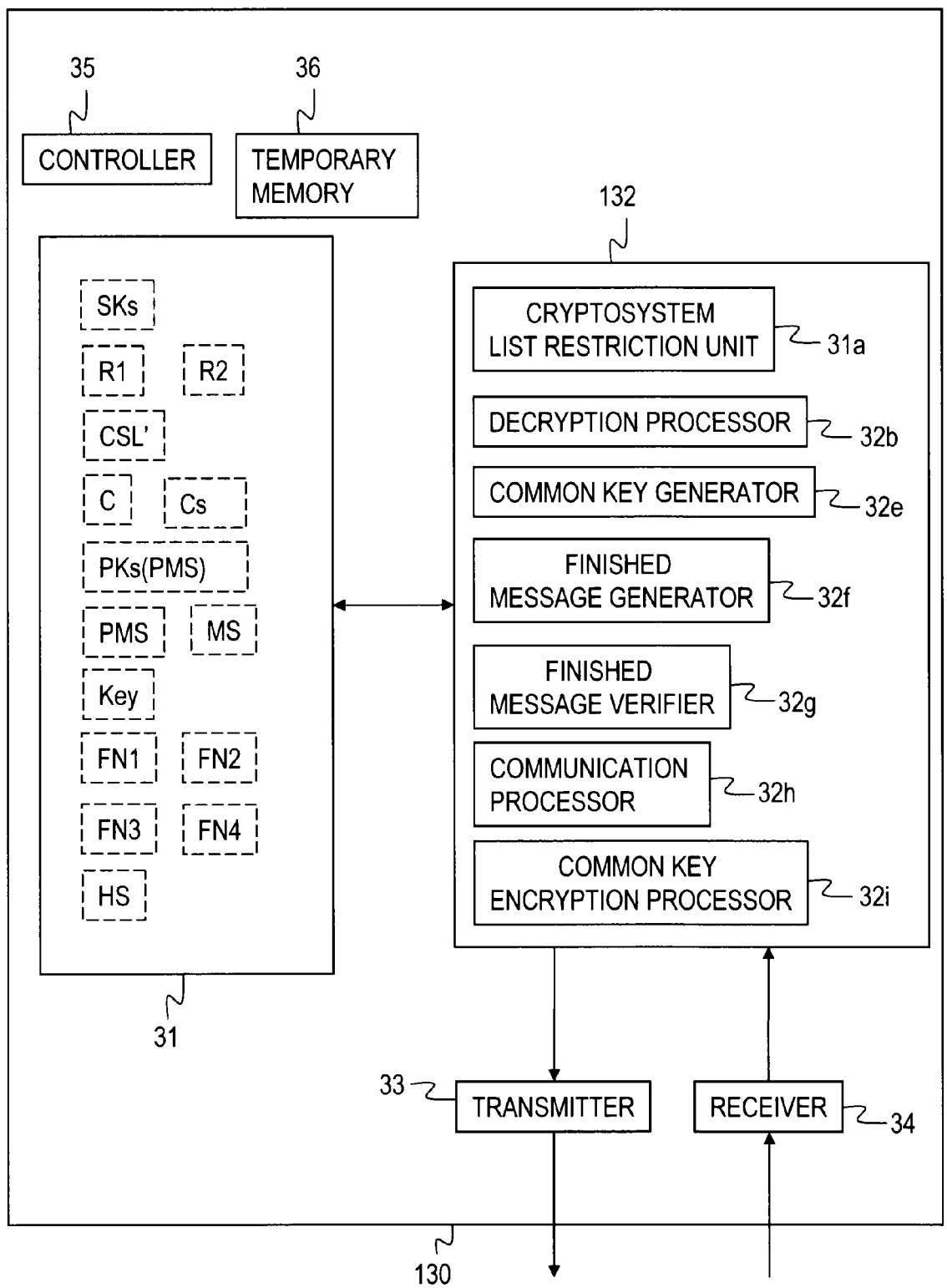
FIG. 14 is a block diagram illustrating the functional structure of a relay apparatus in the second embodiment.

FIG. 14 is a block diagram illustrating the functional structure of the relay apparatus 130 in the second embodiment.

As shown in FIG. 14, the relay apparatus 130 in this embodiment includes a memory 31, a calculator 132, a transmitter 33, a receiver 34, a controller 35, and a temporary memory 36. The calculator 132 includes a cryptosystem list restriction unit 31a, a decryption processor 32b, a common key generator 32e, a finished message generator 32f, a finished message verifier 32g, a communication processor 32h, and a common key encryption processor 32i. The relay apparatus 130 executes processing under the control of the controller 35. Unless otherwise specified explicitly, each data item generated in each calculation process is stored in the temporary memory 36 and is read out for a different calculation. The calculator 132 in this embodiment is a processor implemented when predetermined programs are read into the CPU and executed by the CPU.

<Processing>

The processing in this embodiment will be described next.

[Prerequisites]

A difference from the first embodiment is that the secret key of the first apparatus 110 is not stored in the first apparatus 110. The rest is the same as in the first embodiment.

[Overall Processing]

Figure 15:
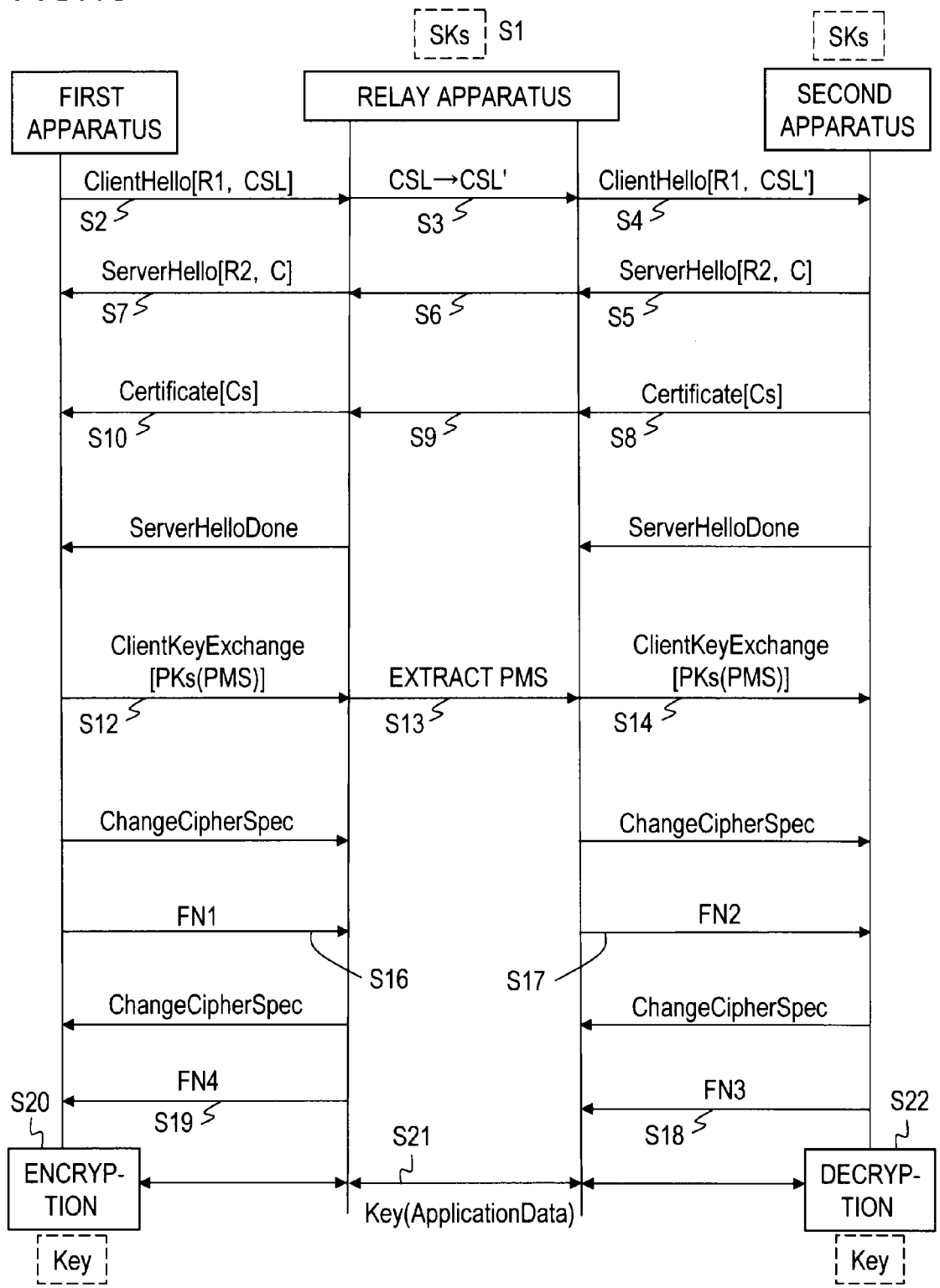
FIG. 15 is a sequence diagram illustrating the overall processing in the second embodiment.

FIG. 15 is a sequence diagram illustrating the overall processing in the second embodiment. Only the differences from the first embodiment will be described.

The differences from the first embodiment are that neither the second public key certificate sending process (step S11) nor the signature information sending process (step S15) is executed. Therefore, authentication of the first apparatus 110 is not performed. The rest is the same as in the first embodiment.

[Processing in Relay Apparatus]

Figure 16:
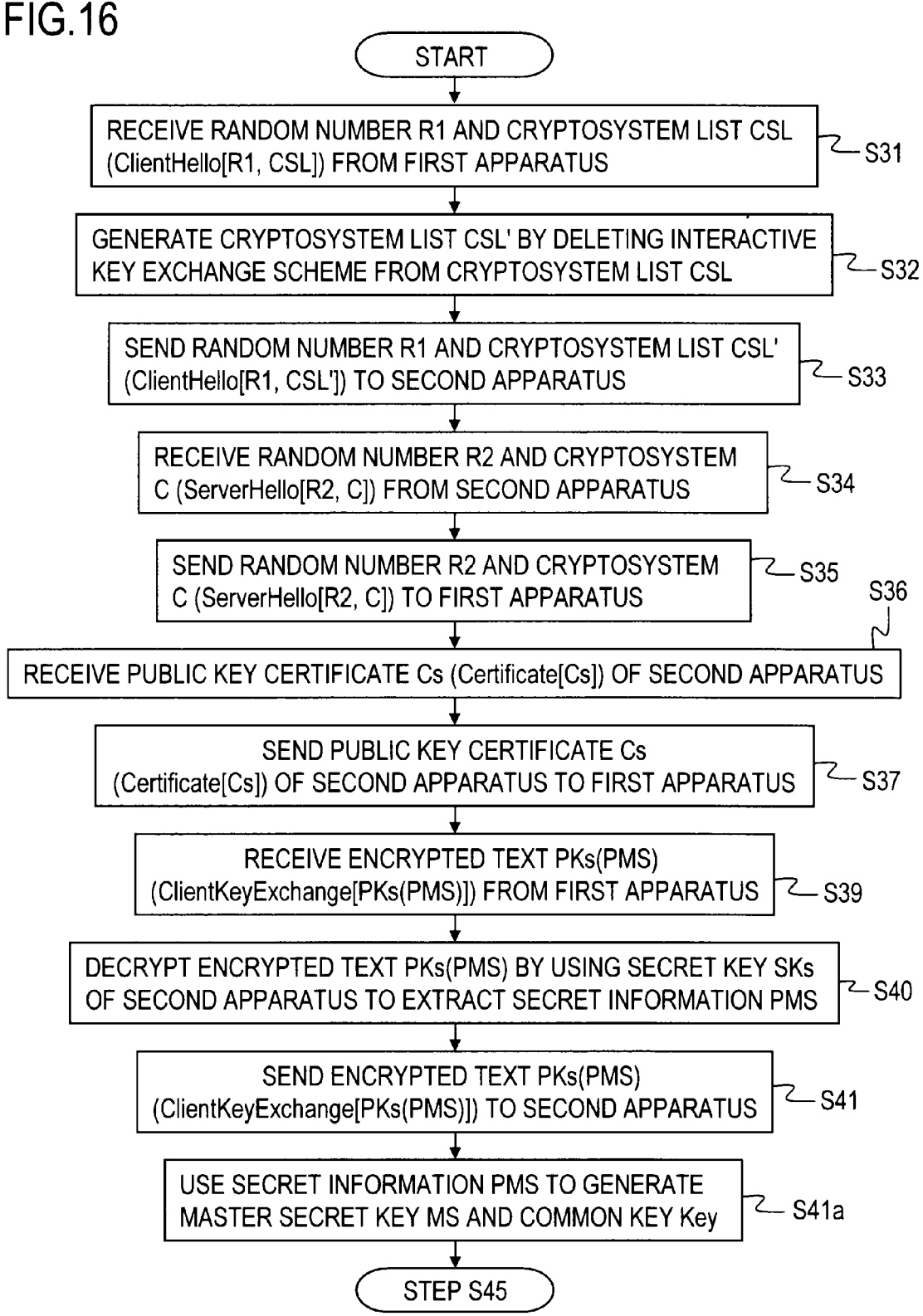
FIG. 16 is a flowchart illustrating processing in the relay apparatus in the second embodiment.

FIG. 16 is a flowchart illustrating the processing in the relay apparatus 130 of the second embodiment. Only the differences from the first embodiment will be described.

The differences from the first embodiment are that neither the processing in step S38 nor the processing in steps S42 to S44 is executed. The rest is the same as in the first embodiment.

<Features of Present Embodiment>

As in the first embodiment, the same secret information PMS, the master secret key MS, and the common key Key can be shared between the first apparatus 110 and the relay apparatus 130 and between the second apparatus 20 and the relay apparatus 130 in this embodiment. Therefore, the relay apparatus 130 does not need to encrypt the secret information PMS again and just has to forward the encrypted text PKs(PMS) (ClientKeyExchange message) sent from the first apparatus 110, to the second apparatus 20. As in the first embodiment, finished messages corresponding to the same secret information PMS can be created in both parties of communications between the first apparatus 110 and the relay apparatus 130 and between the second apparatus 20 and the relay apparatus 130, respectively, in this embodiment. Consequently, the first apparatus 110 and the second apparatus 20 performing processing in accordance with the protocol (such as TLS or the like) can share the same common key through the relay apparatus 130, without changing their specifications. Therefore, the relay apparatus 130 can relay cryptosystem communication according to the protocol (such as TLS or the like) between the first apparatus 110 and the second apparatus 20 just by forwarding the text encrypted by the first apparatus 110 by using the common key Key directly to the second apparatus 20.

As in the first embodiment, the first apparatus 110 in this embodiment can confirm that the party which the first apparatus 110 shares the common key with is at least one of the second apparatus 20 and the relay apparatus 130 (server authentication enabled).

If the cryptosystem list is not restricted in step S3 in this embodiment, the common key cryptosystem in a block cipher CBC (cipher block chaining) mode, such as Camellia, DES, and AES, utilizing the finished message FN as an initial vector (IV), can be used in common key encryption-decryption in steps S20 to S22. In other words, if the cryptosystem list is not restricted in step S3 in this embodiment, the handshake messages (communication log information) between the first apparatus 110 and the relay apparatus 130 agree with the handshake messages (communication log information) between the relay apparatus 130 and the second apparatus 20, and the finished messages between the first apparatus 110 and the relay apparatus 130 also agree with the finished messages between the relay apparatus 130 and the second apparatus 20 (see FIG. 15). More specifically, the finished message FN1 (first finished message) becomes the same as the finished message FN2 (second finished message), and the finished message FN4 (fourth finished message) becomes the same as the finished message FN3 (third finished message).

Consequently, the finished message FN1 (first finished message) and/or the finished message FN4 (fourth finished message) can be used as an initial vector when the first apparatus 110 performs encryption or decryption using the master secret key MS identified by the secret information PMS in a block cipher mode (such as the CBC mode) requiring the initial vector. The finished message FN2 (second finished message) and/or the finished message FN3 (third finished message) can be used as an initial vector when the second apparatus 20 performs encryption or decryption using the master secret key MS identified by the secret information PMS in a block cipher mode (such as the CBC mode) requiring the initial vector.

When the cryptosystem list is not restricted in step S3, even if a common key cryptosystem in a standard CBC mode in TLS or the like is used, the relay apparatus 130 can forward the encrypted text sent from the first apparatus 110, directly to the second apparatus 20. In the common key cryptosystem in a standard CBC mode in TLS or the like, a finished message (Finished) is added to the beginning of the plaintext (ApplicationData) to be encrypted, and the bit length of the added finished message is adjusted by padding or the like and becomes the first block of the text to be encrypted. The common key cryptosystem in the standard CBC mode takes an exclusive OR (XOR) with the encrypted result of the preceding block before it starts encryption of each block. Prior to encryption, the block that includes Finished, to be encrypted first is XORed with the initial vector (IV). In the common key cryptosystem in the standard CBC mode, the initial vector (IV) is obtained by inputting the master secret key MS into a pseudo-random function PRF. Accordingly, the encrypted result of the first block (Data) of the plaintext (ApplicationData) to be encrypted is influenced by the encrypted result of the preceding block that includes Finished and becomes as follows. E(•) represents encryption of •.

E(Data xor E(Finished xor IV))

When the finished message between the first apparatus 110 and the relay apparatus 130 differs from the finished message between the relay apparatus 130 and the second apparatus 20, even if the same common key Key and the same plaintext (ApplicationData) to be encrypted are used, different encrypted results are obtained. The relay apparatus 130 should not simply forward the encrypted results. However, when the cryptosystem list is not restricted in step S3, as described above, the finished messages between the first apparatus 110 and the relay apparatus 130 agrees with the finished messages between the relay apparatus 130 and the second apparatus 20, and the relay apparatus 130 can forward the encrypted text sent from the first apparatus 110, directly to the second apparatus 20.

Third Embodiment

A third embodiment of the present invention will now be described.

This embodiment is a modification of the first embodiment. In this embodiment, the common key is shared without storing the secret key of the second apparatus in the relay apparatus. The relay apparatus needs to encrypt the secret information PMS again so that the same common key can be shared between the first apparatus and the relay apparatus and between the second apparatus and the relay apparatus. On the other hand, processing to store the secret key of the second apparatus in the relay apparatus can be omitted.

Differences from the first embodiment will be described mainly, and a description of items in common with the first embodiment will be omitted.

[Overall Structure]

Figure 17:
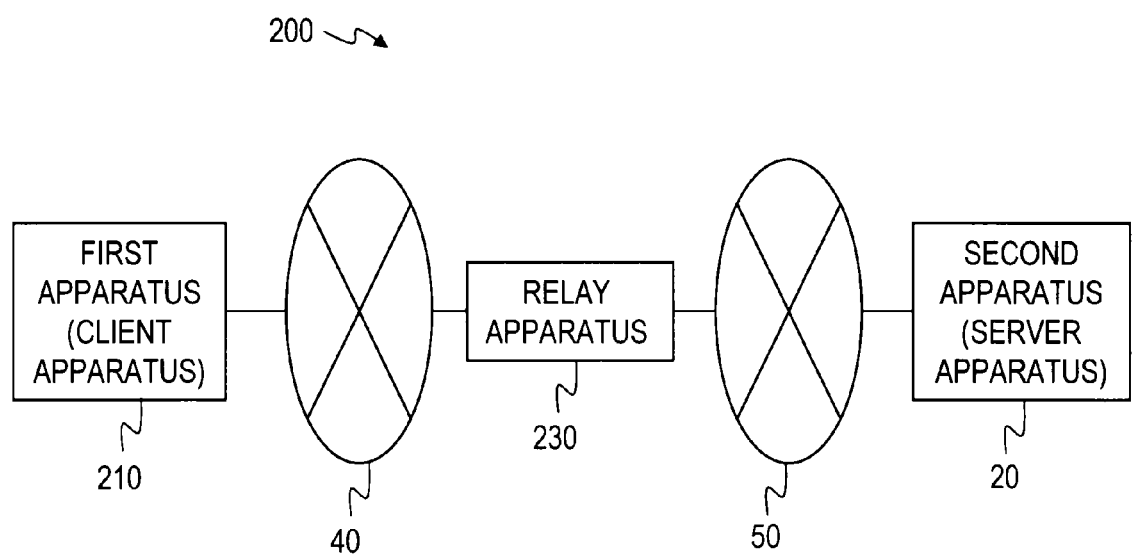
FIG. 17 is a block diagram illustrating the overall structure of a common key cryptosystem communication system according to a third embodiment.

FIG. 17 is a block diagram illustrating the overall structure of a common key cryptosystem communication system 200 in the third embodiment. In FIG. 17, elements identical to those in the first embodiment are indicated by the same reference characters as in FIG. 5, and a description of those elements will be omitted.

As shown in FIG. 17, the common key cryptosystem communication system 200 of this embodiment includes a first apparatus 210 (a client apparatus, for example), a second apparatus 20 (a server apparatus, for example), and a relay apparatus 230 (a gateway apparatus, for example). The first apparatus 210 and the relay apparatus 230 are connected through a network 40 to allow communication between them, and the second apparatus 20 and the relay apparatus 230 are connected through a network 50 to allow communication between them.

The first apparatus 210 and the second apparatus 20 are apparatuses that perform processing in accordance with a protocol (such as SSL, TLS, or the like) including authentication between two apparatuses, sharing of a common key between the two apparatuses by using a cryptography technology, and processing for checking the validity of a common key setting process by using secret information for identifying a common key and communication log information between the two apparatuses. The relay apparatus 230 is an apparatus for performing new unique processing in this embodiment. In FIG. 17, to simplify the description, one first apparatus 210 and one second apparatus 20 are connected to the relay apparatus 230 to allow communication between them. However, two or more first apparatuses 210 and second apparatuses 20 may be connected to the relay apparatus 230 to allow communication between them. The structure may also include a plurality of relay apparatuses 230.

[First Apparatus]

The first apparatus 210 in this embodiment is implemented by a well-known computer that includes a CPU, a RAM, a ROM, a communication device, and the like when a predetermined program is read into the computer and executed by the CPU.

Figure 18:
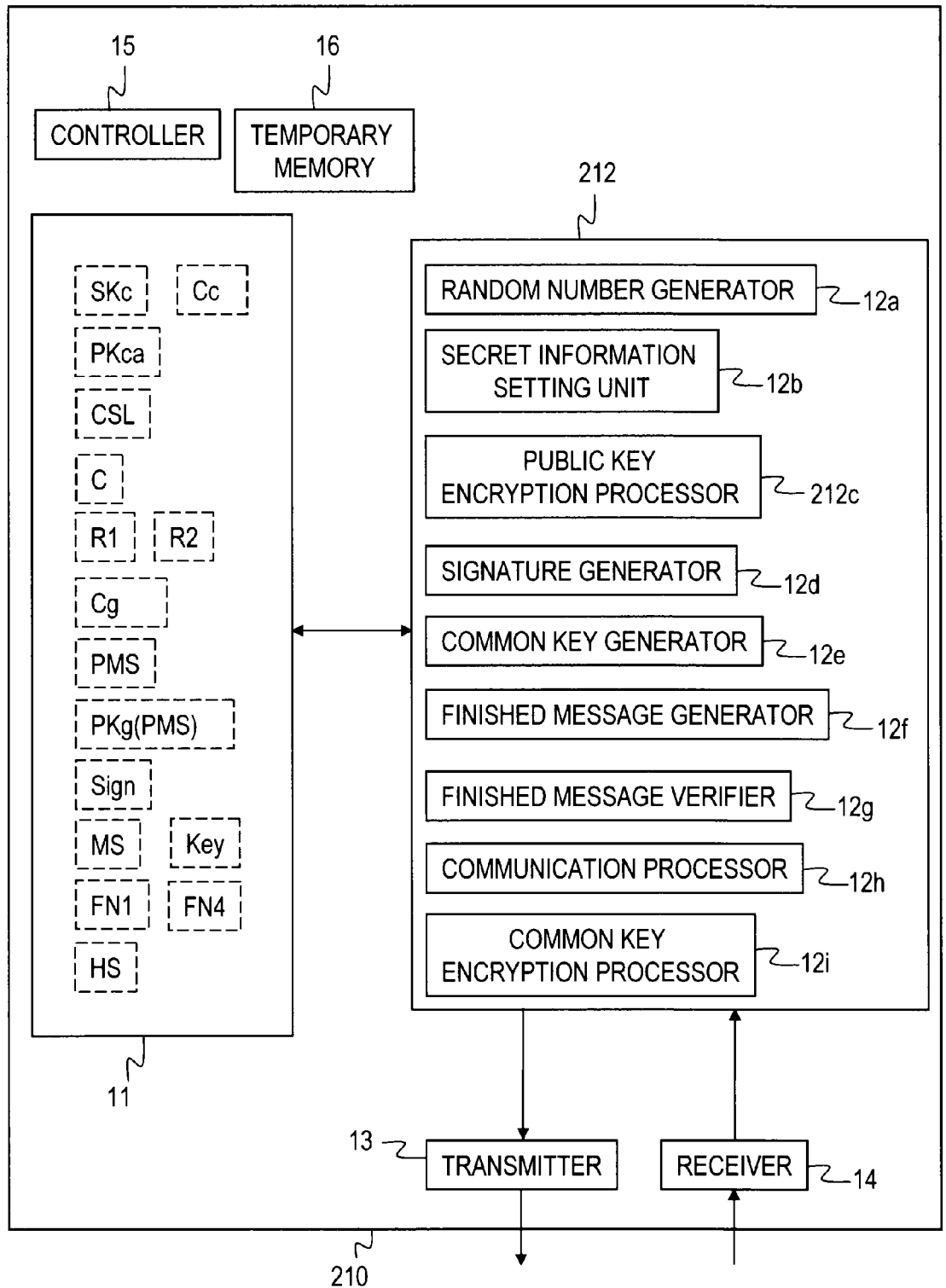
FIG. 18 is a block diagram illustrating the functional structure of a first apparatus in the third embodiment.

FIG. 18 is a block diagram illustrating the functional structure of the first apparatus 210 in the third embodiment.

As shown in FIG. 18, the first apparatus 210 in this embodiment includes a memory 11, a calculator 212, a transmitter 13, a receiver 14, a controller 15, and a temporary memory 16. The calculator 212 includes a random number generator 12a, a secret information setting unit 12b, a public key encryption processor 212c, a signature generator 12d, a common key generator 12e, a finished message generator 12f, a finished message verifier 12g, a communication processor 12h, and a common key encryption processor 12i. The first apparatus 210 executes processing under the control of the controller 15. Unless otherwise specified explicitly, each data item generated in each calculation process is stored in the temporary memory 16 and is read out for a different calculation. The calculator 212 in this embodiment is a processor implemented when predetermined programs are read into the CPU and executed by the CPU.

[Second Apparatus]

The second apparatus is the same as in the first embodiment.

[Relay Apparatus]

The relay apparatus 230 in this embodiment is implemented by a well-known computer that includes a CPU, a RAM, a ROM, a communication device, and the like when a predetermined program is read into the computer and executed by the CPU.

Figure 19:
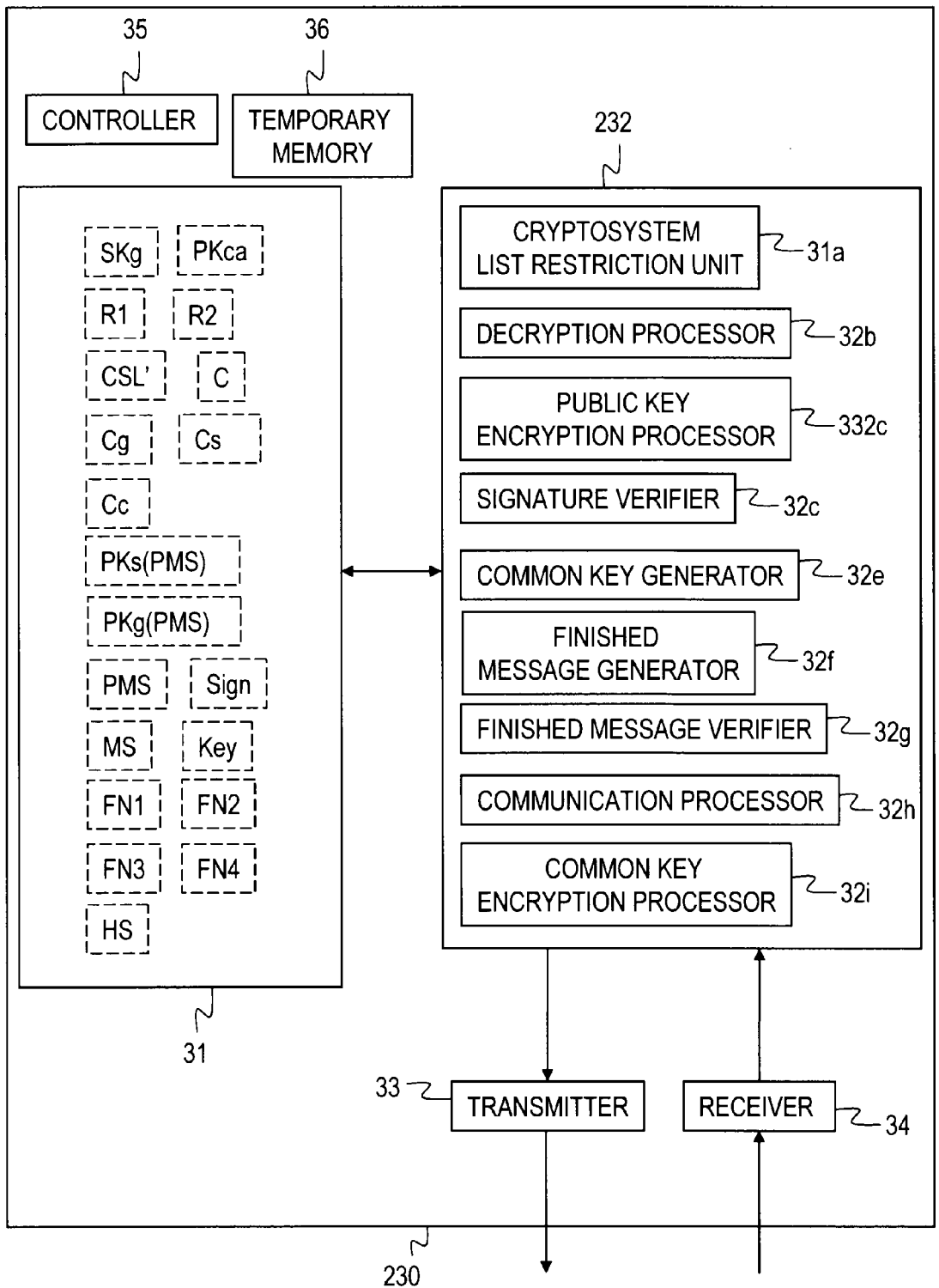
FIG. 19 is a block diagram illustrating the functional structure of a relay apparatus in the third embodiment.

FIG. 19 is a block diagram illustrating the functional structure of the relay apparatus 230 in the third embodiment.

As shown in FIG. 19, the relay apparatus 230 in this embodiment includes a memory 31, a calculator 232, a transmitter 33, a receiver 34, a controller 35, and a temporary memory 36. The calculator 232 includes a cryptosystem list restriction unit 31a, a decryption processor 32b, a signature verifier 32c, a public key encryption processor 332c, a common key generator 32e, a finished message generator 32f, a finished message verifier 32g, a communication processor 32h, and a common key encryption processor 32i. The relay apparatus 230 executes processing as controlled by the controller 35. Unless otherwise specified explicitly, each data item generated in each calculation process is stored in the temporary memory 36 and is read out for a different calculation. The calculator 232 in this embodiment is a processor implemented when predetermined programs are read into the CPU and executed by the CPU.

<Processing>

The processing in this embodiment will be described next.

[Prerequisites]

A difference from the first embodiment is that a pair of keys (public key, secret key) of a public key cryptosystem (such as RSA) is generated for the relay apparatus 230. Each key pair may be generated for each of a plurality of cryptosystems. A secret key SKg of the relay apparatus 230 is stored in the memory 31 of the relay apparatus 230, a certification authority issues a public key certificate Cg for the public key PKg of the relay apparatus 230 corresponding to the secret key SKg, and the public key certificate Cg is stored in the memory 31 of the relay apparatus 230. The rest is the same as in the first embodiment.

[Overall Processing]

Figure 20:
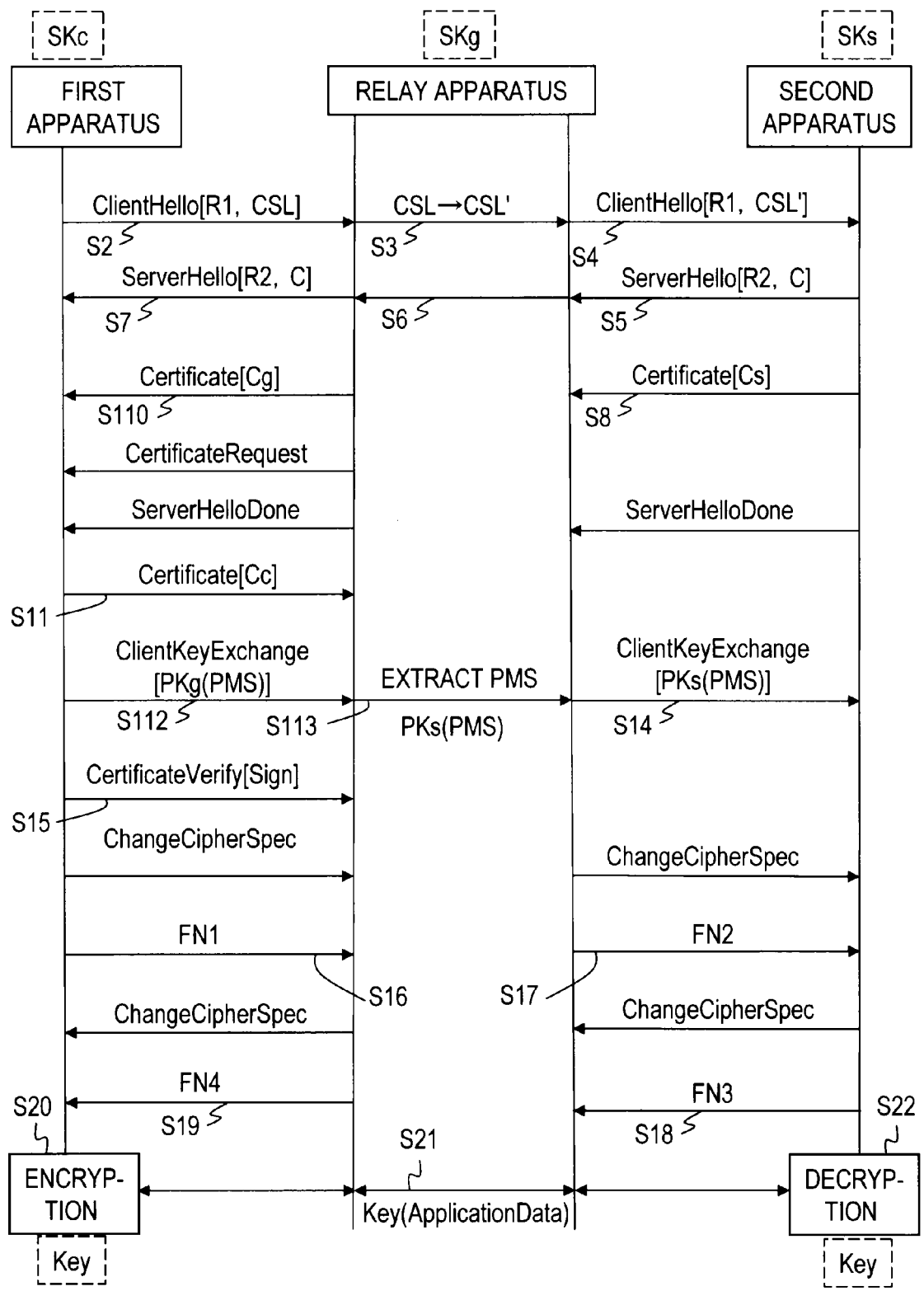
FIG. 20 is a sequence diagram illustrating the overall processing in the third embodiment.

FIG. 20 is a sequence diagram illustrating the overall processing in the third embodiment. Only the differences from the first embodiment will be described.

The differences from the first embodiment are as the following points: neither step S1 nor step S9 is executed; step S110, which will be described below, is executed in place of step S10; and steps S112 and S113, which will be described later, are executed in place of steps S12 and S13, respectively.

<<Step S110>>

In step S110, the communication processor 32h of the relay apparatus 230 reads the public key certificate Cg of the relay apparatus 230 from the memory 31 and sends it to the transmitter 33. The transmitter 33 sends the public key certificate Cg of the relay apparatus 230 through the network 40 to the first apparatus 210 (public key certificate sending process). The sent public key certificate Cg of the relay apparatus 230 is received by the receiver 14 of the first apparatus 210 (FIG. 18) and is sent to the communication processor 12h. The communication processor 12h stores the public key certificate Cg of the relay apparatus 230 in the memory 11.

<<Step S112>>

The secret information setting unit 12b of the first apparatus 210 (FIG. 18) specifies secret information PMS (premaster secret) for identifying the common key Key and stores it in the memory 11. The communication processor 12h of the first apparatus 210 reads the public key certificate Cg of the relay apparatus 230 from the memory 11 and obtains the public key PKca of the CA which has issued the public key certificate Cg of the relay apparatus 230 from the certification authority apparatus, not shown, connected to the network 40. The obtained public key PKca of the CA is stored in the memory 11. The communication processor 12h reads the public key certificate Cg of the relay apparatus 230 and the public key PKca of the CA from the memory 11 and verifies the public key certificate Cg of the relay apparatus 230 by using the public key PKca of the CA. If the verification is finished successfully, the public key encryption processor 212c reads from the memory 11 the secret information PMS, the public key PKg of the relay apparatus 230 included in the public key certificate Cg, and the cryptosystem C, generates encrypted text PKg(PMS) (first encrypted secret information, EncryptedPreMasterSecret message) by encrypting the secret information PMS by using the public key PKg according to the cryptosystem indicated by the cryptosystem C, and stores it in the memory 11 (secret information encrypting process). Information (ClientKeyExchange message) that includes the generated encrypted text PKg(PMS) is sent to the transmitter 13, and the transmitter 13 sends the ClientKeyExchange message, including the encrypted text PKg(PMS) (encrypted secret information), through the network 40 to the relay apparatus 230 (encrypted secret information sending process).

<<Step S113>>

The ClientKeyExchange message is received by the receiver 34 of the relay apparatus 230 (FIG. 19) and is sent to the communication processor 32h. The communication processor 32h stores the encrypted text PKg(PMS) (first encrypted secret information) included in the ClientKeyExchange message in the memory 31. The decryption processor 32b reads the cryptosystem C from the memory 31 and the secret key SKg of the relay apparatus 230, corresponding to the cryptosystem C. The decryption processor 32b reads the encrypted text PKg(PMS) from the memory 31 and decrypts it with the secret key SKg to extract the secret information PMS (first secret information decrypting process). The extracted secret information PMS is stored in the memory 31.

The communication processor 32h of the relay apparatus 230 reads the public key certificate Cs of the second apparatus 20 from the memory 31 and obtains the public key PKca of the CA which has issued the public key certificate Cs of the second apparatus 20 from the certification authority apparatus, not shown, connected to the network 40. The obtained public key PKca of the CA is stored in the memory 31. The communication processor 32h reads the public key certificate Cs of the second apparatus 20 and the public key PKca of the CA from the memory 31 and verifies the public key certificate Cs of the second apparatus 20 by using the public key PKca of the CA. If the verification is finished successfully, the public key encryption processor 332c reads from the memory 31 the secret information PMS, the public key PKs of the second apparatus 20 included in the public key certificate Cs, and the cryptosystem C, generates encrypted text PKs(PMS) (encrypted secret information, EncryptedPreMasterSecret message) by encrypting the secret information PMS by using the public key PKs according to the cryptosystem indicated by the cryptosystem C, and stores it in the memory 31 (second secret information encrypting process).

[Processing in Relay Apparatus]

Figure 21:
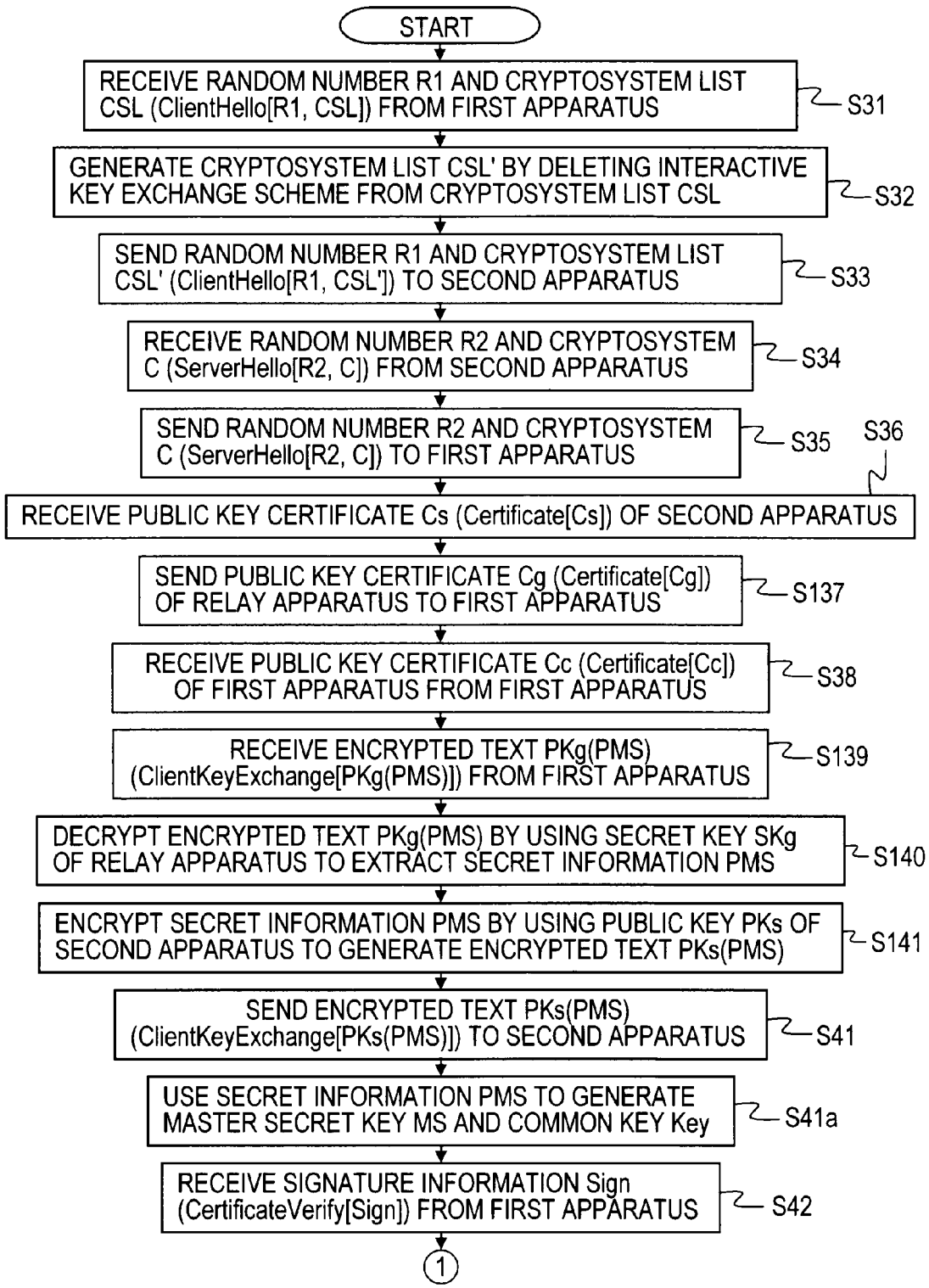
FIG. 21 is a flowchart illustrating processing in the relay apparatus in the third embodiment.

FIG. 21 is a flowchart illustrating the processing in the relay apparatus 230 in the third embodiment. Differences from the first embodiment will be described below.

The differences from the first embodiment are the following points: Step S137, which will be described below, is executed instead of step S37;

steps S139 and S140, which will be described later, are executed instead of steps S39 and S40, respectively; and step S141, which will be described later, is executed between steps S140 and S41.

<<Step S137>>

The transmitter 33 sends the public key certificate Cg of the relay apparatus 230 through the network 40 to the first apparatus 210 (public key certificate sending process).

<<Step S139>>

The receiver 34 of the relay apparatus 230 receives information (ClientKeyExchange message) that includes the encrypted text PKg(PMS) and sends it to the communication processor 32h.

<<Step S140>>

The communication processor 32h stores the encrypted text PKg(PMS) (first encrypted secret information) included in the ClientKeyExchange message in the memory 31. The decryption processor 32b decrypts the encrypted text PKg(PMS) by using the secret key SKg to extract the secret information PMS, as described earlier (first secret information decrypting process). The secret information PMS is stored in the memory 31.

<<Step S141>>

The communication processor 32h of the relay apparatus 230 reads the public key certificate Cs of the second apparatus 20 from the memory 31 and obtains the pubic key PKca of the CA which has issued the public key certificate Cs of the second apparatus 20 from the certification authority apparatus, not shown, connected to the network 40. The obtained public key PKca of the CA is stored in the memory 31. The communication processor 32h reads the public key certificate Cs of the second apparatus 20 and the public key PKca of the CA from the memory 31 and verifies the public key certificate Cs of the second apparatus 20 by using the public key PKca of the CA. If the verification is finished successfully, the public key encryption processor 332c reads from the memory 31 the secret information PMS, the public key PKs of the second apparatus 20 included in the public key certificate Cs, and the cryptosystem C, generates encrypted text PKs(PMS) (encrypted secret information, EncryptedPreMasterSecret message) by encrypting the secret information PMS in accordance with the cryptosystem indicated by the cryptosystem C by using the public key PKs, and stores it in the memory 31 (second secret information encrypting process).

<Features of Present Embodiment>

As in the first embodiment, the same secret information PMS, master secret key MS, and common key Key can be shared between the first apparatus 210 and the relay apparatus 230 and between the second apparatus 20 and the relay apparatus 230 in this embodiment. As in the first embodiment, finished messages corresponding to the same secret information PMS can be generated in both parties of communications between the first apparatus 210 and the relay apparatus 230 and between the second apparatus 20 and the relay apparatus 230, respectively. Consequently, the first apparatus 210 and the second apparatus 20 performing processing in accordance with the protocol (such as TLS or the like) can share the same common key through the relay apparatus 230, without changing their specifications. The relay apparatus 230 can relay cryptosystem communication according to the protocol (such as TLS or the like) between the first apparatus 210 and the second apparatus 20, just by forwarding text encrypted by the first apparatus 210 by using the common key Key directly to the second apparatus 20.

In the first embodiment, the relay apparatus 30 sends the public key certificate Cs of the second apparatus 20 to the first apparatus 10, even while the first apparatus 10 is accessing the relay apparatus 30. The first apparatus 10 may issue a wrong-certificate warning. In the third embodiment, the public key certificate Cg of the relay apparatus 230 is sent to the first apparatus 210, and no such warning is issued.

Fourth Embodiment

A fourth embodiment of the present invention will now be described.

This embodiment is a modification of the third embodiment. Differences from the first or third embodiment will be described mainly, and a description of items in common with the first or third embodiment will be omitted.

[Overall Structure]

Figure 22:
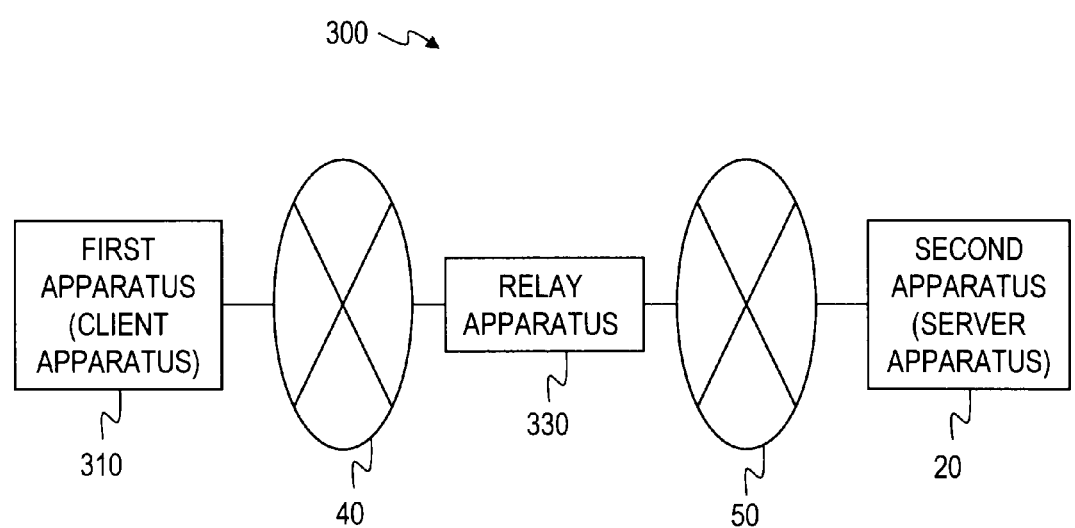
FIG. 22 is a block diagram illustrating the overall structure of a common key cryptosystem communication system according to a fourth embodiment.

FIG. 22 is a block diagram illustrating the overall structure of a common key cryptosystem communication system 300 in the fourth embodiment. In FIG. 22, elements identical to those in the first embodiment are indicated by the same reference characters as in FIG. 5, and a description of those elements will be omitted.

As shown in FIG. 22, the common key cryptosystem communication system 300 of this embodiment includes a first apparatus 310 (a client apparatus, for example), a second apparatus 20 (a server apparatus, for example), and a relay apparatus 330 (a gateway apparatus, for example). The first apparatus 310 and the relay apparatus 330 are connected through a network 40 to allow communication between them, and the second apparatus 20 and the relay apparatus 330 are connected through a network 50 to allow communication between them.

The first apparatus 310 and the second apparatus 20 are apparatuses that perform processing in accordance with a protocol (such as SSL, TLS or the like) including authentication between two apparatuses, sharing of a common key between the two apparatuses by using a cryptography technology, and processing for checking the validity of a common key setting process by using secret information for identifying the common key and communication log information between the two apparatuses. The relay apparatus 330 is an apparatus for performing new unique processing in this embodiment. To simplify the description, in FIG. 22, one first apparatus 310 and one second apparatus 20 are connected to the relay apparatus 330 to allow communication between them. However, two or more first apparatuses 310 and second apparatuses 20 may be connected to the relay apparatus 330 to allow communication between them. The structure may also include a plurality of relay apparatuses 330.

[First Apparatus]

The first apparatus 310 in this embodiment is implemented by a well-known computer that includes a CPU, a RAM, a ROM, a communication device, and the like when a predetermined program is read into the computer and executed by the CPU.

Figure 23:
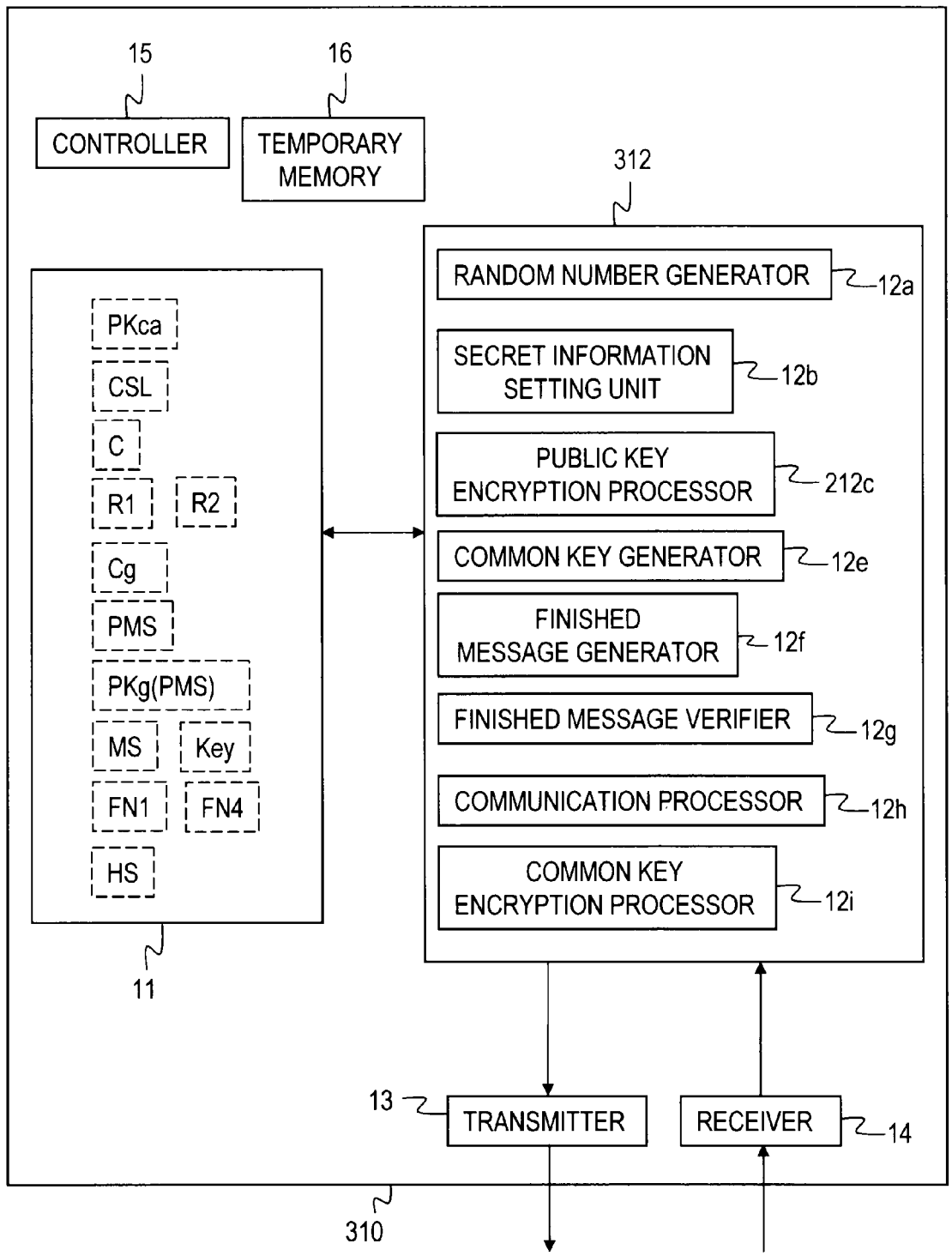
FIG. 23 is a block diagram illustrating the functional structure of a first apparatus in the fourth embodiment.

FIG. 23 is a block diagram illustrating the functional structure of the first apparatus 310 in the fourth embodiment.

As shown in FIG. 23, the first apparatus 310 in this embodiment includes a memory 11, a calculator 312, a transmitter 13, a receiver 14, a controller 15, and a temporary memory 16. The calculator 312 includes a random number generator 12a, a secret information setting unit 12b, a public key encryption processor 212c, a common key generator 12e, a finished message generator 12f, a finished message verifier 12g, a communication processor 12h, and a common key encryption processor 12i. The first apparatus 310 executes processing under the control of the controller 15. Unless otherwise specified explicitly, each data item generated in each calculation process is stored in the temporary memory 16 and is read out for a different calculation. The calculator 312 in this embodiment is a processor implemented when predetermined programs are read into the CPU and executed by the CPU.

[Second Apparatus]

The second apparatus is the same as in the first embodiment.

[Relay Apparatus]

The relay apparatus 330 in this embodiment is implemented by a well-known computer that includes a CPU, a RAM, a ROM, a communication device, and the like when a predetermined program is read into the computer and executed by the CPU.

Figure 24:
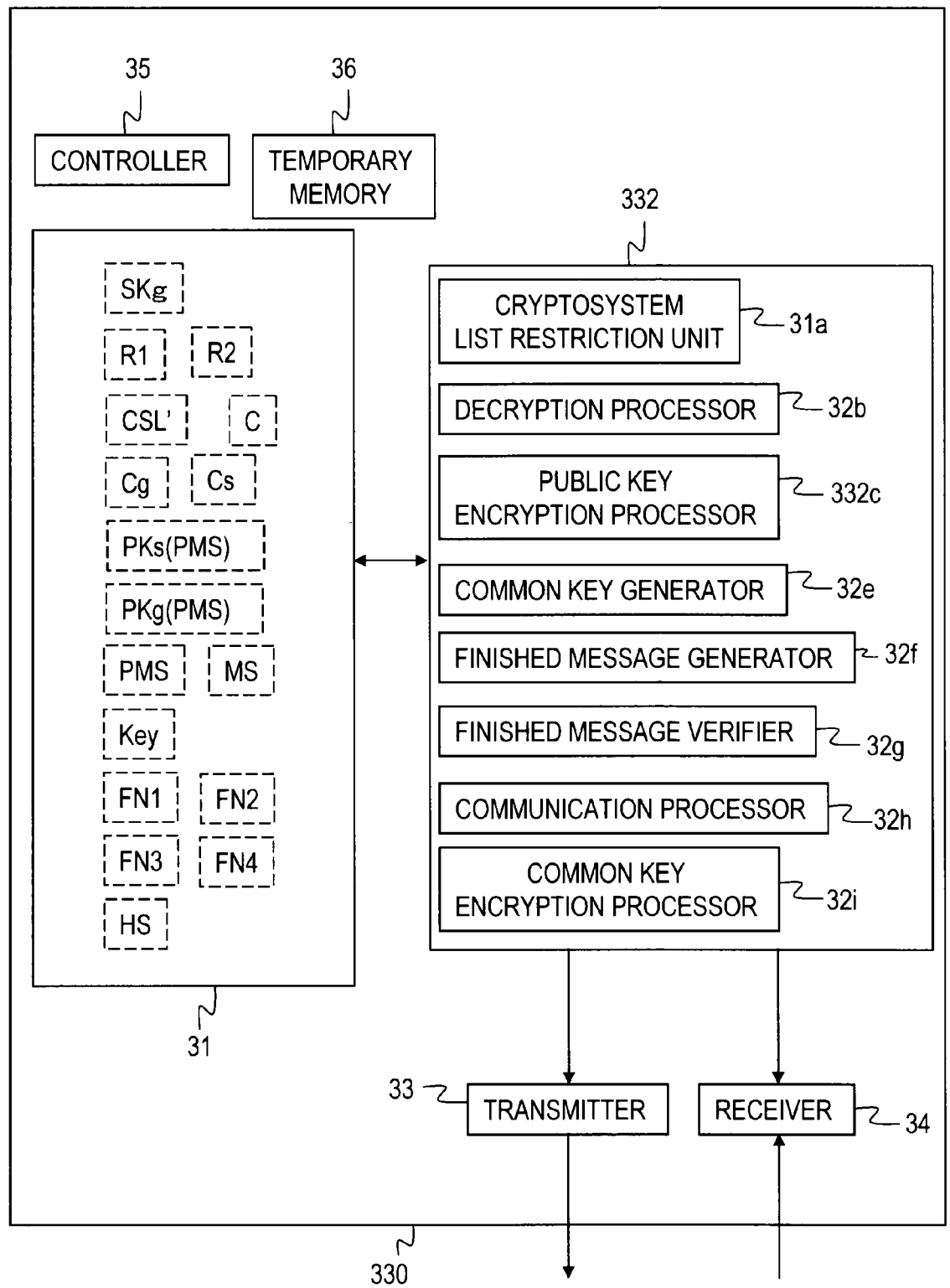
FIG. 24 is a block diagram illustrating the functional structure of a relay apparatus in the fourth embodiment.

FIG. 24 is a block diagram illustrating the functional structure of the relay apparatus 330 in the fourth embodiment.

As shown in FIG. 24, the relay apparatus 330 in this embodiment includes a memory 31, a calculator 332, a transmitter 33, a receiver 34, a controller 35, and a temporary memory 36. The calculator 332 includes a cryptosystem list restriction unit 31a, a decryption processor 32b, a public key encryption processor 332c, a common key generator 32e, a finished message generator 32f, a finished message verifier 32g, a communication processor 32h, and a common key encryption processor 32i. The relay apparatus 330 executes processing under the control of the controller 35. Unless otherwise specified explicitly, each data item generated in each calculation process is stored in the temporary memory 36 and is read out for a different calculation. The calculator 232 in this embodiment is a processor implemented when predetermined programs are read into the CPU and executed by the CPU.

<Processing>

The processing in this embodiment will be described next.

[Prerequisites]

A difference from the third embodiment is that the secret key of the first apparatus is not stored in the first apparatus 310. The rest is the same as in the third embodiment.

[Overall Processing]

Figure 25:
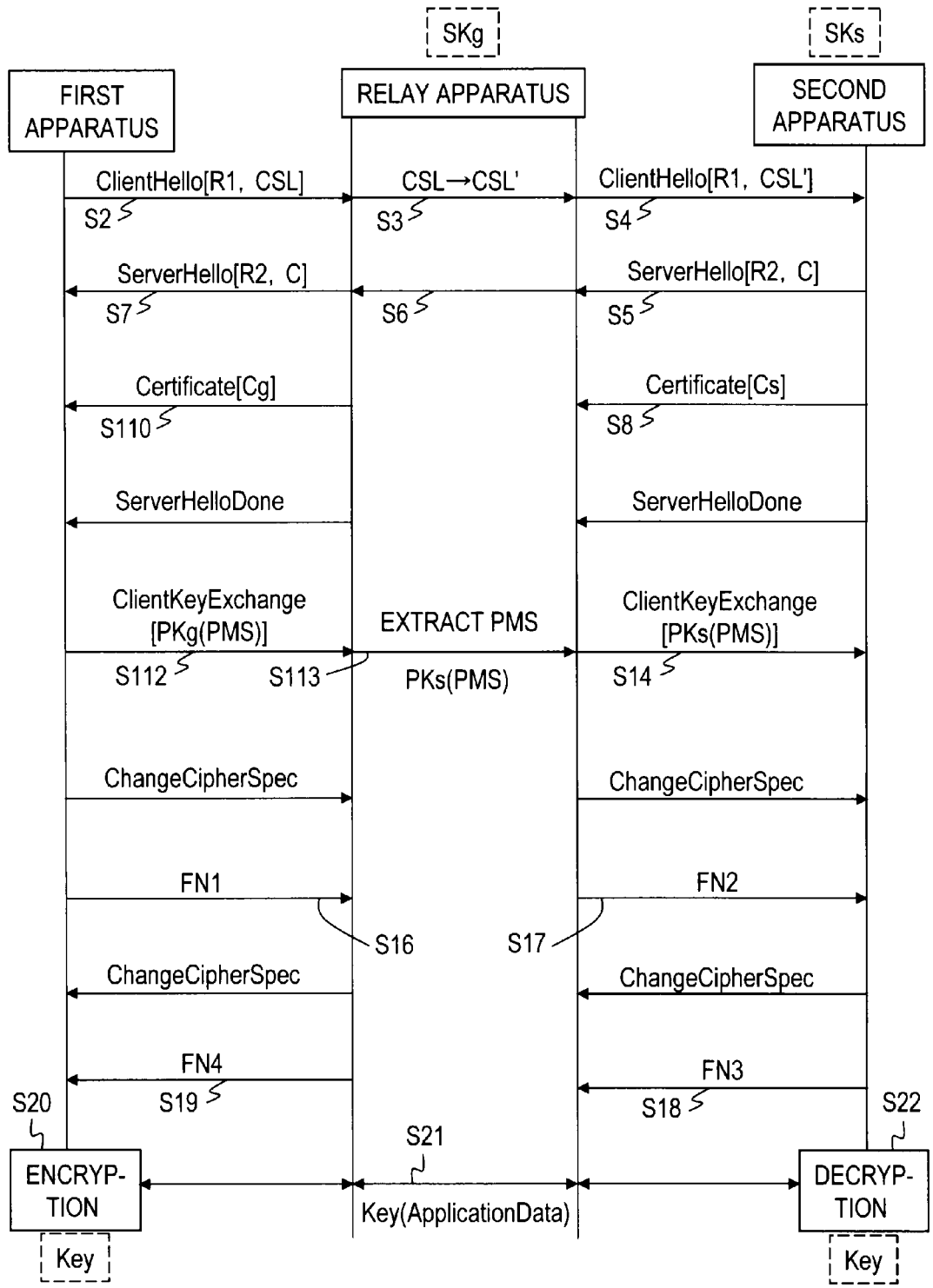
FIG. 25 is a sequence diagram illustrating the overall processing in the fourth embodiment.

FIG. 25 is a sequence diagram illustrating the overall processing in the fourth embodiment. Differences from the third embodiment will be described.

The differences from the third embodiment are that neither the second public key certificate sending process (step S11) nor the signature information sending process (step S15) is executed. The rest is the same as in the third embodiment.

[Processing in Relay Apparatus]

Figure 26:
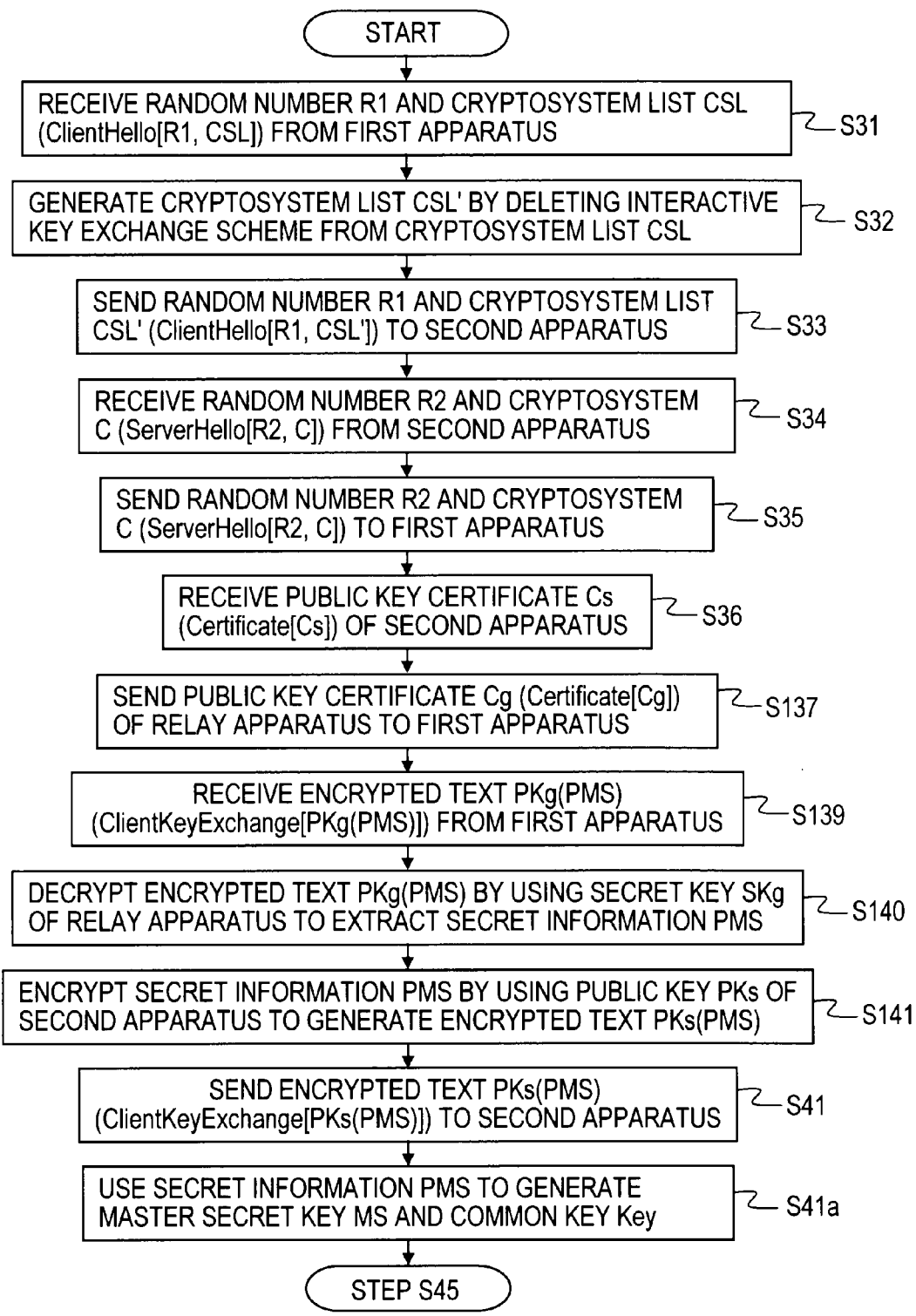
FIG. 26 is a flowchart illustrating processing in the relay apparatus in the fourth embodiment.

FIG. 26 is a flowchart illustrating the processing in the relay apparatus 330 of the fourth embodiment. Differences from the third embodiment will be described.

The differences from the third embodiment are that neither the processing in step S38 nor the processing in steps S42 to S44 is executed. The rest is the same as in the third embodiment.

<Features of Present Embodiment>

As in the first embodiment, the same secret information PMS, master secret key MS, and common key Key can be shared between the first apparatus 310 and the relay apparatus 330 and between the second apparatus 20 and the relay apparatus 330 in this embodiment. As in the first embodiment, finished messages corresponding to the same secret information PMS can be generated in both parties of communications between the first apparatus 310 and the relay apparatus 330 and between the second apparatus 20 and the relay apparatus 330, respectively. Consequently, the first apparatus 310 and the second apparatus 20 performing processing in accordance with the protocol (such as TLS or the like) can share the same common key through the relay apparatus 330, without changing their specifications. The relay apparatus 330 can relay cryptosystem communication according to the protocol (such as TLS or the like) between the first apparatus 310 and the second apparatus 20 just by forwarding text encrypted by the first apparatus 310 by using the common key Key directly to the second apparatus 20.

Fifth Embodiment

This embodiment is a modification of the embodiments described above. After the transmission and reception of finished messages (step S19) ends, the first apparatus, the second apparatus, and the relay apparatus make a re-connection by re-using the session that has already been established in processing up to step S19, and send and receive new finished messages. This can make the finished messages sent and received by the first apparatus after the re-connection and the finished messages sent and received by the second apparatus after the re-connection the same as each other (the processing for making the finished messages sent and received by the first apparatus and the finished messages sent and received by the second apparatus the same as each other will be referred to as finished message coordination). Consequently, the first apparatus and the second apparatus can perform encryption or decryption in a block cipher mode (such as the CBC mode) by using the common key Key and also using one or both of the finished messages as the initial vector. As described earlier, even if a common key cryptosystem in a standard CBC mode in TLS or the like is used, the relay apparatus can forward the encrypted text sent from the first apparatus, directly to the second apparatus 20.

Processing in and after step S19 in the embodiments will be described below. Processing in this embodiment can be applied to any of the embodiments described above. To simplify the description, an example of adding the processing of this embodiment to the first embodiment will be described. Prerequisites of the processing in this embodiment are as follows: The ServerHello message (steps S5 to S7) in each embodiment includes a session identifier SID generated by the second apparatus; in the process of sending the ServerHello message, the session identifier SID is stored in the memories of the first apparatus, the second apparatus, and the relay apparatus and is associated with the secret information PMS and the master secret key MS.

Figure 27:
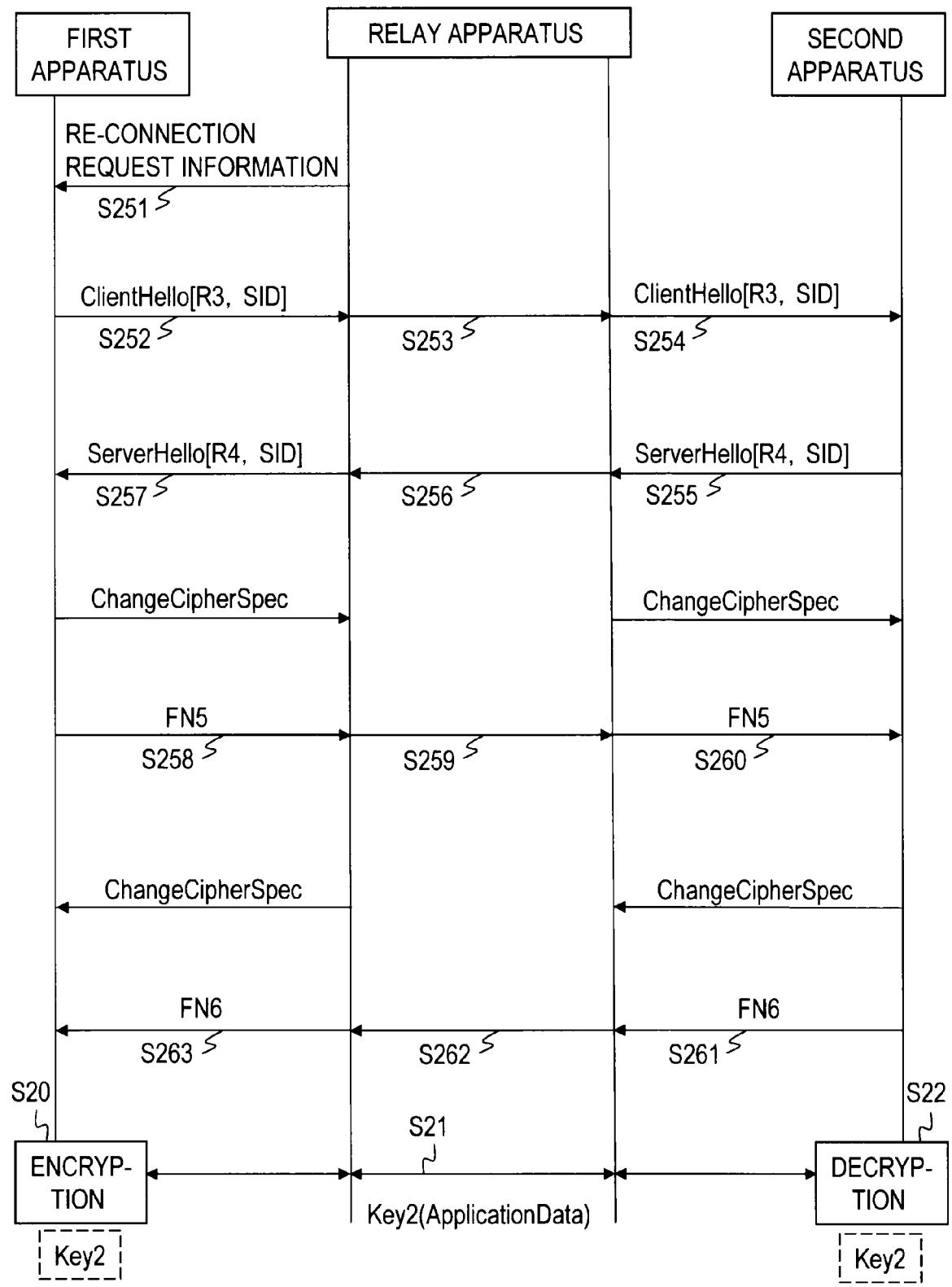
FIG. 27 is a sequence diagram illustrating finished message coordination in a fifth embodiment.

FIG. 27 is a sequence diagram illustrating the finished message coordination in the fifth embodiment.

The transmitter 33 of the relay apparatus 30 (FIG. 8) sends re-connection request information to the first apparatus 10 (FIG. 6) (step S251). The information is received by the receiver 14 of the first apparatus 10 and is sent to the communication processor 12*h*. After that, the random number generator 12*a* generates a random number R3 and sends it to the communication processor 12*h*. The communication processor 12*h* reads the session identifier SID from the memory 11, generates transmission start request information (ClientHello message) that includes the random number R3 and the session identifier SID, and sends it to the transmitter 13. The transmitter 13 sends the transmission start request information (ClientHello message) to the relay apparatus 30. The information is received by the receiver 34 of the relay apparatus 30 and is stored in the memory 31 (step S252). The transmission start request information (ClientHello message) is also sent from the transmitter 33 of the relay apparatus 30 (step S253) and is received by the receiver 24 of the second apparatus 20 (FIG. 7) (step S254). The transmission start request information (ClientHello message) is stored in the memory 21 and is sent to the communication processor 22*h*. After that, the random number generator 22*a* of the second apparatus 20 generates a random number R4 and sends it to the communication processor 22*h*. The communication processor 22*h* reads the session identifier SID from the memory 21, generates transmission start response information (ServerHello message) that includes the random number R4 and the session identifier SID, and sends the information to the transmitter 23. The transmitter 23 sends the transmission start response information (ServerHello message) to the relay apparatus 30, and the information is received by the receiver 34 of the relay apparatus 30 and is stored in the memory 31 (step S255). The transmission start response information (ServerHello message) is also sent from the transmitter 33 of the relay apparatus 30 (step S256) and is received by the receiver 14 of the first apparatus 10 (step S257). The transmission start response information (ServerHello message) is stored in the memory 11 and is sent to the communication processor 12*h*.

After the first apparatus 10 sends the ChangeCipherSpec message (which includes the initialization of the initial vector, for example) through the relay apparatus 30 to the second apparatus 20, the finished message generator 12*f* of the first apparatus 10 reads from the memory 11 the master secret key MS corresponding to the session identifier SID and communication log information HS5 between the first apparatus 10 and the relay apparatus 30 obtained in and after step S252, generates a fifth finished message FN5 corresponding to the master secret key MS and the communication log information HS5, and stores it in the memory 11 (fifth finished message generating process). An example of the communication log information HS5 between the first apparatus 10 and the relay apparatus 30 is all or part of the handshake messages in and after step S252, except the fifth finished message FN5. An example of the communication log information HS5 between the first apparatus 10 and the relay apparatus 30 is all the handshake messages in and after step S252, except the ChangeCipherSpec message, and includes the random number R3 and the random number R4. An example of the fifth finished message FN5 is a message authentication code generated for the communication log information HS5 by using the master secret key MS, and more specifically, is the function value obtained by entering the master secret key MS, a character string (finished label), and the value of the connect bits of the MD5 hash value of the communication log information HS5 and the SHA-1 hash value of the communication log information HS5 into the predetermined pseudo-random function PRF. The fifth finished message FN5 may be obtained by encrypting information corresponding to the communication log information HS5 and the master secret key MS by using the master secret key MS.

The generated fifth finished message FN5 is sent to the transmitter 13 and is then sent to the relay apparatus 30 (step S258). The fifth finished message FN5 may be encrypted by using the common key Key and then sent. The fifth finished message FN5 is received by the receiver 34 of the relay apparatus 30 (step S259) and is further sent from the transmitter 33 to the second apparatus 20 (fifth finished message sending process, step S260).

After the second apparatus 20 sends the ChangeCipherSpec message (which includes the initialization of the initial vector, for example) through the relay apparatus 30 to the first apparatus 10, the finished message generator 22*f* of the second apparatus 20 reads from the memory 21 the master secret key MS corresponding to the session identifier SID and communication log information HS6 between the second apparatus 20 and the relay apparatus 30 obtained in and after step S252, generates a sixth finished message FN6 corresponding to the master secret key MS and the communication log information HS6, and stores it in the memory 21 (sixth finished message generating process). An example of the communication log information HS6 between the second apparatus 20 and the relay apparatus 30 is all or part of the handshake messages in and after step S252, except the ChangeCipherSpec message. An example of the communication log information HS6 between the second apparatus 20 and the relay apparatus 30 is all the handshake messages obtained in and after step S252, except the sixth finished message FN6, and includes the random number R3 and the random number R4. An example of the sixth finished message FN6 is a message authentication code generated for the communication log information HS6 by using the master secret key MS, and more specifically, is the function value obtained by entering the master secret key MS, a character string (finished label), and the value of the connect bits of the MD5 hash value of the communication log information HS6 and the SHA-1 hash value of the communication log information HS6 into the predetermined pseudo-random function PRF. The sixth finished message FN6 may be obtained by encrypting information corresponding to the communication log information HS6 and the master secret key MS by using the master secret key MS.

The generated sixth finished message FN6 is sent to the transmitter 23, which sends it to the relay apparatus 30 (step S261). The sixth finished message FN6 may be encrypted by using the common key Key and sent. The sixth finished message FN6 is received by the receiver 34 of the relay apparatus 30 (step S262) and is further sent from the transmitter 33 to the first apparatus 10 (sixth finished message sending process, step S263).

The common key encryption processor 12$i$ of the first apparatus 10 and the common key encryption processor 22$i$ of the second apparatus 20 can perform encryption or decryption in a block cipher mode (such as the CBC mode) using the fifth finished message FN5 and/or the sixth finished message FN6 as the initial vector. If a common key cryptosystem in a standard CBC mode in TLS or the like is used, the relay apparatus can forward the encrypted text sent from the first apparatus, directly to the second apparatus 20.

<Features of Present Embodiment>

As has been described above, after the fourth finished message sending process (step S19) in this embodiment, the transmitter of the first apparatus sends the transmission start request information (ClientHello message) to the relay apparatus; the transmitter of the relay apparatus sends the transmission start request information (ClientHello message) to the second apparatus; the transmitter of the second apparatus sends the transmission start response information (ServerHello message) to the relay apparatus; and the transmitter of the relay apparatus sends the transmission start response information (ServerHello message) to the first apparatus (re-connection starting process). Then, the finished message generator of the first apparatus generates a fifth finished message corresponding to the secret information PMS and the communication log information between the first apparatus and the relay apparatus obtained in and after the re-connection starting process (fifth finished message generating process); the transmitter of the first apparatus sends the fifth finished message to the relay apparatus; and the transmitter of the relay apparatus sends the fifth finished message to the second apparatus (fifth finished message sending process). The finished message generator of the second apparatus generates a sixth finished message corresponding to the secret information PMS and the communication log information between the second apparatus and the relay apparatus obtained in and after the re-connection starting process (sixth finished message generating process); the transmitter of the second apparatus sends the sixth finished message to the relay apparatus; and the transmitter of the relay apparatus sends the sixth finished message to the first apparatus (sixth finished message sending process).

The fifth finished message sent by the first apparatus is the same as the fifth finished message received by the second apparatus, and the sixth finished message sent by the second apparatus is the same as the sixth finished message received by the first apparatus. Accordingly, the fifth finished message and/or the sixth finished message can be used as an initial vector when the first apparatus and the second apparatus perform encryption or decryption by using the common key Key identified by the secret information PMS, in a block cipher mode (such as the CBC mode) which requires the initial vector. Therefore, by executing the re-connection processing in this embodiment, encryption or decryption can be performed by using the common key Key shared between the first apparatus and the second apparatus, in a block cipher mode (such as the CBC mode) using one or both of the finished messages as the initial vector.

Since the finished message sent and received by the first apparatus and the finished message sent and received by the second apparatus can be made the same as each other, even if a common key cryptosystem in a standard CBC mode in TLS or the like is used, as described earlier, the relay apparatus can forward the encrypted text sent from the first apparatus, directly to the second apparatus.

Sixth Embodiment

Like the fifth embodiment, the present embodiment is a modification of the first to fourth embodiments. After the transmission and reception of finished messages (step S19) ends, the first apparatus, the second apparatus, and the relay apparatus make a re-connection by re-using the session that has already been established in processing up to step S19 and perform finished message coordination. When TLS or the like is used, finished message coordination can be executed by using a TLS session resume mode.

Only the processing subsequent to step S19 in the embodiments will be described. Processing in this embodiment can be applied to any of the first to fourth embodiments described above. To simplify the description, an example of adding the processing of this embodiment to the first embodiment will be described. Prerequisites of the processing in this embodiment are as follows: The ServerHello message (steps S5 to S7) in each embodiment includes the session identifier SID generated by the second apparatus; in the process of sending the ServerHello message, the session identifier SID is stored in the memories of the first apparatus, the second apparatus, and the relay apparatus and is associated with the secret information PMS and the master secret key MS.

[Overall Processing]

Figure 28:
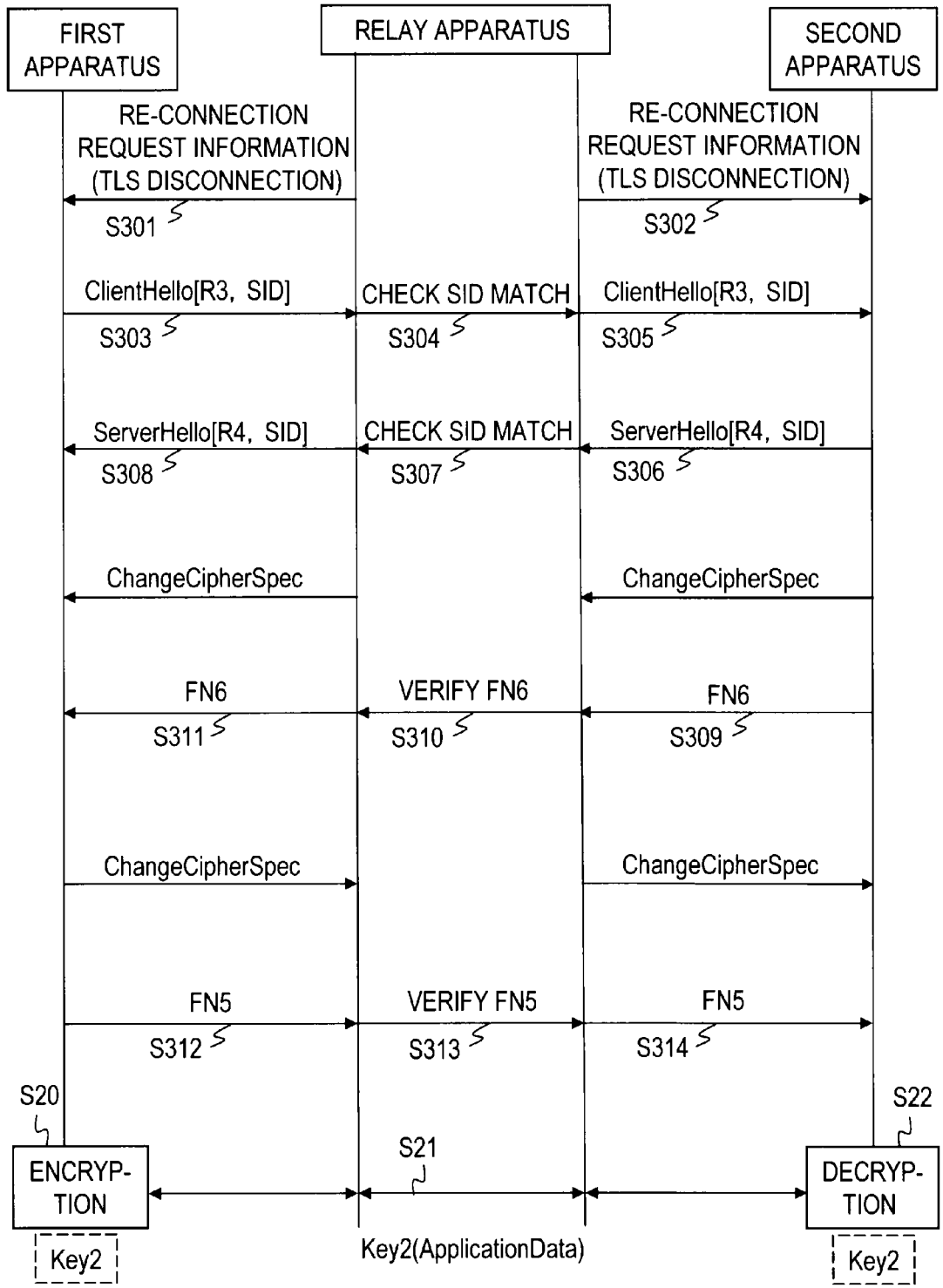
FIG. 28 is a sequence diagram illustrating finished message coordination in a sixth embodiment.

FIG. 28 is a sequence diagram illustrating the finished message coordination in the sixth embodiment.

The transmitter 33 of the relay apparatus 30 (FIG. 8) sends re-connection request information (TLS disconnection, SSL CloseNotify) to the first apparatus 10 (step S301). The transmitter 33 of the relay apparatus 30 (FIG. 8) also sends re-connection request information (TLS disconnection, SSL CloseNotify) to the second apparatus 20 (step S302). These pieces of re-connection request information are usually encrypted by the common key encryption processor 32$i$ by using the common key Key shared in the processing up to step S19 and are sent. These pieces of encrypted information are decrypted when necessary.

The re-connection request information sent to the first apparatus 10 is received by the receiver 14 and is sent to the communication processor 12h. After that, the random number generator 12a generates a random number R3 and sends it to the communication processor 12h. The communication processor 12h reads the session identifier SID from the memory 11, generates transmission start request information (ClientHello message) that includes the random number R3 and the session identifier SID, and sends it to the transmitter 13. The transmitter 13 sends the transmission start request information (ClientHello message) to the relay apparatus 30, and the information is received by the receiver 34 of the relay apparatus 30 and is stored in the memory 31 (step S303).

The communication processor 32h of the relay apparatus 30 reads the session identifier SID from the memory 31 and checks whether the session identifier SID received in step S303 agrees with the session identifier SID stored in the memory 31 before step S19 (step S304). When it is judged that the identifiers agree with each other, the transmission start request information (ClientHello message) is sent from the transmitter 33 of the relay apparatus 30. The transmission start request information (ClientHello message) is received by the receiver 24 of the second apparatus 20 (step S305), is stored in the memory 21, and is sent to the communication processor 22h.

After that, the random number generator 22a of the second apparatus 20 generates a random number R4 and sends it to the communication processor 22h. The communication processor 22h reads the session identifier SID from the memory 21, generates transmission start response information (ServerHello message) that includes the random number R4 and the session identifier SID, and sends it to the transmitter 23. The transmitter 23 sends the transmission start response information (ServerHello message) to the relay apparatus 30, and the information is received by the receiver 34 of the relay apparatus 30 and is stored in the memory 31 (step S306).

The communication processor 32h of the relay apparatus 30 reads the session identifier SID from the memory 31 and checks whether the session identifier SID received in step S306 agrees with the session identifier SID stored in the memory 31 before step S19 (whether the session identifier SID sent in step S304 agrees with the session identifier SID received in step S306) (step S307). When it is judged that the identifiers agree with each other, the transmission start response information (ServerHello message) is sent from the transmitter 33 of the relay apparatus 30. The transmission start response information (ServerHello message) is received by the receiver 14 of the first apparatus 10, is stored in the memory 11, and is sent to the communication processor 12h (step S308).

The communication processor 12h of the first apparatus 10 reads the session identifier SID from the memory 11 and checks whether the session identifier SID received in step S308 agrees with the session identifier SID read from the memory 11 (whether the session identifier SID sent in step S303 agrees with the session identifier SID received in step S308). The common key encryption processors 12i, 22i, and 32i of the apparatuses read from the respective memories 11, 21, and 31 the master secret key MS corresponding to the session identifier SID and the random numbers R3 and R4, generate the common key Key2 as described earlier, and store it in the memories 11, 21, and 31.

Then, the ChangeCipherSpec message is sent from the second apparatus 20 through the relay apparatus 30 to the first apparatus 10. After that, when TLS or the like is used, information sent and received between the first apparatus 10, the second apparatus 20, and the relay apparatus 30 is usually encrypted by the corresponding common key encryption processor by using the common key Key2. The encrypted information is decrypted by the corresponding common key encryption processor when necessary. A description of the process will be omitted.

The finished message generators 12f, 22f, and 32f of the apparatuses read from the respective memories 11, 21, and 31 the master secret key MS corresponding to the session identifier SID and communication log information HS6 obtained in and after step S303, generate a sixth finished message FN6 corresponding to the master secret key MS and the communication log information HS6, and store it in the memories 11, 21, and 31. When TLS or the like is used, the communication log information HS6 is all the handshake messages obtained in and after step S303, except the ChangeCipherSpec message. An example of the specific method of generating finished messages has been described earlier.

The communication processor 22h of the second apparatus 20 reads the sixth finished message FN6 from the memory 21 and sends it to the transmitter 23, which sends the message to the relay apparatus 30 (step S309).

The sixth finished message FN6 is received by the receiver 34 of the relay apparatus 30 and is stored in the memory 31. The communication processor 32h reads from the memory 31 the sixth finished message FN6 generated by itself and the sixth finished message FN6 sent from the second apparatus 20 and checks whether the messages agree with each other (step S310). When it is judged that the messages agree with each other, the transmitter 33 of the relay apparatus 30 sends the sixth finished message FN6 to the first apparatus 10 (step S311).

The sixth finished message FN6 is received by the receiver 14 of the first apparatus 10 and is stored in the memory 11. The communication processor 12h reads from the memory 11 the sixth finished message FN6 generated by itself and the sixth finished message FN6 sent from the relay apparatus 30 and checks whether the messages agree with each other.

When it is judged that the messages agree with each other, the ChangeCipherSpec message is sent from the first apparatus 10 to the second apparatus 20 through the relay apparatus 30. Then, the finished message generators 12f, 22f, and 32f of the apparatuses read from the respective memories 11, 21, and 31 the master secret key MS corresponding to the session identifier SID and communication log information HS5 obtained in and after step S303, generate a fifth finished message FN5 corresponding to the master secret key MS and the communication log information HS5, and store it in the memories 11, 21, and 31. When TLS or the like is used, the communication log information HS5 is all the handshake messages obtained in and after step S303, except the ChangeCipherSpec message. An example of the specific method of generating the finished message has been described earlier.

The communication processor 12h of the first apparatus 10 reads the fifth finished message FN5 from the memory 11 and sends it to the transmitter 13, which sends the message to the relay apparatus 30 (step S312).

The fifth finished message FN5 is received by the receiver 34 of the relay apparatus 30 and is stored in the memory 31. The communication processor 32h reads from the memory 31 the fifth finished message FN5 generated by itself and the fifth finished message FN5 sent from the first apparatus 10 and checks whether the messages agree with each other (step S313). When it is judged that the messages agree with each other, the transmitter 33 of the relay apparatus 30 sends the fifth finished message FN5 to the second apparatus 20 (step S314).

The fifth finished message FN5 is received by the receiver 24 of the second apparatus 20 and is stored in the memory 21. The communication processor 22h reads from the memory 21 the fifth finished message FN5 generated by itself and the fifth finished message FN5 sent from the relay apparatus 30 and checks whether the messages agree with each other. When it is judged that the messages agree with each other, cryptosystem communication using the common key Key2 is allowed among the first apparatus 10, the second apparatus 20, and the relay apparatus 30.

[Processing in Relay Apparatus]

Figure 29:
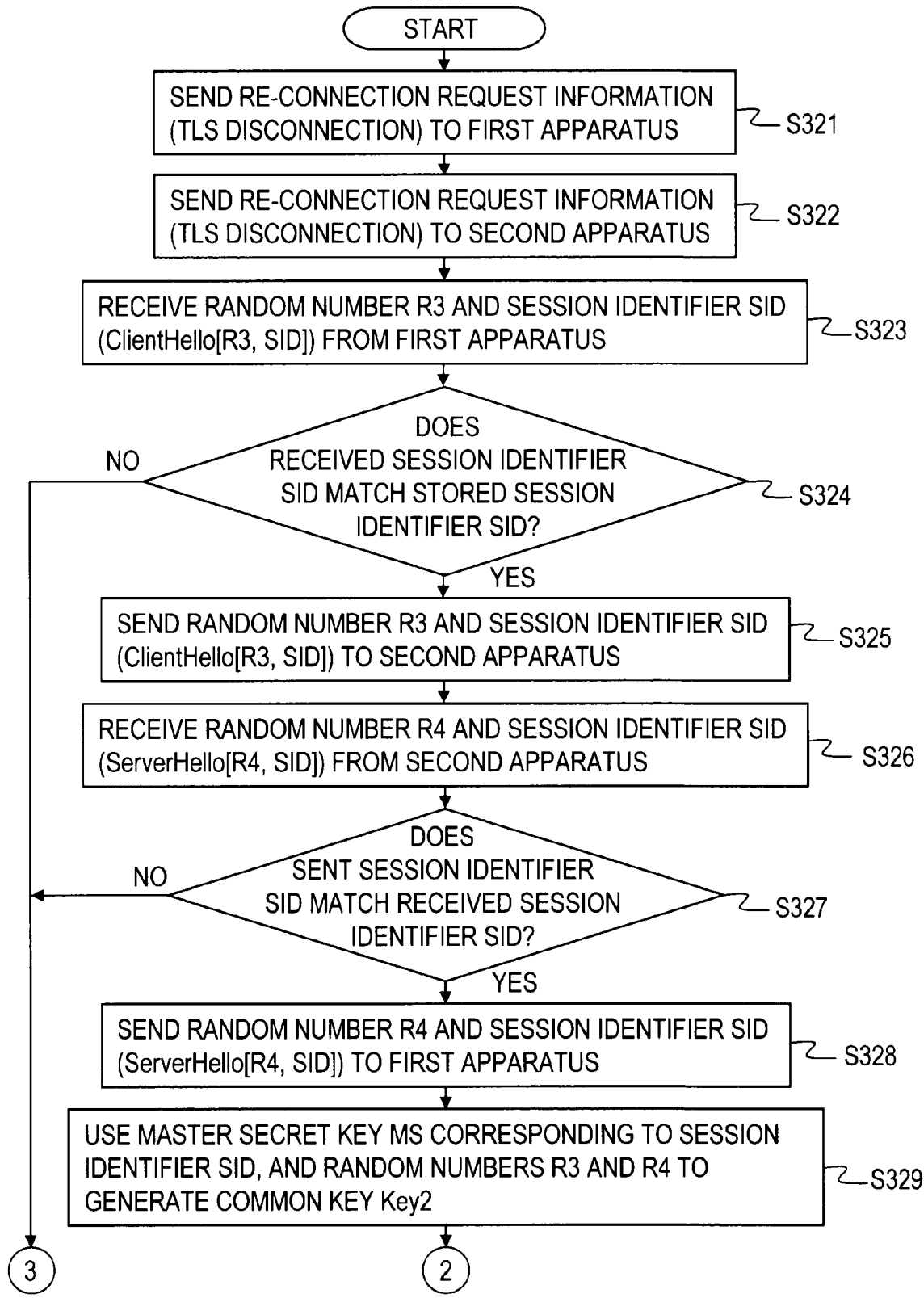
FIG. 29 is a flowchart illustrating processing in a relay apparatus in the sixth embodiment.
Figure 30:
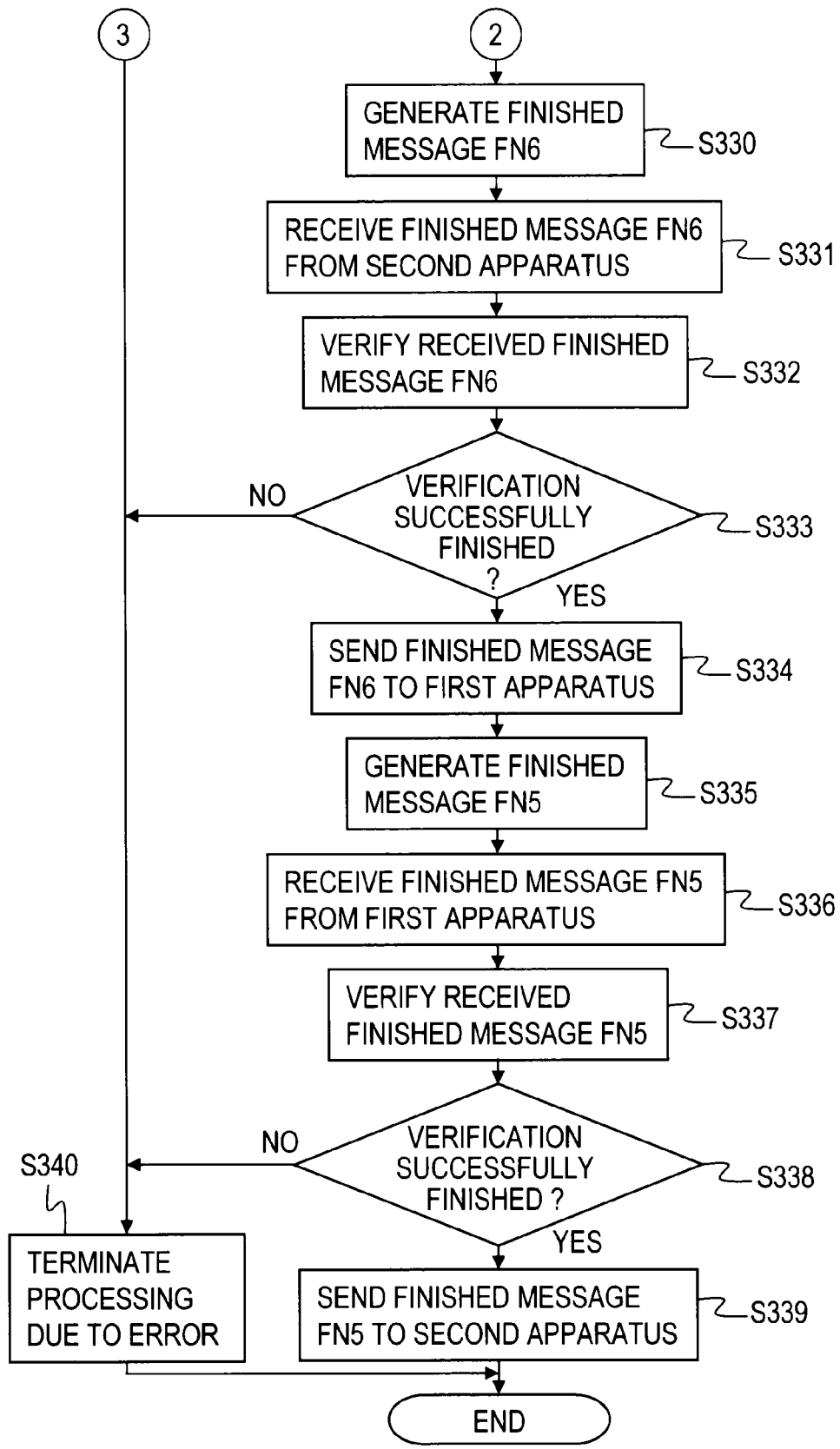
FIG. 30 is a flowchart illustrating the processing in the relay apparatus in the sixth embodiment.

FIGS. 29 and 30 are flowcharts illustrating processing in the relay apparatus 30 of the sixth embodiment. The processing in the relay apparatus 30 will be described below.

The transmitter 33 of the relay apparatus 30 (FIG. 8) sends re-connection request information (TLS disconnection, SSL CloseNotify) to the first apparatus 10 (step S321). The transmitter 33 of the relay apparatus 30 (FIG. 8) also sends re-connection request information (TLS disconnection, SSL CloseNotify) to the second apparatus 20 (step S322).

The transmission start request information (ClientHello message) that includes the random number R3 and the session identifier SID, sent from the first apparatus 10 is received by the receiver 34 of the relay apparatus 30 and is stored in the memory 31 (step S323). The communication processor 32h of the relay apparatus 30 reads the session identifier SID from the memory 31 and checks whether the session identifier SID received in step S323 agrees with the session identifier SID stored in the memory 31 before step S321 (step S324). When the identifiers do not agree with each other, the processing is terminated due to the error (step S340). When the identifiers agree with each other, the transmission start request information (ClientHello message) is sent from the transmitter 33 of the relay apparatus 30 to the second apparatus 20 (step S325).

The transmission start response information (ServerHello message) that includes the random number R4 and the session identifier SID, sent from the second apparatus 20 is received by the receiver 34 of the relay apparatus 30 and is stored in the memory 31 (step S326). The communication processor 32h of the relay apparatus 30 reads the session identifier SID from the memory 31 and checks whether the session identifier SID sent in step S325 agrees with the session identifier SID received in step S326 (step S327). When the identifiers do not agree with each other, the processing is terminated due to the error (step S340). When the identifiers agree with each other, the transmission start response information (ServerHello message) is sent from the transmitter 33 of the relay apparatus 30 to the first apparatus 10 (step S328).

Then, the common key generator 32e reads from the memory 31 the master secret key MS corresponding to the session identifier SID and the random numbers R3 and R4, generates a common key Key2 as described earlier, and stores it in the memory 31 (step S329). The finished message generator 32f reads from the memory 31 the communication log information HS6 and the master secret key MS corresponding to the session identifier SID, generates a sixth finished message FN6 corresponding to the master secret key MS and the communication log information HS6, and stores it in the memory 31 (step S330).

The sixth finished message FN6 sent from the second apparatus 20 is received by the receiver 34 of the relay apparatus 30 and is stored in the memory 31 (step S331). The communication processor 32h reads from the memory 31 the sixth finished message FN6 generated by itself and the sixth finished message FN6 sent from the second apparatus 20 and checks whether the messages agree with each other (step S332). When the messages do not agree with each other (step S333), the processing is terminated due to the error (step S340). When the messages agree with each other (step S333), the transmitter 33 sends the sixth finished message FN6 to the first apparatus 10 (step S334).

The finished message generator 32f reads from the memory 31 the master secret key MS corresponding to the session identifier SID and the communication log information HS5, generates a fifth finished message FN5 corresponding to the master secret key MS and the communication log information HS5, and stores it in the memory 31 (step S335). Then, the fifth finished message FN5 sent from the first apparatus 10 is received by the receiver 34 of the relay apparatus 30 and is stored in the memory 31 (step S336). The communication processor 32h reads from the memory 31 the fifth finished message FN5 generated by itself and the fifth finished message FN5 sent from the first apparatus 10 and checks whether the messages agree with each other (step S337). When the messages do not agree with each other (step S338), the processing is terminated due to the error (step S340). When the messages agree with each other (step S338), the transmitter 33 sends the fifth finished message FN5 to the second apparatus 20 (step S339).

<Features of Present Embodiment>

As has been described above, in the present embodiment, the sixth finished message sent from the second apparatus to the relay apparatus and the sixth finished message sent from the relay apparatus to the first apparatus can be made the same as each other, and the fifth finished message sent from the first apparatus to the relay apparatus and the fifth finished message sent from the relay apparatus to the second apparatus can be made the same as each other. Accordingly, even if a common key cryptosystem in a standard CBC mode in TLS or the like is used, the relay apparatus can forward the encrypted text sent from the first apparatus, directly to the second apparatus.

Re-connection in this embodiment, when viewed from the first apparatus and the second apparatus, is equivalent to standard processing in TLS or the like. Therefore, the specifications of the first apparatus and the second apparatus need not be modified when the processing of this embodiment is carried out.

Seventh Embodiment

In this embodiment, after the transmission and reception of finished messages end (step S19), finished message coordination is executed by re-handshaking.

Only the processing subsequent to step S19 in the embodiments will be described. Processing in this embodiment can be applied to any of the first to fourth embodiments described above. To simplify the description, an example of adding the processing of this embodiment to the first embodiment will be described.

Figure 31:
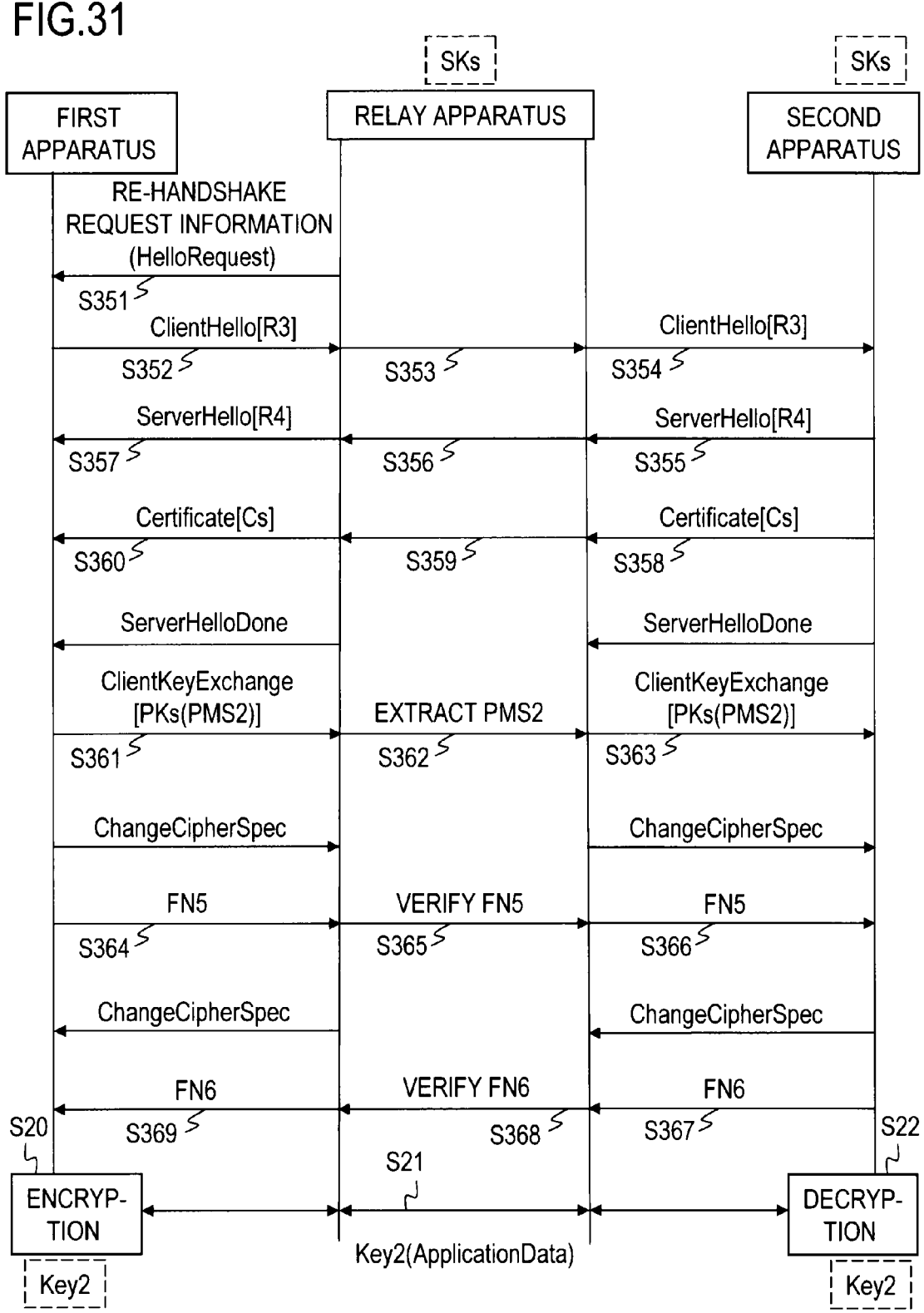
FIG. 31 is a sequence diagram illustrating finished message coordination in a seventh embodiment.

FIG. 31 is a sequence diagram illustrating finished message coordination in the seventh embodiment. Information sent and received in steps S351 to S363 and subsequent ChangeCipherSpec messages are sent and received usually after they are encrypted by using the common key Key shared in the processing up to step S19. Information sent and received in steps S364 to S369 is sent and received usually after it is encrypted by using the common key Key2 shared in the processing of steps S352 to S363. A description of these processes will be omitted in the description of this embodiment.

The transmitter 33 of the relay apparatus 30 (FIG. 8) sends re-handshake request information (HelloRequest) to the first apparatus 10 (step S351). This information is received by the receiver 14 of the first apparatus 10 and is sent to the communication processor 12h. After that, the random number generator 12a generates a random number R3 and sends it to the communication processor 12h. The communication processor 12h generates transmission start request information (ClientHello message) that includes the random number R3 and sends it to the transmitter 13. The transmitter 13 sends the transmission start request information (ClientHello message) to the relay apparatus 30, and the information is received by the receiver 34 of the relay apparatus 30 and is stored in the memory 31 (step S352).

The transmission start request information (ClientHello message) is also sent from the transmitter 33 of the relay apparatus 30 (step S353). The transmission start request information (ClientHello message) is received by the receiver 24 of the second apparatus 20 (FIG. 7) (step S354), is stored in the memory 21, and is sent to the communication processor 22h. After that, the random number generator 22a of the second apparatus 20 generates a random number R4 and sends it to the communication processor 22h. The communication processor 22h generates transmission start response information (ServerHello message) that includes the random number R4 and sends it to the transmitter 23. The transmitter 23 sends the transmission start response information (ServerHello message) to the relay apparatus 30, and the information is received by the receiver 34 of the relay apparatus 30 and is stored in the memory 31 (step S355). The transmission start response information (ServerHello message) is also sent from the transmitter 33 of the relay apparatus 30 (step S356). The transmission start response information (ServerHello message) is received by the receiver 14 of the first apparatus 10 (step S357), is stored in the memory 11, and is sent to the communication processor 12h.

The communication processor 22h of the second apparatus 20 (FIG. 7) reads from the memory 21 a public key certificate Cs of a public key PKs corresponding to the cryptosystem C and sends information (Certificate message) that includes the certificate to the transmitter 23. The transmitter 23 sends the public key certificate Cs of the second apparatus 20 via the network 50 to the relay apparatus 30 (step S358). The public key certificate Cs of the second apparatus 20 is received by the receiver 34 of the relay apparatus 30 (FIG. 8) and is sent to the communication processor 32h. The communication processor 32h stores the public key certificate Cs of the second apparatus 20 in the memory 31 and sends it to the transmitter 33. The transmitter 33 sends the public key certificate Cs of the second apparatus 20 via the network 40 to the first apparatus 10 (step S359). The sent public key certificate Cs of the second apparatus 20 is received by the receiver 14 of the first apparatus 10 (FIG. 6) and is sent to the communication processor 12h. The communication processor 12h stores the public key certificate Cs of the second apparatus 20 in the memory 11 (step S360). When TLS or the like is used, a ServerHelloDone message is then sent from the second apparatus 20 through the relay apparatus 30 to the first apparatus 10.

The secret information setting unit 12b of the first apparatus 10 (FIG. 6) specifies secret information PMS2 for identifying the common key Key2 and stores it in the memory 11. For example, the secret information setting unit 12b generates a random number and specifies it as the secret information PMS2. Then, the communication processor 12h of the first apparatus 10 reads the public key certificate Cs of the second apparatus 20 from the memory 11, verifies it as described earlier, generates encrypted text PKs(PMS2) by encrypting the secret information PMS2 by using the public key PKs of the second apparatus 20 included in the certificate, and stores the text in the memory 11. Information (ClientKeyExchange message) that includes the encrypted text PKs(PMS2) is sent to the transmitter 13. The transmitter 13 sends the ClientKeyExchange message, including the encrypted text PKs (PMS2), through the network 40 to the relay apparatus 30 (step S361).

The ClientKeyExchange message is received by the receiver 34 of the relay apparatus 30 (FIG. 8) and is sent to the communication processor 32h, and the communication processor 32h stores the encrypted text PKs(PMS2) included in the ClientKeyExchange message in the memory 31. The decryption processor 32b reads the secret key SKs of the second apparatus 20 from the memory 31. The decryption processor 32b reads the encrypted text PKs(PMS2) from the memory 31 and decrypts the text by using the secret key SKs to extract the secret information PMS2 (step S362). The extracted secret information PMS2 is stored in the memory 31.

The communication processor 32h reads the encrypted text PKs(PMS2) from the memory 31 and sends a ClientKeyExchange message that includes the text to the transmitter 33. The transmitter 33 sends the ClientKeyExchange message, including the encrypted text PKs(PMS2), via the network 50 to the second apparatus 20. The sent ClientKeyExchange message is received by the receiver 23 of the second apparatus 20 and is sent to the communication processor 22h, and the communication processor 22h stores the encrypted text PKs (PMS2) included in the ClientKeyExchange message in the memory 21. The decryption processor 22c of the second apparatus 20 reads the secret key SKs of the second apparatus 20 from the memory 21. The decryption processor 22c also reads the encrypted text PKs(PMS2) from the memory 21 and decrypts the text by using the secret key SKs to extract the secret information PMS2 (step S363). The extracted secret information PMS2 is stored in the memory 21.

Now, the first apparatus 10, the second apparatus 20, and the relay apparatus 30 share the secret information PMS2. Then, the first apparatus 10, the second apparatus 20, and the relay apparatus 30 generate a master secret key MS2 and a common key Key2, as described earlier, by using the secret information PMS2 and store them in the memories 11, 21, and 31, respectively.

After the ChangeCipherSpec message is sent from the first apparatus 10 through the relay apparatus 30 to the second apparatus 20, the finished message generators 12f, 22f, and 32f of the apparatuses read from the respective memories 11, 21, and 31 the master secret key MS2 and communication log information HS5 obtained in and after step S352, generate a fifth finished message FN5 corresponding to the master secret key MS2 and the communication log information HS5, and store it in the memories 11, 21, and 31. When TLS or the like is used, the communication log information HS5 is all the handshake messages obtained in and after step S352, except the ChangeCipherSpec message. An example of the specific method of generating the finished message has been described earlier.

The communication processor 12h of the first apparatus 10 reads the fifth finished message FN5 from the memory 11 and sends it to the transmitter 13, which sends the message to the relay apparatus 30 (step S364).

The fifth finished message FN5 is received by the receiver 34 of the relay apparatus 30 and is stored in the memory 31. The communication processor 32h reads from the memory 31 the fifth finished message FN5 generated by itself and the fifth finished message FN5 sent from the first apparatus 10 and checks whether the messages agree with each other (step S365). When it is judged that the messages agree with each other, the transmitter 33 of the relay apparatus 30 sends the fifth finished message FN5 to the second apparatus 20 (step S366). The fifth finished message FN5 is received by the receiver 24 of the second apparatus 20 and is stored in the memory 21. The communication processor 22h reads from the memory 21 the fifth finished message FN5 generated by itself and the fifth finished message FN5 sent from the relay apparatus 30 and checks whether the messages agree with each other. Only when it is judged that the messages agree with each other, the ChangeCipherSpec message is sent from the second apparatus 20 through the relay apparatus 30 to the first apparatus 10. The finished message generators 12f, 22f, and 32f of the apparatuses read from the respective memories 11, 21, and 31 the master secret key MS2 and communication log information HS6 obtained in and after step S352, generate a sixth finished message FN6 corresponding to the master secret key MS2 and the communication log information HS6, and store it in the memories 11, 21, and 31, respectively. When TLS or the like is used, the communication log information HS6 is all the handshake messages obtained in and after step S352, except the ChangeCipherSpec message. An example of the specific method of generating the finished message has been described earlier.

The communication processor 22h of the second apparatus 20 reads the sixth finished message FN6 from the memory 21 and sends it to the transmitter 23, which sends the message to the relay apparatus 30 (step S367).

The sixth finished message FN6 is received by the receiver 34 of the relay apparatus 30 and is stored in the memory 3L The communication processor 32h reads from the memory 31 the sixth finished message FN6 generated by itself and the sixth finished message sent from the second apparatus 20 and checks whether the messages agree with each other (step S368). When it is judged that the messages agree with each other, the transmitter 33 of the relay apparatus 30 sends the sixth finished message FN6 to the first apparatus 10 (step S369).

The sixth finished message FN6 is received by the receiver 14 of the first apparatus 10 and is stored in the memory 11. The communication processor 12h reads from the memory 11 the sixth finished message FN6 generate by itself and the sixth finished message FN6 sent from the relay apparatus 30 and checks whether the messages agree with each other. When it is judged that the messages agree with each other, cryptosystem communication using the common key Key2 is allowed among the first apparatus 10, the second apparatus 20, and the relay apparatus 30.

<Features of Present Embodiment>

Even if a common key cryptosystem in a standard CBC mode in TLS or the like is used, the finished message coordination makes it possible for the relay apparatus to forward the encrypted text sent from the first apparatus, directly to the second apparatus.

In this embodiment, since the random numbers R3 and R4 are encrypted and sent in an established TLS session, a higher level of security can be obtained.

Eighth Embodiment

Also in this embodiment, after the transmission and reception of finished messages (step S19) end, finished message coordination is executed by re-handshaking. This embodiment differs from the third embodiment in that the finished message coordination is executed. This means that the secret key of the second apparatus is not stored in the relay apparatus. Only the differences from the seventh embodiment will be described below.

Figure 32:
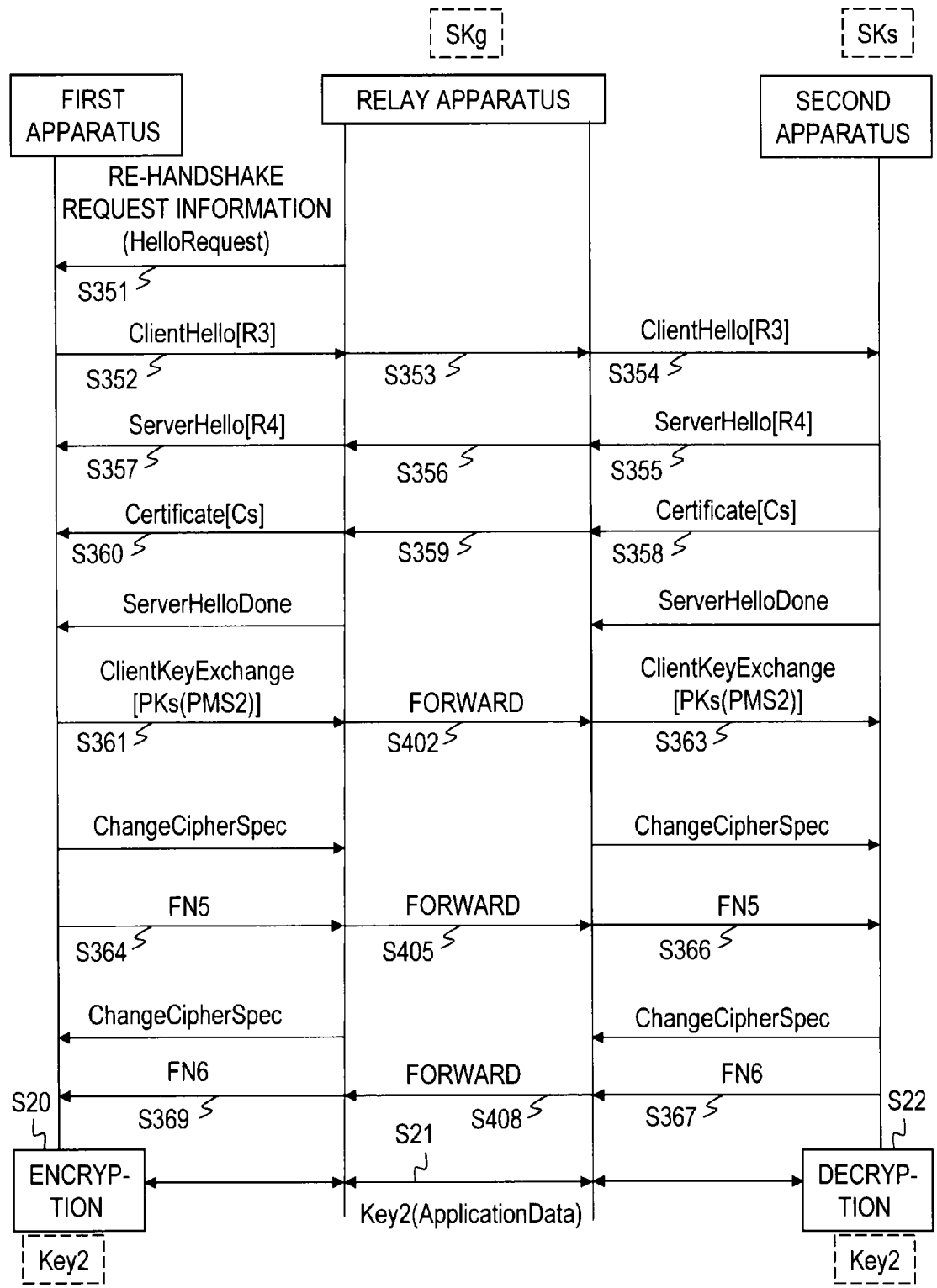
FIG. 32 is a sequence diagram illustrating finished message coordination in an eighth embodiment.

FIG. 32 is a sequence diagram illustrating the finished message coordination in the eighth embodiment. Information is sent and received in steps S351 to S363 and subsequent ChangeCipherSpec messages are sent and received usually after they are encrypted by using the common key Key shared in the processing up to step S19. Information is sent and received in steps S364 to S369 usually after it is encrypted by using the common key Key2 shared in the processing in steps S352 to S363. A description of these processes will be omitted in the description of this embodiment.

The processing in steps S351 to S360, described in the seventh embodiment, is executed, and then the ServerHelloDone message is sent from the second apparatus 20 through the relay apparatus 230 to the first apparatus 210.

The processing in step S361 is executed, and then the relay apparatus 230 forwards the ClientKeyExchange message sent from the first apparatus 210, directly to the second apparatus 20 (step S402), instead of executing the processing in step S362. Then, the processing in step S363 is executed. After the processing in step S364 is executed, the relay apparatus 230 forwards the fifth finished message FN5 sent from the first apparatus 210, directly to the second apparatus 20, instead of executing the processing in step S365, (step S405). Then, the processing in steps S366 and S367 is executed. The relay apparatus 230 forwards the sixth finished message FN6 sent from the second apparatus 20, directly to the first apparatus 210 (step S408), instead of executing the processing in step S368, and the processing in step S369 is executed.

<Features of Present Embodiment>

Even if a common key cryptosystem in a standard CBC mode in TLS or the like is used, the finished message coordination makes it possible for the relay apparatus to forward the encrypted text sent from the first apparatus, directly to the second apparatus. In the finished message coordination in this embodiment, the relay apparatus 230 just forwards communication data. Accordingly, this embodiment can prevent the relay apparatus 230 from leaking communication data in communication performed after the finished message coordination.

Ninth Embodiment

In this embodiment, after the relay apparatus authenticates the first apparatus, a connection to the second apparatus is made. In an example described below, a usual TLS connection (with client authentication) is made between the first apparatus and the relay apparatus, and then the first apparatus is connected to the second apparatus by using a TLS session resume mode.

Figure 33:
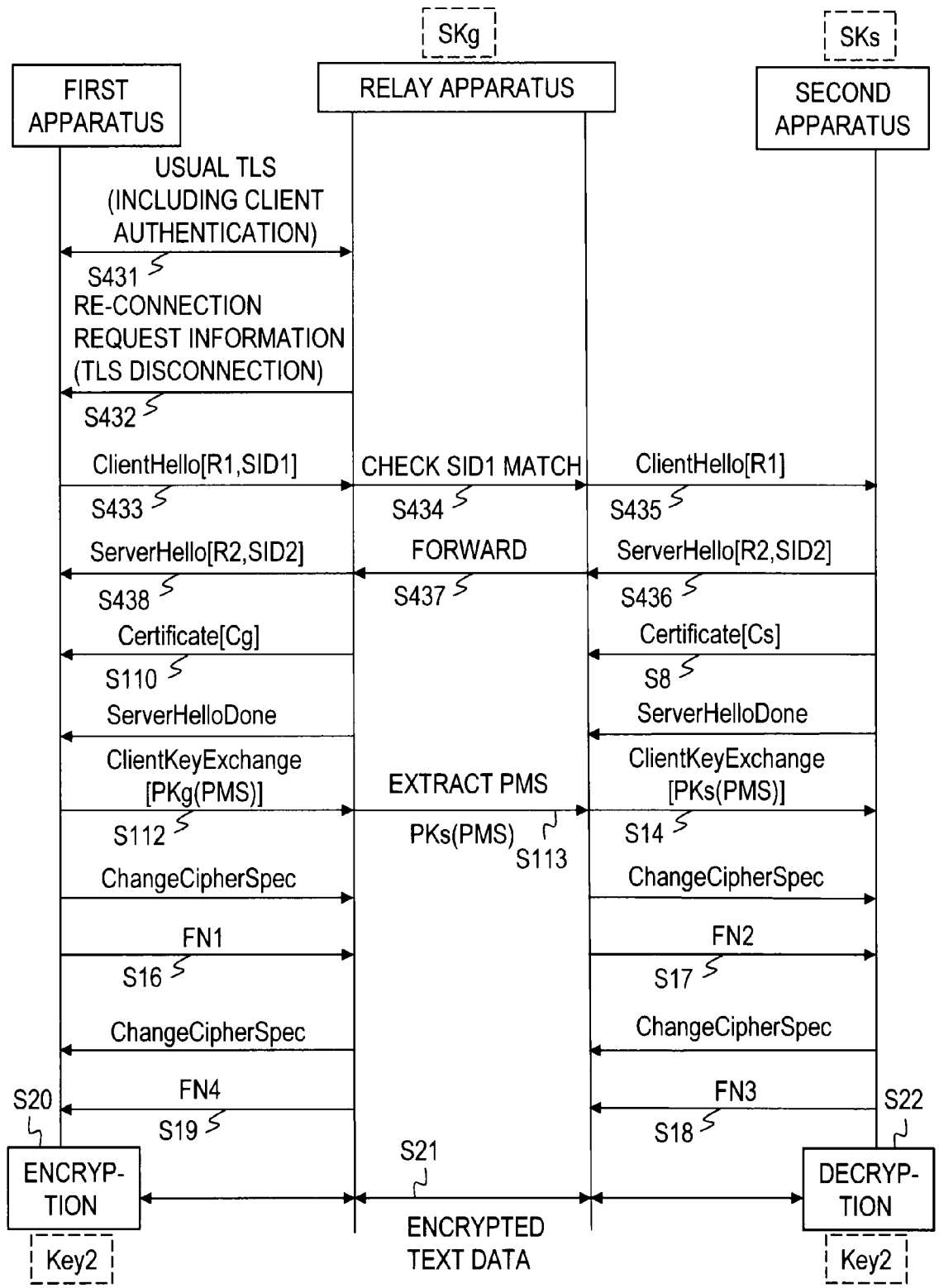
FIG. 33 is a sequence diagram illustrating processing in a ninth embodiment.

FIG. 33 is a sequence diagram illustrating processing in the ninth embodiment. The system configuration for executing the processing in this embodiment is the same as in the third embodiment. The following description will be made with reference to the configuration described in the third embodiment (FIGS. 17 to 19).

A usual TLS connection (including client authentication) is executed between the first apparatus 210 and the relay apparatus 230 by using the secret key SKc, the public key PKc, and the public key certificate Cc of the first apparatus (step S431). Then, the first apparatus 210 and the relay apparatus 230 share a common key Key1, and an encryption session identified by a session identifier SID1 is established. More specifically, the secret information corresponding to the common key Key1 and the master secret key are stored in the memories 11 and 31 of the apparatuses in association with the session identifier SID1.

The transmitter 33 of the relay apparatus 230 (FIG. 19) sends re-connection request information (TLS disconnection, SSL CloseNotify) to the first apparatus 210 (step S432). The re-connection request information is sent usually after it is encrypted in the common key encryption processor 32i of the relay apparatus 230 by using the common key Key1.

The re-connection request information sent to the first apparatus 210 (FIG. 18) is received by the receiver 14 and is sent to the communication processor 12h. If the re-connection request information has been encrypted, it is decrypted in the common key encryption processor 12i of the first apparatus 210 by using the common key Key1. After that, the random number generator 12a generates a random number R1 and sends it to the communication processor 12h. The communication processor 12h reads the session identifier SID1 from the memory 11, generates transmission start request information (ClientHello message) that includes the random number R1 and the session identifier SID1, and sends it to the transmitter 13. The transmitter 13 sends the transmission start request information (ClientHello message) to the relay apparatus 230, and the information is received by the receiver 34 of the relay apparatus 230 (step S433).

The communication processor 32h of the relay apparatus 230 reads the session identifier SID1 from the memory 31 and checks whether the session identifier SID1 received in step S433 agrees with the session identifier SID1 stored in the memory 31 in the processing in step S431 (step S434). When it is judged that the identifiers agree with each other, the communication processor 32h sends the transmission start request information (ClientHello message) that includes the random number R1 to the transmitter 33, which sends the information to the second apparatus 20. The transmission start request information (ClientHello message) is received by the receiver 24 of the second apparatus 20 (FIG. 7) (step S435) and then is sent to the communication processor 22h.

Then, the random number generator 22a of the second apparatus 20 generates a random number R2 and sends it to the communication processor 22h. The communication processor 22h generates a new session identifier SID2 and stores it in the memory 21. The communication processor 22h also generates transmission start response information (ServerHello message) that includes the random number R2 and the session identifier SID2 and sends the information to the transmitter 23. The transmitter 23 sends the transmission start response information (ServerHello message) to the relay apparatus 230, and the information is received by the receiver 34 of the relay apparatus 230 (step S436).

The transmission start response information (ServerHello message) is further sent from the transmitter 33 of the relay apparatus 230 and is received by the receiver 14 of the first apparatus 210 (step S437). The random number R2 and the session identifier SID2 included in the transmission start response information received by the receiver 14 are stored in the memory 11 of the first apparatus 210 (step S438).

The processing in steps S8, S110, S112, S113, S14, and S16 to S19, described earlier, is executed.

<Features of Present Embodiment>

In this embodiment, since the first apparatus 210 is connected to the second apparatus 20 after the first apparatus 210 is authenticated by the relay apparatus 230, the second apparatus 20 can be protected from an attack made by an unauthorized apparatus. The session identifier SID1 specified by the TLS connection in step S431 is used in the authentication of the first apparatus 210 in this embodiment. Unlike a usual firewall, in which connection of an apparatus is controlled in accordance with its IP address, connection control in this embodiment can be conducted even when the IP address of the connection source apparatus varies.

In this embodiment, although the relay apparatus 230 authenticates the first apparatus 210 by a TLS connection including client authentication, a different authentication scheme may be used. For example, after a usual TLS connection (without client authentication) is made between the first apparatus 210 and the relay apparatus 230, ID-password authentication may be made in the established encryption session to make a connection to the second apparatus 20 by using the TLS session resume mode.

After step S19, finished message coordination described in the fifth to eighth embodiments may be executed.

In this embodiment, the session identifier SID1 is stored in the memory of the relay apparatus 230 in the processing in step S431. In step S434, the communication processor 32h of the relay apparatus 230 checks whether the session identifier SID1 received in step S433 and the session identifier SID1 stored in the memory 31 in the processing in step S431 agree with each other. A configuration may be made in which corresponding information corresponding to the session identifier SID1 (such as the hash value of the session identifier SID1) is stored in the memory of the relay apparatus 230 in the processing of step S431; the communication processor 32h of the relay apparatus 230 checks whether the session identifier SID1 received in step S433 corresponds to the corresponding information stored in the memory 31 in the processing in step S431 (if the corresponding information is the hash value of the session identifier SID1, the hash value of the session identifier SID1 received in step S433 is calculated and checked to see whether it agrees with the hash value of the corresponding information); only when the session identifier SID1 received in step S433 agrees with the corresponding information stored in the memory 31 in the processing in step S431, the transmitter 33 sends the transmission start request information (ClientHello message) that includes the random number R1 to the second apparatus 20.

Tenth Embodiment

Also in this embodiment, after the relay apparatus authenticates the first apparatus, a connection to the second apparatus is made. This embodiment differs from the ninth embodiment in that after a usual TLS connection (with client authentication) is made between the first apparatus and the relay apparatus, a connection to the second apparatus is made by using a TLS re-handshake mode.

Figure 34:
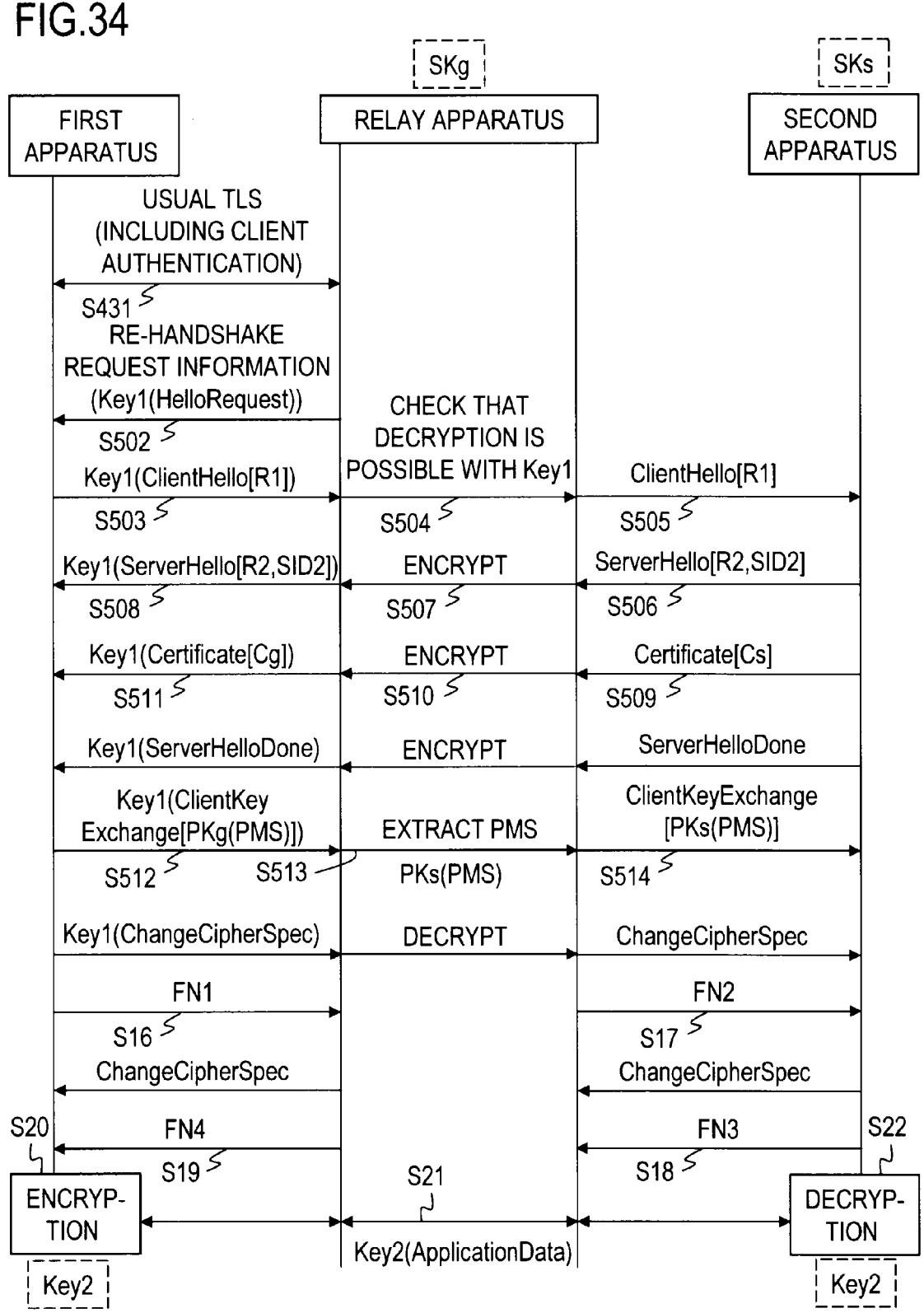
FIG. 34 is a sequence diagram illustrating processing in a tenth embodiment.

FIG. 34 is a sequence diagram illustrating processing in the tenth embodiment. The system structure for executing the processing in this embodiment is the same as in the third embodiment. The following description will be made with reference to the structure described in the third embodiment (FIGS. 17 to 19).

As in the ninth embodiment, a usual TLS connection (including client authentication) is executed between the first apparatus 210 and the relay apparatus 230, by using the secret key SKc, the public key PKc, and the public key certificate Cc of the first apparatus (step S431).

The transmitter 33 of the relay apparatus 230 (FIG. 19) sends re-handshake request information (HelloRequest) to the first apparatus 210 (step S502). The re-handshake request information (HelloRequest) sent in this embodiment has been encrypted in the common key encryption processor 32i of the relay apparatus 230 by using the common key Key1.

The re-handshake request information sent to the first apparatus 210 (FIG. 18) is received by the receiver 14 and decrypted in the common key encryption processor 12i of the first apparatus 210 by using the common key Key1. The decrypted re-handshake request information is sent to the communication processor 12h. After that, the random number generator 12a generates a random number R1 and sends it to the communication processor 12h. The communication processor 12h generates transmission start request information (ClientHello message) that includes the random number R1 and sends it to the common key encryption processor 12i. The common key encryption processor 12i encrypts the transmission start request information (ClientHello message) by using the common key Key1 read from the memory 11 and sends the encrypted information through the communication processor 12h to the transmitter 13. The transmitter 13 sends the encrypted transmission start request information (ClientHello message) to the relay apparatus 230, and the information is received by the receiver 34 of the relay apparatus 230 (step S503).

The communication processor 32h of the relay apparatus 230 reads the common key Key1 from the memory 31 and checks whether the encrypted transmission start request information (ClientHello message) received in step S503 can be decrypted by using the common key Key1 (step S504). This checking is made, for example, on the basis of whether the decrypted result of the encrypted transmission start request information conforms to a predetermined format included in the transmission start request information. When it is checked that the encrypted transmission start request information (ClientHello message) can be decrypted by using the common key Key1, the communication processor 32h sends the transmission start request information (ClientHello message), including the random number R1, to the transmitter 33, which sends it to the second apparatus 20. The transmission start request information (ClientHello message) is received by the receiver 24 of the second apparatus 20 (FIG. 7) (step S505) and sent to the communication processor 22h.

Then, the random number generator 22a of the second apparatus 20 generates a random number R2 and sends it to the communication processor 22h. The communication processor 22h generates a new session identifier SID2 and stores it in the memory 21. The communication processor 22h also generates transmission start response information (ServerHello message) that includes the random number R2 and the session identifier SID2 and sends the information to the transmitter 23. The transmitter 23 sends the transmission start response information (ServerHello message) to the relay apparatus 230, and the information is received by the receiver 34 of the relay apparatus 230 (step S506).

The transmission start response information (ServerHello message) is sent to the common key encryption processor 32i of the relay apparatus 230. The common key encryption processor 32i encrypts the transmission start response information (ServerHello message) by using the common key Key1 read from the memory 31 (step S507). The encrypted transmission start response information (ServerHello message) is sent from the transmitter 33 of the relay apparatus 230 and is received by the receiver 14 of the first apparatus 210. The random number R2 and the session identifier SID2 included in the transmission start response information received by the receiver 14 are stored in the memory 11 of the first apparatus 210 (step S508).

Processing of steps S509 to S514, which are similar to the processing of steps S8, S110, S112, S113, S14 described earlier, and processing of steps S16 to S19 are executed. In the processing from step S509 to a step preceding step S16, when the relay apparatus 230 sends to the first apparatus 210 information sent from the second apparatus 20, the common key encryption processor 32i encrypts the information by using the common key Key1 before the information is sent; and when the relay apparatus 230 sends to the second apparatus 20 information sent from the first apparatus 210, the common key encryption processor 32i decrypts the information by using the common key Key1 before the information is sent.

<Features of Present Embodiment>

In this embodiment, since the first apparatus 210 is connected to the second apparatus 20 after the first apparatus 210 is authenticated by the relay apparatus 230, the second apparatus 20 can be protected from an attack made by an unauthorized apparatus. In this embodiment, since the random numbers R1 and R2 are encrypted and sent in established TLS session after the TLS authentication is made, a high level of security is ensured. Further, in this embodiment, the common key Key1 shared by the TLS connection in step S431 is used in authentication of the first apparatus 210. Unlike usual firewall, in which connection of an apparatus is controlled in accordance with its IP address, connection control in this embodiment can be conducted even when the IP address of the connection source apparatus changes.

In this embodiment, the relay apparatus 230 authenticates the first apparatus 210 by a TLS connection that includes client authentication, but a different authentication scheme may be used. For example, after a usual TLS connection (without client authentication) is made between the first apparatus 210 and the relay apparatus 230, ID-password authentication may be made in an established encryption session, and a connection to the second apparatus 20 may be made by using the TLS re-handshake mode.

Step S19 may be followed by finished message coordination, which has been described in the fifth to eighth embodiments.

Eleventh Embodiment

In a VPN or the like, a first apparatus should sometimes execute connection processing, not using the URL of a relay apparatus but using the URL of a second apparatus. In those cases, usually, the DNS setting must be changed to perform communication through the relay apparatus. In this embodiment, however, the relay apparatus is specified as a proxy of the first apparatus. This allows the first apparatus to execute connection processing by using the URL of the second apparatus, without changing the DNS setting. This structure can be implemented by using a system structure as in the second embodiment, and the first apparatus 110 functions as an HTTP client, and the second apparatus 20 functions as an HTTP server. The following description will be made with reference to the structure (FIGS. 7, 13, and 14) described in the second embodiment. In the example described below, a usual TLS connection (with client authentication) is made between the first apparatus and the relay apparatus, and then a connection to the second apparatus is made by using the TLS re-handshake mode. The connection to the second apparatus may be made not using the TLS re-handshake mode but using the TLS session resume mode as described in the ninth embodiment.

Figure 35:
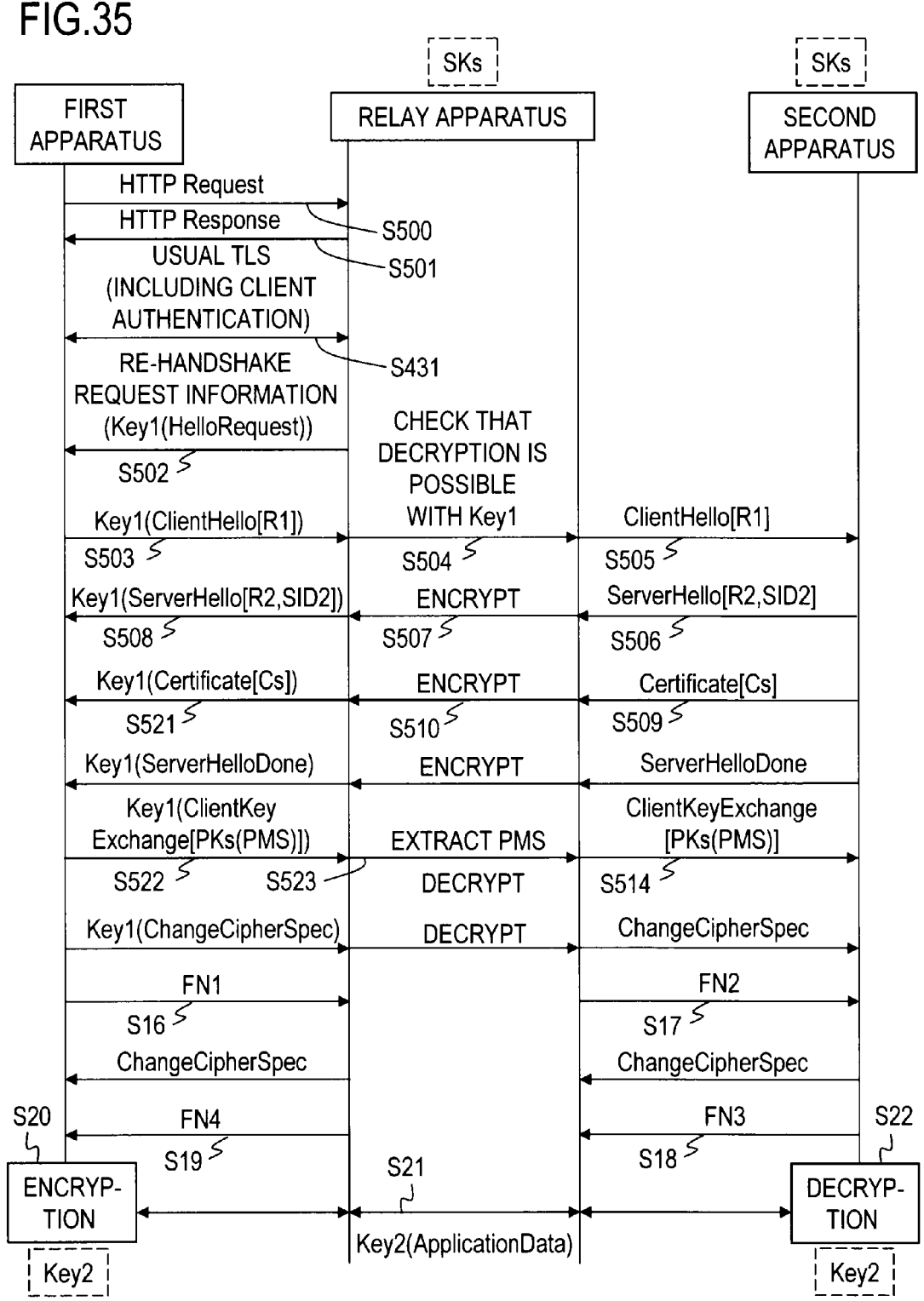
FIG. 35 is a sequence diagram illustrating processing in an eleventh embodiment.

FIG. 35 is a sequence diagram illustrating the processing in the eleventh embodiment.

When the first apparatus 110 starts connection to the URL (server.com) of the second apparatus 20, the transmitter 13 of the first apparatus 110 first sends an HTTP request (CONNECT server.com HTTP/1.0, Host:server.com) to the relay apparatus 130 (step S500). In reply, the transmitter 33 of the relay apparatus 130 sends an HTTP response (HTTP/1.0 200 Connection established) to the first apparatus 110 (step S501).

Then, as in the ninth embodiment, the secret key SKc, the public key PKc, and the public key certificate Cc of the first apparatus are used to execute a normal TLS connection (including client authentication) (step S431). Then, processing similar to that performed in the tenth embodiment will be executed. The processing differs from the processing performed in the tenth embodiment in the following points: In place of step S511 in the tenth embodiment, a Certificate message that includes the public key certificate Cs of the second apparatus is encrypted with Key1 and sent from the relay apparatus 130 to the first apparatus 110 (step S521); in place of step S512, a ClientKeyExchange message that includes PKs(PMS) is encrypted with Key1 and sent from the first apparatus 110 to the relay apparatus 130 (step S522); and in place of step S513, the relay apparatus 130 extracts the secret information PMS from PKs(PMS) and then sends the encrypted ClientKeyExchange message sent from the first apparatus 110, to the second apparatus 20 (step S523).

Twelfth Embodiment

A service style called mashup provides a service by using information that can be obtained from a plurality of servers. The mashup involves such a restriction because of a browser security policy that an object obtained from server B cannot access an object obtained from server A. A system provided to avoid the restriction uses a relay apparatus: The relay apparatus accesses a plurality of servers on behalf of a client, and the client accesses only the relay apparatus, so that it appears as if the client accesses just a single server. When the present invention is applied to the plurality of servers in that system, the speed-up of cryptosystem communication and the session management can be implemented on the plurality of servers.

Figure 36:
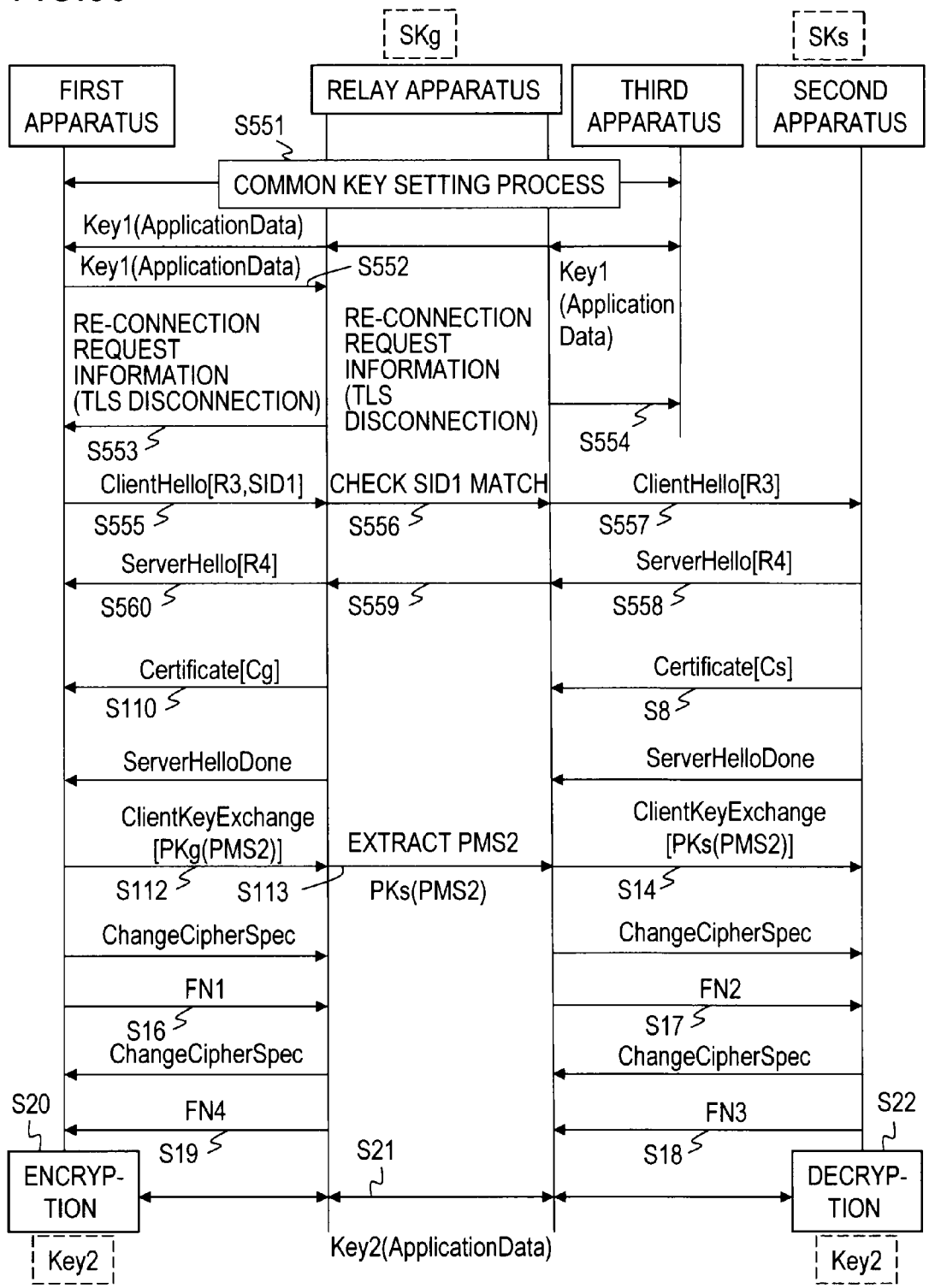
FIG. 36 is a sequence diagram illustrating processing in a twelfth embodiment.

FIG. 36 is a sequence diagram illustrating processing in the twelfth embodiment. The system structure for executing the processing in this embodiment differs from the structure described in the third embodiment (FIGS. 17 to 19) in that a third apparatus is added. The structure of the third apparatus is the same as the second apparatus in any of the embodiments described above. The following description will be made with reference to the structure illustrated in the third embodiment (FIGS. 17 to 19).

The first apparatus 210 (FIG. 18) and the third apparatus execute the common key setting process described in any of the embodiments described above, and the apparatuses share the common key Key1 in common (step S551). Accordingly, the first apparatus 210, the relay apparatus 230 (FIG. 19), and the third apparatus share the common key Key1, and a cryptography session identified by the session identifier SID1 is established. More specifically, the secret information and the master secret key corresponding to the common key Key1 are associated with the session identifier SID1 and stored in the memory of each apparatus.

Then, the first apparatus 210, the relay apparatus 230, and the third apparatus execute cryptosystem communication using the common key Key1. In that process, if encrypted text (Key1(ApplicationData)) that requires the connection destination to be changed is sent to the relay apparatus 230 (step S552), the transmitter 33 of the relay apparatus 230 (FIG. 19) sends re-connection request information (TLS disconnection, SSL CloseNotify) to the first apparatus 210 (step S553). The re-connection request information is usually sent after it is encrypted in the common key encryption processor 32i of the relay apparatus 230 by using the common key Key1. The transmitter 33 sends disconnection request information (TLS disconnection, SSL Close/Notify) to the third apparatus (step S554).

If the first apparatus 210 receives encrypted re-connection request information, the common key encryption processor 12i of the first apparatus 210 decrypts the information by using the common key Key1. Then, the random number generator 12a of the first apparatus 210 generates a random number R3 and sends it to the communication processor 12h. The communication processor 12h reads the session identifier SID1 from the memory 11, generates transmission start request information (ClientHello message) that includes the random number R3 and the session identifier SID1, and sends it to the transmitter 13. The transmitter 13 sends the transmission start request information (ClientHello message) to the relay apparatus 230, and the receiver 34 of the relay apparatus 230 receives the information (step S555).

The communication processor 32h of the relay apparatus 230 reads the session identifier SID1 from the memory 31 and checks whether the session identifier SID1 received in step S555 agrees with the session identifier SID1 stored in the memory 31 in step S551 (step S556). Only when it is judged that the identifiers are the same, the communication processor 32h sends the transmission start request information (ClientHello message), including the random number R3, to the transmitter 33, which sends the information to the second apparatus 20. The transmission start request information (ClientHello message) is received by the receiver 24 of the second apparatus 20 (FIG. 7) (step S557) and is sent to the communication processor 22h.

After that, the random number generator 22a of the second apparatus 20 generates a random number R4 and sends it to the communication processor 22h. The communication processor 22h generates a new session identifier SID2 and stores it in the memory 21, and also generates transmission start response information (ServerHello message) that includes the random number R4 and the session identifier SID2, and sends it to the transmitter 23. The transmitter 23 sends the transmission start response information (ServerHello message) to the relay apparatus 230, and the information is received by the receiver 34 of the relay apparatus 230 (step S558).

The transmission start response information (ServerHello message) is further sent from the transmitter 33 of the relay apparatus 230 and received by the receiver 14 of the first apparatus 210 (step S559). The random number R4 and the session identifier SID2 included in the transmission start response information received by the receiver 14 are stored in the memory 11 of the first apparatus 210 (step S560).

After that, processing of steps S8, S110, S112, S113, S14, S16 to S19 described earlier is executed.

<Features of Present Embodiment>

This embodiment enables high-speed cryptosystem communication between the first apparatus and the plurality of apparatuses through the relay apparatus. For that purpose, the apparatuses except for the relay apparatus only need a standard protocol, and do not need other special function.

In this embodiment, the second apparatus may be connected after the relay apparatus authenticates the first apparatus as in the tenth embodiment. The finished message coordination described in the fifth to eighth embodiments may be executed after step S19.

An example of connecting the second apparatus by using the session resume mode has been described in this embodiment. The connection to the second apparatus may also be made by using the TLS re-handshake mode.

Thirteenth Embodiment

One TLS extension method is RFC 5077 "Transport Layer Security (TLS) Session Resumption without Server-Side State (see http://www.rfc-editor.org/rfc/rfc5077.txt, for example). In this method, the server apparatus sends to the client apparatus a ticket including TLS session information with the client apparatus, and the client apparatus re-sends the ticket to the server apparatus to re-connect to the server apparatus. This method (Ticket-TLS) eliminates the need for storing in the server apparatus the TLS session information, which is required when the client apparatus re-connects to the server apparatus. In the thirteenth embodiment, the present invention is applied to this method. Differences from the embodiments described earlier will be described mainly, and a description of items in common with the embodiments will be omitted.

<Structure>

[Overall Structure]

Figure 37:
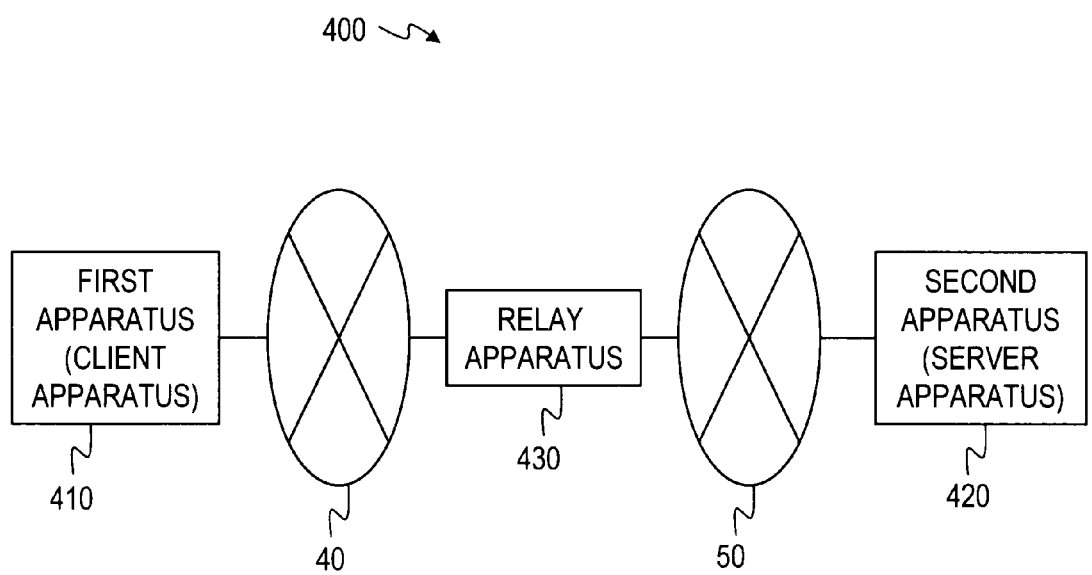
FIG. 37 is a block diagram illustrating the overall structure of a common key cryptosystem communication system according to a thirteenth embodiment.

FIG. 37 is a block diagram illustrating the overall structure of a common key cryptosystem communication system 400 of the thirteenth embodiment. As illustrated in FIG. 13, a common key cryptosystem communication system 400 in this embodiment includes a first apparatus 410 (a client apparatus, for example), a second apparatus 420 (a server apparatus, for example), and a relay apparatus 430 (a gateway apparatus, for example). The first apparatus 410 and the relay apparatus 430 are connected through a network 40 to allow communication between them, and the second apparatus 420 and the relay apparatus 430 are connected through a network 50 to allow communication between them.

The first apparatus 410 and the second apparatus 420 are apparatuses that perform predetermined processing in accordance with a protocol (RFC 5077 in this embodiment), including authentication between two apparatuses, sharing of a common key between the two apparatuses using a cryptography technology, and processing for checking the validity of a common key setting process by using secret information for identifying the common key and communication log information between the two apparatuses. The relay apparatus 430 is an apparatus for performing new unique processing in this embodiment. To simplify the description, in FIG. 37, one first apparatus 410 and one second apparatus 420 are connected to the relay apparatus 430 to allow communication between them. However, two or more first apparatuses 410 and second apparatuses 420 may be connected to the relay apparatus 430 to allow communication between them. The structure may also include a plurality of relay apparatuses 430.

[First Apparatus]

The first apparatus 410 in this embodiment is implemented by a well-known computer that includes a CPU, a RAM, a ROM, a communication device, and the like when a predetermined program is read into the computer and executed by the CPU.

Figure 38:
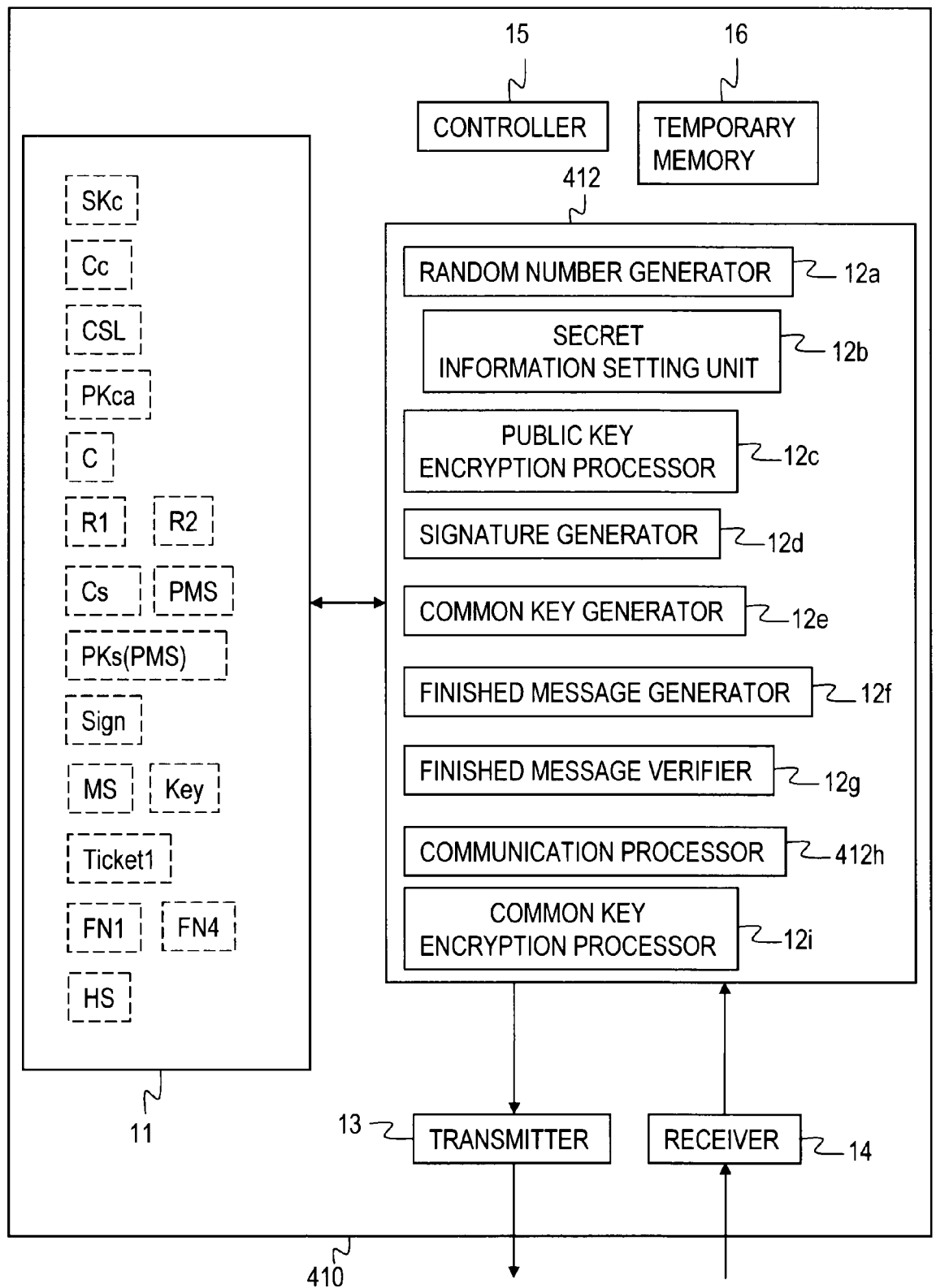
FIG. 38 is a block diagram illustrating the functional structure of a first apparatus in the thirteenth embodiment.

FIG. 38 is a block diagram illustrating the functional structure of the first apparatus 410 in the thirteenth embodiment. In FIG. 38, elements identical to those in the first embodiment are indicated by the same reference characters as in FIG. 6, and a description of those elements will be omitted. The first apparatus 410 includes a memory 11, a calculator 412, a transmitter 13, a receiver 14, a controller 15, and a temporary memory 16. The calculator 412 includes a random number generator 12a, a secret information setting unit 12b, a public key encryption processor 12c, a signature generator 12d, a common key generator 12e, a finished message generator 12f, a finished message verifier 12g, a communication processor 412h, and a common key encryption processor 12i.

[Second Apparatus]

The second apparatus 420 in this embodiment is implemented by a well-known computer that includes a CPU, a RAM, a ROM, a communication device, and the like when a predetermined program is read into the computer and executed by the CPU.

Figure 39:
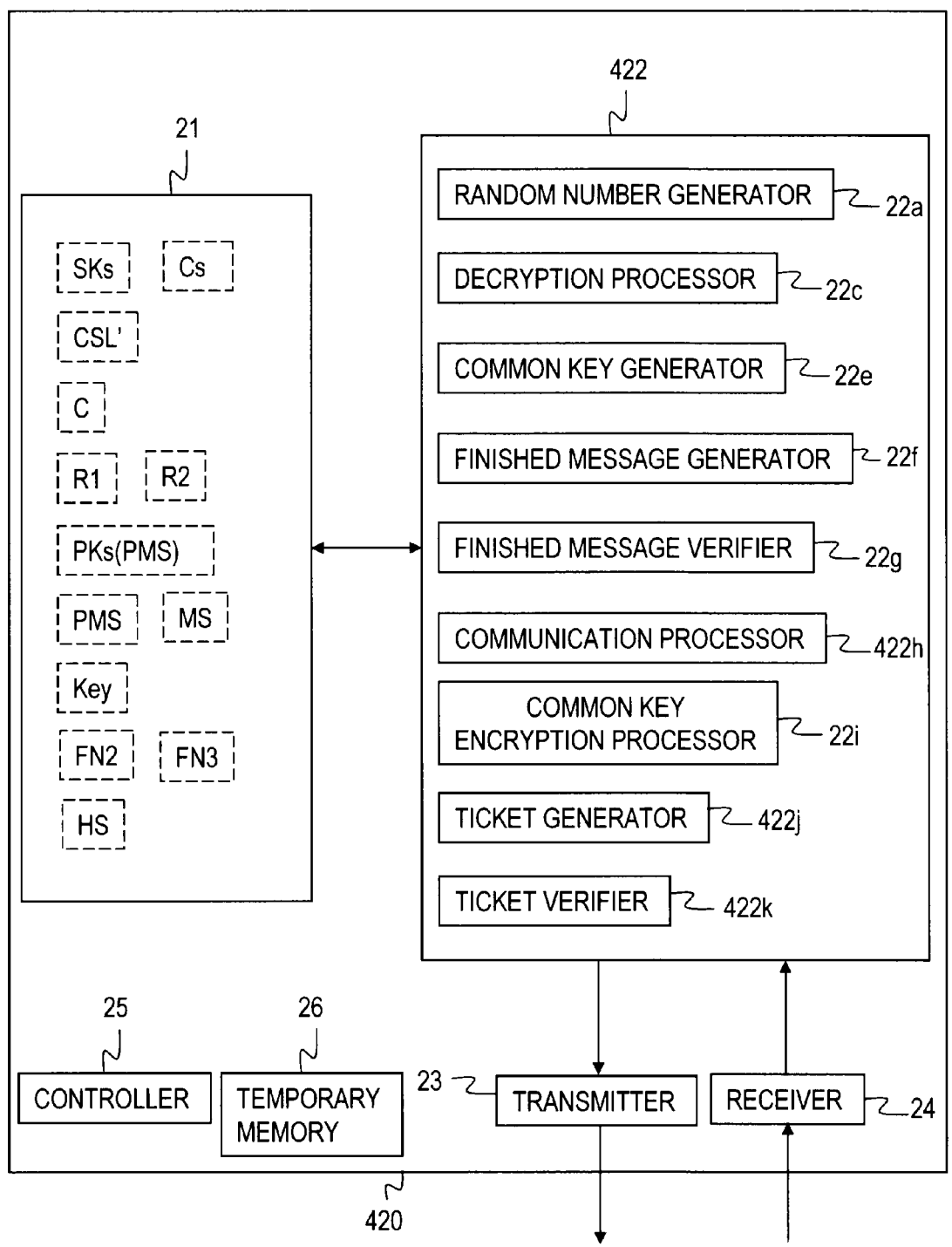
FIG. 39 is a block diagram illustrating the functional structure of a second apparatus in the thirteenth embodiment.

FIG. 39 is a block diagram illustrating the functional structure of the second apparatus 420 in the thirteenth embodiment. In FIG. 39, elements identical to those in the first embodiment are indicated by the same reference characters as in FIG. 7, and a description of those elements will be omitted.

As shown in FIG. 39, the second apparatus 420 in this embodiment includes a memory 21, a calculator 422, a transmitter 23, a receiver 24, a controller 25, and a temporary memory 26. The calculator 422 includes a random number generator 22a, a decryption processor 22c, a common key generator 22e, a finished message generator 22f, a finished message verifier 22g, a communication processor 422h, a common key encryption processor 22i, a ticket generator 422j, and a ticket verifier 422k.

[Relay Apparatus]

The relay apparatus 430 in this embodiment is implemented by a well-known computer that includes a CPU, a RAM, a ROM, a communication device, and the like when a predetermined program is read into the computer and executed by the CPU.

Figure 40:
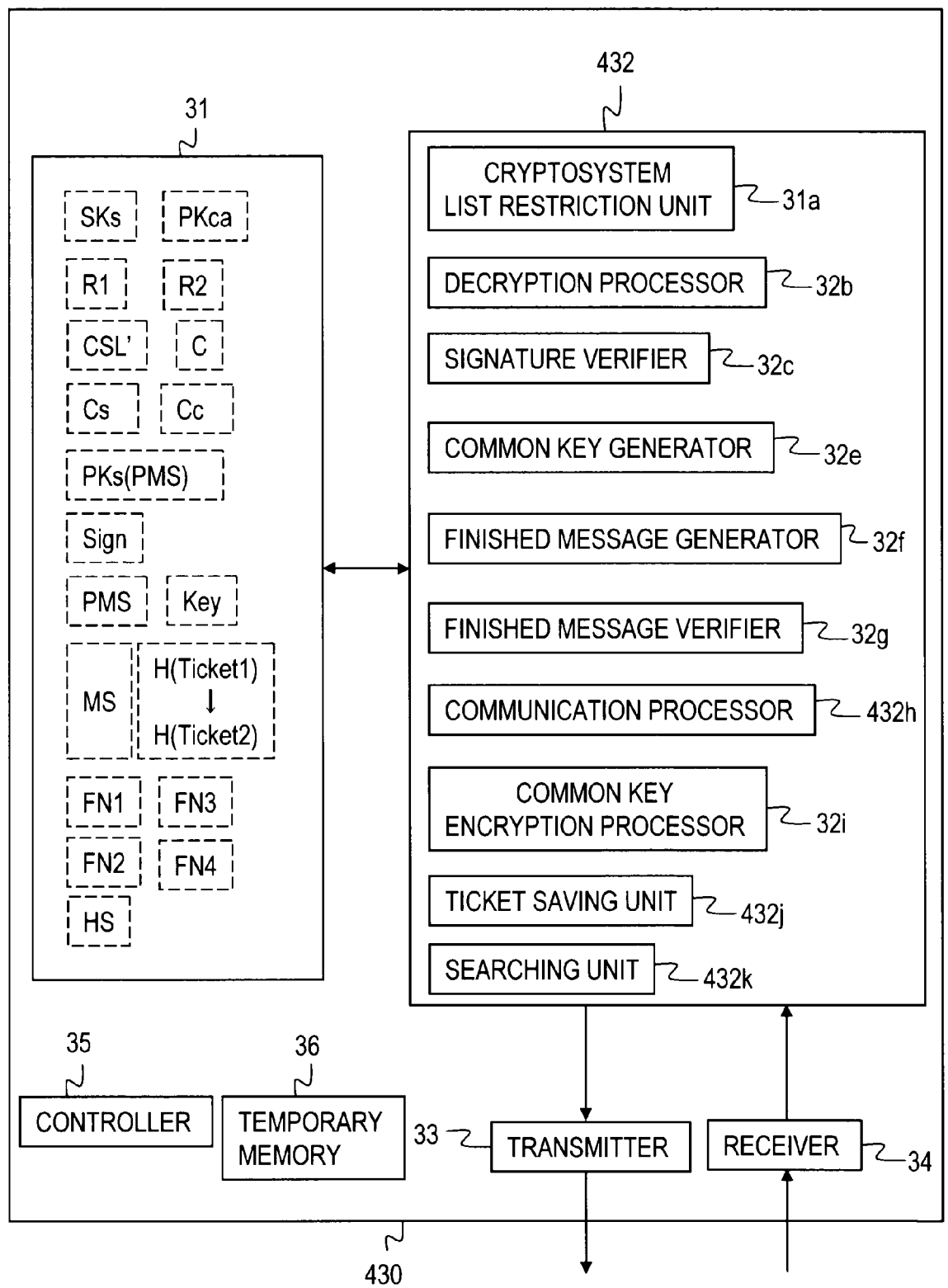
FIG. 40 is a block diagram illustrating the functional structure of a relay apparatus in the thirteenth embodiment.

FIG. 40 is a block diagram illustrating the functional structure of the relay apparatus 430 in the thirteenth embodiment. In FIG. 40, elements identical to those in the first embodiment are indicated by the same reference characters as in FIG. 8, and a description of those elements will be omitted.

As illustrated in FIG. 40, the relay apparatus 430 in this embodiment includes a memory 31, a calculator 432, a transmitter 33, a receiver 34, a controller 35, and a temporary memory 36. The calculator 432 includes a cryptosystem list restriction unit 31a, a decryption processor 32b, a signature verifier 32c, a common key generator 32e, a finished message generator 32f, a finished message verifier 32g, a communication processor 432h, a common key encryption processor 32i, a ticket saving unit 432j, and a searching unit 432k.

[Data Structure]

Example messages used in Ticket-TLS will be described next.

Figure 41A:
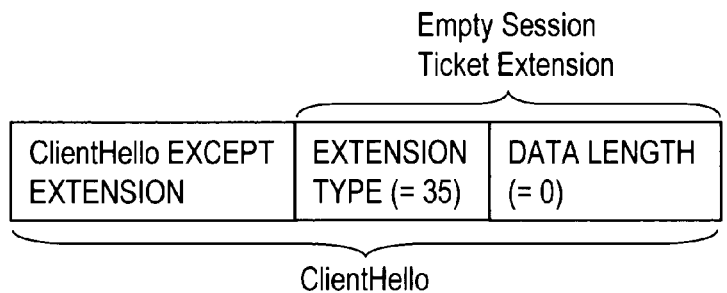
FIG. 41A is a diagram illustrating the data structure of a ClientHello message that includes Empty Session Ticket Extension.
Figure 41B:
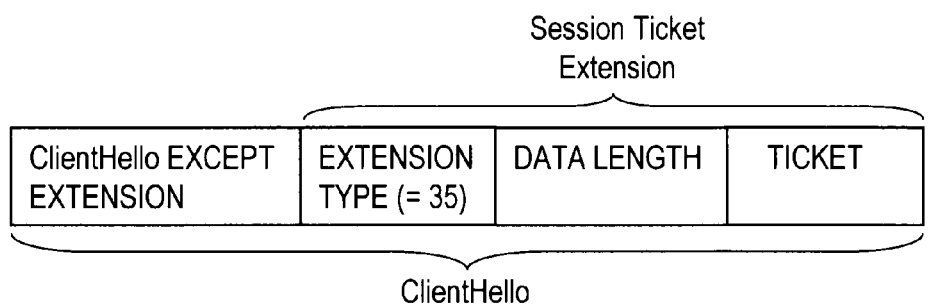
FIG. 41B is a diagram illustrating the data structure of a ClientHello message that includes Session Ticket Extension.
Figure 41C:
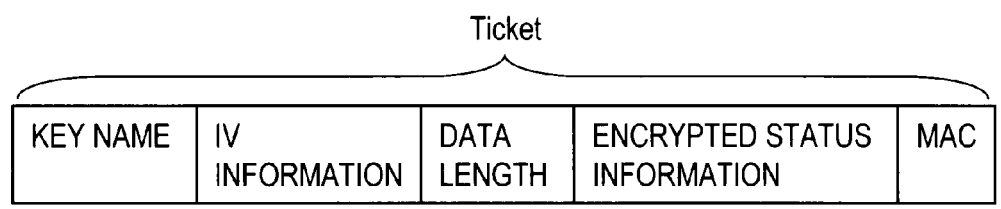
FIG. 41C is a diagram illustrating the data structure of a Ticket.
Figure 41D:
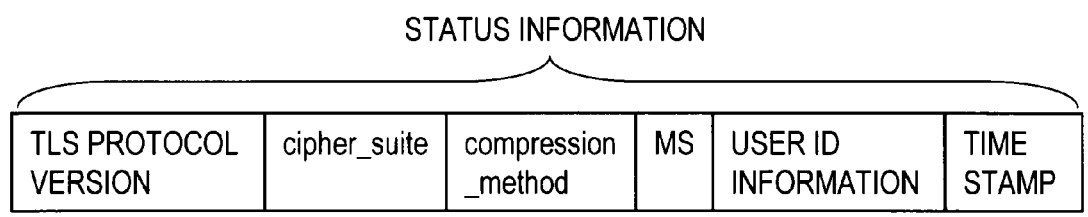
FIG. 41D is a diagram illustrating the data structure of status information shown in FIG. 41C.

FIG. 41A is a diagram illustrating the data structure of a ClientHello message that includes an empty session ticket extension. FIG. 41B is a diagram illustrating the data structure of a ClientHello message that includes a session ticket extension. FIG. 41C is a diagram illustrating the data structure of a ticket, and FIG. 41D is a diagram illustrating the data structure of status information illustrated in FIG. 41C.

The ClientHello message illustrated in FIG. 41A has a ClientHello region except for extension and an empty session ticket extension region. The empty session ticket extension region has a region indicating the extension type ("35" in the empty session ticket extension) and a region indicating the data length of the ticket ("0" in the empty session ticket extension).

The ClientHello message illustrated in FIG. 41B has a ClientHello region except for extension and a session ticket extension region. The session ticket extension region has a region indicating the extension type ("35" in the session ticket extension), a region indicating the data length of the ticket, and a ticket region.

As illustrated in FIG. 41C, the ticket given as an example has a region indicating a key name which identifies the encryption key, a region indicating initialization vector (IV) information for encryption, a region indicating the data length, a region of encrypted status information, and a message authentication code (MAC) region. The encrypted status information is formed by encrypting status information in the 128-bit-key AES (advanced encryption standard) CBC mode, using the IV information and the encryption key identified by the key name. The MAC is generated by using the HMAC-SHA-256 algorithm on the key name, the IV information, the data length, and the encrypted status information. As illustrated in FIG. 41D, the status information in this example has a region indicating the version of the TLS protocol, a cipher_suite region, a compression_method region indicating the data compression method, a region of the master secret key MS, a user ID information region, and a time stamp region. The user ID information includes an information item indicating the user authentication type and an information item used for user authentication.

FIGS. 41A to 41D show the data structures of ClientHello messages that includes an empty session ticket extension or a session ticket extension. ServerHello messages that includes an empty session ticket extension or a session ticket extension have similar data structures. Both the ClientHello messages and the ServerHello messages may include, in addition to a Ticket-TLS extension, a plurality of groups of the extension type region, the data length region, and the data region of a different TLS extension. Those TLS extensions include extensions included in RFC 4366 Transport Layer Security (TLS) extensions, for example.

<Processing>

The processing in the embodiment will be described next.

[Prerequisites]

The prerequisites are the same as in the first embodiment.

[Overall Processing of Initial Connection]

FIG. 42 is a sequence diagram illustrating the overall processing of initial connection in the thirteenth embodiment.

The following description will be made with reference to the diagram.

As in the first embodiment, the secret key SKs of the second apparatus 420 (FIG. 39) is stored in the memory 31 of the relay apparatus 430 (secret key sharing process, step S1). The random number generator 12*a* of the first apparatus 410 (FIG. 38) generates a random number R1 (first random number) (first random number generating process) and stores it in the memory 11. The communication processor 412*h* reads the random number R1 (first random number) and the cryptosystem list CSL from the memory 11, generates information (ClientHello message in FIG. 41A) that includes them and an empty session ticket extension (ESTE), and sends the information to the transmitter 13. The transmitter 13 sends this ClientHello message through the network 40 to the relay apparatus 430 (first random number sending process, step S602).

The ClientHello message is received by the receiver 34 of the relay apparatus 430 (FIG. 40), the processing of step S3 in the first embodiment is executed, and the transmitter 33 sends a ClientHello message that includes the random number R1, a new cryptosystem list CSL', and the ESTE through the network 50 to the second apparatus 420 (second random number sending process, step S604).

The ClientHello message, including the random number R1 and the new cryptosystem list CSL', is received by the receiver 24 of the second apparatus 420 (FIG. 39) and is sent to the communication processor 422*h*. The communication processor 422*h* stores the random number R1 and the new cryptosystem list CSL' included in the ClientHello message in the memory 21. The random number generator 22*a* of the second apparatus 420 generates a random number R2 (second random number) (second random number generating process) and stores it in the memory 21. The communication processor 422*h* selects one cryptosystem C the secret key SKs of which is stored in the memory 21 from the cryptosystem list CSL' stored in the memory 21 and stores the selected cryptosystem C in the memory 21. The communication processor 422*h* further reads the selected cryptosystem C and the random number R2 from the memory 21, generates information (ServerHello message) that includes them and the ESTE, and sends the information to the transmitter 23. The transmitter 23 sends the ServerHello message through the network 50 to the relay apparatus 430 (third random number sending process, step S605).

The ServerHello message is received by the receiver 34 of the relay apparatus 430 (FIG. 40), the processing of step S6 in the first embodiment is executed, and the transmitter 33 sends the ServerHello message through the network 40 to the first apparatus 410 (fourth random number sending process, step S607). The ServerHello message is received by the receiver 14 of the first apparatus 410 (FIG. 38) and is sent to the communication processor 412*h*. The communication processor 412*h* stores the random number R2 (second random number) and the cryptosystem C included in the ServerHello message in the memory 11.

The processing of steps S8 to S17 in the first embodiment is next executed. If the verification of the second finished message FN2 in step S17 is finished successfully, the ticket generator 422*j* of the second apparatus 420 reads the cryptosystem C (corresponding to cipher_suite), the master secret key MS, and the like from the memory 21 and generates Ticket1 as illustrated in FIG. 41C. Ticket1 is sent to the communication processor 422*h*, and the communication processor 422*h* generates a NewSessionTicket message that includes Ticket1 and sends the NewSessionTicket message to the transmitter 23. The transmitter 23 sends the NewSessionTicket message through the network 50 to the relay apparatus 430 (step S617).

The NewSessionTicket message is received by the receiver 34 of the relay apparatus 430 (FIG. 40) and is sent to the ticket saving unit 432*j*. The ticket saving unit 432*j* stores in the memory 31 Ticket1 included in the NewSessionTicket message or information determined uniquely by Ticket1 in association with the master secret key MS generated by using the secret information PMS and stored in the memory 31 (step S618). An example of information determined uniquely by Ticket1 is a hash value H(Ticket1) of Ticket1. Then, the NewSessionTicket message is sent to the transmitter 33. The transmitter 33 sends the NewSessionTicket message that includes Ticket1 through the network 40 to the first apparatus 410 (step S619).

The NewSessionTicket message is received by the receiver 14 of the first apparatus 410 (FIG. 38) and is sent to the communication processor 412*h*. The communication processor 412*h* extracts Ticket1 from the NewSessionTicket message and stores it in the memory 11.

Then, the ChangeCipherSpec message is sent from the second apparatus 420 through the relay apparatus 430 to the first apparatus 410, and processing similar to that of steps S18 and S19 in the first embodiment is performed. The processing here differs from the processing in the first embodiment in that the communication log information HS3 or the communication log information HS4 that is used to generate the third finished message FN3 or the fourth finished message FN4 includes the NewSessionTicket message. Then, the processing of steps S20 to S22 in the first embodiment is executed.

[Initial Connection in Relay Apparatus]

Figure 43:
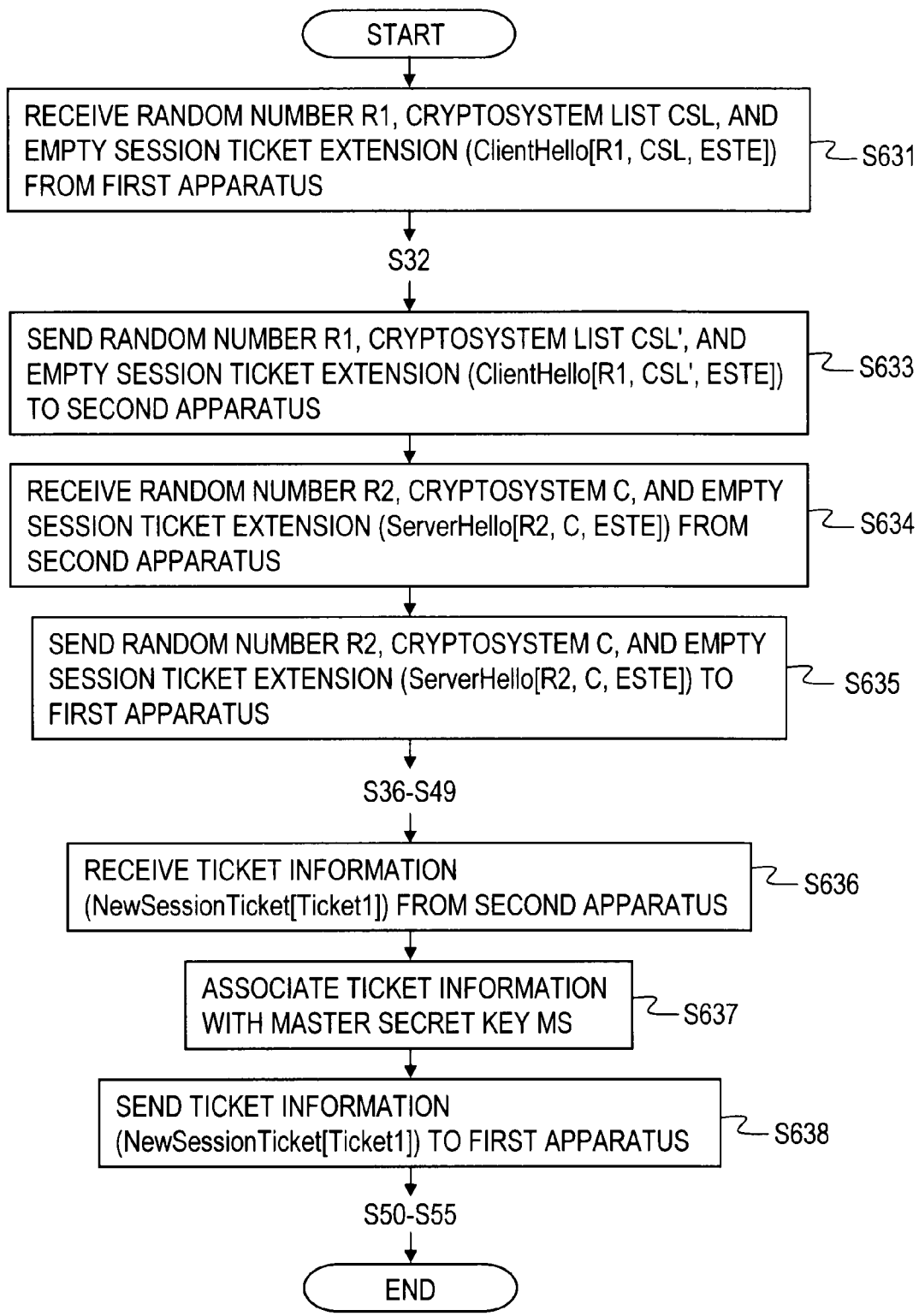
FIG. 43 is a flowchart illustrating initial connection processing in the relay apparatus in the thirteenth embodiment.

FIG. 43 is a flowchart illustrating the initial connection of the relay apparatus 430 in the thirteenth embodiment.

The processing in the relay apparatus 430 will be described with reference to the flowchart. As a prerequisite of the processing, the secret key SKs of the second apparatus 420 is stored in the memory 31 of the relay apparatus 430.

The receiver 34 of the relay apparatus 430 receives information (ClientHello message) that includes the random number R1 (first random number), the cryptosystem list CSL, and ESTE, sent from the first apparatus 410, and the information is sent to the communication processor 432h (step S631). The communication processor 432h stores the random number R1 (first random number) included in the ClientHello message in the memory 31 and sends the cryptosystem list CSL to the cryptosystem list restriction unit 31a. Then, the processing of step S32 in the first embodiment is executed. The communication processor 432h next reads the random number R1 and the new cryptosystem list CSL' from the memory 31, generates information (ClientHello message) that includes them and ESTE, and sends the information to the transmitter 33. The transmitter 33 sends the ClientHello message through the network 50 to the second apparatus 420 (second random number sending process, step S633).

The receiver 34 of the relay apparatus 430 then receives information (ServerHello message) that includes the cryptosystem C, the random number R2, and ESTE, sent from the second apparatus 420, and sends the information to the communication processor 432h (step S634). The communication processor 432h stores the random number R2 (second random number) and the cryptosystem C included in the ServerHello message in the memory 31 and sends the ServerHello message to the transmitter 33. The transmitter 33 sends the ServerHello message through the network 40 to the first apparatus 410 (fourth random number sending process, step S635).

The processing of steps S36 to S49 in the first embodiment is executed, then the receiver 34 receives the NewSessionTicket message sent from the second apparatus 420 and sends it to the ticket saving unit 432j (step S636). The ticket saving unit 432j stores in the memory 31 Ticket1 included in the NewSessionTicket message or information corresponding to Ticket1 in association with the master secret key MS generated by using the secret information PMS and stored in the memory 31 (step S637). Then, the NewSessionTicket message is sent to the transmitter 33. The transmitter 33 sends the NewSessionTicket message through the network 40 to the first apparatus 410 (step S638).

Then, processing similar to that of steps S50 to S55 in the first embodiment is performed. The processing here differs from the processing in the first embodiment in that the communication log information HS3 or communication log information HS4 used to generate the third finished message FN3 or fourth finished message FN4 includes the NewSessionTicket message.

[Overall Processing of Finished Message Coordination (Re-Connection)]

Figure 44:
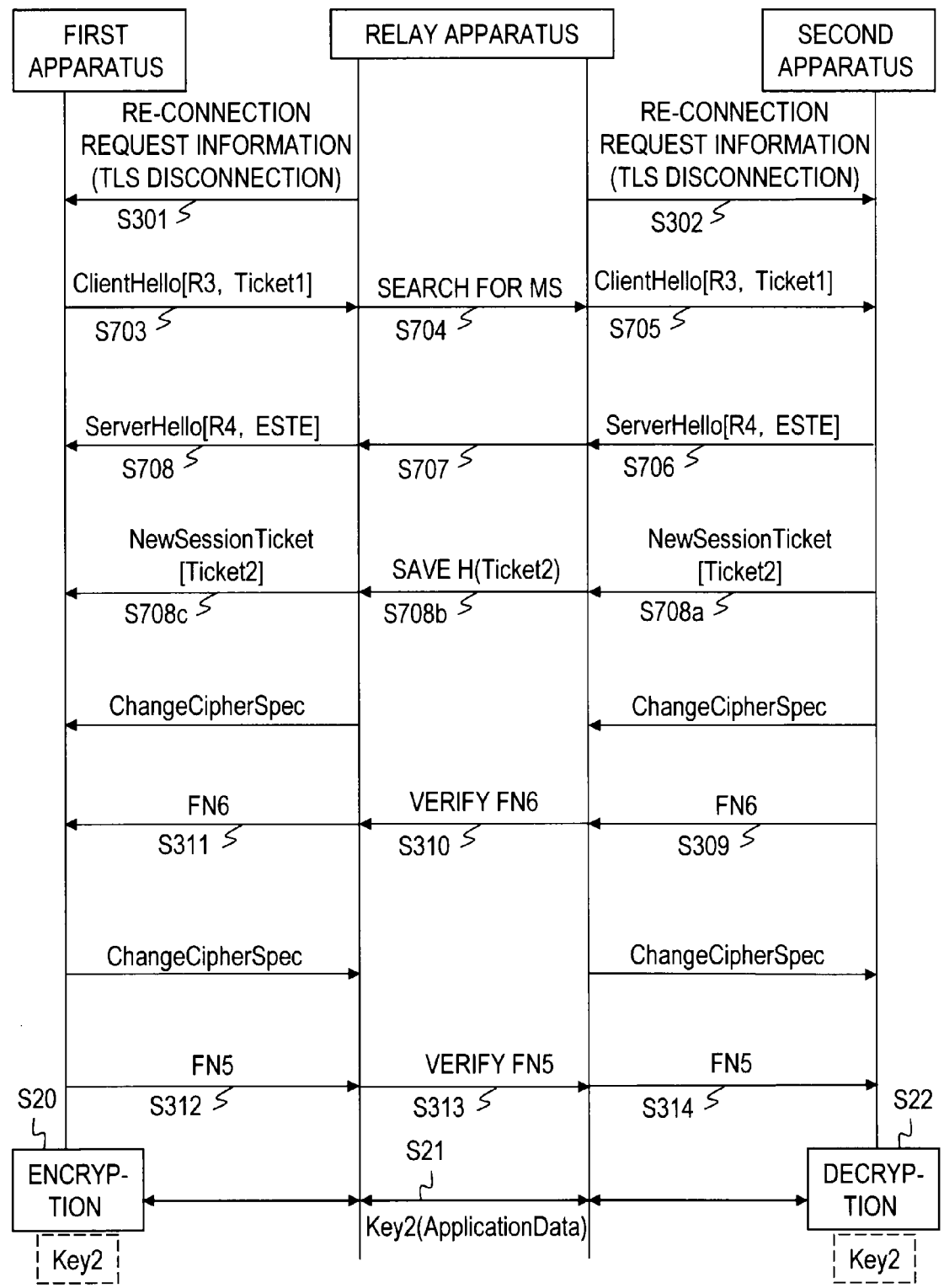
FIG. 44 is a sequence diagram illustrating finished message coordination in the thirteenth embodiment.

FIG. 44 is a sequence diagram illustrating finished message coordination in the thirteenth embodiment.

After the initial connection described above, the transmitter 33 of the relay apparatus 430 (FIG. 40) sends re-connection request information (TLS disconnection, SSL CloseNotify) to the first apparatus 410 (step S301). The transmitter 33 of the relay apparatus 430 sends re-connection request information (TLS disconnection, SSL CloseNotify) to the second apparatus 420 as well (step S302). This processing is the same as in the sixth embodiment.

The re-connection request information sent to the first apparatus 410 is received by the receiver 14 and is sent to the communication processor 412h. After that, the random number generator 12a generates a random number R3 and sends it to the communication processor 412h. The communication processor 412h reads Ticket1 from the memory 11, generates transmission start request information (ClientHello message in FIG. 41B) that includes the random number R3 and Ticket1, and sends the information to the transmitter 13. The transmitter 13 sends the transmission start request information (ClientHello message) to the relay apparatus 430. The information is received by the receiver 34 of the relay apparatus 430 and is stored in the memory 31 (step S703).

Ticket1 in the ClientHello message is sent to the searching unit 432k. The searching unit 432k searches the memory 31 for the master secret key MS associated with Ticket1 or information determined uniquely by Ticket1 to extract the master secret key MS (step S704). If the hash value H(Ticket1) and the master secret key MS are stored in the memory 31 in association with each other in step S618, for example, the searching unit 432k generates the hash value H(Ticket1) of Ticket1 and searches the memory 31 for the master secret key MS associated with the generated hash value H(Ticket1) to extract the master secret key MS.

Only when the master secret key MS is found, the transmission start request information (ClientHello message) is sent from the transmitter 33 of the relay apparatus 430. The transmission start request information (ClientHello message) is received by the receiver 24 of the second apparatus 420 (step S705) and is stored in the memory 21, and Ticket1 included in the information is sent to the ticket verifier 422k. The ticket verifier 422k verifies MAC (FIG. 41C) included in Ticket1 and, only when the verification is finished successfully, obtains the master secret key MS from Ticket1 by decryption and stores it in the memory 21. In that case, the ticket generator 422j may further read the cryptosystem C (corresponding to cipher_suite), the master secret key MS, and the like from the memory 21, generate Ticket2 as illustrated in FIG. 41C, and store it in the memory 21.

The random number generator 22a next generates a random number R4 and sends it to the communication processor 422h. If Ticket2 has been generated, the communication processor 422h generates transmission start response information (ServerHello message) that includes the random number R4 and ESTE and sends the information to the transmitter 23. If Ticket2 has not been generated, ESTE is not included in the transmission start response information (ServerHello message). The transmitter 23 sends the transmission start response information (ServerHello message) to the relay apparatus 430, and the information is received by the receiver 34 of the relay apparatus 430 and is stored in the memory 31 (step S706). The transmission start response information (ServerHello message) is sent from the transmitter 33 of the relay apparatus 430 (step S707), is received by the receiver 14 of the first apparatus 410, and is stored in the memory 11 (step S708).

If Ticket2 has been generated in the second apparatus 420, the communication processor 422h of the second apparatus 420 reads Ticket2 from the memory 21. The communication processor 422h generates a NewSessionTicket message that includes Ticket2 and sends the NewSessionTicket message to the transmitter 23. The transmitter 23 sends the NewSessionTicket message through the network 50 to the relay apparatus 430 (step S708a).

The NewSessionTicket message is received by the receiver 34 of the relay apparatus 430 and sent to the ticket saving unit 432j. As in step S618, the ticket saving unit 432j stores in the memory 31 Ticket2 included in the NewSessionTicket message or information determined uniquely by Ticket2 (such as the hash value H(Ticket2) of Ticket2) in association with the master secret key MS stored in the memory 31 (step S708b). Accordingly, the association between the master secret key MS and Ticket is updated.

The NewSessionTicket message is sent to the transmitter 33. The transmitter 33 sends the NewSessionTicket message through the network 40 to the first apparatus 410 (step S708c). This NewSessionTicket message is received by the receiver 14 of the first apparatus 410 and is sent to the communication processor 412h. The communication processor 412h extracts Ticket2 from the NewSessionTicket message and stores it in the memory 11.

The common key generators 12e, 22e, and 32e of the apparatuses read the master secret key MS and the random numbers R3 and R4 from the corresponding memories 11, 21, and 31, generate a common key Key2 as described earlier, and store it in the memories 11, 21, and 31. Then, the ChangeCipherSpec message is sent from the second apparatus 420 to the first apparatus 410 through the relay apparatus 430. When TLS or the like is used, after the message is sent, information is usually encrypted in the corresponding common key encryption processor by using the common key Key2, is sent from the second apparatus 420 to the first apparatus 410 through the relay apparatus 430, and is decrypted in the common key encryption processor when necessary. Then, processing similar to that of steps S309 to S314 in the sixth embodiment is executed. If Ticket2 has been generated, the processing here differs from the processing in the sixth embodiment in that the communication log information HS5 or communication log information HS6 used to generate a fifth finished message FN5 or a sixth finished message FN6 includes the NewSessionTicket message. When TLS or the like is used, after the ChangeCipherSpec message is sent from the first apparatus 410 through the relay apparatus 430 to the second apparatus 420, information is usually encrypted in the corresponding common key encryption processor by using the common key Key2, is sent from the first apparatus 410 through the relay apparatus 430 to the second apparatus 420, and is decrypted in the common key encryption processor when necessary. Then, cryptosystem communication using the common key Key2 becomes possible among the first apparatus 410, the second apparatus 420, and the relay apparatus 430.

[Finished Message Coordination (Re-Connection) in Relay Apparatus]

Figure 45:
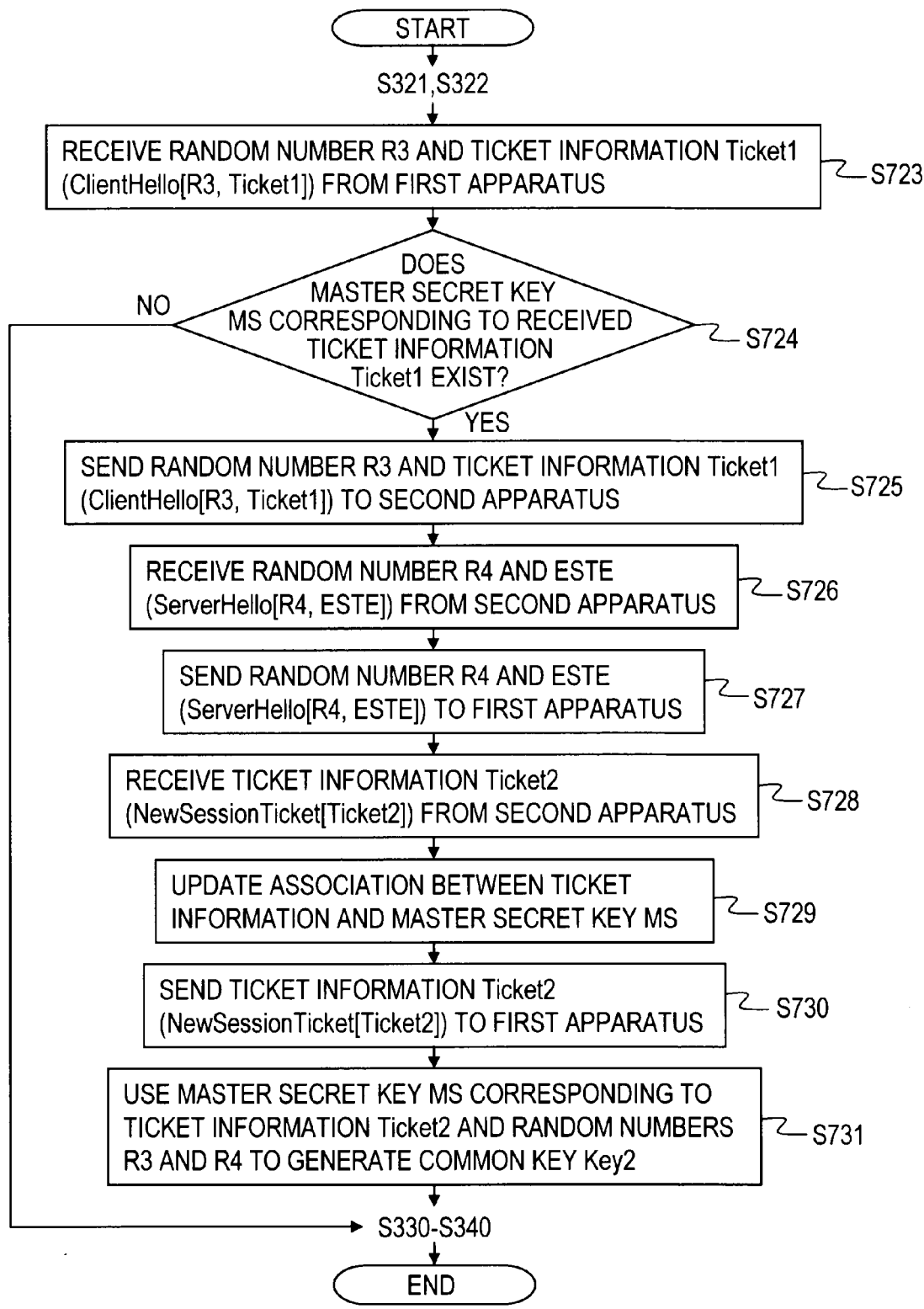
FIG. 45 is a flowchart illustrating processing in the relay apparatus in the thirteenth embodiment.

FIG. 45 is a flowchart illustrating processing of the relay apparatus 430 in the thirteenth embodiment. The processing in the relay apparatus 430 will be described next.

The processing of steps S321 and S322 in the sixth embodiment is executed. Then, transmission start request information (ClientHello message) that includes the random number R3 and Ticket1, sent from the first apparatus 410, is received by the receiver 34 of the relay apparatus 430 and is stored in the memory 31 (step S723).

Ticket1 in the ClientHello message is sent to the searching unit 432k. The searching unit 432k searches the memory 31 for the master secret key MS associated with Ticket1 or information determined uniquely by Ticket1 (step S724). If no associated master secret key MS is found, the processing is terminated due to the error (step S340). If an associated master secret key MS is found, the transmission start request information (ClientHello message) is sent from the transmitter 33 of the relay apparatus 430 to the second apparatus 420 (step S725).

Then, the transmission start response information (ServerHello message) that includes the random number R4 and ESTE, sent from the second apparatus 420, is received by the receiver 34 of the relay apparatus 430 and is stored in the memory 31 (step S726). If Ticket2 has not been generated, the transmission start response information (ServerHello message) does not include ESTE. The transmitter 33 of the relay apparatus 430 sends the transmission start response information (ServerHello message) to the first apparatus 410 (step S727).

If Ticket2 has been generated in the second apparatus 420, the receiver 34 of the relay apparatus 430 receives the NewSessionTicket message that includes Ticket2, sent from the second apparatus 420 (step S728). The ticket saving unit 432j then stores in the memory 31 Ticket2 included in the NewSessionTicket message or information determined uniquely by Ticket2 (such as the hash value H(Ticket2) of Ticket2) in association with the master secret key MS stored in the memory 31 (step S729). Accordingly, the association between the master secret key MS and Ticket is updated. Then, this NewSessionTicket message is sent to the transmitter 33. The transmitter 33 sends the NewSessionTicket message through the network 40 to the first apparatus 410 (step S730).

The common key generator 32e reads the master secret key MS associated with Ticket and the random numbers R3 and R4 stored in the memory 31, generates a common key Key2 as described earlier, and stores it in the memory 31 (step S731). Then, processing similar to that of steps S330 to S340 in the sixth embodiment is executed. If Ticket2 has been generated, the processing here differs from the processing in the sixth embodiment in that the communication log information HS5 or communication log information HS6 used to generate a fifth finished message FN5 or a sixth finished message FN6 includes the NewSessionTicket message.

Modification of Thirteenth Embodiment

As in the first or second embodiment, the secret key SKs of the second apparatus 420 is stored in the relay apparatus 430, in the thirteenth embodiment described above. The secret key SKg of the relay apparatus 430 may be stored in the relay apparatus 430 as in the third or fourth embodiment, and steps S110, S112, and S113 of the third or fourth embodiment may be executed instead of steps S10, S12, and S13.

In the thirteenth embodiment, the relay apparatus 430 performs authentication (CertificateRequest, steps S11 and S15) of the first apparatus 410, as in the first or third embodiment. The relay apparatus 430 may not perform authentication of the first apparatus 410 as in the second or fourth embodiment.

Updating of the association between the master secret key MS and the ticket information by the relay apparatus 430 in steps S708b and S729 may be executed after the verification of the finished message FN6 in steps S310 and S333 is finished successfully. Saving of the new Ticket2 by the first apparatus 410 in step S708c may be executed after the verification of the finished message FN6 in step S312 is finished successfully.

In the thirteenth embodiment, the second apparatus 430 generates the new Ticket2 in finished message coordination (re-connection). This processing may not be performed. In that case, the processing of steps S708a to S708c is not executed.

Fourteenth Embodiment

This embodiment is a modification of the ninth embodiment. After a TLS connection based on Ticket-TLS, described in the thirteenth embodiment, is made between the first apparatus and the relay apparatus, the first apparatus uses the TLS session resume mode to connect to the second apparatus. Differences from the ninth embodiment will be described mainly.

Figure 46:
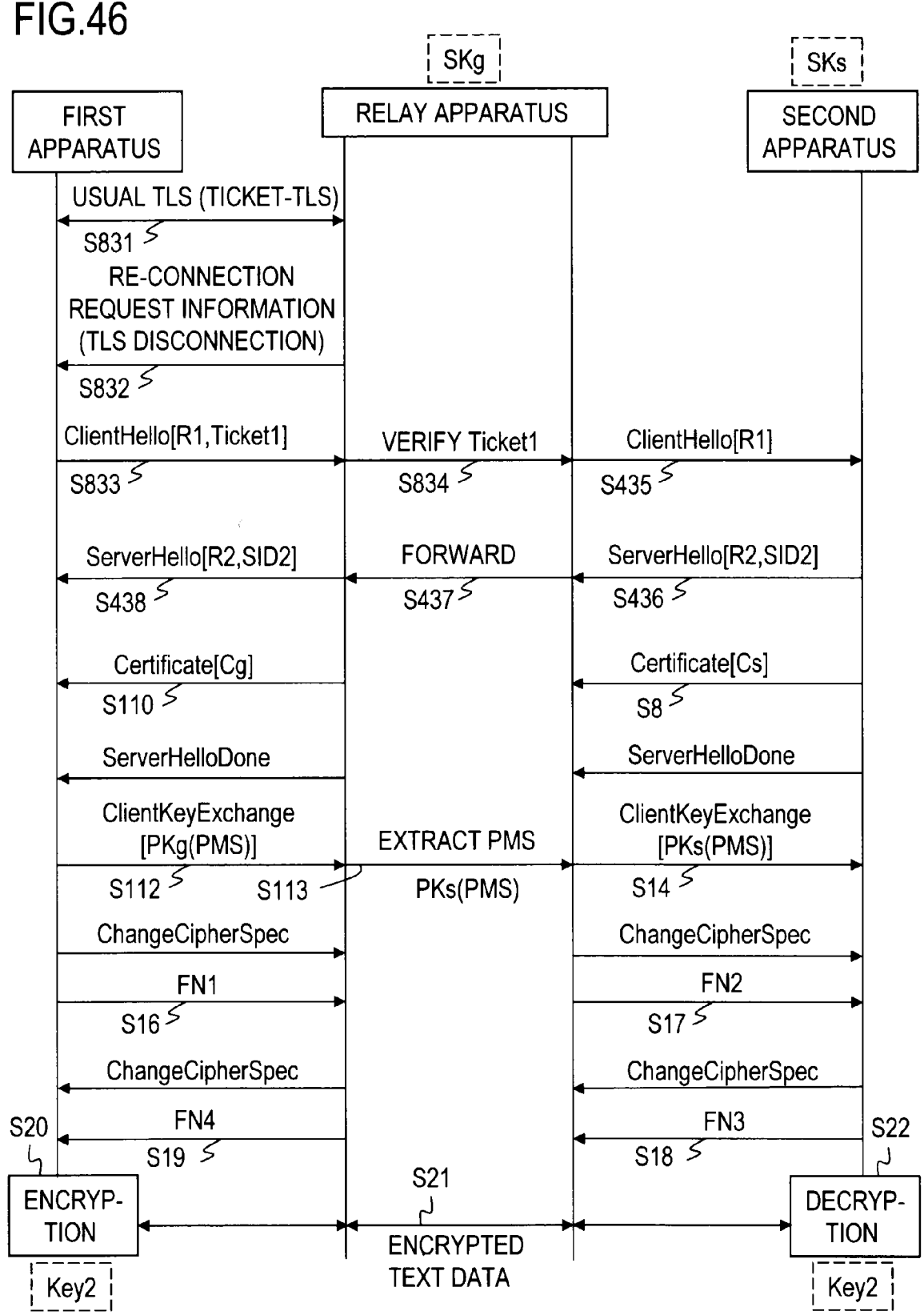
FIG. 46 is a sequence diagram illustrating processing in a fourteenth embodiment.

FIG. 46 is a sequence diagram illustrating processing in the fourteenth embodiment. Only the differences from the ninth embodiment will be described below.

TLS connection (including client authentication) based on Ticket-TLS is executed between the first apparatus 410 and the relay apparatus 430 (step S831). Then, the first apparatus 410 and the relay apparatus 430 share the common key Key1. Ticket1 (see FIG. 41C) that includes the master secret key MS corresponding to the common key Key1 is sent from the relay apparatus 430 to the first apparatus 410, and Ticket1 is stored in the memory 11 of the first apparatus 410.

The transmitter 33 of the relay apparatus 430 sends re-connection request information (TLS disconnection, SSL CloseNotify) to the first apparatus 410 (step S832). The re-connection request information is usually sent after it is encrypted by the common key encryption processor 32$i$ of the relay apparatus 830, by using the common key Key1.

The re-connection request information sent to the first apparatus 410 is received by the receiver 14 and is sent to the communication processor 412$h$. If the re-connection request information is encrypted, the information is decrypted by the common key encryption processor 12$i$ of the first apparatus 410, by using the common key Key1. After that, the random number generator 12$a$ generates a random number R1 and sends it to the communication processor 412$h$. The communication processor 412$h$ reads Ticket1 from the memory 11, generates transmission start request information (ClientHello message) that includes the random number R1 and Ticket1, and sends the information to the transmitter 13. The transmitter 13 sends the transmission start request information (ClientHello message) to the relay apparatus 430. The information is received by the receiver 34 of the relay apparatus 430 (step S833).

The communication processor 432$h$ of the relay apparatus 430 verifies MAC included in the sent Ticket1. Only when the verification is finished successfully, the communication processor 432$h$ sends the transmission start request information (ClientHello message) that includes the random number R1 to the transmitter 33, which sends the information to the second apparatus 20 (step S834). After that, the processing in and after step S435 described in the ninth embodiment is executed.

Fifteenth Embodiment

A fifteenth embodiment of the present invention will be described.

Figure 47:
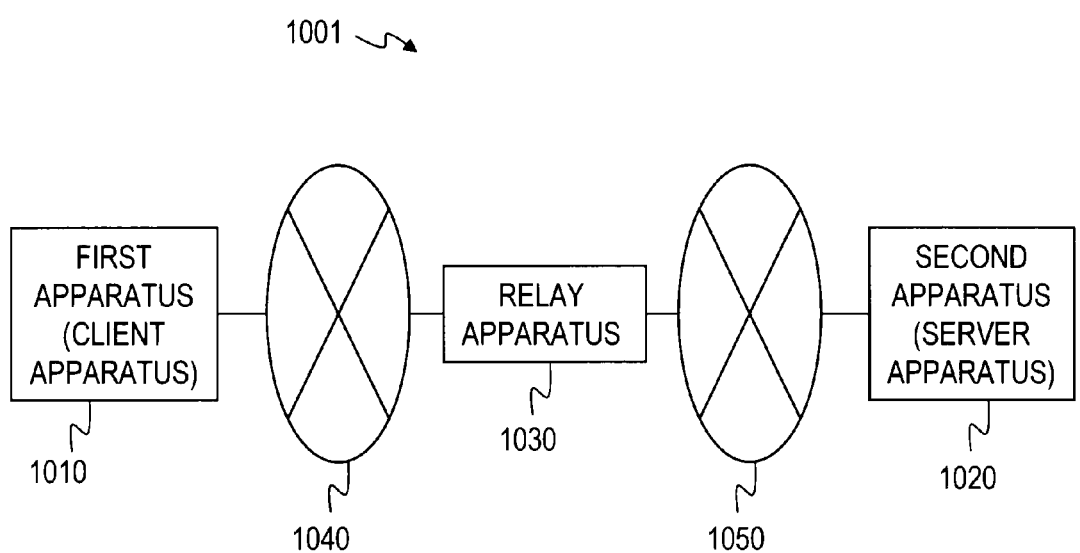
FIG. 47 is a block diagram illustrating the overall structure of a common key cryptosystem communication system according to a fifteenth embodiment.

<Structure>
[Overall Structure]
FIG. 47 is a block diagram illustrating the overall structure of a common key cryptosystem communication system 1001 in the fifteenth embodiment.

As illustrated in FIG. 47, the common key cryptosystem communication system 1001 in this embodiment includes a first apparatus 1010 (a client apparatus, for example), a second apparatus 1020 (a server apparatus, for example), and a relay apparatus 1030 (a gateway apparatus, for example). The first apparatus 1010 and the relay apparatus 1030 are connected through a network 1040 such as the Internet or a local area network (LAN) to allow communication between them, and the second apparatus 1020 and the relay apparatus 1030 are connected through a network 1050 such as the Internet or a LAN to allow communication between them.

The first apparatus 1010 and the second apparatus 1020 are apparatuses that perform processing in accordance with a protocol (such as SSL, TLS or the like), including authentication between two apparatuses, sharing of a common key between the two apparatuses by using a cryptography technology, and processing for checking the validity of a common key setting process by using secret information for identifying the common key and communication log information between the two apparatuses. The relay apparatus 1030 is an apparatus for performing new unique processing in this embodiment. To simplify the description, in FIG. 47, one first apparatus 1010 and one second apparatus 1020 are connected to the relay apparatus 1030 to allow communication between them. However, two or more first apparatuses 1010 and second apparatuses 1020 may be connected to the relay apparatus 1030 to allow communication between them. The structure may also include a plurality of relay apparatuses 1030.

[First Apparatus]
The first apparatus 1010 in this embodiment is implemented by a well-known computer that includes a central processing unit (CPU), a random-access memory (RAM), a read-only memory (ROM), a communication device, and the like when a predetermined program is read into the computer and executed by the CPU.

Figure 48:
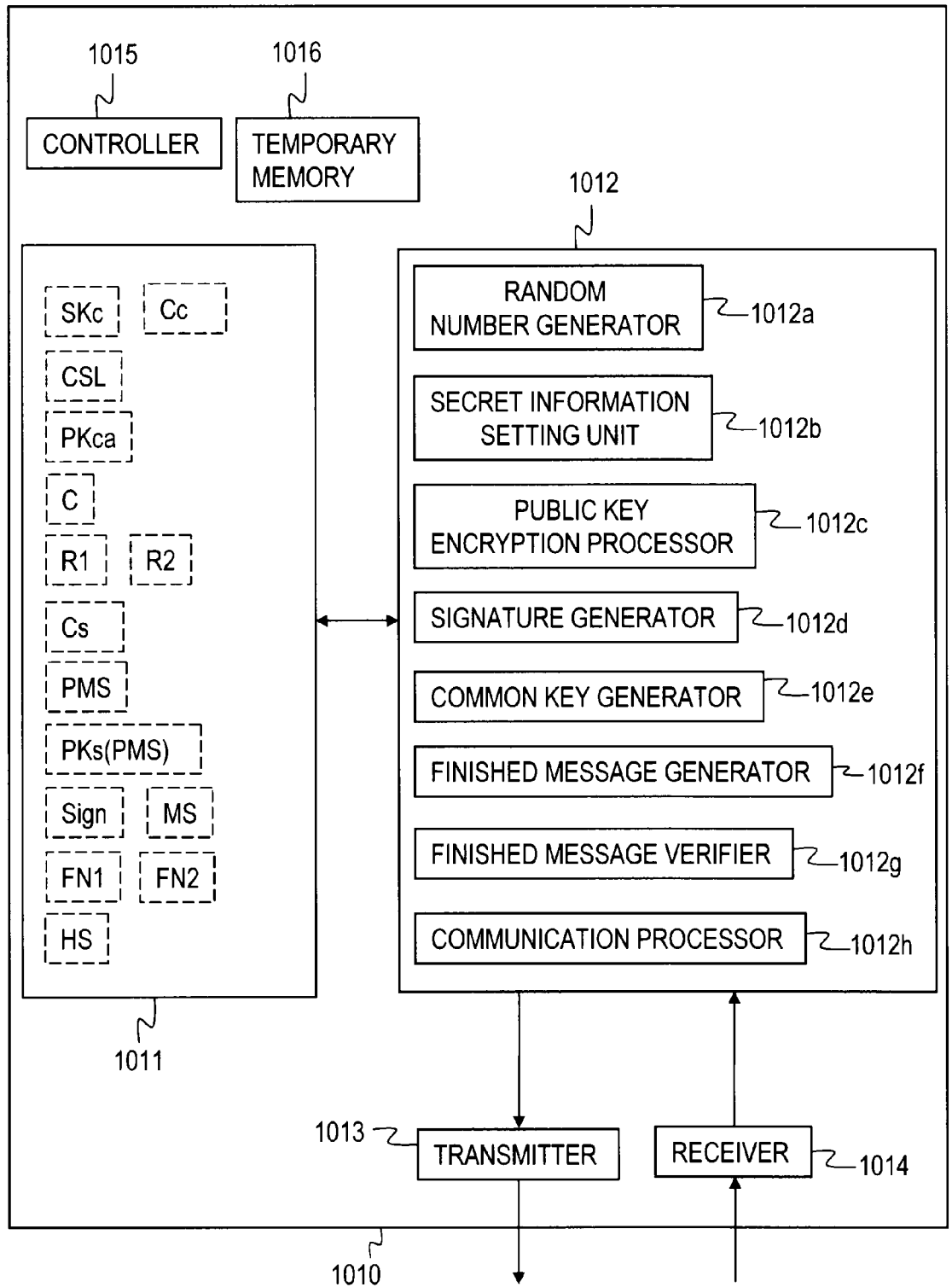
FIG. 48 is a block diagram illustrating the functional structure of a first apparatus in the fifteenth embodiment.

FIG. 48 is a block diagram illustrating the functional structure of the first apparatus 1010 in the fifteenth embodiment.

As shown in FIG. 48, the first apparatus 1010 in this embodiment includes a memory 1011, a calculator 1012, a transmitter 1013, a receiver 1014, a controller 1015, and a temporary memory 1016. The calculator 1012 includes a random number generator 1012$a$, a secret information setting unit 1012$b$, a public key encryption processor 1012$c$, a signature generator 1012$d$, a common key generator 1012$e$, a finished message generator 1012$f$, a finished message verifier 1012$g$, and a communication processor 1012$h$.

The calculator 1012 and the controller 1015 in this embodiment are processors implemented when predetermined programs are read into the CPU and executed by the CPU. The memory 1011 and the temporary memory 1016 are well-known storage devices such as RAMs, registers, cache memories, and hard disk drives, or storage areas formed by combining at least some of these. The transmitter 1013 and the receiver 1014 are communication devices such as LAN cards or modems controlled by the CPU that includes a predetermined program read into it. Examples of hardware implementing the first apparatus include a personal computer, a mobile phone, and a personal digital assistant (PDA).

The first apparatus 1010 executes processing under the control of the controller 1015. Unless otherwise specified explicitly, each data item generated in each calculation process is stored in the temporary memory 1016 and is read out for a different calculation.

[Second Apparatus]
The second apparatus 1020 in this embodiment is implemented by a well-known computer that includes a CPU, a RAM, a ROM, a communication device, and the like when a predetermined program is read into the computer and executed by the CPU.

Figure 49:
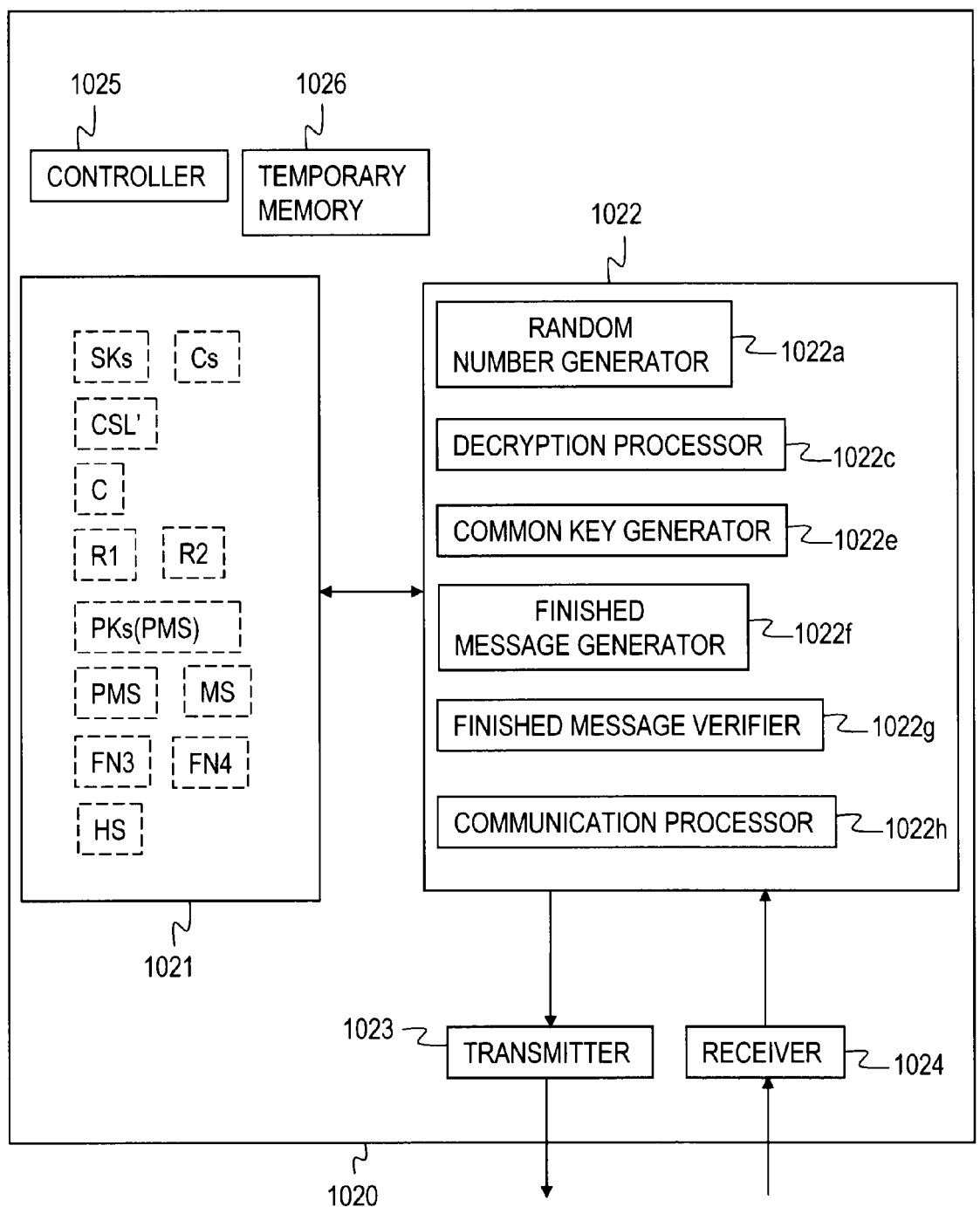
FIG. 49 is a block diagram illustrating the functional structure of a second apparatus in the fifteenth embodiment.

FIG. 49 is a block diagram illustrating the functional structure of the second apparatus 1020 in the fifteenth embodiment.

As shown in FIG. 49, the second apparatus 1020 in this embodiment includes a memory 1021, a calculator 1022, a transmitter 1023, a receiver 1024, a controller 1025, and a temporary memory 1026. The calculator 1022 includes a random number generator 1022$a$, a decryption processor 1022$c$, a common key generator 1022$e$, a finished message generator 1022*f*, a finished message verifier 1022*g*, and a communication processor 1022*h*.

The calculator 1022 and the controller 1025 in this embodiment are processors implemented when predetermined programs are read into the CPU and executed by the CPU. The memory 1021 and the temporary memory 1026 are well-known storage devices such as RAMs, registers, cache memories, and hard disk drives, or storage areas formed by combining at least some of these. The transmitter 1023 and the receiver 1024 are communication devices such as LAN cards or modems controlled by the CPU that includes a predetermined program read into it. Examples of hardware implementing the second apparatus include a server machine and a personal computer.

The second apparatus 1020 executes processing under the control of the controller 1025. Unless otherwise specified explicitly, each data item generated in each calculation process is stored in the temporary memory 1026 and is read out for a different calculation.

[Relay Apparatus]

The relay apparatus 1030 in this embodiment is implemented by a well-known computer that includes a CPU, a RAM, a ROM, a communication device, and the like when a predetermined program is read into the computer and executed by the CPU.

Figure 50:
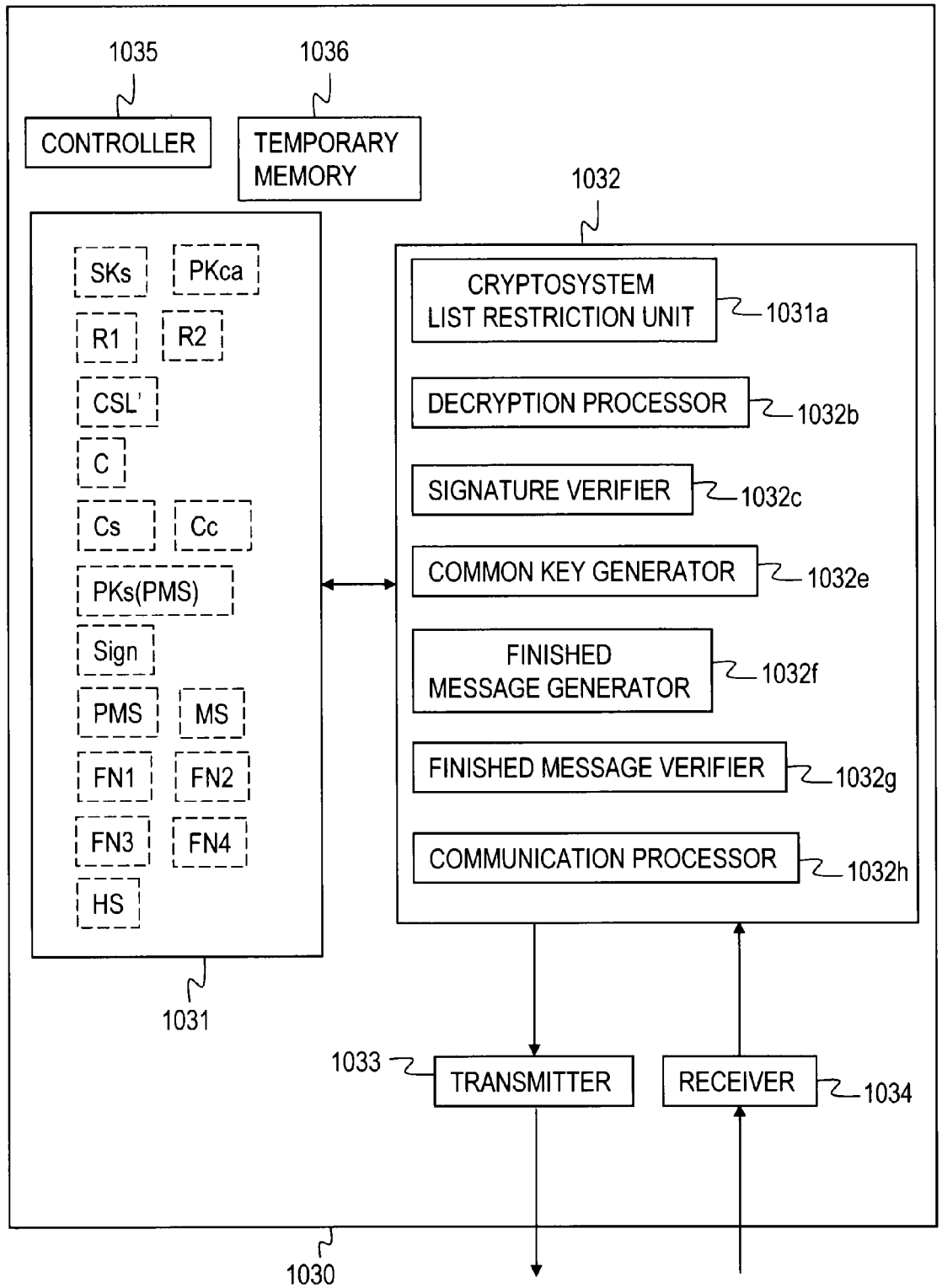
FIG. 50 is a block diagram illustrating the functional structure of a relay apparatus in the fifteenth embodiment.

FIG. 50 is a block diagram illustrating the functional structure of the relay apparatus 1030 in the fifteenth embodiment.

As shown in FIG. 50, the relay apparatus 1030 in this embodiment includes a memory 1031, a calculator 1032, a transmitter 1033, a receiver 1034, a controller 1035, and a temporary memory 1036. The calculator 1032 includes a cryptosystem list restriction unit 1031*a*, a decryption processor 1032*b*, a signature verifier 1032*c*, a common key generator 1032*e*, a finished message generator 1032*f*, a finished message verifier 1032*g*, and a communication processor 1032*h*.

The calculator 1032 and the controller 1035 in this embodiment are processors implemented when predetermined programs are read into the CPU and executed by the CPU. The memory 1031 and the temporary memory 1036 are well-known storage devices such as RAMs, registers, cache memories, and hard disk drives or storage areas formed by combining at least some of these. The transmitter 1033 and the receiver 1034 are communication devices such as LAN cards and modems controlled by the CPU into which a predetermined program has been read. Examples of hardware implementing the relay apparatus include a gateway machine, a server machine, and a personal computer.

The relay apparatus 1030 executes processing under the control of the controller 1035. Unless otherwise specified explicitly, each data item generated in each calculation process is stored in the temporary memory 1036 and is read out for a different calculation.

<Processing>

The processing of the embodiment will be described next.

[Prerequisites]

The following points are assumed: A pair of keys (public key, secret key) of a public key cryptosystem (such as RSA) is generated for both the first apparatus 1010 and the second apparatus 1020. Each key pair may be generated for each of a plurality of cryptosystems. A secret key SKc of the first apparatus 1010 is stored in the memory 1011 of the first apparatus 1010, and a secret key SKs of the second apparatus 1020 is stored in the memory 1021 of the second apparatus 1020. A certification authority has issued a public key certificate for each public key; a public key certificate Cc of the public key PKc of the first apparatus 1010 is stored in the memory 1011 of the first apparatus 1010; and a public key certificate Cs of the public key PKs of the second apparatus 1020 is stored in the memory 1021 of the second apparatus 1020. The public key certificate Cc is an electronic signature generated for the public key PKc of the first apparatus 1010, by using the secret key of the certification authority, and includes the public key PKc. The public key certificate Cs is an electronic signature generated for the public key PKs of the second apparatus 1020, by using the secret key of the certification authority, and includes the public key PKs. The public key certificate Cc is stored in the memory 1011 of the first apparatus 1010, and the public key certificate Cs is stored in the memory 1021 of the second apparatus 1020. Examples of standards for public key certificates include X.509. A cryptosystem list CSL listing cryptosystems for sharing secret information between two apparatuses is stored in the memory 1011 of the first apparatus 1010. The list corresponds to a cipher suite in TLS or the like and includes RSA cryptosystems and Diffie-Hellman (DH) cryptosystems.

[Overall Processing]

Figure 51:
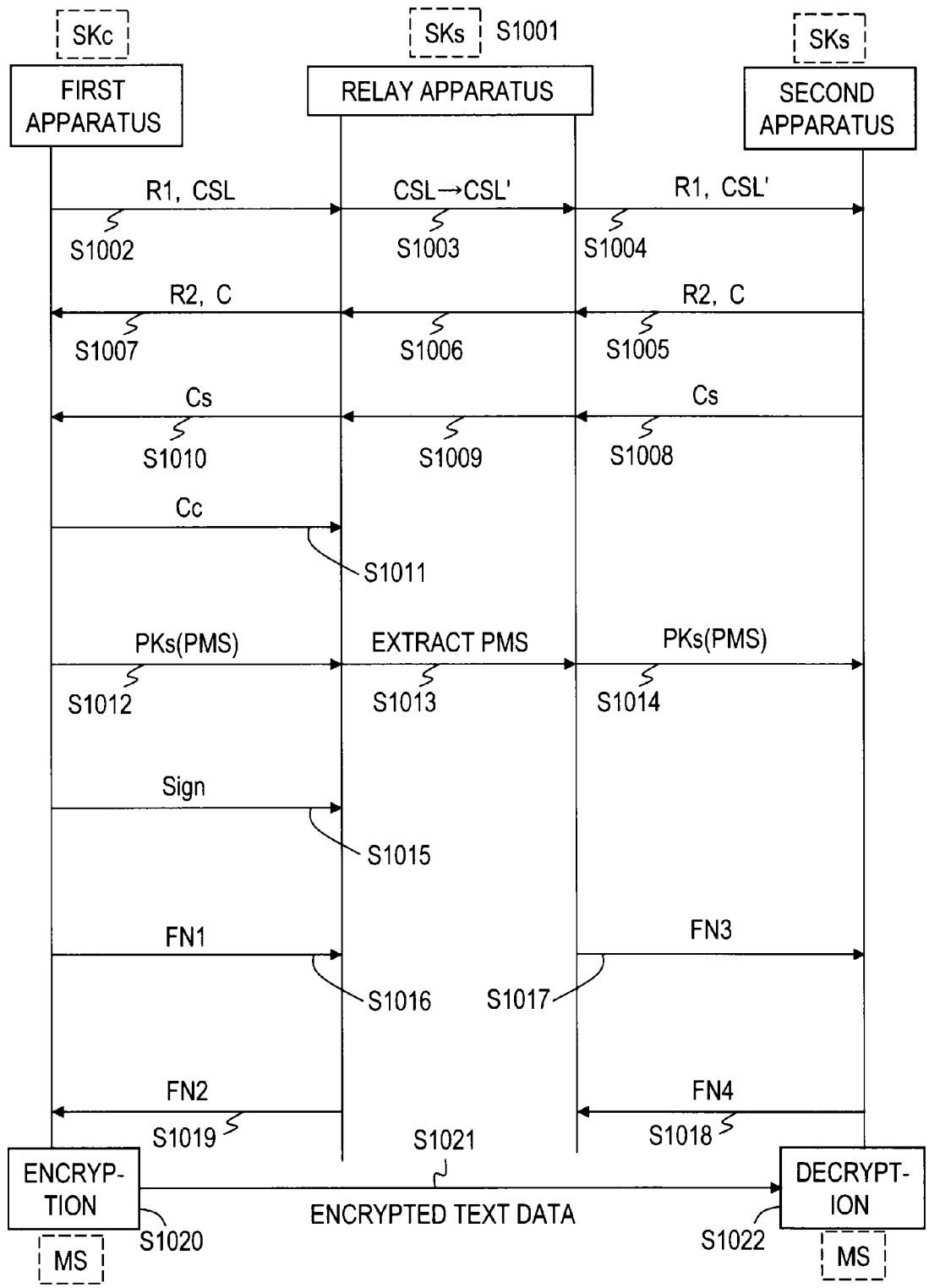
FIG. 51 is a sequence diagram illustrating the overall processing in the fifteenth embodiment.

FIG. 51 is a sequence diagram illustrating the overall processing in the fifteenth embodiment. A description will be made with reference to the diagram.

The secret key SKs of the second apparatus 1020 (FIG. 49) is first stored in the memory 1031 of the relay apparatus 1030 (secret key sharing process, step S1001). If one key pair has been generated for each of a plurality of cryptosystems, the secret key SKs corresponding to each cryptosystem is stored in the memory 1031. The second apparatus 1020 can give its secret key SKs to the relay apparatus 1030 in some ways: For example, the administrator of the second apparatus 1020 may send by post a recording medium such as a memory card storing the secret key SKs to the administrator of the relay apparatus 1030; the second apparatus 1020 may deliver the secret key SKs to the relay apparatus 1030 safely by performing key sharing utilizing an authentication technology or a cryptography technology.

The random number generator 1012*a* of the first apparatus 1010 (FIG. 48) generates a random number R1 (first random number) (first random number generating process) and stores it in the memory 1011. The communication processor 1012*h* reads the random number R1 (first random number) and the cryptosystem list CSL from the memory 1011, generates information (ClientHello message) that includes these read items, and sends the information to the transmitter 1013. The transmitter 1013 sends the ClientHello message, including the random number R1 and the cryptosystem list CSL, to the relay apparatus 1030 through the network 1040 (first random number sending process, step S1002).

The ClientHello message is received by the receiver 1034 of the relay apparatus 1030 (FIG. 50) and is sent to the communication processor 1032*h*. The communication processor 1032*h* stores the random number R1 (first random number) included in the ClientHello message in the memory 1031 and sends the cryptosystem list CSL to the cryptosystem list restriction unit 1031*a*. From the cryptosystems included in the cryptosystem list CSL, the cryptosystem list restriction unit 1031*a* selects only the public key cryptosystems by which one of two apparatuses encrypts secret information and sends the encrypted text to the other apparatus, and the other apparatus decrypts the encrypted text to share the secret information. The cryptosystem list restriction unit 1031*a* generates a new cryptosystem list CSL' containing just the selected cryptosystems. When TLS or the like is used, the cryptosystem list restriction unit 1031*a* selects just RSA cryptosystems from the cryptosystems included in CSL, generates a new cryptosystem list CSL' containing just the RSA cryptosystems, and stores the list in the memory 1031 (step S1003).

The communication processor 1032$h$ reads the random number R1 and the new cryptosystem list CSL' from the memory 1031, generates information (ClientHello message) that includes these read items, and sends the information to the transmitter 1033. The transmitter 1033 sends the ClientHello message, including the random number R1 and the new cryptosystem list CSL', to the second apparatus 1020 through the network 1050 (second random number sending process, step S1004).

The ClientHello message, including the random number R1 and the new cryptosystem list CSL', is received by the receiver 1024 of the second apparatus 1020 (FIG. 49) and is sent to the communication processor 1022$h$. The communication processor 1022$h$ stores the random number R1 and the new cryptosystem list CSL' included in the ClientHello message in the memory 1021. Then, the random number generator 1022$a$ of the second apparatus 1020 generates a random number R2 (second random number) (second random number generating process) and stores it in the memory 1021. The communication processor 1022$h$ selects one cryptosystem C for which the secret key SKs is stored in the memory 1021, from the cryptosystem list CSL' stored in the memory 1021, and stores the selected cryptosystem C in the memory 1021. The communication processor 1022$h$ reads the selected cryptosystem C and the random number R2 from the memory 1021, generates information (ServerHello message) that includes these read items, and sends the information to the transmitter 1023. When TLS or the like is used, the ServerHello message also includes a session identifier (session id), a compression algorithm (compression method), and the like. The cryptosystem C corresponds to a cipher suite in TLS or the like, and the cryptosystem C in this embodiment is an RSA cryptosystem. The transmitter 1023 sends the ServerHello message, including the random number R2 and the cryptosystem C, to the relay apparatus 1030 through the network 1050 (third random number sending process, step S1005).

The ServerHello message is received by the receiver 1034 of the relay apparatus 1030 (FIG. 50) and is sent to the communication processor 1032$h$. The communication processor 1032$h$ stores the random number R2 (second random number) and the cryptosystem C included in the ServerHello message in the memory 1031 (step S1006) and sends the ServerHello message to the transmitter 1033. The transmitter 1033 sends the ServerHello message, including the random number R2 and the cryptosystem C, to the first apparatus 1010 through the network 1040 (fourth random number sending process, step S1007). The ServerHello message is received by the receiver 1014 of the first apparatus 1010 (FIG. 48) and is sent to the communication processor 1012$h$. The communication processor 1012$h$ stores the random number R2 (second random number) and the cryptosystem C included in the ServerHello message in the memory 1011.

The communication processor 1022$h$ of the second apparatus 1020 (FIG. 49) reads the public key certificate Cs of the public key PKs corresponding to the cryptosystem C stored in the memory 1021 and sends information (Certificate message) that includes the public key certificate Cs to the transmitter 1023. The transmitter 1023 sends the public key certificate Cs of the second apparatus 1020 to the relay apparatus 1030 through the network 1050 (first public key certificate sending process, step S1008). The public key certificate Cs of the second apparatus 1020 is received by the receiver 1034 of the relay apparatus 1030 (FIG. 50) and is sent to the communication processor 1032$h$. The communication processor 1032$h$ stores the public key certificate Cs of the second apparatus 1020 in the memory 1031 and sends it to the transmitter 1033. The transmitter 1033 sends the public key certificate Cs of the second apparatus 1020 to the first apparatus 1010 through the network 1040 (public key certificate forwarding process, step S1009). The sent public key certificate Cs of the second apparatus 1020 is received by the receiver 1014 of the first apparatus 1010 (FIG. 48) and is sent to the communication processor 1012$h$. The communication processor 1012$h$ stores the public key certificate Cs of the second apparatus 1020 in the memory 1011 (step S1010).

After the second apparatus 1020 sends a message such as ServerKeyExchange, CertificateRequest, or ServerHelloDone to the first apparatus 1010, the communication processor 1012$h$ of the first apparatus 1010 reads the public key certificate Cc of the public key PKc corresponding to the cryptosystem C stored in the memory 1011 and sends information (Certificate message) that includes the public key certificate Cc to the transmitter 1013. The transmitter 1013 sends the public key certificate Cc of the first apparatus 1010 to the relay apparatus 1030 through the network 1040 (second public key certificate sending process, step 1011). The public key certificate Cc of the first apparatus 1010 is received by the receiver 1034 of the relay apparatus 1030 (FIG. 50) and is sent to the communication processor 1032$h$. The communication processor 1032$h$ stores the public key certificate Cc of the first apparatus 1010 in the memory 1031.

The secret information setting unit 1012$b$ of the first apparatus 1010 (FIG. 48) specifies secret information PMS (pre-master secret) for identifying the common key MS (master secret) and stores the secret information PMS in the memory 1011. The secret information PMS is set to a random number generated by the secret information setting unit 1012$b$, for example. The communication processor 1012$h$ of the first apparatus 1010 reads the public key certificate Cs of the second apparatus 1020 from the memory 1011 and obtains a public key PKca of the CA which has issued the pubic key certificate Cs of the second apparatus 1020 from a certification authority apparatus, not shown, connected to the network 1040. The obtained public key PKca of the CA is stored in the memory 1011. The communication processor 1012$h$ reads the public key certificate Cs of the second apparatus 1020 and the public key PKca of the CA from the memory 1011 and verifies the public key certificate Cs of the second apparatus 1020 by using the public key PKca of the CA. If the verification is finished successfully, the public key encryption processor 1012$c$ reads from the memory 1011 the secret information PMS, the public key PKs of the second apparatus 1020 included in the public key certificate Cs, and the cryptosystem C, generates encrypted text PKs(PMS) (encrypted secret information, EncryptedPreMasterSecret message) by encrypting the secret information PMS by using the public key PKs according to the cryptosystem indicated as the cryptosystem C, and stores the encrypted text PKs(PMS) in the memory 1011 (secret information encrypting process). Information (ClientKeyExchange message) that includes the generated encrypted text PKs(PMS) is sent to the transmitter 1013. The transmitter 1013 sends the ClientKeyExchange message, including the encrypted text PKs(PMS) (encrypted secret information), to the relay apparatus 1030 through the network 1040 (encrypted secret information sending process, step S1012).

The ClientKeyExchange message is received by the receiver 1034 of the relay apparatus 1030 (FIG. 50) and is sent to the communication processor 1032$h$. The communication processor 1032$h$ stores the encrypted text PKs(PMS) (encrypted secret information) included in the ClientKeyExchange message in the memory 1031. The decryption processor 1032*b* then reads from the memory 1031 the cryptosystem C and the secret key SKs of the second apparatus 1020, where the read secret key SKs corresponds to the read cryptosystem C. The decryption processor 1032*b* reads the encrypted text PKs(PMS) from the memory 1031 and decrypts it with the secret key SKs to extract the secret information PMS (first secret information decrypting process, step S1013). The extracted secret information PMS is stored in the memory 1031. Then, the communication processor 1032*h* reads the encrypted text PKs(PMS) from the memory 1031 and sends a ClientKeyExchange message that includes the encrypted text PKs(PMS) to the transmitter 1033. The transmitter 1033 sends the ClientKeyExchange message, including the encrypted text PKs(PMS), to the second apparatus 1020 through the network 1050 (encrypted secret information forwarding process). The sent ClientKeyExchange message is received by the receiver 1023 of the second apparatus 1020 and is sent to the communication processor 1022*h*. The communication processor 1022*h* stores the encrypted text PKs(PMS) included in the ClientKeyExchange message in the memory 1021. The decryption processor 1022*c* of the second apparatus 1020 reads from the memory 1021 the cryptosystem C and the secret key SKs of the second apparatus 1020, where the read secret key SKs corresponds to the read cryptosystem C. The decryption processor 1022*c* further reads the encrypted text PKs(PMS) from the memory 1021, and decrypts it with the secret key SKs to extract the secret information PMS (second secret information decrypting process, step 1014). The extracted secret information PMS is stored in the memory 1021.

The signature generator 1012*d* of the first apparatus 1010 (FIG. 48) reads from the memory 1011 the cryptosystem C and the secret key SKc of the first apparatus, where the read secret key SKc corresponds to the read cryptosystem C. The signature generator 1012*d* generates signature information Sign by using the secret key SKc and stores it in the memory 1011 (signature information generating process). All the handshake messages (communication log information) that have been sent or received by the first apparatus 1010 so far from the ClientHello message (step S1002), except the signature information Sign, are to be signed. The communication processor 1012*h* reads the signature information Sign from the memory 1011 and sends information (CertificateVerify message) that includes the read information to the transmitter 1013. The transmitter 1013 sends the CertificateVerify message through the network 1040 to the relay apparatus 1030 (signature information sending process, step S1015). The CertificateVerify message is received by the receiver 1034 of the relay apparatus 1030 (FIG. 50) and is sent to the communication processor 1032*h*. The communication processor 1032*h* stores the signature information Sign included in the CertificateVerify message in the memory 1031. The signature verifier 1032*c* reads the public key certificate Cc of the first apparatus 1010 from the memory 31 and obtains the public key PKca of the CA which has issued the public key certificate Cc of the first apparatus 1010 from the certification authority apparatus, not shown, connected to the network 1040. The obtained public key PKca of the CA is stored in the memory 1031. The communication processor 1032*h* reads the public key certificate Cc of the first apparatus 1010 and the public key PKca of the CA from the memory 1031 and verifies the public key certificate Cc of the first apparatus 1010 by using the public key PKca of the CA. If the verification is finished successfully, the signature verifier 1032*c* reads the signature information Sign and the public key PKc of the first apparatus 1010 included in the public key certificate Cc of the first apparatus 1010, from the memory 1031. The signature verifier 1032*c* verifies the signature information Sign by using the public key PKc of the first apparatus 1010 (signature information verifying process). This processing corresponds to the processing by which the relay apparatus 1030, instead of the second apparatus 1020, verifies the first apparatus 1010.

The common key generator 1012*e* of the first apparatus 1010 (FIG. 48) reads the secret information PMS from the memory 1011, generates a common key MS determined by the secret information PMS, and stores it in the memory 1011. The common key MS is, for example, information determined by the random number R1 (first random number), the random number R2 (second random number), and the secret information PMS. For example, the common key generator 1012*e* reads the secret information PMS, the random number R1 (first random number), and the random number R2 (second random number) from the memory 1011 and generates the hash value of the value of the connect bits of these items and a constant as a common key MS (master secret). Then, the finished message generator 1012*f* reads from the memory 1011 the common key MS, communication log information HS1 between the first apparatus 1010 and the relay apparatus 1030, and the secret information PMS, generates a first finished message FN1 by encrypting information corresponding to the secret information PMS and the communication log information HS1, by using the common key MS, and stores it in the memory 1011 (first finished message generating process). For example, the communication log information HS1 between the first apparatus 1010 and the relay apparatus 1030 is all the handshake messages so far, except the first finished message message FN1, and includes the random number R1 (first random number) and the random number R2 (second random number). The first finished message FN1 is, for example, encrypted text obtained by encrypting, according to the common key cryptosystem by using the common key MS, the value of the connect bits of the secret information PMS (premaster secret), a character string (finished label), and the MD5 hash value of the communication log information HS1 plus the SHA-1 hash value of the communication log information HS1. The generated first finished message FN1 is sent to the transmitter 1013, which then sends it through the network 1040 to the relay apparatus 1030 (first finished message sending process, step S1016).

The first finished message FN1 is received by the receiver 1034 of the relay apparatus 1030 (FIG. 50) and is stored in the memory 1031. Next, the common key generator 1032*e* of the relay apparatus 1030 reads the secret information PMS from the memory 1031, generates a common key MS determined by the secret information PMS, and stores it in the memory 1031. For example, the common key generator 1032*e* reads the secret information PMS, the random number R1 (first random number), and the random number R2 (second random number) from the memory 1031 and generates the hash value of the value of the connect bits of the read items and a constant as the common key MS (master secret). The finished message verifier 1032*g* reads from the memory 1031 the first finished message FN1, the common key MS, the communication log information HS1 between the first apparatus 1010 and the relay apparatus 1030, and the secret information PMS, and verifies whether the first finished message FN1 corresponds to the secret information PMS, by using the common key MS. For example, the finished message verifier 1032*g* verifies whether the result obtained by decrypting the first finished message FN1 by using the common key MS agrees with information corresponding to the secret information PMS and the communication log information HS1. For example, the finished message verifier 1032g verifies whether the result obtained by decrypting the first finished message FN1 by using the common key MS agrees with the value of the connect bits of the secret information PMS (premaster secret), a character string (finished label), and the MD5 hash value of the communication log information HS1 plus the SHA-1 hash value of the communication log information HS1.

If the verification is finished successfully, the finished message generator 1032f of the relay apparatus 1030 (FIG. 50) reads from the memory 1031 the common key MS, communication log information HS3 between the second apparatus 1020 and the relay apparatus 1030, and the secret information PMS, generates a second finished message FN3 by encrypting information corresponding to the secret information PMS and the communication log information HS3 by using the common key MS, and stores it in the memory 1031 (second finished message generating process). An example of the communication log information HS3 between the second apparatus 1020 and the relay apparatus 1030 is all the handshake messages so far, except the second finished message FN3, and includes the random number R1 (first random number) and the random number R2 (second random number). The second finished message FN3 is, for example, encrypted text obtained by encrypting, according to the common key cryptosystem by using the common key MS, the value of the connect bits of the secret information PMS (premaster secret), a character string (finished label), and the MD5 hash value of the communication log information HS3 plus the SHA-1 hash value of the communication log information HS3. The generated second finished message FN3 is sent to the transmitter 1033, which sends it through the network 1050 to the second apparatus 1020 (second finished message sending process, step S1017).

The second finished message FN3 is received by the receiver 1024 of the second apparatus 1020 (FIG. 49) and is stored in the memory 1021. The common key generator 1022e of the second apparatus 1020 reads the secret information PMS from the memory 1021, generates a common key MS determined by the secret information PMS, and stores it in the memory 1021. For example, the common key generator 1022e reads from the memory 1021 the secret information PMS, the random number R1 (first random number), and the random number R2 (second random number), and generates the hash value of the value of the connect bits of these items and a constant as a common key MS (master secret). The finished message verifier 1022g then reads from the memory 1021 the second finished message FN3, the common key MS, the communication log information HS3 between the second apparatus 1020 and the relay apparatus 1030, and the secret information PMS, and verifies whether the second finished message FN3 corresponds to the secret information PMS, by using the common key MS. For example, the finished message verifier 1022g verifies whether the decryption result obtained by decrypting the second finished message FN3 by using the common key MS agrees with information corresponding to the secret information PMS and the communication log information HS3. For example, the finished message verifier 1022g verifies whether the decryption result obtained by decrypting the second finished message FN3 by using the common key MS agrees with the value of the connect bits of the secret information PMS (premaster secret), a character string (finished label), and the MD5 hash value of the communication log information HS3 plus the SHA-1 hash value of the communication log information HS3.

If the verification is finished successfully, the finished message generator 1022f of the second apparatus 1020 (FIG. 49) reads from the memory 1021 the common key MS, communication log information HS4 between the second apparatus 1020 and the relay apparatus 1030, and the secret information PMS, generates a third finished message FN4 by encrypting information corresponding to the secret information PMS and the communication log information HS4 by using the common key MS, and stores it in the memory 1021 (third finished message generating process). An example of the communication log information HS4 between the second apparatus 1020 and the relay apparatus 1030 is all the handshake messages so far, except the third finished message FN4, and includes the random number R1 (first random number) and the random number R2 (second random number). The third finished message FN4 is, for example, encrypted text obtained by encrypting, according to the common key cryptosystem by using the common key MS, the value of the connect bits of the secret information PMS (premaster secret), a character string (finished label), and the MD5 hash value of the communication log information HS4 plus the SHA-1 hash value of the communication log information HS4. The generated third finished message FN4 is sent to the transmitter 1033, which sends it through the network 1050 to the relay apparatus 1030 (third finished message sending process, step S1018).

The third finished message FN4 is received by the receiver 1034 of the relay apparatus 1030 (FIG. 50) and is stored in the memory 1031. The finished message verifier 1032g reads from the memory 1031 the third finished message FN4, the common key MS, the communication log information HS4 between the second apparatus 1020 and the relay apparatus 1030, and the secret information PMS, and verifies whether the third finished message FN4 corresponds to the secret information PMS, by using the common key MS.

If the verification is finished successfully, the finished message generator 1032f of the relay apparatus 1030 (FIG. 50) reads from the memory 1031 the common key MS, communication log information HS2 between the first apparatus 1010 and the relay apparatus 1030, and the secret information PMS, generates a fourth finished message FN2 by encrypting information corresponding to the secret information PMS and the communication log information HS2 by using the common key MS, and stores it in the memory 1031 (fourth finished message generating process). An example of the communication log information HS2 between the first apparatus 1010 and the relay apparatus 1030 is all the handshake messages so far, except the fourth finished message FN2, and includes the random number R1 (first random number) and the random number R2 (second random number). The fourth finished message FN2 is, for example, encrypted text obtained by encrypting, according to the common key cryptosystem by using the common key MS, the value of the connect bits of the secret information PMS (premaster secret), a character string (finished label), and the MD5 hash value of the communication log information HS2 plus the SHA-1 hash value of the communication log information HS2. The generated fourth finished message FN2 is sent to the transmitter 1033, which sends it through the network 1040 to the first apparatus 1010 (fourth finished message sending process, step S1019).

The fourth finished message FN2 is received by the receiver 1014 of the first apparatus 1010 (FIG. 48) and is stored in the memory 1011. The finished message verifier 1012g reads from the memory 1011 the fourth finished message FN2, the common key MS, the communication log information HS2 between the first apparatus 1010 and the relay apparatus 1030, and the secret information PMS, and verifies whether the fourth finished message FN2 corresponds to the secret information PMS, by using the common key MS (finished message verifying process).

If the verification is finished successfully, common key cryptosystem communication using the common key MS becomes possible between the first apparatus 1010 and the second apparatus 1020. For example, the common key encryption processor (not shown) of the first apparatus 1010 encrypts a message by using the common key MS (step S1020), and the transmitter 1013 sends the generated encrypted text data to the second apparatus 1020. Then, the common key encryption processor (not shown) of the second apparatus 1020 decrypts the encrypted text data by using the common key MS (step S1021) to restore the message.

[Processing in Relay Apparatus]

Figure 52:
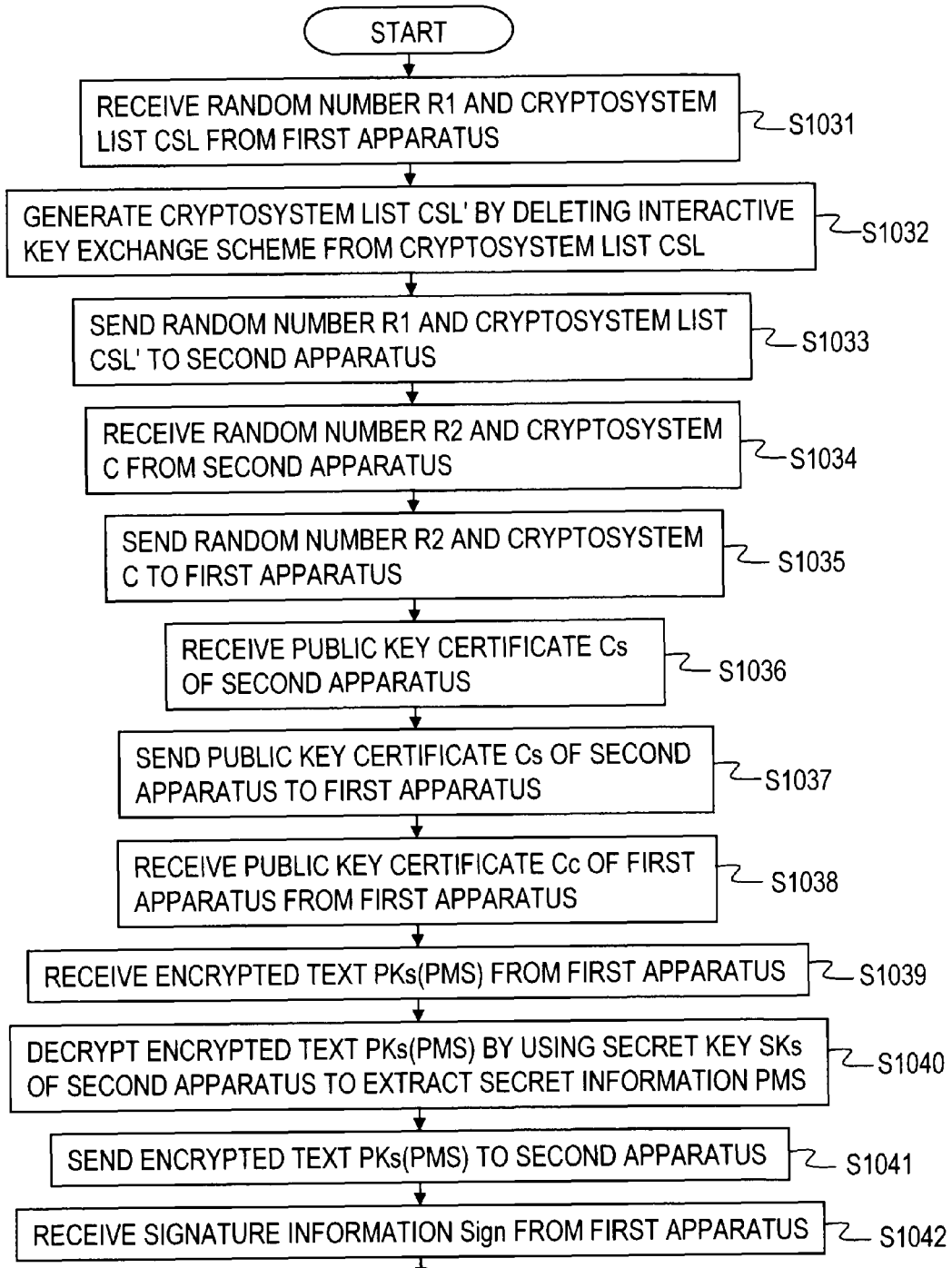
FIG. 52 is a flowchart illustrating processing in the relay apparatus in the fifteenth embodiment.
Figure 53:
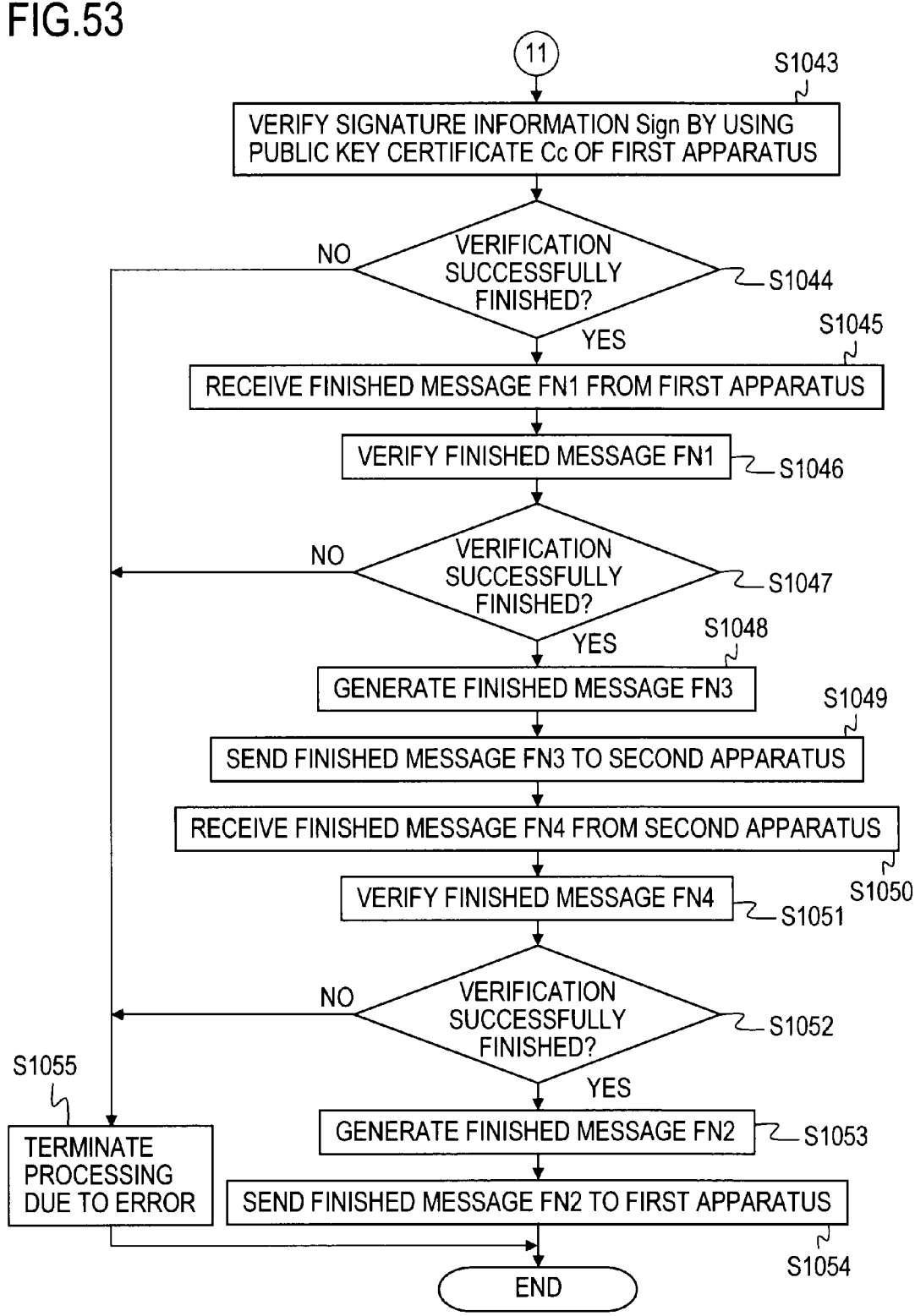
FIG. 53 is a flowchart illustrating the processing in the relay apparatus in the fifteenth embodiment.

FIGS. 52 and 53 are flowcharts illustrating processing in the relay apparatus 1030 of the fifteenth embodiment.

The processing in the relay apparatus 1030 will be described next with reference to the flowcharts. As a prerequisite of the processing, the secret key SKs of the second apparatus 1020 is stored in the memory 1031 of the relay apparatus 1030.

The receiver 1034 of the relay apparatus 1030 receives the information (ClientHello message) that includes the random number R1 (first random number) and the cryptosystem list CSL, sent from the first apparatus 1010, and the information is sent to the communication processor 1032h (step S1031). The communication processor 1032h stores the random number R1 (first random number) included in the ClientHello message in the memory 1031 and sends the cryptosystem list CSL to the cryptosystem list restriction unit 1031a. The cryptosystem list restriction unit 1031a generates a new cryptosystem list CSL' by excluding an interactive key exchange scheme (DH method and the like) from the cryptosystems included in the cryptosystem list CSL, as described earlier, and stores the new list in the memory 1031 (step S1032). The communication processor 1032h next reads from the memory 1031 the random number R1 and the new cryptosystem list CSL', generates information (ClientHello message) that includes them, and sends it to the transmitter 1033. The transmitter 1033 sends the ClientHello message, including the random number R1 and the new cryptosystem list CSL', through the network 1050 to the second apparatus 1020 (second random number sending process, step S1033).

The receiver 1034 of the relay apparatus 1030 receives the information (ServerHello message) that includes the cryptosystem C and the random number R2, sent from the second apparatus 1020, and sends the information to the communication processor 1032h (step S1034). The communication processor 1032h stores the random number R2 (second random number) and the cryptosystem C included in the ServerHello message in the memory 1031 and sends the ServerHello message to the transmitter 1033. The transmitter 1033 sends the ServerHello message including the random number R2 and the cryptosystem C, through the network 1040 to the first apparatus 1010 (fourth random number sending process, step S1035).

Then, the receiver 1034 of the relay apparatus 1030 receives the public key certificate Cs of the second apparatus 1020, sent from the second apparatus 1020, and sends it to the communication processor 1032h (step S1036). The transmitter 1033 sends the public key certificate Cs of the second apparatus 1020 through the network 1040 to the first apparatus 1010 (public key certificate forwarding process, step S1037).

The receiver 1034 of the relay apparatus 1030 receives the information (Certificate message) that includes the public key certificate Cc of the first apparatus 1010, sent from the first apparatus 1010, and sends it to the communication processor 1032h (step S1038). The communication processor 1032h stores the public key certificate Cc of the first apparatus 1010 in the memory 1031.

Then, the receiver 1034 of the relay apparatus 1030 receives the information (ClientKeyExchange message) that includes the encrypted text PKs(PMS) and sends it to the communication processor 1032h (step S1039). The communication processor 1032h stores the encrypted text PKs(PMS) (encrypted secret information) included in the ClientKeyExchange message in the memory 1031. The decryption processor 1032b next decrypts the encrypted text PKs(PMS) by using the secret key SKs, as described earlier, to extract the secret information PMS (first secret information decrypting process, step S1040). The extracted secret information PMS is stored in the memory 1031. The communication processor 1032h sends the ClientKeyExchange message, including the encrypted text PKs(PMS), to the transmitter 1033, and the transmitter 1033 sends the ClientKeyExchange message through the network 1050 to the second apparatus 1020 (encrypted secret information forwarding process, step S1041).

The receiver 1034 of the relay apparatus 1030 receives the CertificateVerify message that includes the signature information Sign, sent from the first apparatus 1010, and sends it to the communication processor 1032h (step S1042). The communication processor 1032h stores the signature information Sign included in the CertificateVerify message in the memory 1031. The signature verifier 1032c verifies the signature information Sign by using the public key certificate Cc of the first apparatus 1010, as described earlier (signature information verifying process, step S1043). If the verification fails (step S1044), the processing is terminated due to the error (step S1055).

If the verification is finished successfully, the receiver 1034 receives the first finished message FN1 sent from the first apparatus 1010 (step S1045). The first finished message FN1 is stored in the memory 1031. Next, the common key generator 1032e reads the secret information PMS from the memory 1031, generates a common key MS determined by the secret information PMS, and stores it in the memory 1031. Then, the finished message verifier 1032g reads from the memory 1031 the first finished message FN1, the common key MS, the communication log information HS1 between the first apparatus 1010 and the relay apparatus 1030, and the secret information PMS, and verifies the first finished message FN1 as described earlier by using the common key MS (step S1046). If the verification fails (step S1047), the processing is terminated due to the error (step S1055).

If the verification is finished successfully, the finished message generator 1032f reads from the memory 1031 the common key MS, the communication log information HS3 between the second apparatus 1020 and the relay apparatus 1030, and the secret information PMS, generates a second finished message FN3 by encrypting information corresponding to the secret information PMS and the communication log information HS3, and stores it in the memory 1031 (second finished message generating process, step S1048). The generated second finished message FN3 is sent to the transmitter 1033, which then sends it through the network 1050 to the second apparatus 1020 (second finished message sending process, step S1049).

The receiver 1034 of the relay apparatus 1030 receives a third finished message FN4 (step S1050). The third finished message FN4 is stored in the memory 1031. The finished message verifier 1032g then reads from the memory 1031 the third finished message FN4, the common key MS, the communication log information HS4 between the second apparatus 1020 and the relay apparatus 1030, and the secret information PMS, and verifies the third finished message FN4, by using the common key MS, as described earlier (step S1051). If the verification fails (step S1052), the processing is terminated due to the error (step S1055).

If the verification is finished successfully, the finished message generator 1032f reads from the memory 1031 the common key MS, the communication log information HS2 between the first apparatus 1010 and the relay apparatus 1030, and the secret information PMS, generates a fourth finished message FN2 by encrypting information corresponding to the secret information PMS and the communication log information HS2, by using the common key MS, and stores it in the memory 1031 (fourth finished message generating process, step S1053). The generated fourth finished message FN2 is sent to the transmitter 1033, which then sends it through the network 1040 to the first apparatus 1010 (fourth finished message sending process, step S1054).

<Features of Present Embodiment>

Since the first apparatus 1010 and the second apparatus 1020 in this embodiment share the same secret information PMS, the relay apparatus 1030 does not need to encrypt the PMS again to let the first apparatus 1010 and the second apparatus 1020 have the secret information PMS in common. The relay apparatus 1030 just has to forward the encrypted text PKs(PMS) (ClientKeyExchange message) sent from the first apparatus 1010, to the second apparatus 1020 (step S1013). Accordingly, the first apparatus 1010 and the second apparatus 1020 can share the secret information PMS and can also share the common key MS determined by the secret information PMS.

Since the first apparatus 1010 and the second apparatus 1020 share the same secret information PMS, each of them can generate a finished message corresponding to the same secret information PMS separately (steps S1016 and S1018) and can send the finished message to the relay apparatus 1030. Since the memory 1031 of the relay apparatus 1030 in this embodiment stores the secret key SKs of the second apparatus 1020, the relay apparatus 1030 can decrypt the encrypted text PKs(PMS) (ClientKeyExchange message) sent from the first apparatus 1010 to extract the secret information PMS (step S1013). Therefore, the relay apparatus 1030 can also send a finished message corresponding to the same common key determined by the secret information PMS, to the first apparatus 1010 and the second apparatus 1020 (steps S1017 and S1019).

Finished messages corresponding to the same common key MS can be generated in both parties of communications between the first apparatus 1010 and the relay apparatus 1030 and between the second apparatus 1020 and the relay apparatus 1030, respectively. Accordingly, the common key MS that can be shared between the first apparatus 1010 and the second apparatus 1020 as described above is a common key that passes the verification under the protocol. Consequently, the first apparatus 1010 and the second apparatus 1020 performing processing in accordance with the protocol can share the same common key through the relay apparatus 1030, without changing their specifications.

In this embodiment, especially, the random number R1 (first random number) used in a session between the first apparatus 1010 and the relay apparatus 1030 is used also in a session between the second apparatus 1020 and the relay apparatus 1030 (ClientHello message). Moreover, the random number R2 (second random number) used in a session between the second apparatus 1020 and the relay apparatus 1030 is used also in a session between the first apparatus 1010 and the relay apparatus 1030 (ServerHello message). Therefore, even when the common key MS is determined by the random number R1 (first random number), the random number R2 (second random number), and the secret information PMS and when the finished message is determined by the random number included in the ClientHello message and the random number included in the ServerHello message, the same common key MS can be specified between the first apparatus 1010 and the relay apparatus 1030 and between the second apparatus 1020 and the relay apparatus 1030. Moreover, finished messages corresponding to the same common key MS can be generated in both parties of communications between the first apparatus 1010 and the relay apparatus 1030 and between the second apparatus 1020 and the relay apparatus 1030, respectively. As a result, the first apparatus 1010 and the second apparatus 1020 that perform processing in accordance with a protocol such as TLS or the like can share the same common key through the relay apparatus 1030, without changing their specifications.

The transmitter 1023 of the second apparatus 1020 in this embodiment sends the public key certificate Cs of the second apparatus 1020 to the relay apparatus 1030 (step S1008) prior to the secret information encrypting process (step S1012); the receiver 1034 of the relay apparatus 1030 receives the public key certificate Cs of the second apparatus 1020; and the transmitter 1033 of the relay apparatus 1030 sends the public key certificate Cs of the second apparatus 1020 to the first apparatus 1010 (step S1009) prior to the secret information encrypting process (step S1012). Accordingly, the first apparatus 1010 can obtain the public key PKs with the certificate of the second apparatus. The public key encryption processor 1012c of the first apparatus 1010 generates encrypted secret information PKs(PMS) by encrypting the secret information PMS by using the public key PKs of the second apparatus 1020 corresponding to the secret key SKs of the second apparatus 1020 and sends it to the second apparatus 1020 through the relay apparatus 1030 (steps S1012 to S1014). This corresponds to the transmission of a challenge for authenticating the second apparatus 1020 and the relay apparatus 1030 from the first apparatus 1010. The first apparatus 1010 receives the fourth finished message FN2 from the relay apparatus 1030. This corresponds to the reception of a response to the challenge. The first apparatus 1010 verifies whether the fourth finished message FN2 corresponds to the secret information PMS (step S1019). This corresponds to the verification of the response. Therefore, only the second apparatus 1020 and the relay apparatus 1030 having the secret key SKs are allowed to decrypt the secret information PMS, based on the assumption that the certification authority having issued the public key certificate Cs of the second apparatus 1020 is proper. Therefore, the first apparatus 1010 can recognize that the party which the first apparatus 1010 shares the common key MS with is at least one of the second apparatus 1020 and the relay apparatus 1030 (server authentication enabled).

The transmitter 1013 of the first apparatus 1010 in this embodiment sends the public key certificate Cc of the first apparatus 1010 to the relay apparatus 1030 (step S1011). The relay apparatus 1030 can then obtain the public key PKc with the certificate of the first apparatus 1010. The signature generator 1012d of the first apparatus 1010 generates signature information Sign by using the secret key SKc of the first apparatus 1010 corresponding to the public key PKc of the first apparatus 1010, and the transmitter 1013 sends the signature information Sign to the relay apparatus 1030. The signature verifier 1032c of the relay apparatus 1030 verifies the signature information Sign by using the public key PKc of the first apparatus 1010. This corresponds to the authentication of the first apparatus 1010 by the relay apparatus 1030 instead of by the second apparatus on the assumption that the certification authority that has issued the public key certificate Cc of the first apparatus 1010 is proper (client authentication enabled).

Sixteenth Embodiment

A sixteenth embodiment of the present invention will now be described.

This embodiment is a modification of the fifteenth embodiment. In the fifteenth embodiment, the first apparatus authenticates the second apparatus (server authentication), and the relay apparatus, instead of the second apparatus, authenticates the first apparatus (client authentication). In contrast, in the present embodiment, the first apparatus authenticates the second apparatus (server authentication) but client authentication is not performed. Differences from the fifteenth embodiment will be mainly described below, and a description of items in common with the fifteenth embodiment will be omitted.

[Overall Structure]

Figure 54:
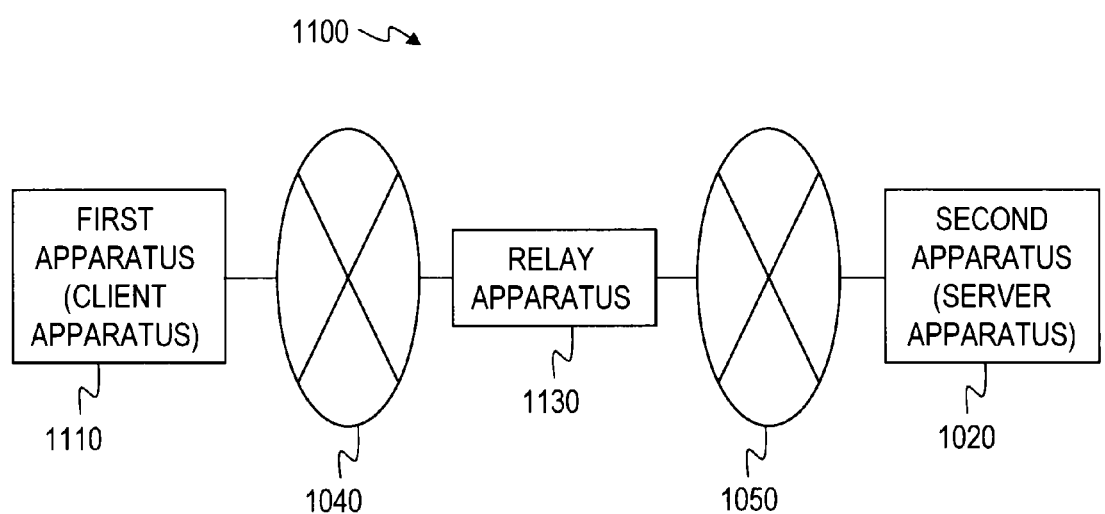
FIG. 54 is a block diagram illustrating the overall structure of a common key cryptosystem communication system according to a sixteenth embodiment.

FIG. 54 is a block diagram illustrating the overall structure of a common key cryptosystem communication system 1100 in the sixteenth embodiment. In FIG. 54, elements identical to those in the fifteenth embodiment are indicated by the same reference characters as in FIG. 47, and a description of those elements will be omitted.

As shown in FIG. 54, the common key cryptosystem communication system 1100 of this embodiment includes a first apparatus 1110 (a client apparatus, for example), a second apparatus 1020 (a server apparatus, for example), and a relay apparatus 1130 (a gateway apparatus, for example). The first apparatus 1110 and the relay apparatus 1130 are connected through a network 1040 to allow communication between them, and the second apparatus 1020 and the relay apparatus 1130 are connected through a network 1050 to allow communication between them.

The first apparatus 1110 and the second apparatus 1020 are apparatuses that perform processing in accordance with a protocol (such as SSL, TLS or the like) including authentication between two apparatuses, sharing of a common key between the two apparatuses by using a cryptography technology, and processing for checking the validity of a common key setting process by using secret information for identifying the common key and communication log information between the two apparatuses. The relay apparatus 1130 is an apparatus for performing new unique processing in this embodiment. To simplify the description, in FIG. 54, one first apparatus 1110 and one second apparatus 1020 are connected to the relay apparatus 1130 to allow communication between them. However, two or more first apparatuses 1110 and second apparatuses 1020 may be connected to the relay apparatus 1130 to allow communication between them. The structure may also include a plurality of relay apparatuses 1130.

[First Apparatus]

The first apparatus 1110 in this embodiment is implemented by a well-known computer that includes a CPU, a RAM, a ROM, a communication device, and the like when a predetermined program is read into the computer and executed by the CPU.

Figure 55:
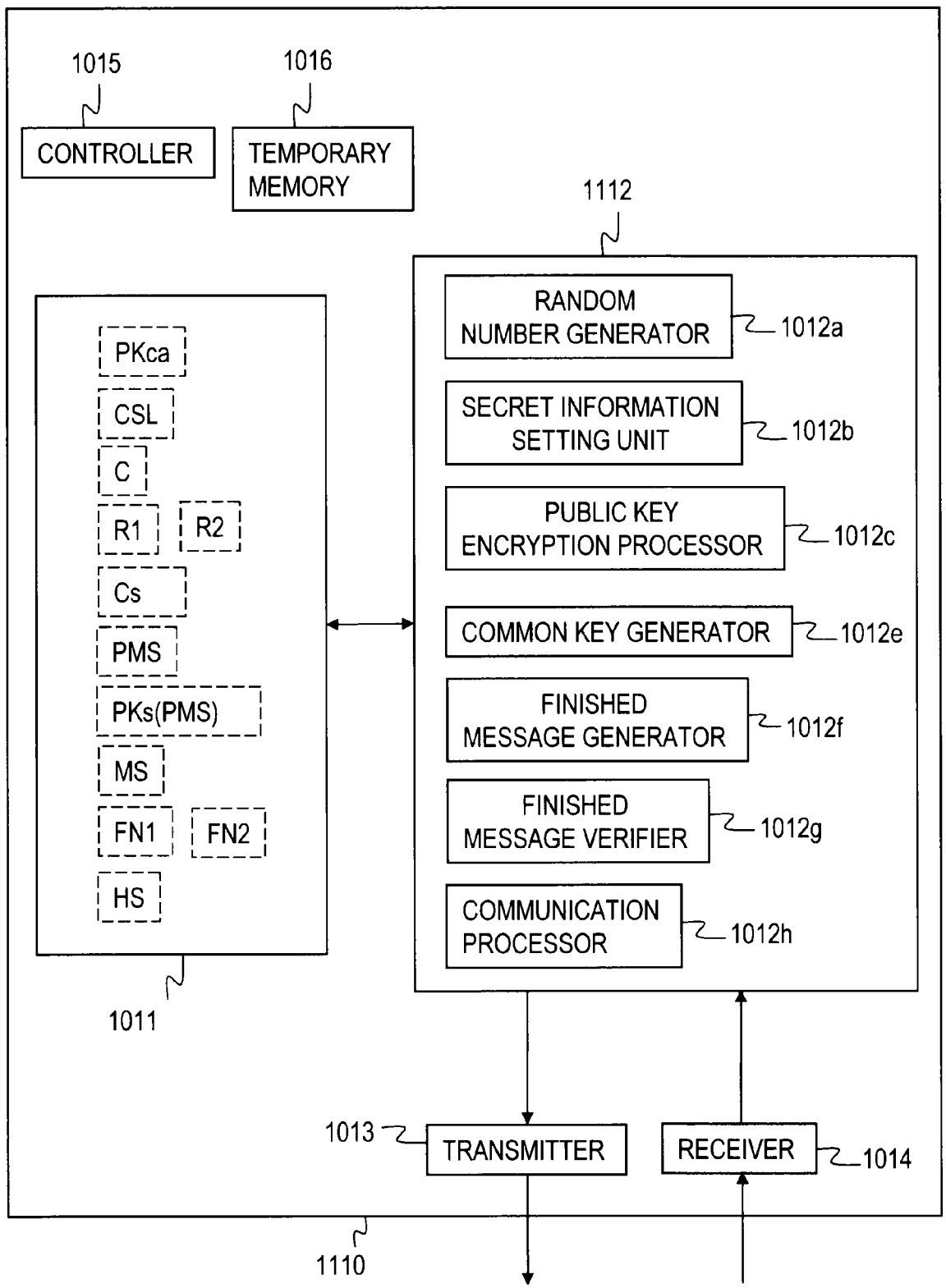
FIG. 55 is a block diagram illustrating the functional structure of a first apparatus in the sixteenth embodiment.

FIG. 55 is a block diagram illustrating the functional structure of the first apparatus 1110 in the sixteenth embodiment.

As shown in FIG. 55, the first apparatus 1110 in this embodiment includes a memory 1011, a calculator 1112, a transmitter 1013, a receiver 1014, a controller 1015, and a temporary memory 1016. The calculator 1112 includes a random number generator 1012a, a secret information setting unit 1012b, a public key encryption processor 1012c, a common key generator 1012e, a finished message generator 1012f, a finished message verifier 1012g, and a communication processor 1012h. The first apparatus 1110 executes processing under the control of the controller 1015. Unless otherwise specified explicitly, each data item generated in each calculation process is stored in the temporary memory 1016 and is read out for a different calculation. The calculator 1112 in this embodiment is a processor implemented when predetermined programs are read into the CPU and executed by the CPU.

[Second Apparatus]

The second apparatus is the same as in the fifteenth embodiment.

[Relay Apparatus]

The relay apparatus 1130 in this embodiment is implemented by a well-known computer that includes a CPU, a RAM, a ROM, a communication device, and the like when a predetermined program is read into the computer and executed by the CPU.

Figure 56:
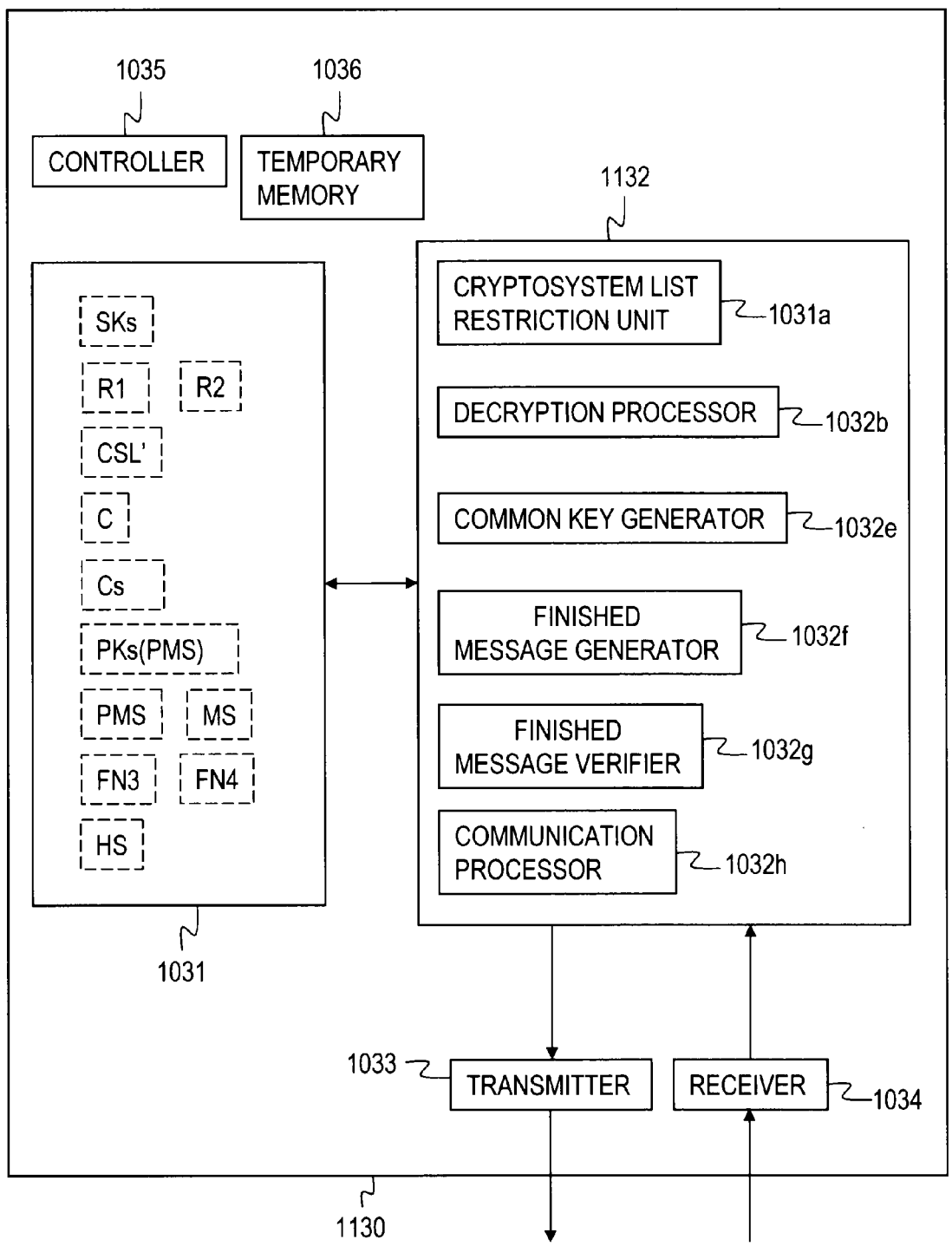
FIG. 56 is a block diagram illustrating the functional structure of a relay apparatus in the sixteenth embodiment.

FIG. 56 is a block diagram illustrating the functional structure of the relay apparatus 1130 in the sixteenth embodiment.

As shown in FIG. 56, the relay apparatus 1130 in this embodiment includes a memory 1031, a calculator 1132, a transmitter 1033, a receiver 1034, a controller 1035, and a temporary memory 1036. The calculator 1132 includes a cryptosystem list restriction unit 1031a, a decryption processor 1032b, a common key generator 1032e, a finished message generator 1032f, a finished message verifier 1032g, and a communication processor 1032h. The relay apparatus 1130 executes processing under the control of the controller 1035. Unless otherwise specified explicitly, each data item generated in each calculation process is stored in the temporary memory 1036 and is read out for a different calculation. The calculator 1132 in this embodiment is a processor implemented when predetermined programs are read into the CPU and executed by the CPU.

<Processing>

The processing in this embodiment will be described next.

[Prerequisites]

A difference from the fifteenth embodiment is that the secret key of the first apparatus is not stored in the first apparatus 1110. The rest is the same as in the fifteenth embodiment.

[Overall Processing]

Figure 57:
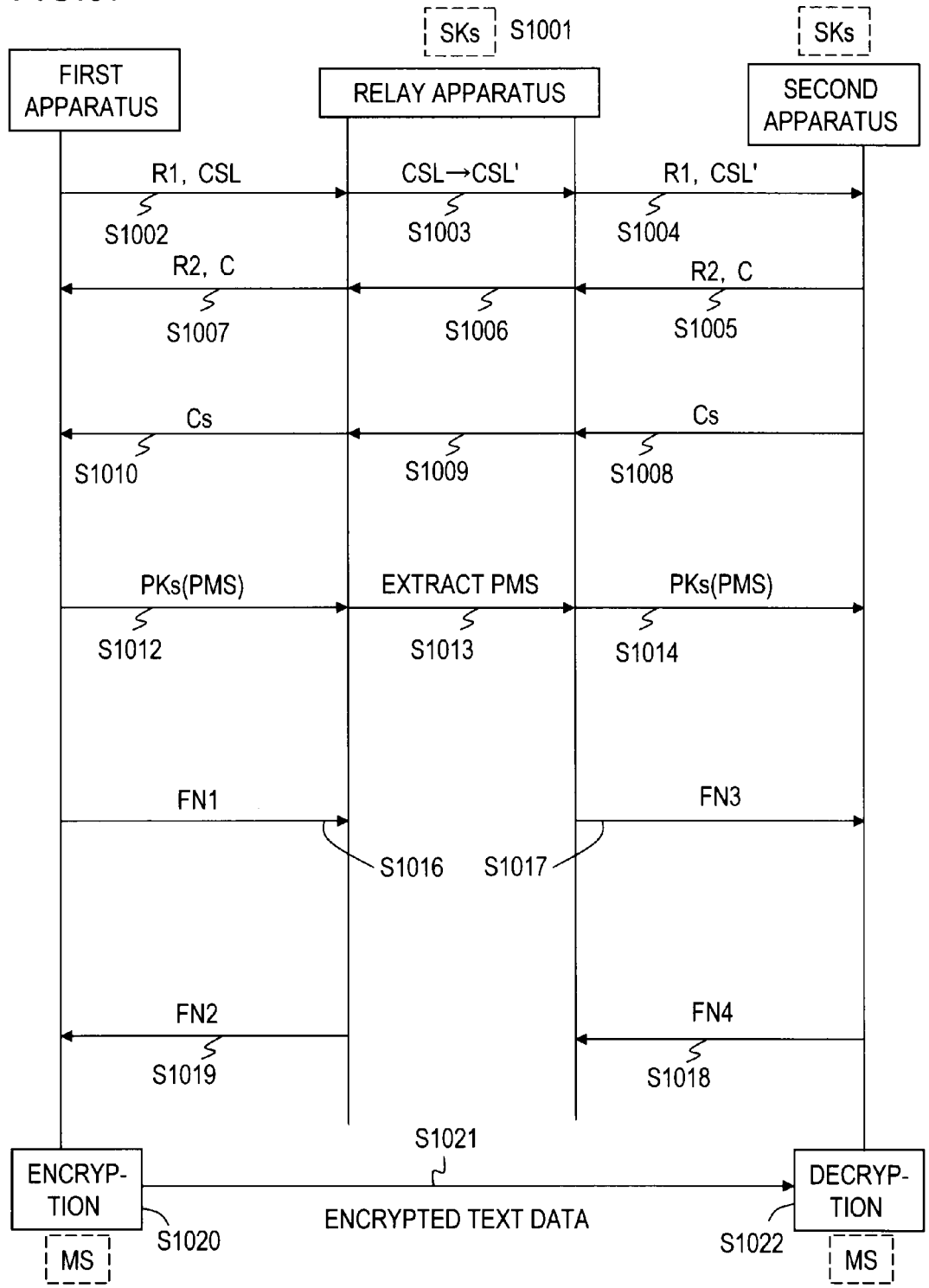
FIG. 57 is a sequence diagram illustrating the overall processing in the sixteenth embodiment.

FIG. 57 is a sequence diagram illustrating the overall processing in the sixteenth embodiment. Only the differences from the fifteenth embodiment will be described.

The differences from the fifteenth embodiment are that neither the second public key certificate sending process (step S1011) nor the signature information sending process (step S1015) is executed. The first apparatus 1110 is not authenticated. The rest is the same as in the fifteenth embodiment.

[Processing in Relay Apparatus]

Figure 58:
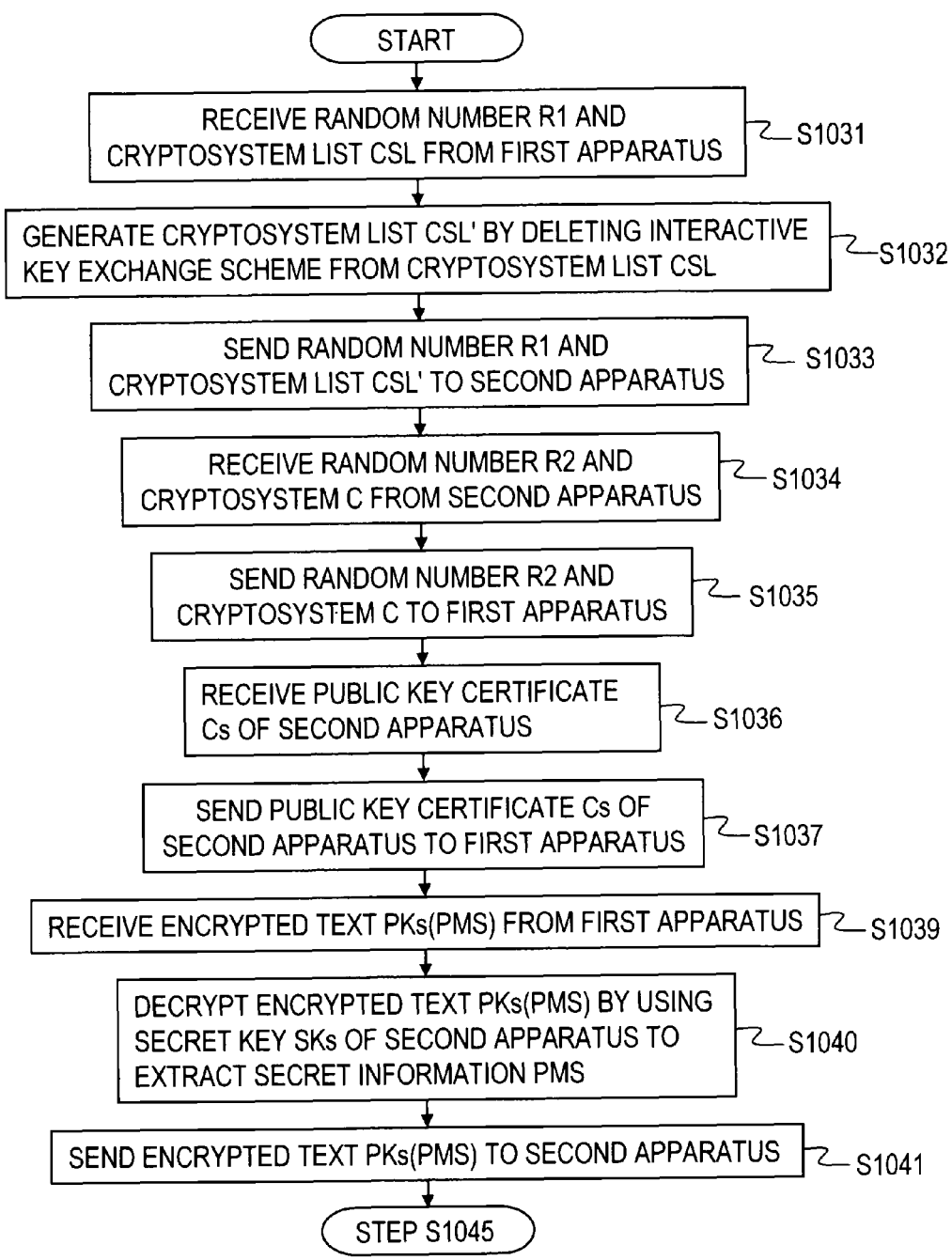
FIG. 58 is a flowchart illustrating processing in the relay apparatus in the sixteenth embodiment.

FIG. 58 is a flowchart illustrating the processing in the relay apparatus 1130 of the sixteenth embodiment. Only the differences from the fifteenth embodiment will be described.

The differences from the fifteenth embodiment are that neither the processing in step S1038 nor the processing in steps S1042 to S1044 is executed. The rest is the same as in the fifteenth embodiment.

<Features of Present Embodiment>

As in the fifteenth embodiment, the identical common key MS can be shared between the first apparatus 1110 and the relay apparatus 1130 and between the second apparatus 1020 and the relay apparatus 1130 in this embodiment. Therefore, the relay apparatus 1130 does not need to encrypt the secret information PMS again and just has to forward the encrypted text PKs(PMS) (ClientKeyExchange message) sent from the first apparatus 1110, to the second apparatus 1020. As in the fifteenth embodiment, finished messages corresponding to the same secret information PMS can be generated in both parties of communications between the first apparatus 1110 and the relay apparatus 1130 and between the second apparatus 1020 and the relay apparatus 1130 in this embodiment, respectively. Consequently, the first apparatus 1110 and the second apparatus 1020 performing processing in accordance with the protocol (such as TLS or the like) can share the same common key through the relay apparatus 1130, without changing their specifications.

As in the fifteenth embodiment, the first apparatus 1110 in this embodiment can confirm that it shares the common key MS with at least one of the second apparatus 1020 and the relay apparatus 1130 (server authentication enabled).

If the cryptosystem list is not restricted in step S1003 in this embodiment, the common key cryptosystem in a block cipher CBC mode, utilizing the finished message FN as an initial vector (IV), can be used in common key encryption-decryption in steps S1020 to S1022. In other words, if the cryptosystem list is not restricted in step S1003 in this embodiment, the handshake messages (communication log information) between the first apparatus 1110 and the relay apparatus 1130 agree with the handshake messages (communication log information) between the relay apparatus 1130 and the second apparatus 1020, and the finished messages between the first apparatus 1110 and the relay apparatus 1130 also agree with the finished messages between the relay apparatus 1130 and the second apparatus 1020 (see FIG. 57). More specifically, the finished message FN1 (first finished message) becomes the same as the finished message FN3 (second finished message), and the finished message FN2 (fourth finished message) becomes the same as the finished message FN4 (third finished message).

Consequently, the finished message FN1 (first finished message) and/or the finished message FN2 (fourth finished message) can be used as an initial vector when the first apparatus 1110 performs encryption or decryption using the common key MS determined by the secret information PMS in a block cipher mode (such as the CBC mode) requiring the initial vector. The finished message FN3 (second finished message) and/or the finished message FN4 (third finished message) can be used as an initial vector when the second apparatus 1020 performs encryption or decryption using the common key MS determined by the secret information PMS in a block cipher mode (such as the CBC mode) requiring the initial vector.

Seventeenth Embodiment

A seventeenth embodiment of the present invention will now be described.

This embodiment is a modification of the fifteenth embodiment. In this embodiment, the common key is shared without storing the secret key of the second apparatus in the relay apparatus. The relay apparatus needs to encrypt the secret information PMS again so that the same common key MS can be shared between the first apparatus and the relay apparatus and between the second apparatus and the relay apparatus. On the other hand, processing to store the secret key of the second apparatus in the relay apparatus can be omitted.

Differences from the fifteenth embodiment will be described mainly, and a description of items in common with the fifteenth embodiment will be omitted.

[Overall Structure]

Figure 59:
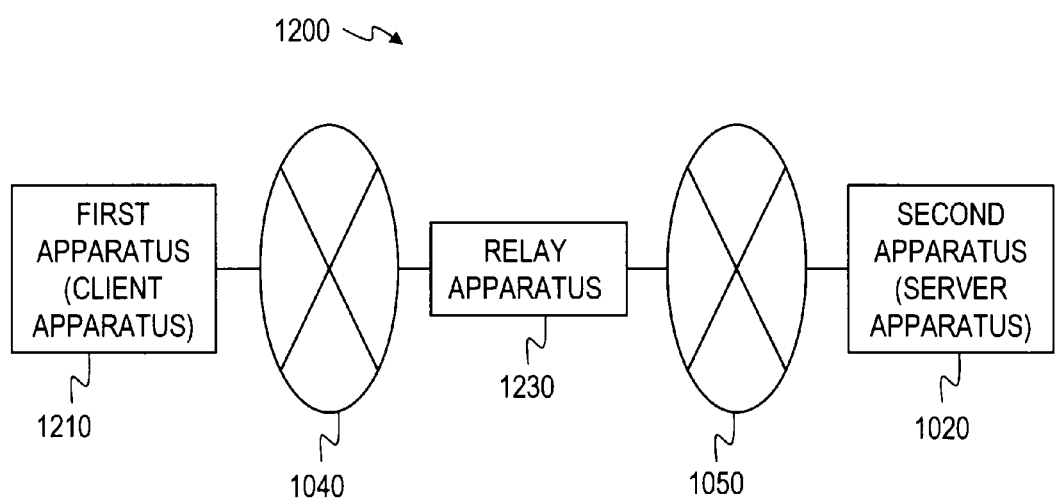
FIG. 59 is a block diagram illustrating the overall structure of a common key cryptosystem communication system according to a seventeenth embodiment.

FIG. 59 is a block diagram illustrating the overall structure of a common key cryptosystem communication system 1200 in the seventeenth embodiment. In FIG. 59, elements identical to those in the fifteenth embodiment are indicated by the same reference characters as in FIG. 47, and a description of those elements will be omitted.

As shown in FIG. 59, the common key cryptosystem communication system 1200 of this embodiment includes a first apparatus 1210 (a client apparatus, for example), a second apparatus 1020 (a server apparatus, for example), and a relay apparatus 1230 (a gateway apparatus, for example). The first apparatus 1210 and the relay apparatus 1230 are connected through a network 1040 to allow communication between them, and the second apparatus 1020 and the relay apparatus 1230 are connected through a network 1050 to allow communication between them.

The first apparatus 1210 and the second apparatus 1020 are apparatuses that perform processing in accordance with a protocol (such as SSL, TLS, or the like) including authentication between two apparatuses, sharing of a common key between the two apparatuses by using a cryptography technology, and processing for checking the validity of a common key setting process by using secret information for identifying the common key and communication log information between the two apparatuses. The relay apparatus 1230 is an apparatus for performing new unique processing in this embodiment. In FIG. 59, to simplify the description, one first apparatus 1210 and one second apparatus 1020 are connected to the relay apparatus 1230 to allow communication between them. However, two or more first apparatuses 1210 and second apparatuses 1020 may be connected to the relay apparatus 1230 to allow communication between them. The structure may also include a plurality of relay apparatuses 1230.

[First Apparatus]

The first apparatus 1210 in this embodiment is implemented by a well-known computer that includes a CPU, a RAM, a ROM, a communication device, and the like when a predetermined program is read into the computer and executed by the CPU.

Figure 60:
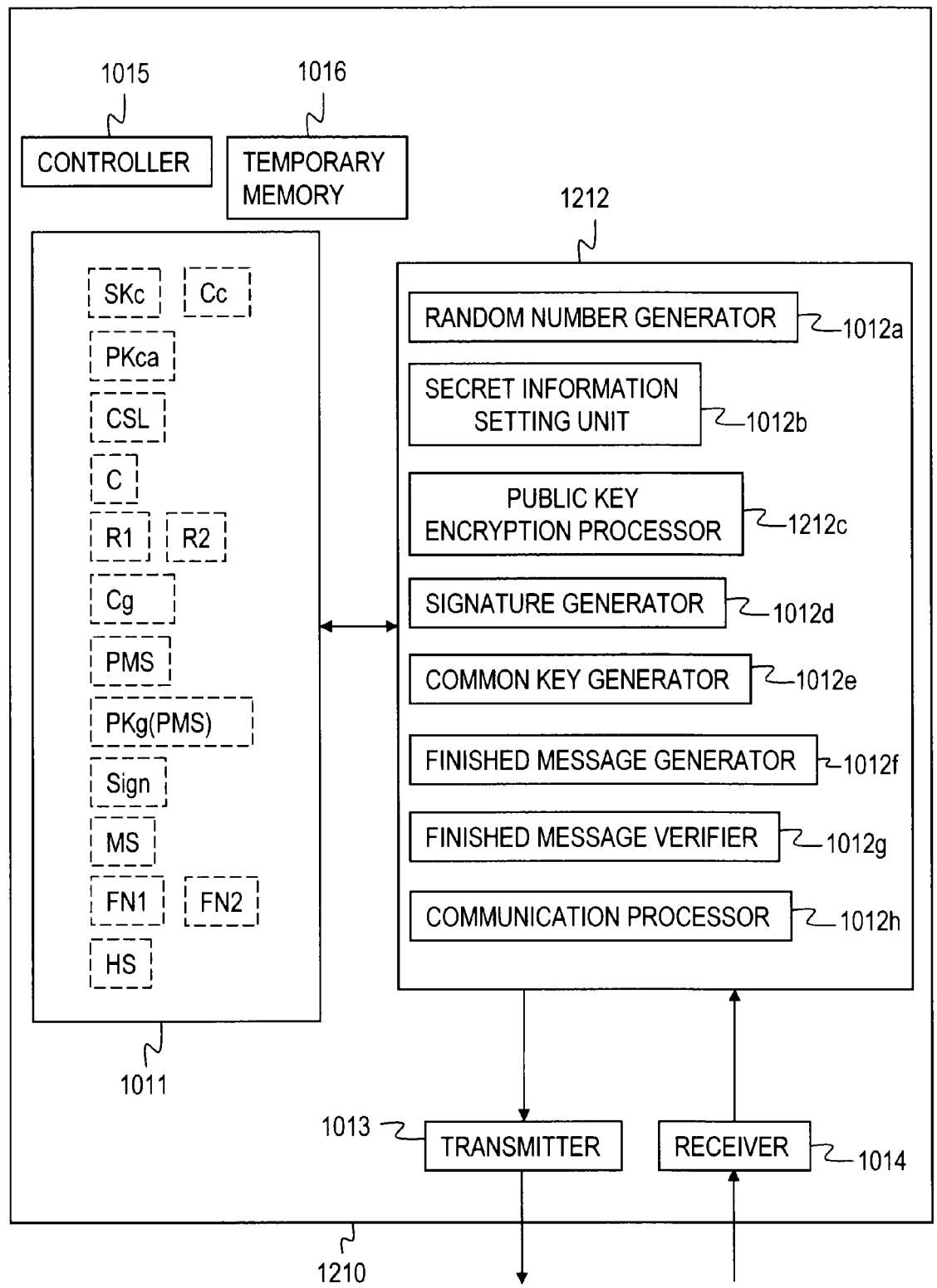
FIG. 60 is a block diagram illustrating the functional structure of a first apparatus in the seventeenth embodiment.

FIG. 60 is a block diagram illustrating the functional structure of the first apparatus 1210 in the seventeenth embodiment.

As shown in FIG. 60, the first apparatus 1210 in this embodiment includes a memory 1011, a calculator 1212, a transmitter 1013, a receiver 1014, a controller 1015, and a temporary memory 1016. The calculator 1212 includes a random number generator 1012*a*, a secret information setting unit 1012*b*, a public key encryption processor 1212*c*, a signature generator 1012*d*, a common key generator 1012*e*, a finished message generator 1012*f*, a finished message verifier 1012*g*, and a communication processor 1012*h*. The first apparatus 1210 executes processing under the control of the controller 1015. Unless otherwise specified explicitly, each data item generated in each calculation process is stored in the temporary memory 1016 and is read out for a different calculation. The calculator 1212 in this embodiment is a processor implemented when predetermined programs are read into the CPU and executed by the CPU.

[Second Apparatus]

The second apparatus is the same as in the fifteenth embodiment.

[Relay Apparatus]

The relay apparatus 1230 in this embodiment is implemented by a well-known computer that includes a CPU, a RAM, a ROM, a communication device, and the like when a predetermined program is read into the computer and executed by the CPU.

Figure 61:
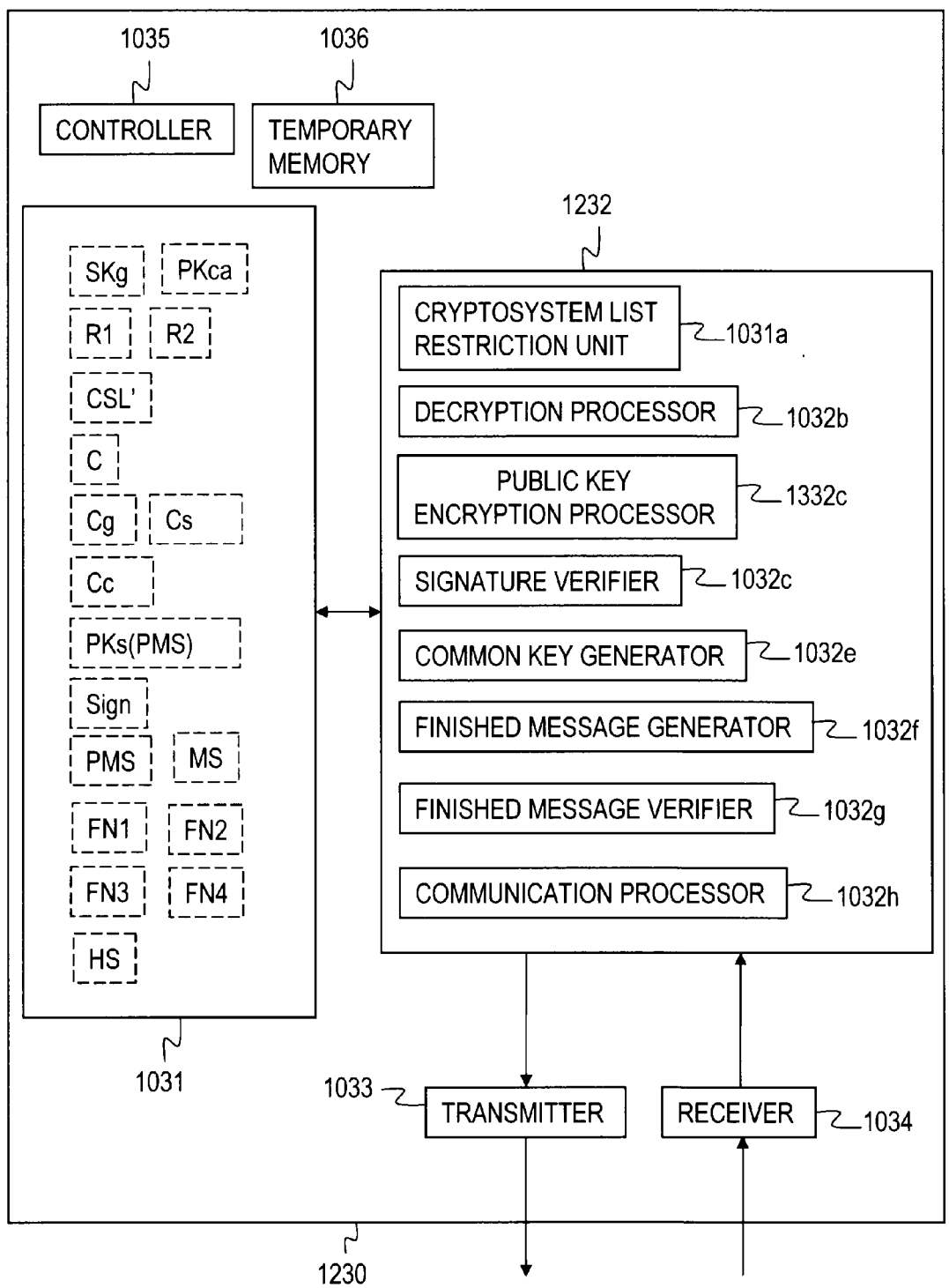
FIG. 61 is a block diagram illustrating the functional structure of a relay apparatus in the seventeenth embodiment.

FIG. 61 is a block diagram illustrating the functional structure of the relay apparatus 1230 in the seventeenth embodiment.

As shown in FIG. 61, the relay apparatus 1230 in this embodiment includes a memory 1031, a calculator 1232, a transmitter 1033, a receiver 1034, a controller 1035, and a temporary memory 1036. The calculator 1232 includes a cryptosystem list restriction unit 1031a, a decryption processor 1032b, a signature verifier 1032c, a public key encryption processor 1332c, a common key generator 1032e, a finished message generator 1032f, a finished message verifier 1032g, and a communication processor 1032h. The relay apparatus 1230 executes processing under the control of the controller 1035. Unless otherwise specified explicitly, each data item generated in each calculation process is stored in the temporary memory 1036 and is read out for a different calculation. The calculator 1232 in this embodiment is a processor implemented when predetermined programs are read into the CPU and executed by the CPU.

<Processing>

The processing in this embodiment will be described next.

[Prerequisites]

A difference from the fifteenth embodiment is that a pair of keys (public key, secret key) of a public key cryptosystem (such as RSA) is generated for the relay apparatus 1230. Each key pair may be generated for each of a plurality of cryptosystems. A secret key SKg of the relay apparatus 1230 is stored in the memory 1031 of the relay apparatus 1230, a certification authority issues a public key certificate Cg for a public key PKg of the relay apparatus 1230 corresponding to the secret key SKg, and the public key certificate Cg is stored in the memory 1031 of the relay apparatus 1230. The rest is the same as in the fifteenth embodiment.

[Overall Processing]

Figure 62:
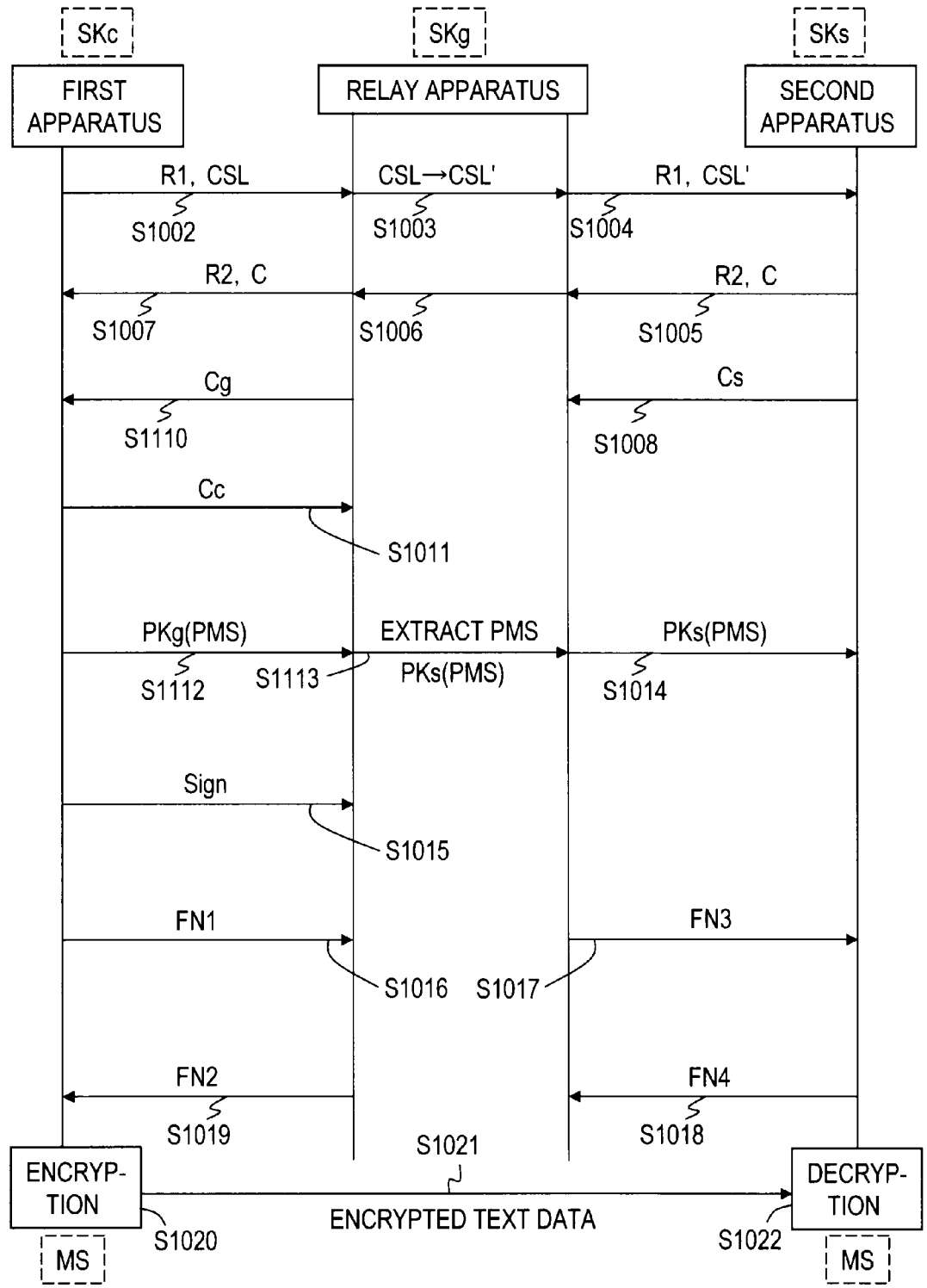
FIG. 62 is a sequence diagram illustrating the overall processing in the seventeenth embodiment.

FIG. 62 is a sequence diagram illustrating the overall processing in the seventeenth embodiment. Only the differences from the fifteenth embodiment will be described below.

The differences from the fifteenth embodiment are the following points: neither step S1001 nor step S1009 is executed; step S1110, which will be described below, is executed in place of step S1010; and steps S1112 and S1113, which will be described later, are executed in place of steps S1012 and S1013, respectively.

<<Step S1110>>

In step S1110, the communication processor 1032h of the relay apparatus 1230 reads the public key certificate Cg of the relay apparatus 1230 from the memory 1031 and sends it to the transmitter 1033. The transmitter 1033 sends the public key certificate Cg of the relay apparatus 1230 through the network 1040 to the first apparatus 1210 (public key certificate forwarding process). The sent public key certificate Cg of the relay apparatus 1230 is received by the receiver 1014 of the first apparatus 1210 (FIG. 60) and is sent to the communication processor 1012h. The communication processor 1012h stores the public key certificate Cg of the relay apparatus 1230 in the memory 1011.

<<Step S1112>>

The secret information setting unit 1012b of the first apparatus 1210 (FIG. 60) specifies secret information PMS (premaster secret) for identifying the common key MS (master secret) and stores it in the memory 1011. The communication processor 1012h of the first apparatus 1210 reads the public key certificate Cg of the relay apparatus 1230 from the memory 1011 and obtains a public key PKca of the CA which has issued the public key certificate Cg of the relay apparatus 1230 from the certification authority apparatus, not shown, connected to the network 1040. The obtained public key PKca of the CA is stored in the memory 1011. The communication processor 1012h reads the public key certificate Cg of the relay apparatus 1230 and the public key PKca of the CA from the memory 1011 and verifies the public key certificate Cg of the relay apparatus 1230 by using the public key PKca of the CA. If the verification is finished successfully, the public key encryption processor 1212c reads from the memory 1011 the secret information PMS, the public key PKg of the relay apparatus 1230 included in the public key certificate Cg, and the cryptosystem C, generates encrypted text PKg(PMS) (first encrypted secret information, EncryptedPreMasterSecret message) by encrypting the secret information PMS by using the public key PKg according to the cryptosystem indicated by the cryptosystem C, and stores it in the memory 1011 (secret information encrypting process). Information (ClientKeyExchange message) that includes the generated encrypted text PKg(PMS) is sent to the transmitter 1013, and the transmitter 1013 sends the ClientKeyExchange message, including the encrypted text PKg(PMS) (encrypted secret information), through the network 1040 to the relay apparatus 1230 (encrypted secret information sending process).

<<Step S1113>>

The ClientKeyExchange message is received by the receiver 1034 of the relay apparatus 1230 (FIG. 61) and is sent to the communication processor 1032h. The communication processor 1032h stores the encrypted text PKg(PMS) (first encrypted secret information) included in the ClientKeyExchange message in the memory 1031. The decryption processor 1032b reads from the memory 1031 the cryptosystem C and the secret key SKg of the relay apparatus 1230, corresponding to the cryptosystem C. The decryption processor 1032b also reads the encrypted text PKg(PMS) from the memory 1031 and decrypts it with the secret key SKg to extract the secret information PMS (first secret information decrypting process). The extracted secret information PMS is stored in the memory 1031.

The communication processor 1032h of the relay apparatus 1230 reads the public key certificate Cs of the second apparatus 1020 from the memory 1031 and obtains the public key PKca of the CA which has issued the public key certificate Cs of the second apparatus 1020 from the certification authority apparatus, not shown, connected to the network 1040. The obtained public key PKca of the CA is stored in the memory 1031. The communication processor 1032h reads the public key certificate Cs of the second apparatus 1020 and the public key PKca of the CA from the memory 1031 and verifies the public key certificate Cs of the second apparatus 1020 by using the public key PKca of the CA. If the verification is finished successfully, the public key encryption processor 1332c reads from the memory 1031 the secret information PMS, the public key PKs of the second apparatus 1020 included in the public key certificate Cs, and the cryptosystem C, generates encrypted text PKs(PMS) (encrypted secret information, EncryptedPreMasterSecret message) by encrypting the secret information PMS by using the public key PKs according to the cryptosystem indicated by the cryptosystem C, and stores it in the memory 1031 (second secret information encrypting process).

[Processing in Relay Apparatus]

Figure 63:
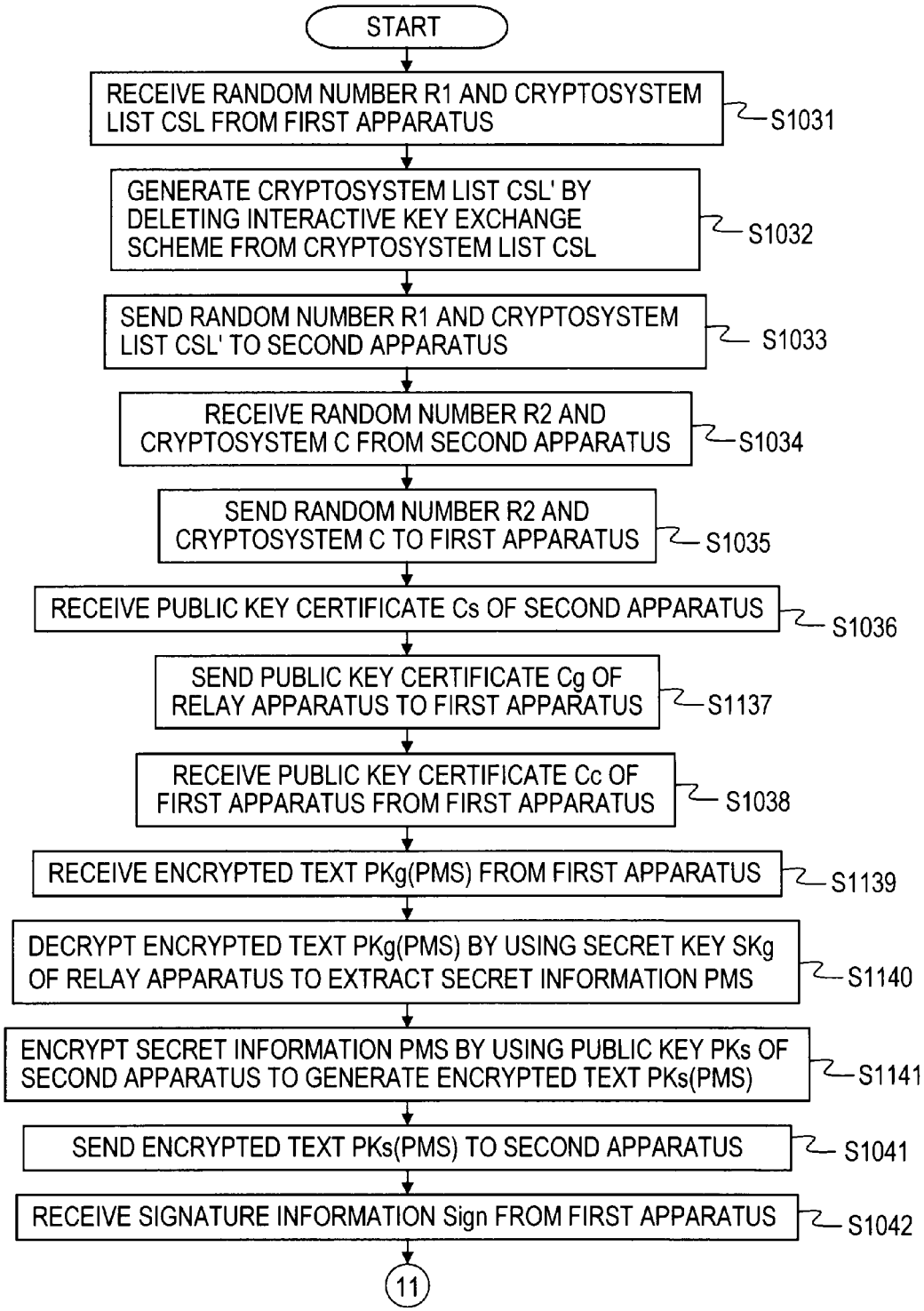
FIG. 63 is a flowchart illustrating processing in the relay apparatus in the seventeenth embodiment.

FIG. 63 is a flowchart illustrating the processing in the relay apparatus 1230 in the seventeenth embodiment. Only the differences from the fifteenth embodiment will be described below.

The differences from the fifteenth embodiment are the following points: Step S1137, which will be described below, is executed instead of step S1037; steps 1139 and S1140, which will be described later, are executed instead of steps S1039 and S1040, respectively; and step S1141, which will be described later, is executed between steps S1140 and S1041.

<<Step S1137>>

The transmitter 1033 sends the public key certificate Cg of the relay apparatus 1230 through the network 1040 to the first apparatus 1210 (public key certificate forwarding process).

<<Step S1139>>

The receiver 1034 of the relay apparatus 1230 receives information (ClientKeyExchange message) that includes the encrypted text PKg(PMS) and sends it to the communication processor 1032h.

<<Step S1140>>

The communication processor 1032h stores the encrypted text PKg(PMS) (first encrypted secret information) included in the ClientKeyExchange message in the memory 1031. The decryption processor 1032b decrypts the encrypted text PKg (PMS) by using the secret key SKg to extract the secret information PMS, as described earlier (first secret information decrypting process). The secret information PMS is stored in the memory 1031.

<<Step S1141>>

The communication processor 1032h of the relay apparatus 1230 reads the public key certificate Cs of the second apparatus 1020 from the memory 1031 and obtains the pubic key PKca of the CA which has issued the public key certificate Cs of the second apparatus 1020 from the certification authority apparatus, not shown, connected to the network 1040. The obtained public key PKca of the CA is stored in the memory 1031. The communication processor 1032h reads the public key certificate Cs of the second apparatus 1020 and the public key PKca of the CA from the memory 1031 and verifies the public key certificate Cs of the second apparatus 1020 by using the public key PKca of the CA. If the verification is finished successfully, the public key encryption processor 1332c reads from the memory 1031 the secret information PMS, the public key PKs of the second apparatus 1020 included in the public key certificate Cs, and the cryptosystem C, generates encrypted text PKs(PMS) (encrypted secret information, EncryptedPreMasterSecret message) by encrypting the secret information PMS in accordance with the cryptosystem indicated by the cryptosystem C by using the public key PKs, and stores it in the memory 1031 (second secret information encrypting process).

<Features of Present Embodiment>

As in the fifteenth embodiment, the identical common key MS can be shared between the first apparatus 1210 and the relay apparatus 1230 and between the second apparatus 1020 and the relay apparatus 1230 in this embodiment. As in the fifteenth embodiment, finished messages corresponding to the same secret information PMS can be generated in both parties of communications between the first apparatus 1210 and the relay apparatus 1230 and between the second apparatus 1020 and the relay apparatus 1230, respectively. Consequently, the first apparatus 1210 and the second apparatus 1020 performing processing in accordance with the protocol (such as TLS or the like) can share the same common key through the relay apparatus 1230, without changing their specifications.

Eighteenth Embodiment

An eighteenth embodiment of the present invention will now be described.

This embodiment is a modification of the seventeenth embodiment. Differences from the fifteenth or seventeenth embodiment will be described mainly, and a description of items in common with the fifteenth or seventeenth embodiment will be omitted.

[Overall Structure]

Figure 64:
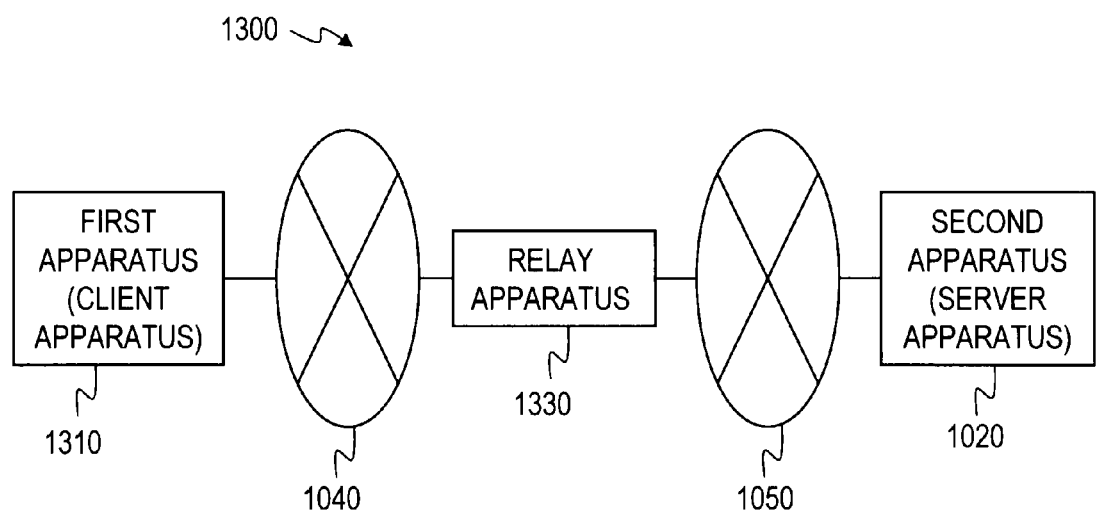
FIG. 64 is a block diagram illustrating the overall structure of a common key cryptosystem communication system according to an eighteenth embodiment.

FIG. 64 is a block diagram illustrating the overall structure of a common key cryptosystem communication system 1300 in the eighteenth embodiment. In FIG. 64, elements identical to those in the fifteenth embodiment are indicated by the same reference characters as in FIG. 47, and a description of those elements will be omitted.

As shown in FIG. 64, the common key cryptosystem communication system 1300 of this embodiment includes a first apparatus 1310 (a client apparatus, for example), a second apparatus 1020 (a server apparatus, for example), and a relay apparatus 1330 (a gateway apparatus, for example). The first apparatus 1310 and the relay apparatus 1330 are connected through a network 1040 to allow communication between them, and the second apparatus 1020 and the relay apparatus 1330 are connected through a network 1050 to allow communication between them.

The first apparatus 1310 and the second apparatus 1020 are apparatuses that perform processing in accordance with a protocol (such as SSL, TLS or the like) including authentication between two apparatuses, sharing of a common key between the two apparatuses by using a cryptography technology, and processing for checking the validity of a common key setting process by using secret information for identifying the common key and communication log information between the two apparatuses. The relay apparatus 1330 is an apparatus for performing new unique processing in this embodiment. To simplify the description, in FIG. 64, one first apparatus 1310 and one second apparatus 1020 are connected to the relay apparatus 1330 to allow communication between them. However, two or more first apparatuses 1310 and second apparatuses 1020 may be connected to the relay apparatus 1330 to allow communication between them. The structure may also include a plurality of relay apparatuses 1330.

[First Apparatus]

The first apparatus 1310 in this embodiment is implemented by a well-known computer that includes a CPU, a RAM, a ROM, a communication device, and the like when a predetermined program is read into the computer and executed by the CPU.

Figure 65:
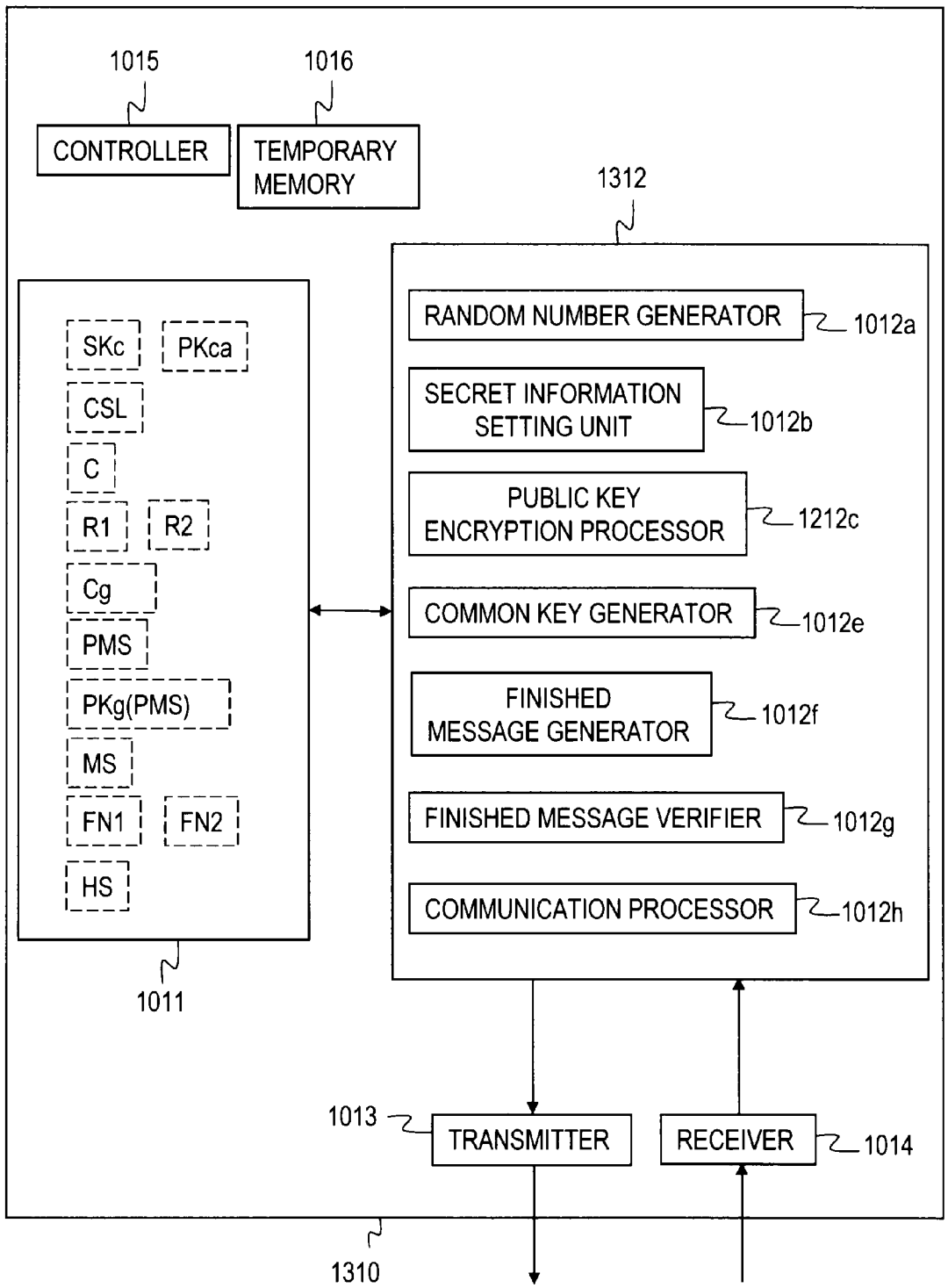
FIG. 65 is a block diagram illustrating the functional structure of a first apparatus in the eighteenth embodiment.

FIG. 65 is a block diagram illustrating the functional structure of the first apparatus 1310 in the eighteenth embodiment.

As shown in FIG. 65, the first apparatus 1310 in this embodiment includes a memory 1011, a calculator 1312, a transmitter 1013, a receiver 1014, a controller 1015, and a temporary memory 1016. The calculator 1312 includes a random number generator 1012a, a secret information setting unit 1012b, a public key encryption processor 1212c, a common key generator 1012e, a finished message generator 1012f, a finished message verifier 1012g, and a communication processor 1012h. The first apparatus 1310 executes processing under the control of the controller 1015. Unless otherwise specified explicitly, each data item generated in each calculation process is stored in the temporary memory 1016 and is read out for a different calculation. The calculator 1312 in this embodiment is a processor implemented when predetermined programs are read into the CPU and executed by the CPU.

[Second Apparatus]

The second apparatus is the same as in the fifteenth embodiment.

[Relay Apparatus]

The relay apparatus 1330 in this embodiment is implemented by a well-known computer that includes a CPU, a RAM, a ROM, a communication device, and the like when a predetermined program is read into the computer and executed by the CPU.

Figure 66:
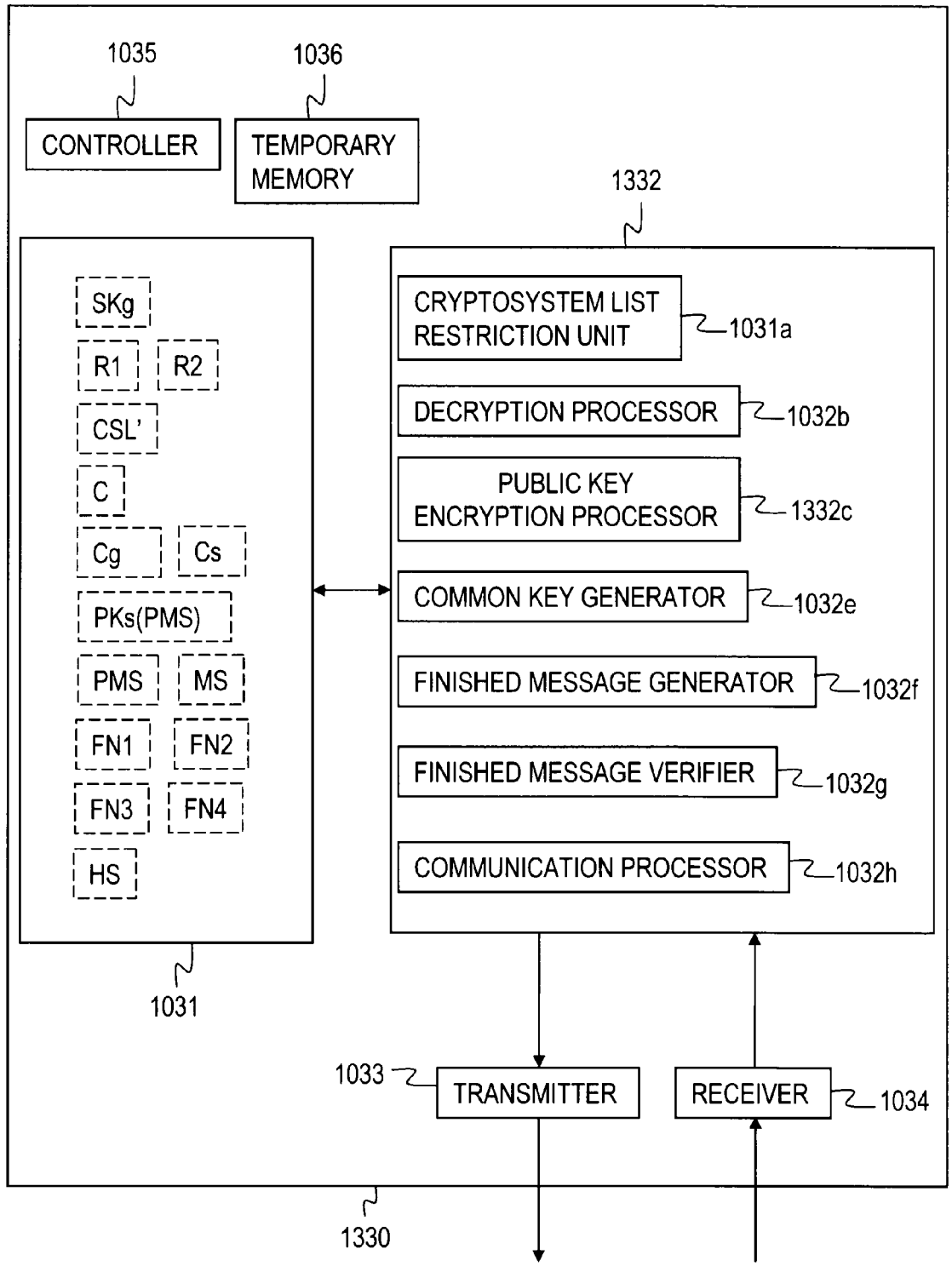
FIG. 66 is a block diagram illustrating the functional structure of a relay apparatus in the eighteenth embodiment.

FIG. 66 is a block diagram illustrating the functional structure of the relay apparatus 1330 in the eighteenth embodiment.

As shown in FIG. 66, the relay apparatus 1330 in this embodiment includes a memory 1031, a calculator 1332, a transmitter 1033, a receiver 1034, a controller 1035, and a temporary memory 1036. The calculator 1332 includes a cryptosystem list restriction unit 1031*a*, a decryption processor 1032*b*, a public key encryption processor 1332*c*, a common key generator 1032*e*, a finished message generator 1032*f*, a finished message verifier 1032*g*, and a communication processor 1032*h*. The relay apparatus 1330 executes processing under the control of the controller 1035. Unless otherwise specified explicitly, each data item generated in each calculation process is stored in the temporary memory 1036 and is read out for a different calculation. The calculator 1332 in this embodiment is a processor implemented when predetermined programs are read into the CPU and executed by the CPU.

<Processing>

The processing in this embodiment will be described next.

[Prerequisites]

A difference from the seventeenth embodiment is that the secret key of the first apparatus is not stored in the first apparatus 1310. The rest is the same as in the seventeenth embodiment.

[Overall Processing]

Figure 67:
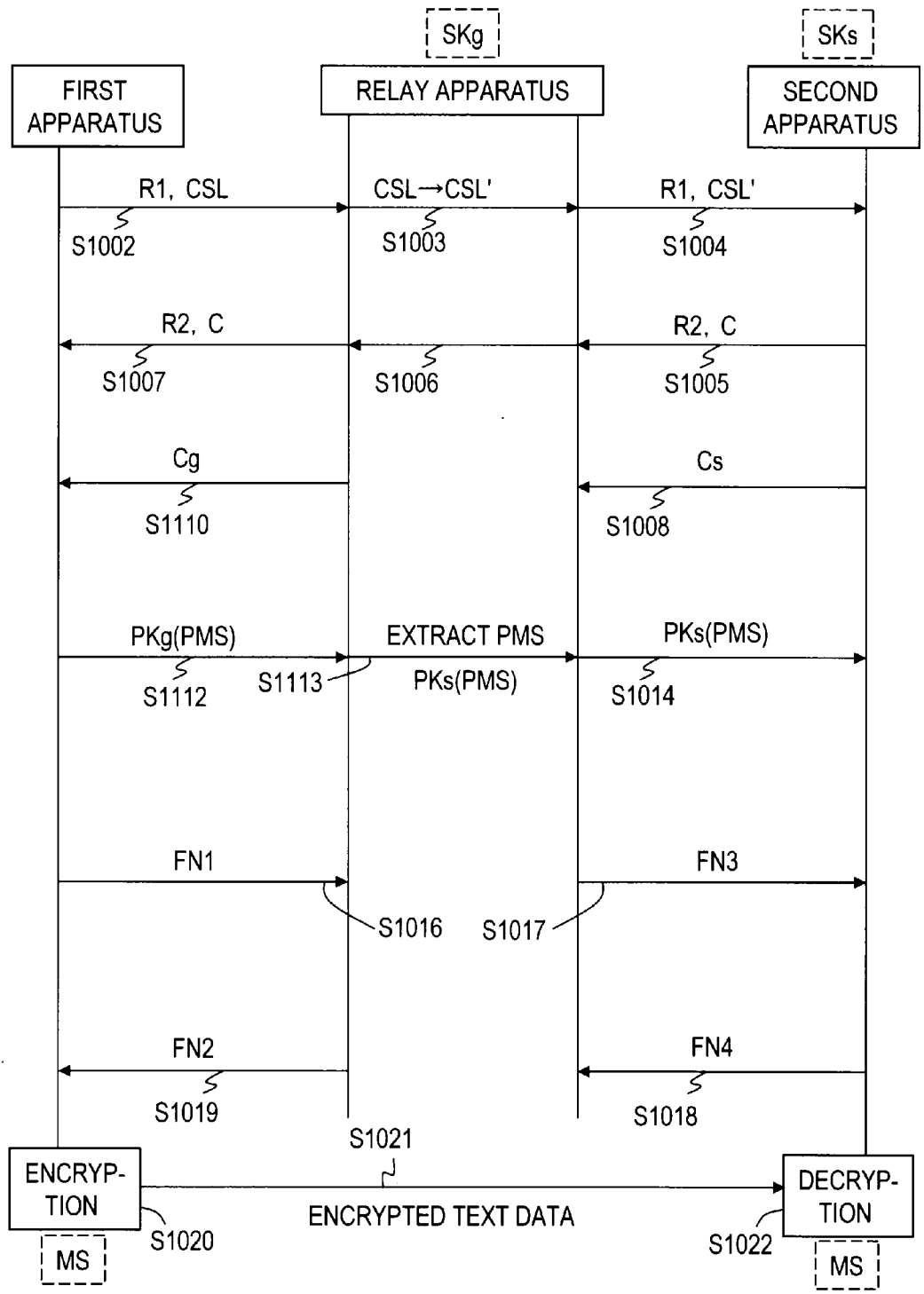
FIG. 67 is a sequence diagram illustrating the overall processing in the eighteenth embodiment.

FIG. 67 is a sequence diagram illustrating the overall processing in the eighteenth embodiment. Only the differences from the seventeenth embodiment will be described.

The differences from the seventeenth embodiment are that neither the second public key certificate sending process (step S1011) nor the signature information sending process (step S1015) is executed. The rest is the same as in the seventeenth embodiment.

[Processing in Relay Apparatus]

Figure 68:
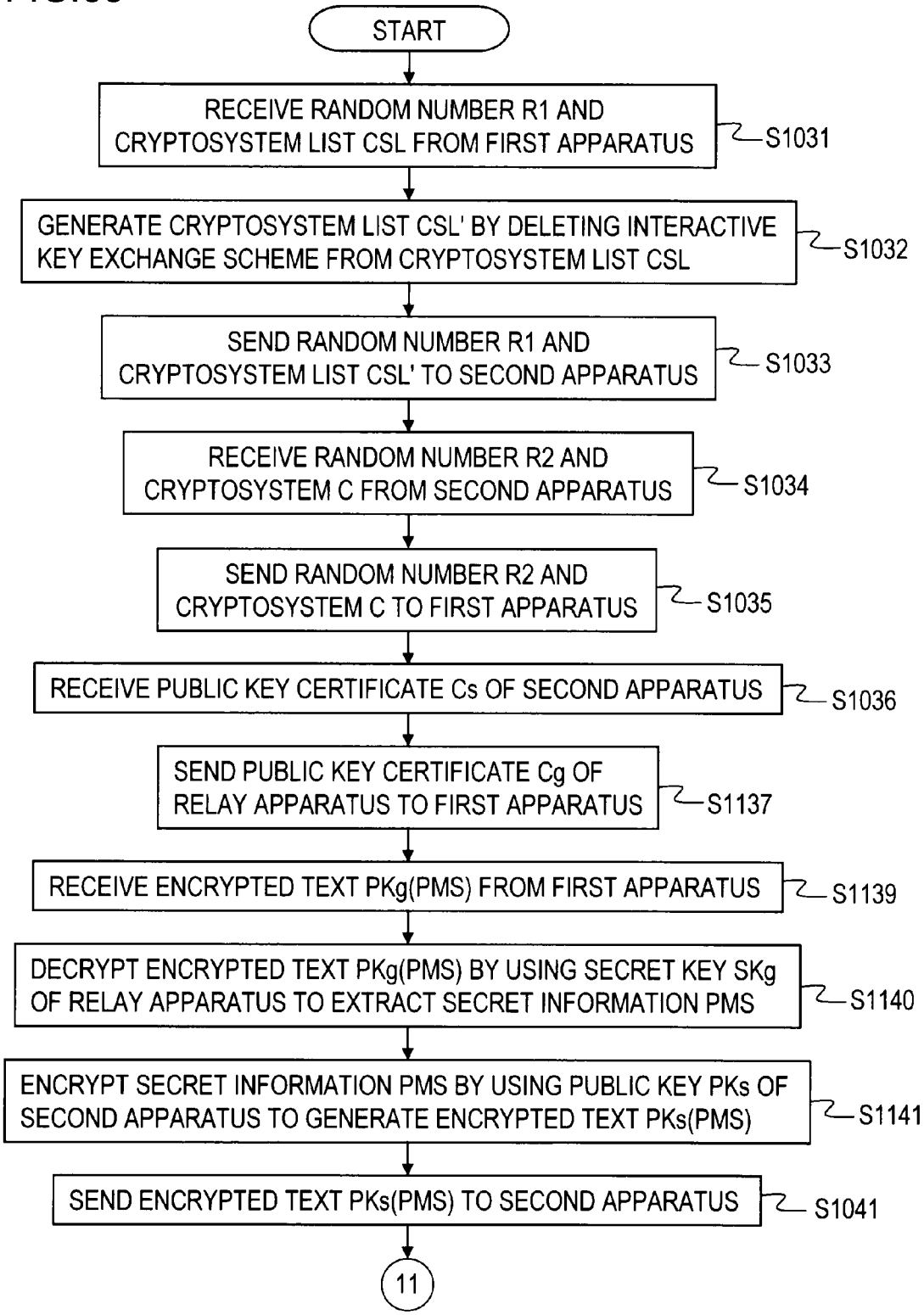
FIG. 68 is a flowchart illustrating processing in the relay apparatus in the eighteenth embodiment.

FIG. 68 is a flowchart illustrating the processing in the relay apparatus 1330 of the eighteenth embodiment. Only the differences from the seventeenth embodiment will be described.

The differences from the seventeenth embodiment are that neither the processing in step S1038 nor the processing in steps S1042 to S1044 is executed. The rest is the same as in the seventeenth embodiment.

<Features of Present Embodiment>

As in the fifteenth embodiment, the identical common key MS can be shared between the first apparatus 1310 and the relay apparatus 1330 and between the second apparatus 1020 and the relay apparatus 1330 in this embodiment. As in the fifteenth embodiment, finished messages corresponding to the same secret information PMS can be generated in both parties of communications between the first apparatus 1310 and the relay apparatus 1330 and between the second apparatus 1020 and the relay apparatus 1330, respectively. Consequently, the first apparatus 1310 and the second apparatus 1020 performing processing in accordance with the protocol (such as TLS or the like) can share the same common key through the relay apparatus 1330, without changing their specifications.

Nineteenth Embodiment

This embodiment is a modification of the fifteenth to eighteenth embodiments described above. After the transmission and reception of finished messages (step S1019) end, the first apparatus, the second apparatus, and the relay apparatus make a re-connection by re-using the session that has already been established in processing up to step S1019, and send and receive new finished messages. This can make the finished messages sent and received by the first apparatus and the finished messages sent and received by the second apparatus the same as each other. Consequently, the first apparatus and the second apparatus can perform encryption or decryption by using the common key MS in a block cipher mode (such as the CBC mode) using the finished messages as an initial vector. Processing in and after step S1019 in the embodiments will be described below. Processing in this embodiment can be applied to any of the embodiments described above. To simplify the description, an example of adding the processing of this embodiment to the fifteenth embodiment will be described. Prerequisites of the processing in this embodiment are as follows: The ServerHello message (steps S1005 to S1007) in each embodiment includes a session identifier (session id) generated by the second apparatus; in the process of sending the ServerHello message, the session identifier (session id) is stored in the memories of the first apparatus, the second apparatus, and the relay apparatus and is associated with the secret information PMS.

Figure 69:
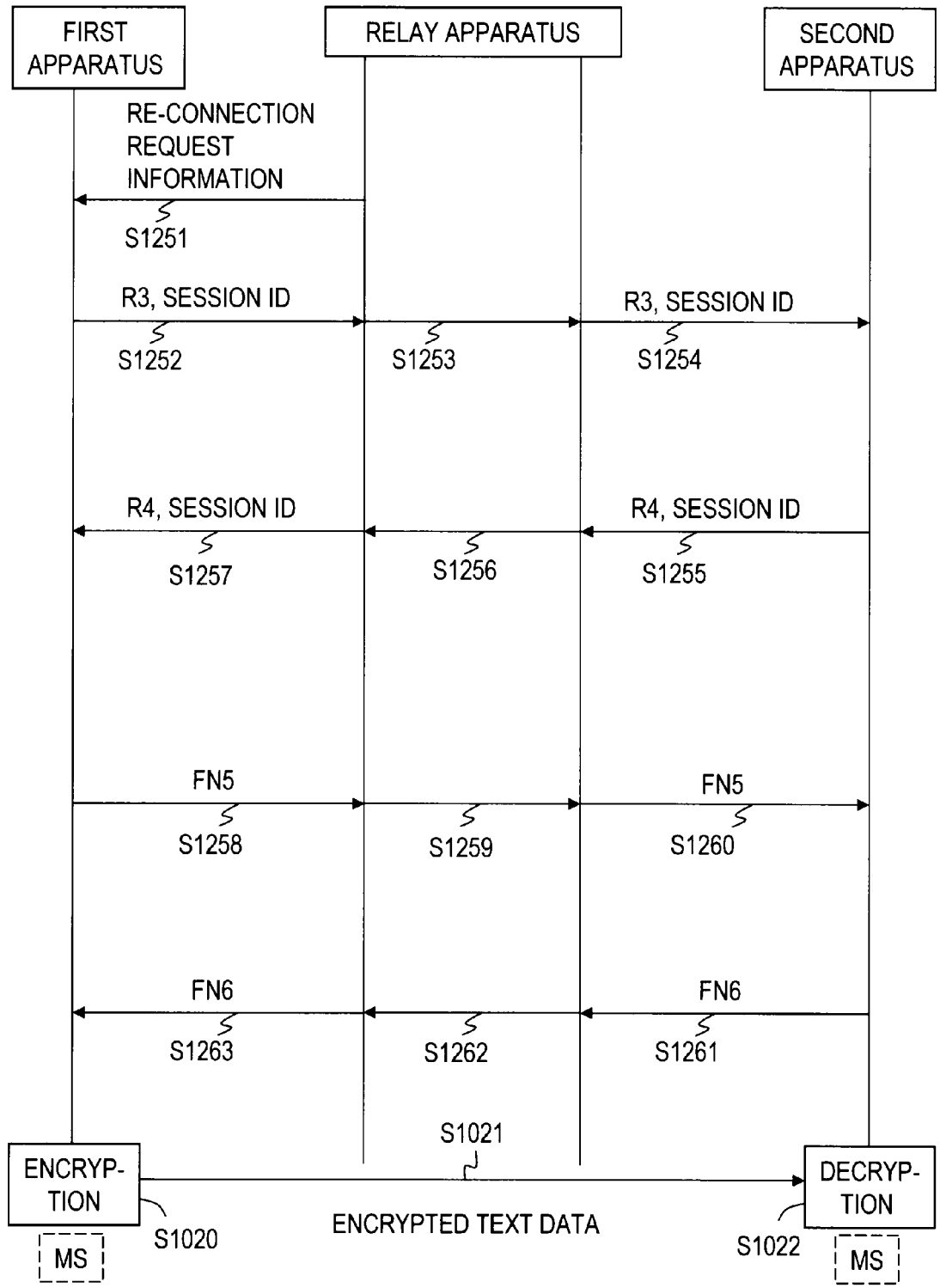
FIG. 69 is a sequence diagram illustrating additional processing in a nineteenth embodiment.

FIG. 69 is a sequence diagram illustrating additional processing in the nineteenth embodiment.

The transmitter 1033 of the relay apparatus 1030 sends re-connection request information to the first apparatus 1010 (step S1251). The information is received by the receiver 1014 of the first apparatus 1010 and is sent to the communication processor 1012*h*. After that, the random number generator 1012*a* generates a random number R3 and sends it to the communication processor 1012*h*. The communication processor 1012*h* reads the session identifier (session id) from the memory 1011, generates transmission start request information (ClientHello message) that includes the random number R3 and the session identifier, and sends it to the transmitter 1013. The transmitter 1013 sends the transmission start request information (ClientHello message) to the relay apparatus 1030. The information is received by the receiver 1034 of the relay apparatus 1030 (step S1252). The transmission start request information (ClientHello message) is sent from the transmitter 1033 of the relay apparatus 1030 (step S1253), is received by the receiver 1024 of the second apparatus 1020 (step S1254), and is sent to the communication processor 1022*h*. After that, the random number generator 1022*a* of the second apparatus 1020 generates a random number R4 and sends it to the communication processor 1022*h*. The communication processor 1022*h* reads the session identifier (session id) from the memory 1021, generates transmission start response information (ServerHello message) that includes the random number R4 and the session identifier, and sends the information to the transmitter 1023. The transmitter 1023 sends the transmission start response information (ServerHello message) to the relay apparatus 1030, and the information is received by the receiver 1034 of the relay apparatus 1030 (step S1255). The transmission start response information (ServerHello message) is sent from the transmitter 1033 of the relay apparatus 1030 (step S1256), is received by the receiver 1014 of the first apparatus 1010 (step S1257), and is sent to the communication processor 1012h.

After the first apparatus 1010 sends the ChangeCipherSpec message (which includes the initialization of the initial vector, for example) through the relay apparatus 1030 to the second apparatus 1020, the finished message generator 1012f of the first apparatus 1010 reads from the memory 1011 the common key MS, communication log information HS5 between the first apparatus 1010 and the relay apparatus 1030 obtained in and after step S1252, and the secret information PMS, generates a fifth finished message FN5 by encrypting information corresponding to the secret information PMS and the communication log information HS5 by using the common key MS, and stores it in the memory 1011 (fifth finished message generating process). An example of the communication log information HS5 between the first apparatus 1010 and the relay apparatus 1030 is all the handshake messages in and after step S1252, except the ChangeCipherSpec message, and includes the random number R3 and the random number R4. An example of the fifth finished message FN5 is encrypted text obtained by encrypting the secret information PMS (premaster secret), a character string (finished label), and the value of the connect bits of the MD5 hash value of the communication log information HS5 and the SHA-1 hash value of the communication log information HS5, by using the common key MS according to the common key cryptosystem. The generated fifth finished message FN5 is sent to the transmitter 1013 and is then sent to the relay apparatus 1030 (step S1258). The fifth finished message FN5 is received by the receiver 1034 of the relay apparatus 1030 (step S1259) and is further sent from the transmitter 1033 to the second apparatus 1020 (fifth finished message sending process, step S1260).

After the second apparatus 1020 sends the ChangeCipherSpec message (which includes the initialization of the initial vector, for example) through the relay apparatus 1030 to the first apparatus 1010, the finished message generator 1022f of the second apparatus 1020 reads from the memory 1021 the common key MS, communication log information HS6 between the second apparatus 1020 and the relay apparatus 1030 obtained in and after step S1252, and the secret information PMS, generates a sixth finished message FN6 by encrypting information corresponding to the secret information PMS and the communication log information HS6, by using the common key MS, and stores it in the memory 1021 (sixth finished message generating process). The generated sixth finished message FN6 is sent to the transmitter 1023, which sends it to the relay apparatus 1030 (step S1261). The sixth finished message FN6 is received by the receiver 1034 of the relay apparatus 1030 (step S1262) and is further sent from the transmitter 1033 to the first apparatus 1010 (sixth finished message sending process, step S1263).

The common key encryption processor, not shown, of the first apparatus 1010 and the common key encryption processor, not shown, of the second apparatus 1020 can perform encryption or decryption in a block cipher mode (such as the CBC mode) using the fifth finished message FN5 and/or the sixth finished message FN6 as an initial vector.

<Features of Present Embodiment>

As has been described above, after the fourth finished message sending process (step S1019) in this embodiment, the transmitter of the first apparatus sends the transmission start request information (ClientHello message) to the relay apparatus; the transmitter of the relay apparatus sends the transmission start request information (ClientHello message) to the second apparatus; the transmitter of the second apparatus sends the transmission start response information (ServerHello message) to the relay apparatus; and the transmitter of the relay apparatus sends the transmission start response information (ServerHello message) to the first apparatus (reconnection starting process). Then, the finished message generator of the first apparatus generates the fifth finished message by encrypting information corresponding to the secret information PMS and the communication log information between the first apparatus and the relay apparatus obtained in and after the re-connection starting process, by using the common key MS determined by the secret information PMS (fifth finished message generating process); the transmitter of the first apparatus sends the fifth finished message to the relay apparatus; and the transmitter of the relay apparatus sends the fifth finished message to the second apparatus (fifth finished message sending process). The finished message generator of the second apparatus generates the sixth finished message by encrypting information corresponding to the secret information PMS and the communication log information between the second apparatus and the relay apparatus obtained in and after the re-connection starting process, by using the common key MS determined by the secret information PMS (sixth finished message generating process); the transmitter of the second apparatus sends the sixth finished message to the relay apparatus; and the transmitter of the relay apparatus sends the sixth finished message to the first apparatus (sixth finished message sending process).

The fifth finished message sent by the first apparatus is the same as the fifth finished message received by the second apparatus, and the sixth finished message sent by the second apparatus is the same as the sixth finished message received by the first apparatus. Accordingly, the fifth finished message and/or the sixth finished message can be used as an initial vector in encryption or decryption performed by the first apparatus and the second apparatus by using the common key MS determined by the secret information PMS in a block cipher mode (such as the CBC mode) which requires the initial vector. Therefore, by executing the re-connection processing in this embodiment, encryption or decryption can be performed by using the common key MS shared between the first apparatus and the second apparatus in a block cipher mode (such as the CBC mode) which uses one or both of the finished messages as an initial vector. The re-connection processing in this embodiment is standard processing in TLS or the like when viewed from the first apparatus and the second apparatus. In other words, to perform the processing in this embodiment, there is no need to change the specifications of the first apparatus and the second apparatus.

[Modifications and Others]

The present invention is not limited to the above described embodiments. In each of the above embodiments, when processing using a public key is necessary, a corresponding public key certificate is verified; and when the public key is verified successfully, the public key is used in the processing. A configuration may be used, however, in which a table indicating the correspondence between public keys and the verification results of corresponding public key certificates is stored in a memory, whether a public key is valid is checked by using the table, and the public key is used.

In each of the above embodiments, the first apparatus uses the cryptosystem list CSL and the second apparatus selects a cryptosystem. The present invention may be applied to a protocol which does not perform such operations. In each of the above embodiments, the first apparatus and the second apparatus generate the first random number and the second random number, respectively, to perform a session. Such random numbers are unnecessary when the present invention is applied to a protocol in which a session is performed without generating random numbers.

In each of the above embodiments, the first finished message, the second finished message, the third finished message, and the fourth finished message are calculated and exchanged in that order. When the finished messages do not depend on each other, the finished messages may be calculated and exchanged in other orders.

A configuration may be used in which handshake messages used to generate finished messages are selected such that the finished messages generated for communications between the first apparatus and the relay apparatus are identical to the finished messages generated for communications between the second apparatus and the relay apparatus. This allows that the finished messages generated for communications between the first apparatus and the relay apparatus are identical to the finished messages generated for communications between the second apparatus and the relay apparatus, without performing finished message coordination. In other words, when handshake messages different in communications between the first apparatus and the relay apparatus and communications between the second apparatus and the relay apparatus are not used to generate the finished messages, the finished messages generated for communications between the first apparatus and the relay apparatus can be identical to the finished messages generated for communications between the second apparatus and the relay apparatus.

The timing when each apparatus generates the master secret key MS and the common key Key from the secret information PMS and the like or the timing when each apparatus generates the finished message from the master secret key MS and the handshake messages is not limited to that described above. A configuration may be used in which the first apparatus generates the master secret key MS and the like immediately before the first apparatus generates the first finished message, the relay apparatus generates the maser secret key MS and the like immediately before the relay apparatus verifies the first finished message, and the second apparatus generates the maser secret key MS and the like immediately before the second apparatus verifies the second finished message. The master secret key MS may be used as a key for cryptosystem communication.

The processing described above may be executed in the order in which it is described or may be executed in parallel or separately in accordance with the processing capability of the apparatus that executes the processing or as necessary. Naturally, any modification can be made within the scope of the present invention.

If the structure described above is implemented by a computer, the processing of the function to be provided by each apparatus is described in a program. By executing the program on the computer, the corresponding processing function is implemented on the computer.

The program describing the processing can be recorded on a computer-readable recording medium. The computer-readable recording medium can be any type of magnetic recording device, optical disc, magneto-optical recording medium, or semiconductor memory, for example. More specifically, a hard disk drive, a flexible disk, a magnetic tape or the like can be used as the magnetic recording device; a DVD (digital versatile disc), DVD-RAM (random access memory), CD-ROM (compact disc read only memory), CD-R/RW (recordable/rewritable), or the like can be used as the optical disc; an MO (magneto-optical disc) or the like can be used as a magneto-optical recording medium; and an EEP-ROM (electronically erasable and programmable read only memory) or the like can be used as the semiconductor memory, for example.

The program is distributed by selling, transferring, or lending a portable recording medium, such as a DVD or a CD-ROM, with the program recorded on it, for example. The program may also be distributed by storing the program in a storage device of a server computer and sending the program from the server computer through a network to another computer.

The computer which executes this type of program first temporarily stores the program recorded on the portable recording medium or the program sent from the server computer in its own storage device. When executing the processing, the computer reads the program stored in its recording medium and executes the processing in accordance with the read program. In another style of program execution, the computer may read the program directly from the portable recording medium and may execute the processing in accordance with the program. Further, the computer may also execute the processing in accordance with the received program each time the program is sent from the server computer. The processing may also be executed by a so-called application service provider (ASP) service, in which a server computer does not send the program to a local computer, and the processing of the function is implemented just by giving execution instructions and receiving results. The program in the embodiments described above includes information used in the processing by the computer and close to a program (not a direct instruction to the computer but data having a characteristic of setting the processing of the computer).

Although the apparatus is implemented by executing the predetermined program on the computer in the embodiments described above, at least a part of the processing can be implemented by hardware.

INDUSTRIAL APPLICABILITY

The field of application of the present invention is, for example, a field in which a client apparatus located on an in-house network conforming to TLS and a server apparatus located on the Internet perform cryptosystem communication through a gateway apparatus of the present invention by TLS authentication and by sharing a common key.

What is claimed is:

1. A common key setting method for setting a common key in a first apparatus and a second apparatus through a relay apparatus, wherein the first and second apparatuses perform processing according to a protocol including authentication between two apparatuses, sharing of a common key between the two apparatuses by using a cryptography technology, and processing for checking the validity of a common key setting process by using secret information for identifying the common key and communication log information between the two apparatuses, the common key setting method comprising:

a secret key sharing step of storing a secret key of the second apparatus into a memory of the relay apparatus;

a secret information setting step of setting secret information for identifying the common key, in a secret information setting unit of the first apparatus;

a secret information encryption step of generating encrypted secret information by encrypting the secret information by using a public key of the second apparatus corresponding to the secret key of the second apparatus, in a public key encryption processor of the first apparatus;

an encrypted secret information transmission step of transmitting the encrypted secret information to the relay apparatus, in a transmitter of the first apparatus;

a first secret information decryption step of decrypting the encrypted secret information by using the secret key of the second apparatus read from the memory of the relay apparatus to extract the secret information, in a decryption processor of the relay apparatus;

an encrypted secret information forwarding step of transmitting the encrypted secret information to the second apparatus, in a transmitter of the relay apparatus;

a second secret information decryption step of decrypting the encrypted secret information by using the secret key of the second apparatus to extract the secret information, in a decryption processor of the second apparatus;

a first finished message generation step of generating a first finished message corresponding to the secret information and communication log information between the first apparatus and the relay apparatus, in a finished message generator of the first apparatus;

a first finished message transmission step of transmitting the first finished message to the relay apparatus, in the transmitter of the first apparatus;

a second finished message generation step of generating a second finished message corresponding to the secret information and communication log information between the second apparatus and the relay apparatus, in a finished message generator of the relay apparatus;

a second finished message transmission step of transmitting the second finished message to the second apparatus, in the transmitter of the relay apparatus;

a third finished message generation step of generating a third finished message corresponding to the secret information and communication log information between the second apparatus and the relay apparatus, in a finished message generator of the second apparatus;

a third finished message transmission step of transmitting the third finished message to the relay apparatus, in a transmitter of the second apparatus;

a fourth finished message generation step of generating a fourth finished message corresponding to the secret information and communication log information between the first apparatus and the relay apparatus, in the finished message generator of the relay apparatus; and a fourth finished message transmission step of transmitting the fourth finished message to the first apparatus, in the transmitter of the relay apparatus.

2. The common key setting method according to claim 1, further comprising:

a first public key certificate transmission step of transmitting a certificate of the public key of the second apparatus to the relay apparatus before the secret information encryption step, in the transmitter of the second apparatus;

a public key certificate transmission step of receiving the certificate of the public key of the second apparatus, in a receiver of the relay apparatus, and of transmitting the certificate of the public key of the second apparatus to the first apparatus before the secret information encryption step, in the transmitter of the relay apparatus; and a finished message verification step of verifying whether the fourth finished message corresponds to the secret information, in a finished message verifier of the first apparatus.

3. The common key setting method according to claim 2, further comprising:

a second public key certificate transmission step of transmitting a certificate of a public key of the first apparatus to the relay apparatus, in the transmitter of the first apparatus;

signature information generation step of generating signature information by using a secret key of the first apparatus corresponding to the public key of the first apparatus, in a signature generator of the first apparatus;

a signature information transmission step of transmitting the signature information to the relay apparatus, in the transmitter of the first apparatus; and a signature information verification step of verifying the signature information by using the public key of the first apparatus, in a signature verifier of the relay apparatus, and of authenticating the first apparatus, in the relay apparatus.

4. A common key setting method for setting a common key in a first apparatus and a second apparatus through a relay apparatus, wherein the first and second apparatuses perform processing according to a protocol including authentication between two apparatuses, sharing of a common key between the two apparatuses by using a cryptography technology, and processing for checking the validity of a common key setting process by using secret information for identifying the common key and communication log information between the two apparatuses, the common key setting method comprising:

a secret information setting step of setting secret information for identifying the common key, in a secret information setting unit of the first apparatus;

a first secret information encryption step of generating first encrypted secret information by encrypting the secret information by using a public key of the relay apparatus corresponding to a secret key of the relay apparatus, in a public key encryption processor of the first apparatus;

an encrypted secret information transmission step of transmitting the first encrypted secret information to the relay apparatus, in a transmitter of the first apparatus;

a first secret information decryption step of decrypting the first encrypted secret information by using the secret key of the relay apparatus read from the memory of the relay apparatus to extract the secret information, in a decryption processor of the relay apparatus;

a second secret information encryption step of generating second encrypted secret information by encrypting the secret information by using a public key of the second apparatus, in a public key encryption processor of the relay apparatus;

an encrypted secret information forwarding step of transmitting the second encrypted secret information to the second apparatus, in a transmitter of the relay apparatus;

a second secret information decryption step of decrypting the second encrypted secret information by using a secret key of the second apparatus corresponding to the public key of the second apparatus to extract the secret information, in a decryption processor of the second apparatus;

a first finished message generation step of generating a first finished message corresponding to the secret information and communication log information between the first apparatus and the relay apparatus, in a finished message generator of the first apparatus;

a first finished message transmission step of transmitting the first finished message to the relay apparatus, in the transmitter of the first apparatus;

a second finished message generation step of generating a second finished message corresponding to the secret information and communication log information between the second apparatus and the relay apparatus, in a finished message generator of the relay apparatus;

a second finished message transmission step of transmitting the second finished message to the second apparatus, in the transmitter of the relay apparatus;

a third finished message generation step of generating a third finished message corresponding to the secret information and communication log information between the second apparatus and the relay apparatus, in a finished message generator of the second apparatus;

a third finished message transmission step of transmitting the third finished message to the relay apparatus, in a transmitter of the second apparatus;

a fourth finished message generation step of generating a fourth finished message corresponding to the secret information and communication log information between the first apparatus and the relay apparatus, in the finished message generator of the relay apparatus; and a fourth finished message transmission step of transmitting the fourth finished message to the first apparatus, in the transmitter of the relay apparatus.

5. The common key setting method according to claim 1, 2, 3, or 4, further comprising:

a first random number generation step of generating a first random number, in a random number generator of the first apparatus;

a first random number transmission step of transmitting the first random number to the relay apparatus, in the transmitter of the first apparatus;

a second random number transmission step of transmitting the first random number to the second apparatus, in the transmitter of the relay apparatus;

a second random number generation step of generating a second random number, in a random number generator of the second apparatus;

a third random number transmission step of transmitting the second random number to the relay apparatus, in the transmitter of the second apparatus; and a fourth random number transmission step of transmitting the second random number to the first apparatus, in the transmitter of the relay apparatus;

wherein the common key is determined by the first random number, the second random number, and the secret information;

the communication log information between the first apparatus and the relay apparatus comprises the first random number and the second random number; and the communication log information between the second apparatus and the relay apparatus comprises the first random number and the second random number.

6. The common key setting method according to claim 5, wherein the first finished message is identical to the second finished message; and the third finished message is identical to the fourth finished message.

7. The common key setting method according to claim 1, 2, 3, or 4, wherein the first finished message is identical to the second finished message; and the third finished message is identical to the fourth finished message.

8. The common key setting method according to claim 1, 2, 3, or 4, further comprising:

a re-connection starting step of transmitting transmission start request information to the relay apparatus, in the transmitter of the first apparatus, of transmitting the transmission start request information to the second apparatus, in the transmitter of the relay apparatus, of transmitting transmission start response information to the relay apparatus, in the transmitter of the second apparatus, and of transmitting the transmission start response information to the first apparatus, in the transmitter of the relay apparatus, after the fourth finished message transmission step;

a fifth finished message generation step of generating a fifth finished message corresponding to the secret information and communication log information between the first apparatus and the relay apparatus obtained after the re-connection starting step, in the finished message generator of the first apparatus;

a fifth finished message transmission step of transmitting the fifth finished message to the relay apparatus, in the transmitter of the first apparatus, and of transmitting the fifth finished message to the second apparatus, in the transmitter of the relay apparatus;

a sixth finished message generation step of generating a sixth finished message corresponding to the secret information and communication log information between the second apparatus and the relay apparatus obtained after the re-connection starting step, in the finished message generator of the second apparatus; and a sixth finished message transmission step of transmitting the sixth finished message to the relay apparatus, in the transmitter of the second apparatus, and of transmitting the sixth finished message to the first apparatus, in the transmitter of the relay apparatus.

9. The common key setting method according to claim 1, 2, 3, or 4, further comprising:

a session establishment step of executing authentication of the first apparatus, in the relay apparatus, and if the first apparatus is successfully authenticated, sharing a second common key between the relay apparatus and the first apparatus, and storing the second common key into the memory of the relay apparatus and a memory of the first apparatus, before the secret information setting step;

a transmission start request information encryption step of generating encrypted transmission start request information by encrypting transmission start request information by using the second common key, in a common key encryption processor of the first apparatus;

a transmission start request information transmission step of transmitting the encrypted transmission start request information to the relay apparatus, in the transmitter of the first apparatus;

a transmission start request information decryption step of decrypting the encrypted transmission start request information by using the second common key, in a common key encryption processor of the relay apparatus;

a transmission start request information forwarding step of forwarding the transmission start request information to the second apparatus, in the transmitter of the relay apparatus, only when the encrypted transmission start request information is correctly decrypted in the transmission start request information decryption step;

a transmission start response information transmission step of transmitting transmission start response information corresponding to the received transmission start request information to the relay apparatus, in the transmitter of the second apparatus; and
a transmission start response information forwarding step of forwarding the received transmission start response information to the first apparatus, in the transmitter of the relay apparatus;
wherein the secret information setting step is executed only when the first apparatus receives the transmission start response information.

10. The common key setting method according to claim 1, 2, 3, or 4, further comprising:
a session establishment step of executing authentication of the first apparatus, in the relay apparatus, and if the first apparatus is successfully authenticated, sharing a session identifier between the relay apparatus and the first apparatus, and storing the session identifier or corresponding information corresponding to the session identifier into the memory of the relay apparatus and the session identifier into a memory of the first apparatus, before the secret information setting step;
a transmission start request information generation step of generating transmission start request information that includes the session identifier, in a common key encryption processor of the first apparatus;
a transmission start request information transmission step of transmitting the transmission start request information that includes the session identifier to the relay apparatus, in the transmitter of the first apparatus;
a transmission start request information forwarding step of forwarding the transmission start request information to the second apparatus, in the transmitter of the relay apparatus, only when the session identifier included in the received transmission start request information matches the session identifier stored in the memory of the relay apparatus, or when the session identifier included in the received transmission start request information corresponds to the corresponding information stored in the memory of the relay apparatus;
a transmission start response information transmission step of transmitting transmission start response information corresponding to the received transmission start request information to the relay apparatus, in the transmitter of the second apparatus; and
a transmission start response information forwarding step of forwarding the received transmission start response information to the first apparatus, in the transmitter of the relay apparatus;
wherein the secret information setting step is executed only when the first apparatus receives the transmission start response information.

11. A relay apparatus, comprising:
a memory;
a transmitter;
a receiver;
a decryption processor;
a first finished message generator; and
a second finished message generator;
wherein the relay apparatus performs a relay operation between a first apparatus and a second apparatus that perform processing according to a protocol including authentication between two apparatuses, sharing of a common key between the two apparatuses by using a cryptography technology, and processing for checking the validity of a common key setting process by using secret information for identifying the common key and communication log information between the two apparatuses;

the memory stores a secret key of the second apparatus;
the receiver receives encrypted secret information generated by encrypting secret information used to identify a common key, by using a public key of the second apparatus corresponding to the secret key of the second apparatus;
the decryption processor decrypts the encrypted secret information by using the secret key of the second apparatus read from the memory to extract the secret information;
the transmitter transmits the encrypted secret information to the second apparatus;
the receiver receives a first finished message corresponding to the secret information and communication log information between the first apparatus and the relay apparatus, from the first apparatus;
the first finished message generator generates a second finished message corresponding to the secret information and communication log information between the second apparatus and the relay apparatus;
the transmitter transmits the second finished message to the second apparatus;
the receiver receives a third finished message corresponding to the secret information and communication log information between the second apparatus and the relay apparatus, from the second apparatus;
the second finished message generator generates a fourth finished message corresponding to the secret information and communication log information between the first apparatus and the relay apparatus; and
the transmitter transmits the fourth finished message to the first apparatus.

12. A relay apparatus, comprising:
a memory;
a transmitter;
a receiver;
a decryption processor;
a public key encryption processor;
a first finished message generator; and
a second finished message generator;
wherein the relay apparatus performs a relay operation between a first apparatus and a second apparatus that perform processing according to a protocol including authentication between two apparatuses, sharing of a common key between the two apparatuses by using a cryptography technology, and processing for checking the validity of a common key setting process by using secret information for identifying the common key and communication log information between the two apparatuses;
the memory stores a secret key of the relay apparatus;
the receiver receives first encrypted secret information generated by encrypting secret information used to identify a common key, by using a public key of the relay apparatus corresponding to the secret key of the relay apparatus;
the decryption processor decrypts the first encrypted secret information by using the secret key of the relay apparatus read from the memory to extract the secret information;
the public key encryption processor generates second encrypted secret information by encrypting the secret information by using a public key of the second apparatus;
the transmitter transmits the second encrypted secret information to the second apparatus;

the receiver receives a first finished message corresponding to the secret information and communication log information between the first apparatus and the relay apparatus, from the first apparatus;

the first finished message generator generates a second finished message corresponding to the secret information and communication log information between the second apparatus and the relay apparatus;

the transmitter transmits the second finished message to the second apparatus;

the receiver receives a third finished message corresponding to the secret information and communication log information between the second apparatus and the relay apparatus, from the second apparatus;

the second finished message generator generates a fourth finished message corresponding to the secret information and communication log information between the first apparatus and the relay apparatus; and the transmitter transmits the fourth finished message to the first apparatus.

13. The relay apparatus according to claim 11 or 12, further comprising a cryptosystem list restriction unit, wherein the receiver receives, from the first apparatus, a cryptosystem list that lists cryptosystems for sharing the secret information between two apparatuses;

the cryptosystem list restriction unit selects, among the cryptosystems listed in the cryptosystem list, only public key cryptosystems by which one of the two apparatuses encrypts the secret information and transmits the encrypted text to the other apparatus, and the other apparatus decrypts the encrypted text to share the secret information between the two apparatuses, and the cryptosystem list restriction unit generates a new cryptosystem list that lists the selected cryptosystems only; and the transmitter transmits the new cryptosystem list to the second apparatus.

14. The relay apparatus according to claim 11 or 12, wherein the receiver receives transmission start request information from the first apparatus after the fourth finished message is transmitted to the first apparatus;

the transmitter forwards the received transmission start request information to the second apparatus;

the receiver receives transmission start response information from the second apparatus;

the transmitter forwards the received transmission start response information to the first apparatus;

the transmitter receives, from the first apparatus, a fifth finished message corresponding to the secret information and communication log information between the first apparatus and the relay apparatus obtained after the transmission start request information;

the transmitter forwards the received fifth finished message to the second apparatus;

the receiver receives, from the second apparatus, a sixth finished message corresponding to the secret information and communication log information between the second apparatus and the relay apparatus obtained after the transmission start request information; and the transmitter forwards the received sixth finished message to the first apparatus.

15. A non-transitory computer readable storage medium which stores a program for causing a computer to function as the relay apparatus according to claim 11 or 12.

* * * * *